United States Patent
Ozolins et al.

(10) Patent No.: US 12,496,422 B2
(45) Date of Patent: Dec. 16, 2025

(54) AIR DELIVERY CONDUIT

(71) Applicant: RESMED ASIA PTE. LTD., Singapore (SG)

(72) Inventors: Angelene Marie Ozolins, Sydney (AU); Beng Hai Tan, Singapore (SG); Mohankumar Krishnan Valiyambath, Singapore (SG); Sok Li Goh, Singapore (SG)

(73) Assignee: ResMed Asia Pte. Ltd., Singapore (SG)

( * ) Notice: Subject to any disclaimer, the term of this patent is extended or adjusted under 35 U.S.C. 154(b) by 1027 days.

(21) Appl. No.: 17/612,657

(22) PCT Filed: May 20, 2020

(86) PCT No.: PCT/IB2020/054750
§ 371 (c)(1),
(2) Date: Nov. 19, 2021

(87) PCT Pub. No.: WO2020/234778
PCT Pub. Date: Nov. 26, 2020

(65) Prior Publication Data
US 2022/0218934 A1    Jul. 14, 2022

(30) Foreign Application Priority Data

May 20, 2019  (AU) ................................. 2019901704
Jul. 30, 2019  (AU) ................................. 2019902721
May 11, 2020  (SG) ............................. 1020200432U

(51) Int. Cl.
*A61M 16/08*    (2006.01)
*A61M 16/00*    (2006.01)
(Continued)

(52) U.S. Cl.
CPC .... *A61M 16/0875* (2013.01); *A61M 16/0066* (2013.01); *A61M 16/022* (2017.08);
(Continued)

(58) Field of Classification Search
CPC .......... A61M 16/0875; A61M 16/0066; A61M 16/1095; A61M 2207/00; A61M 2207/10;
(Continued)

(56) References Cited

U.S. PATENT DOCUMENTS 2,358,743 A * 9/1944 Smith ................ F16L 11/02
                                              138/128
4,782,832 A    11/1988 Trimble et al.
(Continued)

FOREIGN PATENT DOCUMENTS

JP    S49-83917        8/1974
WO    98/004310 A1    2/1998
(Continued)

OTHER PUBLICATIONS

Extended European Search Report dated Jun. 19, 2023 issued in European Application No. 20809245.2 (6 pages).
(Continued)

*Primary Examiner* — Kendra D Carter
*Assistant Examiner* — Jaeick Jang
(74) *Attorney, Agent, or Firm* — Nixon & Vanderhye P.C.

(57) ABSTRACT

Methods of manufacturing components and devices for providing respiratory pressure therapy, and components manufactured according to the methods. Support structures are provided for the components. In embodiments, the support structures may be rigid rings. Alternatively, resilient materials are applied to components to create resilient reinforcing elements. The devices and components include conduits to deliver flows of pressurised gas to a patient interface, positioning and stabilising structures having head- (Continued)

gear tubes with support elements, and patient interfaces including the conduits.

22 Claims, 73 Drawing Sheets

(51) Int. Cl.
*A61M 16/06* (2006.01)
*A61M 16/10* (2006.01)
*A61M 16/12* (2006.01)
*A61M 16/16* (2006.01)
*A61M 16/20* (2006.01)

(52) U.S. Cl.
CPC .... *A61M 16/0611* (2014.02); *A61M 16/0616* (2014.02); *A61M 16/0622* (2014.02); *A61M 16/0666* (2013.01); *A61M 16/0683* (2013.01); *A61M 16/0816* (2013.01); *A61M 16/1005* (2014.02); *A61M 16/107* (2014.02); *A61M 16/109* (2014.02); *A61M 16/1095* (2014.02); *A61M 16/125* (2014.02); *A61M 16/16* (2013.01); *A61M 16/208* (2013.01); *A61M 2016/0027* (2013.01); *A61M 2016/0039* (2013.01); *A61M 2205/02* (2013.01); *A61M 2205/3334* (2013.01); *A61M 2205/3344* (2013.01); *A61M 2205/3368* (2013.01); *A61M 2205/3653* (2013.01); *A61M 2205/7518* (2013.01); *A61M 2207/10* (2013.01); *A61M 2210/0618* (2013.01)

(58) Field of Classification Search
CPC ........ F16L 11/11; F16L 11/111; F16L 11/112; F16L 11/115; F16L 11/118; F16L 11/1185; F24F 13/0218
See application file for complete search history.

(56) References Cited

U.S. PATENT DOCUMENTS

| | | | | |
|---|---|---|---|---|
| 4,920,235 | A * | 4/1990 | Yamaguchi | H01R 4/646 174/DIG. 11 |
| 4,944,310 | A | 7/1990 | Sullivan | |
| 6,532,959 | B1 | 3/2003 | Berthon-Jones | |
| 6,581,594 | B1 | 6/2003 | Drew et al. | |
| 7,866,944 | B2 | 1/2011 | Kenyon et al. | |
| 8,636,479 | B2 | 1/2014 | Kenyon et al. | |
| 8,638,014 | B2 | 1/2014 | Sears et al. | |
| 8,733,349 | B2 | 5/2014 | Bath et al. | |
| 9,656,038 | B2 | 5/2017 | Rummery et al. | |
| 10,034,995 | B2 | 7/2018 | Kooij et al. | |
| 2003/0075228 | A1 * | 4/2003 | Tippett | B32B 27/28 156/143 |
| 2004/0065335 | A1 | 4/2004 | Huber et al. | |
| 2004/0099268 | A1 | 5/2004 | Smith et al. | |
| 2008/0173305 | A1 * | 7/2008 | Frater | B08B 9/023 128/204.26 |
| 2009/0025724 | A1 | 1/2009 | Herron, Jr. | |
| 2009/0044808 | A1 | 2/2009 | Guney Memduh et al. | |
| 2009/0050156 | A1 | 2/2009 | Ng et al. | |
| 2010/0000534 | A1 | 1/2010 | Kooij et al. | |
| 2010/0224195 | A1 | 9/2010 | Henry | |
| 2014/0007881 | A1 * | 1/2014 | Rummery | A61M 16/0633 156/195 |
| 2015/0083131 | A1 * | 3/2015 | Mals | F16L 11/02 128/204.18 |
| 2015/0352308 | A1 | 12/2015 | Cullen et al. | |
| 2017/0333663 | A1 | 11/2017 | Huber et al. | |
| 2018/0021535 | A1 * | 1/2018 | Goff | A61M 16/0875 128/202.27 |

FOREIGN PATENT DOCUMENTS

| | | |
|---|---|---|
| WO | 98/034665 A1 | 8/1998 |
| WO | 2000/078381 A1 | 12/2000 |
| WO | 2004/073778 A1 | 9/2004 |
| WO | 2005/063328 A1 | 7/2005 |
| WO | 2006/074513 A1 | 7/2006 |
| WO | 2006/130903 A1 | 12/2006 |
| WO | 2009/052560 A1 | 4/2009 |
| WO | 2010/084183 A2 | 7/2010 |
| WO | 2010/135785 A1 | 12/2010 |
| WO | 2012/053910 A1 | 4/2012 |
| WO | 2012/122601 A1 | 9/2012 |
| WO | 2012/171072 A1 | 12/2012 |
| WO | 2013/020167 A1 | 2/2013 |
| WO | 2016/133781 A1 | 8/2016 |

OTHER PUBLICATIONS

Office Action dated Oct. 16, 2023 issued in Japanese Application No. 2021-569855 with English translation (11 pages).
International Search Report for PCT/IB2020/054720 mailed Aug. 28, 2020, 19 pages.
Written Opinion of the ISA for PCT/IB2020/054750 mailed Aug. 28, 2020, 7 pages.
Written Opinion of the International Preliminary Examining Authority for PCT/IB2020/054750 mailed May 7, 2021, 6 pages.
International Preliminary Report on Patentability for PCT/IB2020/054750 mailed Sep. 20, 2021, 43 pages.
"Respiratory Physiology", by John B. West, Lippincott Williams & Wilkins, 9th edition published 2012 (8 pages).
Examination Report dated Oct. 2, 2024 issued in New Zealand Application No. 799085 (3 pages).
Examination Report dated Oct. 1, 2024 issued in New Zealand Application No. 779012 (3 pages).
Office Action dated Oct. 29, 2024 issued in Chinese Application No. 202080052451.3 with English translation (11 pages).
Examination Report dated May 5, 2025 issued in Australian Application No. 2020278993 (3 pages).
Office Action dated Jun. 5, 2025 issued in Chinese Application No. 202080052451.3 with English translation (11 pages).

* cited by examiner

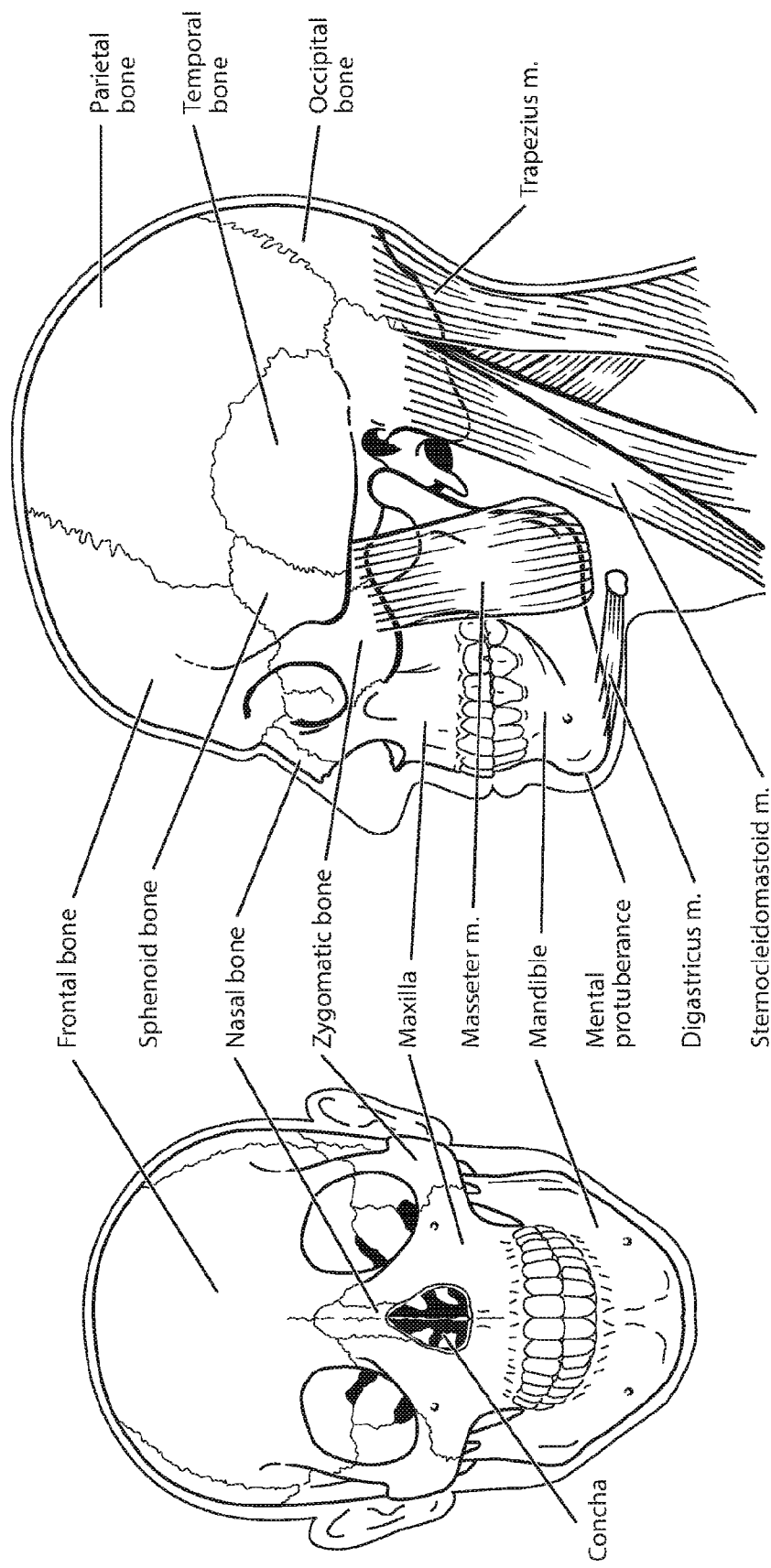

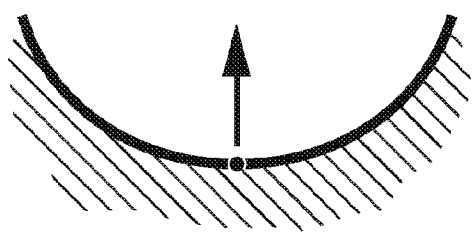
FIG. 3B — Relatively Large Positive Curvature
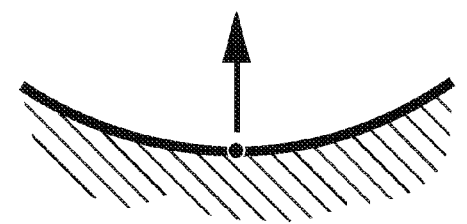
FIG. 3C — Relatively Small Positive Curvature
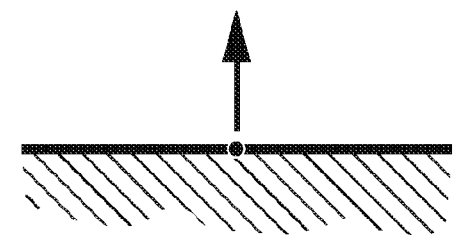
FIG. 3D — Zero Curvature
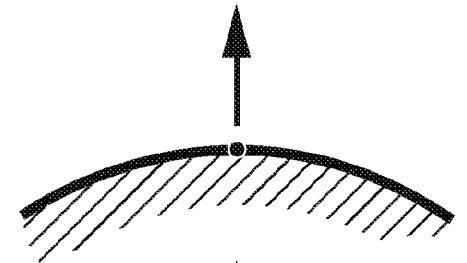
FIG. 3E — Relatively Small Negative Curvature
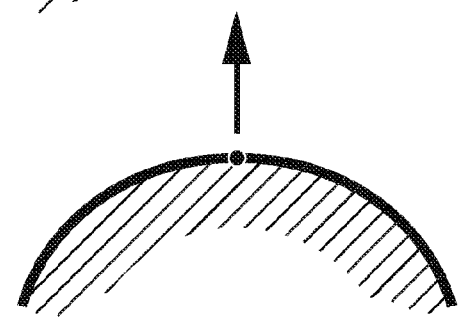
FIG. 3F — Relatively Large Negative Curvature Left-hand rule
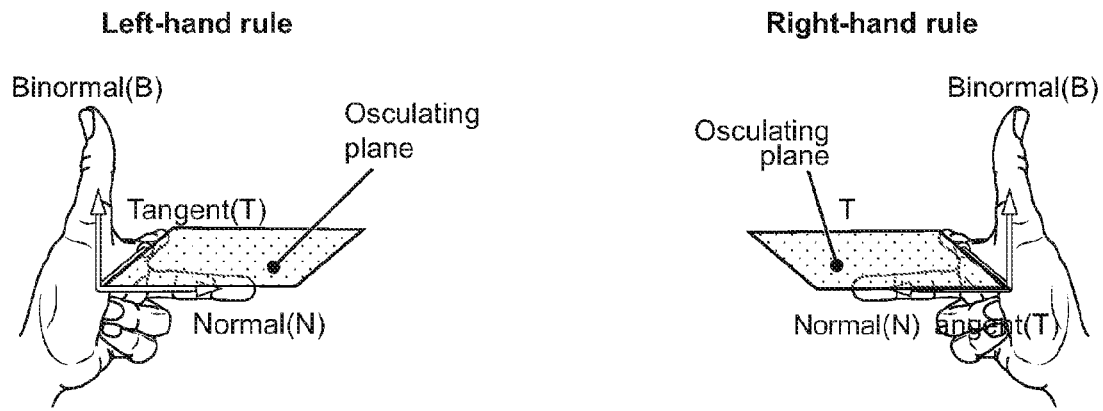
FIG. 3O
Right-hand rule
FIG. 3P
Left ear helix
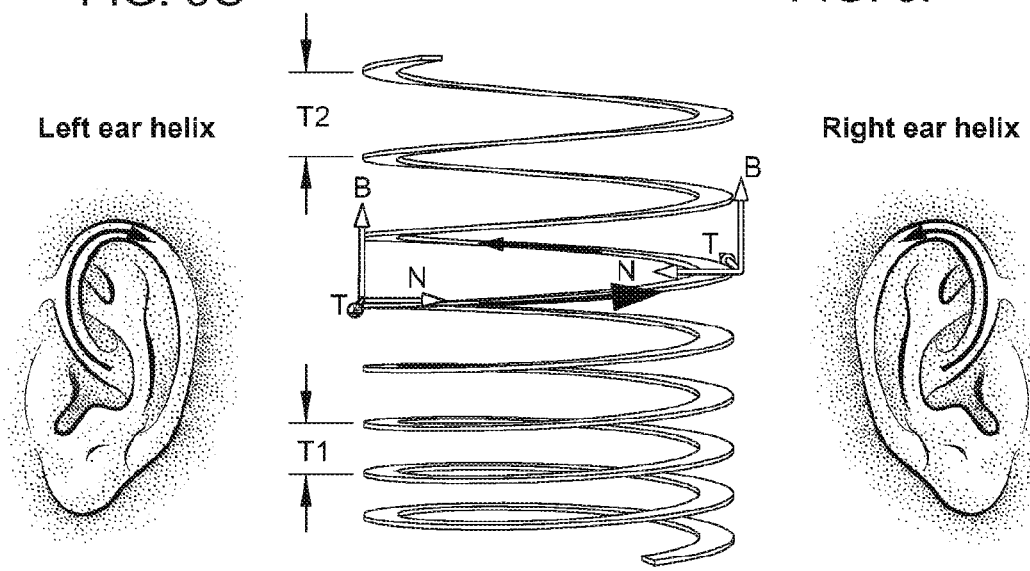
FIG. 3Q
Right-hand helix
Right-hand positive
FIG. 3S
Right ear helix
FIG. 3R
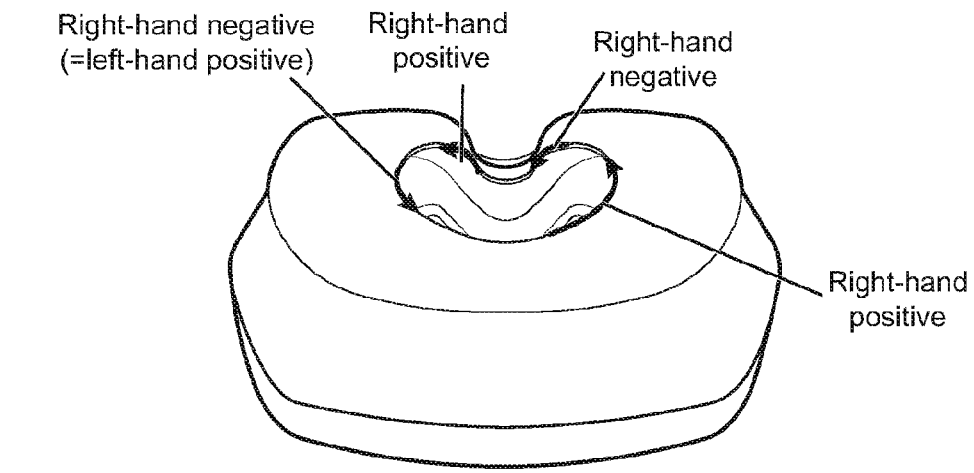
FIG. 3T

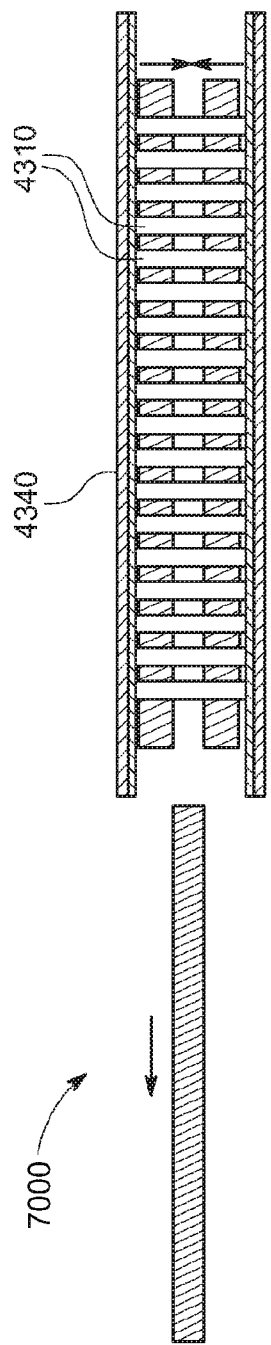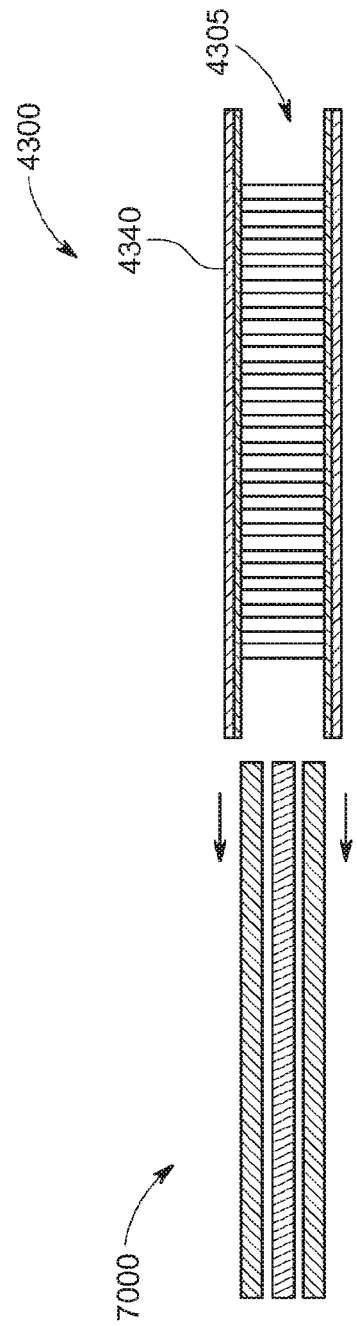

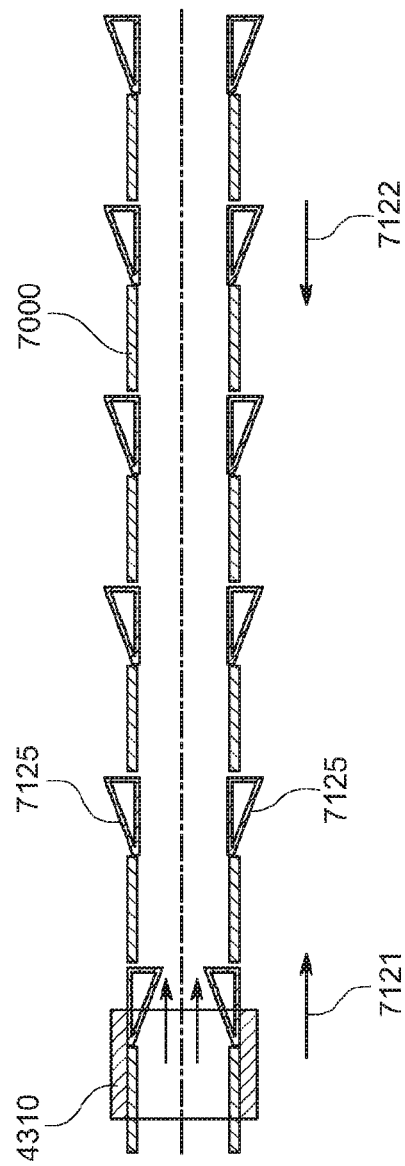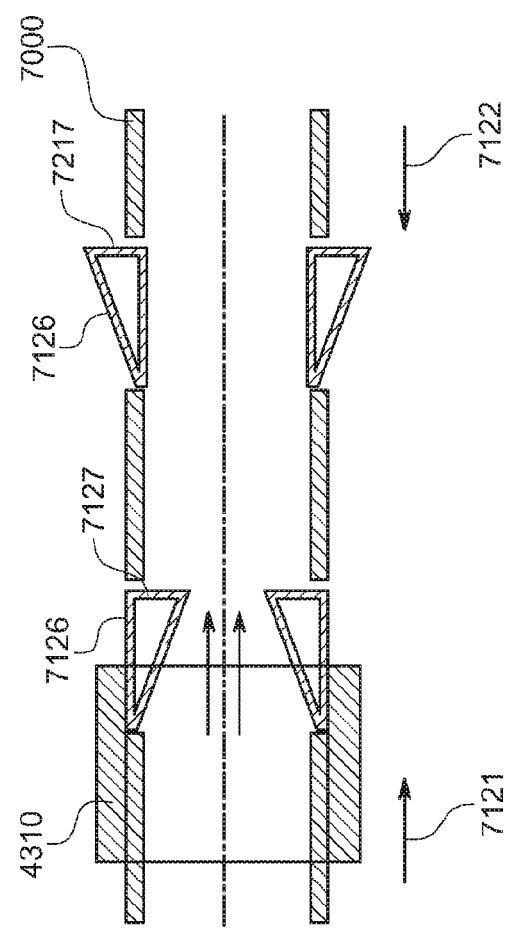
FIG. 54
FIG. 55

AIR DELIVERY CONDUIT

1 CROSS-REFERENCE TO RELATED APPLICATIONS

This application is the U.S. national phase of International Application No. PCT/IB2020/054750 filed May 20, 2020 which designated the U.S. and claims priority to Australian Patent Application No. 2019901704 filed 20 May 2019, Australian Patent Application No. 2019902721 filed 30 Jul. 2019 and Singaporean patent application number 1020200432U filed 11 May 2020, the entire contents of each of which are hereby incorporated by reference.

2 BACKGROUND OF THE TECHNOLOGY

2.1 Field of the Technology

The present technology relates to one or more of the screening, diagnosis, monitoring, treatment, prevention and amelioration of respiratory-related disorders. The present technology also relates to medical devices or apparatus, and their use.

2.2 Description of the Related Art

2.2.1 Human Respiratory System and its Disorders

The respiratory system of the body facilitates gas exchange. The nose and mouth form the entrance to the airways of a patient.

The airways include a series of branching tubes, which become narrower, shorter and more numerous as they penetrate deeper into the lung. The prime function of the lung is gas exchange, allowing oxygen to move from the inhaled air into the venous blood and carbon dioxide to move in the opposite direction. The trachea divides into right and left main bronchi, which further divide eventually into terminal bronchioles. The bronchi make up the conducting airways, and do not take part in gas exchange. Further divisions of the airways lead to the respiratory bronchioles, and eventually to the alveoli. The alveolated region of the lung is where the gas exchange takes place, and is referred to as the respiratory zone. See "*Respiratory Physiology*", by John B. West, Lippincott Williams & Wilkins, 9th edition published 2012.

A range of respiratory disorders exist. Certain disorders may be characterised by particular events, e.g. apneas, hypopneas, and hyperpneas.

Examples of respiratory disorders include Obstructive Sleep Apnea (OSA), Cheyne-Stokes Respiration (CSR), respiratory insufficiency, Obesity Hyperventilation Syndrome (OHS), Chronic Obstructive Pulmonary Disease (COPD), Neuromuscular Disease (NMD) and Chest wall disorders.

Obstructive Sleep Apnea (OSA), a form of Sleep Disordered Breathing (SDB), is characterised by events including occlusion or obstruction of the upper air passage during sleep. It results from a combination of an abnormally small upper airway and the normal loss of muscle tone in the region of the tongue, soft palate and posterior oropharyngeal wall during sleep. The condition causes the affected patient to stop breathing for periods typically of 30 to 120 seconds in duration, sometimes 200 to 300 times per night. It often causes excessive daytime somnolence, and it may cause cardiovascular disease and brain damage. The syndrome is a common disorder, particularly in middle aged overweight males, although a person affected may have no awareness of the problem. See U.S. Pat. No. 4,944,310 (Sullivan).

Cheyne-Stokes Respiration (CSR) is another form of sleep disordered breathing. CSR is a disorder of a patient's respiratory controller in which there are rhythmic alternating periods of waxing and waning ventilation known as CSR cycles. CSR is characterised by repetitive de-oxygenation and re-oxygenation of the arterial blood. It is possible that CSR is harmful because of the repetitive hypoxia. In some patients CSR is associated with repetitive arousal from sleep, which causes severe sleep disruption, increased sympathetic activity, and increased afterload. See U.S. Pat. No. 6,532,959 (Berthon-Jones).

Respiratory failure is an umbrella term for respiratory disorders in which the lungs are unable to inspire sufficient oxygen or exhale sufficient $CO_2$ to meet the patient's needs. Respiratory failure may encompass some or all of the following disorders.

A patient with respiratory insufficiency (a form of respiratory failure) may experience abnormal shortness of breath on exercise.

Obesity Hyperventilation Syndrome (OHS) is defined as the combination of severe obesity and awake chronic hypercapnia, in the absence of other known causes for hypoventilation. Symptoms include dyspnea, morning headache and excessive daytime sleepiness.

Chronic Obstructive Pulmonary Disease (COPD) encompasses any of a group of lower airway diseases that have certain characteristics in common. These include increased resistance to air movement, extended expiratory phase of respiration, and loss of the normal elasticity of the lung. Examples of COPD are emphysema and chronic bronchitis. COPD is caused by chronic tobacco smoking (primary risk factor), occupational exposures, air pollution and genetic factors. Symptoms include: dyspnea on exertion, chronic cough and sputum production.

Neuromuscular Disease (NMD) is a broad term that encompasses many diseases and ailments that impair the functioning of the muscles either directly via intrinsic muscle pathology, or indirectly via nerve pathology. Some NMD patients are characterised by progressive muscular impairment leading to loss of ambulation, being wheelchair-bound, swallowing difficulties, respiratory muscle weakness and, eventually, death from respiratory failure. Neuromuscular disorders can be divided into rapidly progressive and slowly progressive: (i) Rapidly progressive disorders: Characterised by muscle impairment that worsens over months and results in death within a few years (e.g. Amyotrophic lateral sclerosis (ALS) and Duchenne muscular dystrophy (DMD) in teenagers); (ii) Variable or slowly progressive disorders: Characterised by muscle impairment that worsens over years and only mildly reduces life expectancy (e.g. Limb girdle, Facioscapulohumeral and Myotonic muscular dystrophy). Symptoms of respiratory failure in NMD include: increasing generalised weakness, dysphagia, dyspnea on exertion and at rest, fatigue, sleepiness, morning headache, and difficulties with concentration and mood changes.

Chest wall disorders are a group of thoracic deformities that result in inefficient coupling between the respiratory muscles and the thoracic cage. The disorders are usually characterised by a restrictive defect and share the potential of long term hypercapnic respiratory failure. Scoliosis and/or kyphoscoliosis may cause severe respiratory failure. Symptoms of respiratory failure include: dyspnea on exertion, peripheral oedema, orthopnea, repeated chest infections, morning headaches, fatigue, poor sleep quality and loss of appetite.

A range of therapies have been used to treat or ameliorate such conditions. Furthermore, otherwise healthy individuals may take advantage of such therapies to prevent respiratory disorders from arising. However, these have a number of shortcomings.

2.2.2 Therapy

Various therapies, such as Continuous Positive Airway Pressure (CPAP) therapy, Non-invasive ventilation (NIV) and Invasive ventilation (IV) have been used to treat one or more of the above respiratory disorders.

Continuous Positive Airway Pressure (CPAP) therapy has been used to treat Obstructive Sleep Apnea (OSA). The mechanism of action is that continuous positive airway pressure acts as a pneumatic splint and may prevent upper airway occlusion, such as by pushing the soft palate and tongue forward and away from the posterior oropharyngeal wall. Treatment of OSA by CPAP therapy may be voluntary, and hence patients may elect not to comply with therapy if they find devices used to provide such therapy one or more of: uncomfortable, difficult to use, expensive and aesthetically unappealing.

Non-invasive ventilation (NIV) provides ventilatory support to a patient through the upper airways to assist the patient breathing and/or maintain adequate oxygen levels in the body by doing some or all of the work of breathing. The ventilatory support is provided via a non-invasive patient interface. NIV has been used to treat CSR and respiratory failure, in forms such as OHS, COPD, NMD and Chest Wall disorders. In some forms, the comfort and effectiveness of these therapies may be improved.

Invasive ventilation (IV) provides ventilatory support to patients that are no longer able to effectively breathe themselves and may be provided using a tracheostomy tube. In some forms, the comfort and effectiveness of these therapies may be improved.

2.2.3 Treatment Systems

These therapies may be provided by a treatment system or device. Such systems and devices may also be used to screen, diagnose, or monitor a condition without treating it.

A treatment system may comprise a Respiratory Pressure Therapy Device (RPT device), an air circuit, a humidifier, a patient interface, and data management. Another form of treatment system is a mandibular repositioning device.

2.2.3.1 Patient Interface

A patient interface may be used to interface respiratory equipment to its wearer, for example by providing a flow of air to an entrance to the airways. The flow of air may be provided via a mask to the nose and/or mouth, a tube to the mouth or a tracheostomy tube to the trachea of a patient. Depending upon the therapy to be applied, the patient interface may form a seal, e.g., with a region of the patient's face, to facilitate the delivery of gas at a pressure at sufficient variance with ambient pressure to effect therapy, e.g., at a positive pressure of about 10 cmH$_2$O relative to ambient pressure. For other forms of therapy, such as the delivery of oxygen, the patient interface may not include a seal sufficient to facilitate delivery to the airways of a supply of gas at a positive pressure of about 10 cmH$_2$O.

Certain other mask systems may be functionally unsuitable for the present field. For example, purely ornamental masks may be unable to maintain a suitable pressure. Mask systems used for underwater swimming or diving may be configured to guard against ingress of water from an external higher pressure, but not to maintain air internally at a higher pressure than ambient.

Certain masks may be clinically unfavourable for the present technology e.g. if they block airflow via the nose and only allow it via the mouth.

Certain masks may be uncomfortable or impractical for the present technology if they require a patient to insert a portion of a mask structure in their mouth to create and maintain a seal via their lips.

Certain masks may be impractical for use while sleeping, e.g. for sleeping while lying on one's side in bed with a head on a pillow.

The design of a patient interface presents a number of challenges. The face has a complex three-dimensional shape. The size and shape of noses and heads varies considerably between individuals. Since the head includes bone, cartilage and soft tissue, different regions of the face respond differently to mechanical forces. The jaw or mandible may move relative to other bones of the skull. The whole head may move during the course of a period of respiratory therapy.

As a consequence of these challenges, some masks suffer from being one or more of obtrusive, aesthetically undesirable, costly, poorly fitting, difficult to use, and uncomfortable especially when worn for long periods of time or when a patient is unfamiliar with a system. Wrongly sized masks can give rise to reduced compliance, reduced comfort and poorer patient outcomes. Masks designed solely for aviators, masks designed as part of personal protection equipment (e.g. filter masks), SCUBA masks, or for the administration of anaesthetics may be tolerable for their original application, but nevertheless such masks may be undesirably uncomfortable to be worn for extended periods of time, e.g., several hours. This discomfort may lead to a reduction in patient compliance with therapy. This is even more so if the mask is to be worn during sleep.

CPAP therapy is highly effective to treat certain respiratory disorders, provided patients comply with therapy. If a mask is uncomfortable, or difficult to use a patient may not comply with therapy. Since it is often recommended that a patient regularly wash their mask, if a mask is difficult to clean (e.g., difficult to assemble or disassemble), patients may not clean their mask and this may impact on patient compliance.

While a mask for other applications (e.g. aviators) may not be suitable for use in treating sleep disordered breathing, a mask designed for use in treating sleep disordered breathing may be suitable for other applications.

For these reasons, patient interfaces for delivery of CPAP during sleep form a distinct field.

2.2.3.1.1 Seal-Forming Structure

Patient interfaces may include a seal-forming structure. Since it is in direct contact with the patient's face, the shape and configuration of the seal-forming structure can have a direct impact the effectiveness and comfort of the patient interface.

A patient interface may be partly characterised according to the design intent of where the seal-forming structure is to engage with the face in use. In one form of patient interface, a seal-forming structure may comprise a first sub-portion to form a seal around the left naris and a second sub-portion to form a seal around the right naris. In one form of patient interface, a seal-forming structure may comprise a single element that surrounds both nares in use. Such single element may be designed to for example overlay an upper lip region and a nasal bridge region of a face. In one form of patient interface a seal-forming structure may comprise an element that surrounds a mouth region in use, e.g. by forming a seal on a lower lip region of a face. In one form of patient interface, a seal-forming structure may comprise a single element that surrounds both nares and a mouth region in use. These different types of patient interfaces may be known by a variety of names by their manufacturer including nasal masks, full-face masks, nasal pillows, nasal puffs and oro-nasal masks.

A seal-forming structure that may be effective in one region of a patient's face may be inappropriate in another region, e.g. because of the different shape, structure, variability and sensitivity regions of the patient's face. For example, a seal on swimming goggles that overlays a patient's forehead may not be appropriate to use on a patient's nose.

Certain seal-forming structures may be designed for mass manufacture such that one design fit and be comfortable and effective for a wide range of different face shapes and sizes. To the extent to which there is a mismatch between the shape of the patient's face, and the seal-forming structure of the mass-manufactured patient interface, one or both must adapt in order for a seal to form.

One type of seal-forming structure extends around the periphery of the patient interface, and is intended to seal against the patient's face when force is applied to the patient interface with the seal-forming structure in confronting engagement with the patient's face. The seal-forming structure may include an air or fluid filled cushion, or a moulded or formed surface of a resilient seal element made of an elastomer such as a rubber. With this type of seal-forming structure, if the fit is not adequate, there will be gaps between the seal-forming structure and the face, and additional force will be required to force the patient interface against the face in order to achieve a seal.

Another type of seal-forming structure incorporates a flap seal of thin material positioned about the periphery of the mask so as to provide a self-sealing action against the face of the patient when positive pressure is applied within the mask. Like the previous style of seal forming portion, if the match between the face and the mask is not good, additional force may be required to achieve a seal, or the mask may leak.

Furthermore, if the shape of the seal-forming structure does not match that of the patient, it may crease or buckle in use, giving rise to leaks.

Another type of seal-forming structure may comprise a friction-fit element, e.g. for insertion into a naris, however some patients find these uncomfortable.

Another form of seal-forming structure may use adhesive to achieve a seal. Some patients may find it inconvenient to constantly apply and remove an adhesive to their face.

A range of patient interface seal-forming structure technologies are disclosed in the following patent applications, assigned to ResMed Limited: WO 1998/004,310; WO 2006/074,513; WO 2010/135,785.

One form of nasal pillow is found in the Adam Circuit manufactured by Puritan Bennett. Another nasal pillow, or nasal puff is the subject of U.S. Pat. No. 4,782,832 (Trimble et al.), assigned to Puritan-Bennett Corporation.

ResMed Limited has manufactured the following products that incorporate nasal pillows: SWIFT™ nasal pillows mask, SWIFT™ II nasal pillows mask, SWIFT™ LT nasal pillows mask, SWIFT™ FX nasal pillows mask and MIRAGE LIBERTY™ full-face mask. The following patent applications, assigned to ResMed Limited, describe examples of nasal pillows masks: International Patent Application WO2004/073,778 (describing amongst other things aspects of the ResMed Limited SWIFT™ nasal pillows), US Patent Application 2009/0044808 (describing amongst other things aspects of the ResMed Limited SWIFT™ LT nasal pillows); International Patent Applications WO 2005/063, 328 and WO 2006/130,903 (describing amongst other things aspects of the ResMed Limited MIRAGE LIBERTY™ full-face mask); International Patent Application WO 2009/052,560 (describing amongst other things aspects of the ResMed Limited SWIFT™ FX nasal pillows).

2.2.3.1.2 Positioning and Stabilising

A seal-forming structure of a patient interface used for positive air pressure therapy is subject to the corresponding force of the air pressure to disrupt a seal. Thus a variety of techniques have been used to position the seal-forming structure, and to maintain it in sealing relation with the appropriate portion of the face.

One technique is the use of adhesives. See for example US Patent Application Publication No. US 2010/0000534. However, the use of adhesives may be uncomfortable for some.

Another technique is the use of one or more straps and/or stabilising harnesses. Many such harnesses suffer from being one or more of ill-fitting, bulky, uncomfortable and awkward to use.

2.2.3.2 Respiratory Pressure Therapy (RPT) Device

A respiratory pressure therapy (RPT) device may be used individually or as part of a system to deliver one or more of a number of therapies described above, such as by operating the device to generate a flow of air for delivery to an interface to the airways. The flow of air may be pressurised. Examples of RPT devices include a CPAP device and a ventilator.

Air pressure generators are known in a range of applications, e.g. industrial-scale ventilation systems. However, air pressure generators for medical applications have particular requirements not fulfilled by more generalised air pressure generators, such as the reliability, size and weight requirements of medical devices. In addition, even devices designed for medical treatment may suffer from shortcomings, pertaining to one or more of: comfort, noise, ease of use, efficacy, size, weight, manufacturability, cost, and reliability.

An example of the special requirements of certain RPT devices is acoustic noise.

Table of noise output levels of prior RPT devices (one specimen only, measured using test method specified in ISO 3744 in CPAP mode at 10 $cmH_2O$).

| RPT Device name | A-weighted sound pressure level dB(A) | Year (approx.) |
| --- | --- | --- |
| C-Series Tango ™ | 31.9 | 2007 |
| C-Series Tango ™ with Humidifier | 33.1 | 2007 |

-continued

| RPT Device name | A-weighted sound pressure level dB(A) | Year (approx.) |
|---|---|---|
| S8 Escape ™ II | 30.5 | 2005 |
| S8 Escape ™ II with H4i ™ Humidifier | 31.1 | 2005 |
| S9 AutoSet ™ | 26.5 | 2010 |
| S9 AutoSet ™ with H5i Humidifier | 28.6 | 2010 |

One known RPT device used for treating sleep disordered breathing is the S9 Sleep Therapy System, manufactured by ResMed Limited. Another example of an RPT device is a ventilator. Ventilators such as the ResMed Stellar™ Series of Adult and Paediatric Ventilators may provide support for invasive and non-invasive non-dependent ventilation for a range of patients for treating a number of conditions such as but not limited to NMD, OHS and COPD.

The ResMed Elisée™ 150 ventilator and ResMed VS III™ ventilator may provide support for invasive and non-invasive dependent ventilation suitable for adult or paediatric patients for treating a number of conditions. These ventilators provide volumetric and barometric ventilation modes with a single or double limb circuit. RPT devices typically comprise a pressure generator, such as a motor-driven blower or a compressed gas reservoir, and are configured to supply a flow of air to the airway of a patient. In some cases, the flow of air may be supplied to the airway of the patient at positive pressure. The outlet of the RPT device is connected via an air circuit to a patient interface such as those described above.

The designer of a device may be presented with an infinite number of choices to make. Design criteria often conflict, meaning that certain design choices are far from routine or inevitable. Furthermore, the comfort and efficacy of certain aspects may be highly sensitive to small, subtle changes in one or more parameters.

2.2.3.3 Air Circuit

Conventional air circuits for respiratory pressure therapy generally include corrugated plastic tubes that have a hard feel against the skin. Such tubing often incorporates a helical plastic support structure and plastic film.

2.2.3.4 Humidifier

Delivery of a flow of air without humidification may cause drying of airways. The use of a humidifier with an RPT device and the patient interface produces humidified gas that minimizes drying of the nasal mucosa and increases patient airway comfort. In addition in cooler climates, warm air applied generally to the face area in and about the patient interface is more comfortable than cold air.

A range of artificial humidification devices and systems are known, however they may not fulfil the specialised requirements of a medical humidifier.

Medical humidifiers are used to increase humidity and/or temperature of the flow of air in relation to ambient air when required, typically where the patient may be asleep or resting (e.g. at a hospital). A medical humidifier for bedside placement may be small. A medical humidifier may be configured to only humidify and/or heat the flow of air delivered to the patient without humidifying and/or heating the patient's surroundings. Room-based systems (e.g. a sauna, an air conditioner, or an evaporative cooler), for example, may also humidify air that is breathed in by the patient, however those systems would also humidify and/or heat the entire room, which may cause discomfort to the occupants. Furthermore medical humidifiers may have more stringent safety constraints than industrial humidifiers While a number of medical humidifiers are known, they can suffer from one or more shortcomings. Some medical humidifiers may provide inadequate humidification, some are difficult or inconvenient to use by patients.

2.2.3.5 Data Management

There may be clinical reasons to obtain data to determine whether the patient prescribed with respiratory therapy has been "compliant", e.g. that the patient has used their RPT device according to one or more "compliance rules". One example of a compliance rule for CPAP therapy is that a patient, in order to be deemed compliant, is required to use the RPT device for at least four hours a night for at least 21 of 30 consecutive days. In order to determine a patient's compliance, a provider of the RPT device, such as a health care provider, may manually obtain data describing the patient's therapy using the RPT device, calculate the usage over a predetermined time period, and compare with the compliance rule. Once the health care provider has determined that the patient has used their RPT device according to the compliance rule, the health care provider may notify a third party that the patient is compliant.

There may be other aspects of a patient's therapy that would benefit from communication of therapy data to a third party or external system.

Existing processes to communicate and manage such data can be one or more of costly, time-consuming, and error-prone.

2.2.3.6 Mandibular Repositioning

A mandibular repositioning device (MRD) or mandibular advancement device (MAD) is one of the treatment options for sleep apnea and snoring. It is an adjustable oral appliance available from a dentist or other supplier that holds the lower jaw (mandible) in a forward position during sleep. The MRD is a removable device that a patient inserts into their mouth prior to going to sleep and removes following sleep. Thus, the MRD is not designed to be worn all of the time. The MRD may be custom made or produced in a standard form and includes a bite impression portion designed to allow fitting to a patient's teeth. This mechanical protrusion of the lower jaw expands the space behind the tongue, puts tension on the pharyngeal walls to reduce collapse of the airway and diminishes palate vibration.

In certain examples a mandibular advancement device may comprise an upper splint that is intended to engage with or fit over teeth on the upper jaw or maxilla and a lower splint that is intended to engage with or fit over teeth on the upper jaw or mandible. The upper and lower splints are connected together laterally via a pair of connecting rods. The pair of connecting rods are fixed symmetrically on the upper splint and on the lower splint.

In such a design the length of the connecting rods is selected such that when the MRD is placed in a patient's mouth the mandible is held in an advanced position. The length of the connecting rods may be adjusted to change the level of protrusion of the mandible. A dentist may determine a level of protrusion for the mandible that will determine the length of the connecting rods.

Some MRDs are structured to push the mandible forward relative to the maxilla while other MADs, such as the ResMed Narval CC™ MRD are designed to retain the mandible in a forward position. This device also reduces or minimises dental and temporo-mandibular joint (TMJ) side effects. Thus, it is configured to minimises or prevent any movement of one or more of the teeth.

2.2.3.7 Vent Technologies

Some forms of treatment systems may include a vent to allow the washout of exhaled carbon dioxide. The vent may allow a flow of gas from an interior space of a patient interface, e.g., the plenum chamber, to an exterior of the patient interface, e.g., to ambient.

The vent may comprise an orifice and gas may flow through the orifice in use of the mask. Many such vents are noisy. Others may become blocked in use and thus provide insufficient washout. Some vents may be disruptive of the sleep of a bed partner 1100 of the patient 1000, e.g. through noise or focused airflow.

ResMed Limited has developed a number of improved mask vent technologies. See International Patent Application Publication No. WO 1998/034,665; International Patent Application Publication No. WO 2000/078,381; U.S. Pat. No. 6,581,594; US Patent Application Publication No. US 2009/0050156; US Patent Application Publication No. 2009/0044808.

Table of noise of prior masks (ISO 17510-2: 2007, 10 cmH$_2$O pressure at 1 m)

| Mask name | Mask type | A-weighted sound power level dB(A) (uncertainty) | A-weighted sound pressure dB(A) (uncertainty) | Year (approx.) |
|---|---|---|---|---|
| Glue-on (*) | nasal | 50.9 | 42.9 | 1981 |
| ResCare standard (*) | nasal | 31.5 | 23.5 | 1993 |
| ResMed Mirage™ (*) | nasal | 29.5 | 21.5 | 1998 |
| ResMed UltraMirage™ | nasal | 36 (3) | 28 (3) | 2000 |
| ResMed Mirage Activa™ | nasal | 32 (3) | 24 (3) | 2002 |
| ResMed Mirage Micro™ | nasal | 30 (3) | 22 (3) | 2008 |
| ResMed Mirage™ SoftGel | nasal | 29 (3) | 22 (3) | 2008 |
| ResMed Mirage™ FX | nasal | 26 (3) | 18 (3) | 2010 |
| ResMed Mirage Swift™ (*) | nasal pillows | 37 | 29 | 2004 |
| ResMed Mirage Swift™ II | nasal pillows | 28 (3) | 20 (3) | 2005 |
| ResMed Mirage Swift™ LT | nasal pillows | 25 (3) | 17 (3) | 2008 |
| ResMed AirFit P10 | nasal pillows | 21 (3) | 13 (3) | 2014 |

(*) (one specimen only, measured using test method specified in ISO 3744 in CPAP mode at 10 cmH$_2$O)

Sound pressure values of a variety of objects are listed below

| Object | A-weighted sound pressure dB(A) | Notes |
|---|---|---|
| Vacuum cleaner: Nilfisk Walter Broadly Litter Hog: B+ Grade | 68 | ISO 3744 at 1 m distance |
| Conversational speech | 60 | 1 m distance |
| Average home | 50 | |
| Quiet library | 40 | |
| Quiet bedroom at night | 30 | |
| Background in TV studio | 20 | |

3 BRIEF SUMMARY OF THE TECHNOLOGY

The present technology is directed towards providing medical devices used in the screening, diagnosis, monitoring, amelioration, treatment, or prevention of respiratory disorders having one or more of improved comfort, cost, efficacy, ease of use and manufacturability.

A first aspect of the present technology relates to apparatus used in the screening, diagnosis, monitoring, amelioration, treatment or prevention of a respiratory disorder.

Another aspect of the present technology relates to methods used in the screening, diagnosis, monitoring, amelioration, treatment or prevention of a respiratory disorder.

An aspect of certain forms of the present technology is to provide methods and/or apparatus that improve the compliance of patients with respiratory therapy.

Another aspect of certain forms of the present technology is to provide improved methods and techniques of manufacturing apparatus, and components therefor, used in the screening, diagnosis, monitoring, amelioration, treatment or prevention of a respiratory disorder.

Another aspect of the present technology is to provide an apparatus used in the screening, diagnosis, monitoring, amelioration, treatment or prevention of a respiratory disorder and which can facilitate the use of improved manufacturing methods and techniques.

One aspect of the present technology relates to an air delivery conduit having increased comfort and visual appeal.

Another aspect of the present technology relates to an air delivery conduit comprising a textile.

Another aspect of the present technology relates to an air delivery conduit that is quiet, unobtrusive and/or appealing to patients, and may include a textile.

Another aspect of the present technology relates to an air delivery conduit configured to lengthen or contract. The air delivery conduit may be configured to lengthen or contract without twisting.

Another aspect of the present technology relates to an air delivery conduit comprising a textile that is made airtight.

Another aspect of the present technology comprises an air delivery conduit comprising an outer surface formed by a textile and an inner surface formed from an air-impermeable material.

Another aspect of the present technology comprises an air delivery conduit comprising a reinforcing structure. The reinforcing structure may comprise a plurality of ring members.

Another aspect of the present technology comprises an air delivery conduit comprising a textile laminate.

Another aspect of the present technology comprises an air delivery conduit comprising an outer covering and a sealing layer configured to seal the outer covering.

Another aspect of the present technology comprises an air delivery conduit having reduced intrusiveness and greater appeal to patients due to the use of fabric, thereby improving compliance with therapy.

Another aspect of the present technology comprises an air delivery conduit being lightweight and/or which exerts low tube drag on a patient interface.

Another aspect of the present technology comprises an air delivery conduit in the form of a short tube of a patient interface, the short tube configured to connect to a hose connected to a respiratory pressure therapy device.

Another aspect of the present technology comprises an air delivery conduit in the form of a long tube configured to connect at a first end directly to a respiratory therapy device and at a second end to a patient interface.

Another aspect of the present technology comprises a patient interface comprising an air delivery tube according to an example of the present technology in the form of a short tube.

Another aspect of the present technology relates to a patient interface assembly comprising a patient interface configured to sealingly engage a patient's face and an air delivery tube that is connectable to the patient interface. The air delivery tube may comprise a textile material.

Another aspect of the present technology relates to a respiratory therapy system comprising a respiratory pressure therapy (RPT) device configured to pressurize a flow of respiratory gas. The respiratory therapy system also includes an air delivery tube that is connectable to the RPT. The air delivery tube may comprise a textile material.

Another aspect of the present technology comprises an air delivery conduit comprising an outer layer formed from a textile comprising one or more first portions and one or more second portions. The outer layer may be heat-treated to cause a change in a property of the second portions.

Another aspect of the present technology comprises an air delivery conduit comprising an outer layer formed from a textile comprising a stiffened network of fibres. The stiffened network of fibres may be stiffened by a stiffening process. The stiffened network of fibres may be stiffened by heat treatment. The stiffened network of fibres may comprise fibres formed from a thermoplastic material or a thermosetting material.

Another aspect of the present technology comprises an air delivery conduit comprising an outer layer formed from a textile and comprising a first portion having a first stiffness and a second portion having a second stiffness greater than the first stiffness. The outer layer may comprise a plurality of first portions and a plurality of second portions alternating along the length of the outer layer.

Another aspect of the present technology comprises an air delivery conduit comprising an outer layer formed from a knitted textile, the knitted textile comprising one or more portions knitted at least partially from thermally activated yarn. The thermally activated yarn may comprise fibres at least partially fused to surrounding fibres. The thermally activated yarn may comprise fibres which are at least partially cured.

Another aspect of the present technology comprises a system for respiratory pressure therapy comprising a respiratory pressure therapy device, a patient interface and an air delivery conduit according to an example of the present technology.

Another aspect of the present technology comprises an air delivery conduit configured to convey a flow of air under pressure from a respiratory pressure therapy device to a patient interface for providing respiratory pressure therapy to a patient, the air delivery conduit comprising:
 a flexible reinforcing structure provided along a length of the air delivery conduit;
 an air impermeable covering provided to the reinforcing structure along the length of the air delivery conduit, the covering forming a sealed air path through which the flow of air is able to be conveyed in use, the air impermeable covering comprising:
  a sealing layer provided to the flexible reinforcing structure;
  a sheet wrapped around the reinforcing structure, the sheet comprising a first edge and a second edge each extending along the air delivery conduit, an outer side, and an inner side, the inner side of the sheet comprising:
   a first portion on a first side of the first edge proximate the first edge; and
   a second portion proximate the first edge, on a second side of the first edge opposite the first side;
  wherein the sealing layer seals between the first portion of the inner side of the sheet and the second portion of the inner side of the sheet.

In examples: (a) the inner side of the sheet proximate the second edge is bonded to the sealing layer; (b) the inner side of the sheet proximate the second edge is bonded to the outer side of the sheet proximate the first edge; (c) the sealing layer is bonded to the reinforcing structure; (d) the sheet is bonded to the sealing layer; (e) the sealing layer comprises a thermoplastic material; (f) the sealing layer comprises thermoplastic polyurethane; (g) the sealing layer is heat-bonded to the reinforcing structure and/or the sheet; (h) the sealing layer is adhered to the reinforcing structure and/or the sheet; (i) the air delivery conduit comprises an outer strip bonded to the outer side of the textile sheet over and along the second edge of the sheet; (j) the outer strip comprises a flexible tape; and/or (k) the outer strip comprises a textile material.

In examples: (a) the sheet comprises a laminate; (b) the sheet comprises an outer layer comprising a textile material and an inner layer comprising an air impermeable material; (c) the air impermeable material comprises a thermoplastic material; (d) the air impermeable material comprises thermoplastic polyurethane; (e) the outer layer and the inner layer are bonded together by dot glue lamination; (f) the sealing layer comprises a sealing strip extending along the length of the air delivery conduit; (g) the sheet is bonded to the sealing strip, the first edge of the sheet lying along the sealing strip proximate a centreline along the sealing strip; (h) the inner side of the sheet proximate the second edge is bonded to the outer side of the sheet proximate the first edge, the second edge spaced from the first edge such that the sheet overlaps with itself; and/or (i) the second edge of the sheet comprises a serrated profile configured to resist peeling of the second edge of the sheet away from the outer side of the sheet.

In examples: (a) the reinforcing structure comprises a plurality of support structures spaced apart along the length of the air delivery conduit; (b) each support structure is in the form of a ring member; (c) the reinforcing structure comprises one or more helical members; (d) the air delivery conduit comprises a first end configured to connect to tubing connected to an outlet of the respiratory pressure therapy device, and a second end configured to connect to a patient interface; and/or (e) the air delivery conduit comprises a first end configured to connect to an outlet of the respiratory pressure therapy device and a second end configured to connect to a patient interface.

In examples: the inner side of the sheet proximate the second edge is bonded to the sealing layer.

In examples: the inner side of the sheet proximate the second edge is bonded to the outer side of the sheet proximate the first edge.

In examples: the sealing layer is bonded to the reinforcing structure.

In examples: the sheet is bonded to the sealing layer.

In examples: the sealing layer comprises a thermoplastic material.

In examples: the sealing layer is heat-bonded to the reinforcing structure and/or the sheet.

In examples: the air delivery conduit comprises an outer strip bonded to the outer side of the sheet over and along the second edge of the sheet.

In examples: the sheet comprises a laminate.

In examples: the sheet comprises an outer layer comprising a textile material.

In examples: the sealing layer comprises a sealing strip extending along the length of the air delivery conduit.

In examples: the sheet is bonded to the sealing strip, the first edge of the outer sheet lying along the sealing strip proximate a centreline along the sealing strip.

In examples: the inner side of the sheet proximate the second edge is bonded to the outer side of the sheet proximate the first edge with the second edge spaced from the first edge such that the sheet overlaps with itself.

In examples: the second edge of the sheet comprises a serrated profile configured to resist peeling of the second edge of the sheet away from the outer side of the sheet.

In examples: the reinforcing structure comprises a plurality of support structures spaced apart along the length of the air delivery conduit.

In examples: the air delivery conduit comprises a first end configured to connect to tubing connected to an outlet of the respiratory pressure therapy device, and a second end configured to connect to a patient interface. Another aspect of the present technology comprises an air delivery conduit configured to convey a flow of air under pressure from a respiratory pressure therapy device to a patient interface for providing respiratory pressure therapy to a patient, the air delivery conduit comprising:
  a flexible reinforcing structure provided along a length of the air delivery conduit; and
  an air impermeable covering provided to the reinforcing structure along the length of the air delivery conduit, the covering forming a sealed air path through which the flow of air is able to be conveyed in use, the air impermeable covering comprising a textile layer and a sealing layer laminated to the textile layer;
  wherein the covering is wrapped around the reinforcing structure and the textile layer comprises a first edge and a second edge each extending along the air delivery conduit, an outer side, and an inner side, the inner side of the textile layer comprising:
  a first portion on a first side of the first edge proximate the first edge; and
  a second portion proximate the first edge, on a second side of the first edge opposite the first side;
  wherein a portion of the sealing layer extends beyond the first edge of the textile layer to form a sealing flap, the sealing flap being sealed to another portion of the sealing layer to prevent leaks flowing between the first portion of the inner side of the textile layer and the second portion of the inner side of the textile layer.

In examples: (a) the sealing flap is sealed to both the outer side of the textile layer proximate the first edge of the textile layer, and an inner side of the sealing layer; and/or (b) the sealing flap is sealed to an inner side of the sealing layer on the second side of the first edge of the textile layer.

In examples: (a) the sealing layer is bonded to the reinforcing structure; (b) the sealing layer comprises a thermoplastic material; (c) the sealing layer comprises thermoplastic polyurethane; (d) the sealing layer is heat-bonded to the reinforcing structure; (e) the sealing layer is adhered to the reinforcing structure; (f) the air delivery conduit comprises an outer strip bonded to the outer side of the air impermeable covering over and along the second edge of the covering; (g) the outer strip comprises a flexible tape; and/or (h) the outer strip comprises a textile material.

In examples: (a) the sealing layer comprises a thermoplastic material; (b) the sealing layer comprises thermoplastic polyurethane; (c) the textile layer and the sealing layer are bonded together by dot glue lamination; (d) the inner side of the covering proximate the second edge is bonded to the outer side of the covering proximate the first edge, the second edge spaced from the first edge such that the covering overlaps with itself; and/or (e) the second edge of the covering comprises a serrated profile configured to resist peeling of the second edge of the covering away from the outer side of the covering.

In examples: (a) the reinforcing structure comprises a plurality of support structures spaced apart along the length of the air delivery conduit; (b) each support structure is in the form of a ring member; (c) the reinforcing structure comprises one or more helical members; (d) the air delivery conduit comprises a first end configured to connect to tubing connected to an outlet of the respiratory pressure therapy device, and a second end configured to connect to a patient interface; and/or (e) the air delivery conduit comprises a first end configured to connect to an outlet of the respiratory pressure therapy device and a second end configured to connect to a patient interface.

In examples: the sealing flap is sealed to both an outer side of the textile layer proximate the first edge of the outer sheet, and an inner side of the sealing layer.

In examples: the sealing flap is sealed to an inner side of the sealing layer on the second side of the first edge of the outer sheet.

In examples: the sealing layer is bonded to the reinforcing structure.

In examples: the air delivery conduit comprises an outer strip bonded to the outer side of the textile sheet over and along the second edge of the textile sheet.

In examples: the sealing layer comprises a thermoplastic material.

In examples: the inner side of the covering proximate the second edge is bonded to the outer side of the covering proximate the first edge, the second edge spaced from the first edge such that the covering overlaps with itself.

In examples: the second edge of the covering comprises a serrated profile configured to resist peeling of the second edge of the covering away from the outer side of the covering.

In examples: the reinforcing structure comprises a plurality of support structures spaced apart along the length of the air delivery conduit.

In examples: the air delivery conduit comprises a first end configured to connect to tubing connected to an outlet of the respiratory pressure therapy device, and a second end configured to connect to a patient interface.

Another aspect of the present technology comprises an air delivery conduit configured to convey a flow of air under pressure from a respiratory pressure therapy device to a patient interface for providing respiratory pressure therapy to a patient, the air delivery conduit comprising:
- a flexible reinforcing structure provided along a length of the air delivery conduit;
- a sealing strip applied to the reinforcing structure;
- an air impermeable textile covering wrapped around the reinforcing structure and sealing strip, the covering forming a sealed air path through which the flow of air is able to be conveyed in use, the covering having a first edge and a second edge each extending along the air delivery conduit, the first edge and second edge meeting or overlapping to form a seam;
- wherein the sealing strip seals across an inner portion of the seam to prevent air leaking through the seam.

In examples: (a) the covering is bonded to itself at a location proximate the seam; (b) the covering is bonded to the reinforcing structure; (c) the covering is bonded to the sealing strip; (d) the sealing strip comprises a thermoplastic material; (e) the air delivery conduit further comprises an outer strip bonded to an outer side of the covering along the second edge of the covering; (f) the first edge of the covering and/or the second edge of the covering is serrated; (g) the covering has a laminate structure; (h) the covering comprises an air impermeable inner layer and an outer textile layer; (i) the air impermeable inner layer comprises a thermoplastic material; (j) the inner portion of the seam is aligned along a centreline of the sealing strip; (k) the reinforcing structure comprises a plurality of support structures spaced apart along the length of the air delivery conduit; and/or (l) the air delivery conduit comprises a first end configured to connect to tubing connected to an outlet of the respiratory pressure therapy device, and a second end configured to connect to a patient interface.

In examples: the covering is bonded to itself at a location proximate the seam.

In examples: the covering is bonded to the reinforcing structure.

In examples: the covering is bonded to the sealing strip.

In examples: the covering comprises a textile material and the sealing strip comprises a thermoplastic material.

In examples: the conduit further comprises an outer strip bonded to the outer side of the covering along the second edge of the covering.

In examples: the first edge of the covering and/or the second edge of the covering is serrated.

In examples: the covering has a laminate structure.

In examples: the covering comprises an air impermeable inner layer and an outer textile layer.

In examples: the air impermeable inner layer comprises a thermoplastic material.

In examples: the inner portion of the seam is aligned along a centreline of the sealing strip.

In examples: the reinforcing structure comprises a plurality of support structures spaced apart along the length of the air delivery conduit.

In examples: the air delivery conduit comprises a first end configured to connect to tubing connected to an outlet of the respiratory pressure therapy device, and a second end configured to connect to a patient interface.

Another aspect of the present technology comprises an air delivery conduit configured to convey a flow of air under pressure from a respiratory pressure therapy device to a patient interface for providing respiratory pressure therapy to a patient, the air delivery conduit comprising:
- a flexible reinforcing structure comprising a plurality of support structures spaced apart along a length of the air delivery conduit;
- an air impermeable covering provided to the support structures along the length of the air delivery conduit, the covering forming a sealed air path through which the flow of air is able to be conveyed in use;
- wherein each support structure comprises an outer surface, an inner surface opposite the outer surface and a pair of intermediate faces connecting the outer surface and the inner surface, each support structure comprising a cross section having outer rounded corners connecting the outer surface and the intermediate faces.

In examples: (a) the cross section of each support structure comprises inner rounded corners connecting the inner surface and the intermediate faces; (b) the outer rounded corners of each support structure comprise a greater radius than the inner rounded corners; (c) the inner surface of each support structure is convex; (d) the support structures are substantially rigid; (e) the support structures are formed from a plastic material; and/or (f) the support structures are formed from one of polycarbonate, nylon, polycarbonate-ABS, and nylon-polyurethane.

In examples: (a) each support structure is formed as a ring member; (b) each support structure comprises a circular outer profile and a non-circular inner profile; (c) each support structure comprises a pair of thickened portions on opposing sides of the support structure; (d) each support structure comprises an elliptical inner profile; (e) each support structure comprises an elliptical outer profile; (f) each support structure comprises an elliptical inner profile; (g) the inner profile of each support structure comprises a pair of straight sides on opposing sides of the support structure; and/or (h) the pair of straight sides are opposing along the major axis of the elliptical inner profile.

In examples: (a) the support structures are spaced apart by a distance of between 1 mm and 9 mm; (b) the support structures are spaced apart by a distance of between 2 mm and 6 mm; (c) the support structures are spaced apart by a distance of between 2 mm and 3 mm; (d) the support structures are spaced apart by a distance less than 6 mm; and/or (e) the support structures are spaced apart by a distance less than 3 mm.

In examples: (a) the air-impermeable covering comprises an outer surface formed from a textile material; (b) the air delivery conduit comprises a first end configured to connect to tubing connected to an outlet of the respiratory pressure therapy device, and a second end configured to connect to a patient interface; and/or (c) the air delivery conduit comprises a first end configured to connect to an outlet of the respiratory pressure therapy device and a second end configured to connect to a patient interface.

In examples: the cross section of each support structure comprises inner rounded corners connecting the inner surface and the intermediate faces.

In examples: the outer rounded of each support structure comprise a greater radius than the inner rounded corners.

In examples: the inner surface of each support structure is convex.

In examples: the support structures are substantially rigid.

In examples: the support structure(s) comprise(s) a pair of thickened portions on opposing sides of the support structure.

In examples: each support structure is formed as a ring member.

In examples: each ring member comprises an elliptical outer profile.

In examples: each ring member comprises a circular outer profile and a non-circular inner profile.

In examples: each ring member comprises an elliptical inner profile.

In examples: the inner profile of each ring member comprises a pair of straight sides on opposing sides of the ring member.

In examples: the pair of straight sides are opposing along the major axis of the elliptical inner profile.

Another aspect of the present technology comprises an air delivery conduit configured to convey a flow of air under pressure from a respiratory pressure therapy device to a patient interface for providing respiratory pressure therapy to a patient, the air delivery conduit comprising:
- a flexible reinforcing structure comprising a plurality of support structures spaced apart along a length of the air delivery conduit;
- an air impermeable covering provided to the support structures along the length of the air delivery conduit, the covering forming a sealed air path through which the flow of air is able to be conveyed in use;
- wherein each support structure comprises a pair of thickened portions on opposing sides of the support structure.

In examples: (a) each support structure comprises a circular outer profile and a non-circular inner profile; (b) each support structure comprises an elliptical inner profile; (c) the pair of thickened portions are opposing along a minor axis of the elliptical inner profile; (d) each support structure comprises an elliptical outer profile; (e) each support structure comprises an elliptical inner profile; (f) the thickened portions are opposing along a major axis of the elliptical inner profile; and/or (g) the support structures each comprise an outer surface, an inner surface opposite the outer surface and a pair of intermediate faces connecting between the outer surface and the inner surface, the thickened portions of each support structure corresponding to widened portions of the intermediate faces of the support structure.

In examples: (a) each support structure comprises an outer surface, an inner surface, a pair of intermediate faces and a cross section comprising outer rounded corners connecting the outer surface and the faces; (b) the cross section of each support structure comprises inner rounded corners connecting the inner surface and the faces; (c) the outer rounded corners of each support structure comprise a greater radius than the inner rounded corners; and/or (d) each support structure comprises a convex inner surface.

In examples: (a) the support structures are spaced apart by a distance of between 1 mm and 10 mm; (b) the support structures are spaced apart by a distance of between 2 mm and 6 mm; (c) the support structures are spaced apart by a distance of between 2 mm and 3 mm; (d) the support structures are spaced apart by distance less than 6 mm; and/or (e) the support structures are spaced apart by distance less than 3 mm.

In examples: (a) the air-impermeable covering comprises a textile material; (b) the air-impermeable covering comprises an outer surface formed from the textile material; (c) the air delivery conduit comprises a first end configured to connect to tubing connected to an outlet of the respiratory pressure therapy device, and a second end configured to connect to a patient interface; and/or (d) the air delivery conduit comprises a first end configured to connect to an outlet of the respiratory pressure therapy device and a second end configured to connect to a patient interface.

In examples: each support structure comprises a circular outer profile and a non-circular inner profile.

In examples: each support structure comprises an elliptical inner profile.

In examples: the pair of thickened portions are opposing along a minor axis of the elliptical inner profile.

In examples: each support structure comprises an elliptical outer profile.

In examples: each support structure comprises an elliptical inner profile.

In examples: the thickened portions are opposing along a major axis of the elliptical inner profile.

In examples: the support structures each comprise an outer surface, an inner surface opposite the outer surface and a pair of intermediate faces connecting between the outer surface and the inner surface, the thickened portions of each support structure corresponding to widened portions of the intermediate faces of the support structure.

In examples: each support structure comprises a cross section comprising outer rounded corners connecting the outer surface and the intermediate faces.

In examples: the cross section of each support structure comprises inner rounded corners connecting the inner surface and the intermediate faces.

In examples: the outer rounded corners of each support structure comprise a greater radius than the inner rounded corners.

In examples: each support structure comprises a convex inner surface.

Another aspect of the present technology comprises an air delivery conduit configured to convey a flow of air under pressure from a respiratory pressure therapy device to a patient interface for providing respiratory pressure therapy to a patient, the air delivery conduit comprising:
- a flexible reinforcing structure provided along a length of the air delivery conduit;
- a covering attached to the reinforcing structure along the length of the air delivery conduit, the covering comprising a textile material;
- a sealing layer forming a sealed air path through which the flow of air is able to be conveyed in use;
- wherein the reinforcing structure is provided between the covering and the sealing layer.

In examples: (a) the reinforcing structure comprises a plurality of support structures spaced apart along the length of the air delivery conduit; (b) the support structures are each in the form of a ring member; (c) the reinforcing structure comprises one or more helical members; (d) the sealing layer is formed from a polymer; (e) the sealing layer is formed from a thermoplastic material; (f) the thermoplastic material comprises a thermoplastic polyurethane; (g) the sealing layer comprises a thickness of less than 0.5 mm; (h) the sealing layer comprises a thickness of less than 0.2 mm; (i) the sealing layer comprises a thickness of less than 0.15 mm; (j) the sealing layer comprises a thickness of less than 0.1 mm; (k) the textile material comprises a knitted structure; (l) the textile material comprises a woven structure; (m) the textile material comprises a non-woven structure; (n) the sealing layer is heat-bonded to the reinforcing structure and/or the covering; (o) the sealing layer is adhered to the reinforcing structure and/or the covering; (p) the air delivery conduit comprises a first end configured to connect to tubing connected to an outlet of the respiratory pressure therapy device, and a second end configured to connect to a patient interface; and/or (q) the air delivery conduit comprises a first end configured to connect to an outlet of the respiratory pressure therapy device and a second end configured to connect to a patient interface.

In examples: (a) the sealing layer comprises a single film layer; (b) the sealing layer comprises an inner film layer and an outer film layer; (c) the inner film layer is configured to resist hydrolysis; (d) the inner film layer is anti-microbial; (e) the inner film layer comprises an Ether type TPU; and/or (f) the outer film layer comprises a lower softening temperature than the inner film layer.

In examples: the reinforcing structure comprises a plurality of support structures spaced apart along the length of the air delivery conduit.

In examples: the support structures are each in the form of a ring member.

In examples: the sealing layer is formed from a thermoplastic material.

In examples: the textile material comprises a knitted structure.

In examples: the sealing layer is heat-bonded to the reinforcing structure.

In examples: the sealing layer is heat-bonded to the covering.

In examples: the inner film layer is configured to resist hydrolysis.

In examples: the inner film layer is c is anti-microbial.

In examples: the inner film layer comprises an Ether type TPU.

In examples: the outer film layer comprises a lower softening temperature than the inner film layer.

Another aspect of the present technology comprises a method of manufacturing an air delivery conduit configured to convey a flow of air under pressure from a respiratory pressure therapy device to a patient interface for providing respiratory pressure therapy to a patient, the method comprising:
 applying a covering to an exterior of an elongate flexible reinforcing structure;
 inserting a sealing layer into an interior of the reinforcing structure, the sealing layer comprising an elongate cylindrical shape during insertion into the interior of the reinforcing structure; and
 bonding the sealing layer to the covering, the sealing layer forming a sealed air path through which the flow of air is able to be conveyed in use.

In examples: (a) the method comprises supporting the reinforcing structure on a mandrel and sliding the covering over the reinforcing structure; (b) the method comprises supporting the reinforcing structure on a mandrel and wrapping the covering around the reinforcing structure; and/or (c) the method comprises holding the covering open and inserting the reinforcing structure into the covering.

In examples: (a) the method comprises preheating the covering; (b) the method comprises blowing hot air to preheat the covering prior to inserting the sealing layer; (c) the method comprises blowing hot air from a mandrel inserted within the covering; (d) the method comprises blowing hot air through the covering from outside of the covering; (e) the method comprises supporting the sealing layer on a mandrel and inserting the mandrel and sealing layer into the interior of the reinforcing structure; (f) the method comprises blowing an interior of the sealing layer with hot air to expand and bond the sealing layer to the covering; (g) the method comprises heat-bonding the sealing layer to the covering; (h) the method comprises adhering the sealing layer to the covering; (i) the mandrel is provided with a low-friction surface; and/or (j) the method comprises supporting the sealing layer on a balloon of the mandrel and inflating the balloon with hot air to expand the sealing layer and bond it to the covering.

In further examples: (a) the covering comprises a textile material; (b) the reinforcing structure comprises a plurality of support structures spaced apart along the length of the air delivery conduit; (c) the reinforcing structure comprises one or more helical members; (d) the sealing layer is formed from a polymer; (e) the sealing layer is formed from a thermoplastic material; (f) the thermoplastic material comprises a thermoplastic polyurethane; (g) the sealing layer comprises a thickness of less than 0.5 mm; (h) the sealing layer comprises a thickness of less than 0.2 mm; (i) the sealing layer comprises a thickness of less than 0.15 mm; (j) the sealing layer comprises a thickness of less than 0.1 mm; (k) the textile material comprises a knitted structure; (l) the textile material comprises a woven structure; and/or (m) the textile material comprises a non-woven structure; and/or (n) the support structures are each in the form of a ring member.

In further examples: (a) the sealing layer comprises a single film layer; (b) the sealing layer comprises an inner film layer and an outer film layer; (c) the inner film layer is configured to resist hydrolysis; (d) the inner film layer is anti-microbial; (e) the inner film layer comprises an Ether type TPU; and/or (f) the outer film layer comprises a lower softening temperature than the inner film layer.

In examples: the covering comprises a first layer on the first side of the covering and a second layer on the second side of the covering, the first layer comprising an air impermeable sealing layer.

In examples: the method comprises forming the covering into the elongate cylindrical shape from a sheet by joining opposing edges of the sheet, the sheet being a laminate formed by the first layer and the second layer.

In examples: the method comprises forming the covering into the elongate cylindrical shape by forming the second layer in the elongate cylindrical shape and then providing the first layer to an exterior of the second layer.

In examples: the method comprises knitting the second layer.

In examples: the method comprises inverting the covering by rolling the covering inwards towards a central axis of the covering and on to the mandrel.

In examples: the method comprises supporting the reinforcing structure on the mandrel by collapsing the mandrel, mounting the reinforcing structure on the mandrel, and expanding the mandrel.

In examples: the method comprises, after inserting the mandrel and reinforcing structure into the covering, collapsing the mandrel to release the reinforcing structure.

In examples: the method comprises bonding the reinforcing structure to the covering.

In examples: the method comprises one of heat-bonding or ultrasonically welding the reinforcing structure to covering.

Another aspect of the present technology comprises a method of manufacturing an air delivery conduit configured to convey a flow of air under pressure from a respiratory pressure therapy device to a patient interface for providing respiratory pressure therapy to a patient, the method comprising:
 forming a covering for the air delivery conduit, the covering comprising an elongate cylindrical shape and comprising a first side providing an external surface of the covering, and a second side providing an internal surface of the covering;
 supporting an elongate flexible reinforcing structure on a mandrel;
 inserting the mandrel and reinforcing structure into the interior of the covering while inverting the covering such that the first side provides the internal surface of the covering and the second side provides the external surface of the covering;

removing the mandrel from the covering leaving the reinforcing structure within the covering.

In examples: (a) the covering comprises a first layer on the first side of the covering and a second layer on the second side of the covering, the first layer comprising an air impermeable sealing layer; (b) the method comprises forming the covering into the elongate cylindrical shape from a sheet by joining opposing edges of the sheet, the sheet being a laminate formed by the first layer and the second layer; (c) the method comprises forming the covering into the elongate cylindrical shape by forming the second layer in the elongate cylindrical shape and then providing the first layer to an exterior of the second layer; (d) the method comprises knitting the second layer; (e) the method comprises inverting the covering by rolling the covering inwards towards a central axis of the covering and on to the mandrel; (f) the method comprises supporting the reinforcing structure on the mandrel by collapsing the mandrel, mounting the reinforcing structure on the mandrel, and expanding the mandrel; (g) the method comprises, after inserting the mandrel and reinforcing structure into the covering, collapsing the mandrel to release the reinforcing structure; (h) the method comprises bonding the reinforcing structure to the covering; and/or (i) the method comprises one of heat-bonding or ultrasonically welding the reinforcing structure to covering.

In further examples: (a) the covering comprises a textile material; (b) the textile material comprises a knitted structure; (c) the textile material comprises a woven structure; (d) the textile material comprises a non-woven structure; (e) the reinforcing structure comprises a plurality of support structures spaced apart along a length of the air delivery conduit; (f) the reinforcing structure comprises one or more helical members; (g) the first layer is formed from a polymer material; (h) the first layer is formed from a thermoplastic material; (i) the thermoplastic material comprises a thermoplastic polyurethane; (j) the first layer comprises a thickness of less than 0.5 mm; (k) the first layer comprises a thickness of less than 0.2 mm; (l) the first layer comprises a thickness of less than 0.15 mm; (m) the first layer comprises a thickness of less than 0.1 mm; and/or (n) the support structures are each in the form of a ring member.

In further examples: (a) the covering comprises a textile material; and/or (b) the method comprises inserting an air impermeable sealing layer into an interior of the reinforcing structure, the sealing layer comprising an elongate cylindrical shape during insertion into the interior of the reinforcing structure, and bonding the sealing layer to the covering.

In examples: the method comprises supporting the reinforcing structure on a mandrel and sliding the covering over the reinforcing structure.

In examples: the method comprises supporting the reinforcing structure on a mandrel and wrapping the covering around the reinforcing structure.

In examples: the method comprises holding the covering open and inserting the reinforcing structure into the covering.

In examples: the method comprises preheating the covering.

In examples: the method comprises blowing hot air to preheat the covering prior to inserting the sealing layer.

In examples: the method comprises blowing hot air from a mandrel inserted within the covering.

In examples: the method comprises supporting the sealing layer on a mandrel and inserting the mandrel and sealing layer into the interior of the reinforcing structure.

In examples: the method comprises blowing an interior of the sealing layer with hot air to expand and bond the sealing layer to the covering.

In examples: the mandrel is provided with a low-friction surface.

In examples: the method comprises supporting the sealing layer on a balloon of the mandrel and inflating the balloon with hot air to expand the sealing layer and bond it to the covering. Another aspect of the present technology comprises a method of manufacturing an air delivery conduit configured to convey a flow of air under pressure from a respiratory pressure therapy device to a patient interface for providing respiratory pressure therapy to a patient, the method comprising:

supporting a stretchable air impermeable covering for the air delivery conduit, the covering comprising an elongate cylindrical shape comprising an exterior and an interior;

expanding the covering;

inserting an elongate flexible reinforcing structure into the interior of the covering;

releasing the covering to allow the covering to contract onto the reinforcing structure.

In examples: (a) the method comprises inserting the elongate flexible reinforcing structure into the interior of the covering while supporting the reinforcing structure on a mandrel, and removing the mandrel from the interior of the covering, leaving the reinforcing structure within the covering; (b) the method comprises expanding the covering with a greater air pressure applied to the interior of the covering than to the exterior of the covering; (c) the method comprises releasing the covering by removing the greater air pressure; (d) the method comprises expanding the covering by application of a vacuum to the exterior of the covering; (e) the method comprises releasing the covering by releasing of the vacuum; (f) the method comprises supporting the covering at ends of the covering with a vacuum jig; and/or (g) the method comprises creating a vacuum between the exterior of the covering and the vacuum jig, the vacuum jig being wider than the covering to allow the covering to expand.

In examples: (a) the elongate reinforcing structure comprises a plurality of support structures spaced apart, the support structures each being wider than the covering when the covering is in a contracted state; (b) after removing the mandrel from the interior of the covering, the air delivery conduit comprises grooves in the covering between adjacent pairs of support structures; (c) the mandrel comprises a plurality of teeth configured to allow the support structures to slide along the mandrel in a first direction and to prevent the support structures from sliding along the mandrel in a second direction opposite to the first direction; (d) the teeth each comprise a first wall and a second wall, the first wall being tapered with respect to a central axis of the mandrel and the second wall being perpendicular to the central axis of the mandrel, the first wall configured to allow the support structures to slide over the respective tooth in the first direction and the second wall configured to prevent the support structures from sliding along the mandrel in the second direction; (e) the mandrel comprises a plurality of sets of teeth spaced apart along the mandrel, each set of teeth configured to prevent a respective support structures from sliding along the mandrel in the second direction; (f) each set of teeth comprises a plurality of teeth provided concentrically about the central axis of the mandrel at a respective point along the central axis; (g) the teeth are biased into an outwardly projecting position with respect to the central axis of the mandrel, and are able to be depressed inwardly with respect to the central axis of the mandrel to allow the support structures to slide over the teeth in the first direction; (h) the teeth are spring-loaded into the outwardly projecting position; (i) the method comprises, before removing the mandrel from the interior of the covering, at least partially bonding the covering to the reinforcing structure; the method comprises, after removing the mandrel from the interior of the covering, bonding the covering to the reinforcing structure; (j) the method comprises one of heat-bonding, ultrasonic welding and adhering the covering to the reinforcing structure; and/or (k) each support structure is in the form of a ring member.

In further examples: (a) the covering comprises a textile material; (b) the textile material comprises a knitted structure; (c) the textile material comprises a woven structure; and/or (d) the textile material comprises a non-woven structure.

In further examples: (a) the covering comprises a first layer on the interior of the covering and a second layer on the exterior of the covering, the first layer comprising an air impermeable sealing layer; (b) the second layer comprises a textile material; (c) the method comprises knitting the textile material; (d) the method comprises weaving the textile material; (e) the textile material comprises a non-woven structure; (f) the method comprises forming the covering into the elongate cylindrical shape from a sheet by joining opposing edges of the sheet, the sheet being a laminate formed by the first layer and the second layer; and/or (g) the method comprises forming the covering into the elongate cylindrical shape by forming the second layer in the elongate cylindrical shape and then providing the first layer to the interior of the second layer.

In further examples: (a) the first layer is formed from a polymer material; (b) the first layer is formed from a thermoplastic material; (c) the thermoplastic material comprises a thermoplastic polyurethane; (d) the first layer comprises a thickness of less than 0.5 mm; (e) the first layer comprises a thickness of less than 0.2 mm; (f) the first layer comprises a thickness of less than 0.15 mm; and/or (g) the first layer comprises a thickness of less than 0.1 mm.

In examples: the method comprises expanding the covering with a greater air pressure applied to the interior of the covering than to the exterior of the covering.

In examples: the method comprises releasing the covering by removing the greater air pressure.

In examples: the method comprises expanding the covering by application of a vacuum to the exterior of the covering.

In examples: the method comprises releasing the covering by releasing of the vacuum.

In examples: the method comprises supporting the covering at ends of the covering with a vacuum jig.

In examples: the method comprises creating a vacuum between the exterior of the covering and the vacuum jig, the vacuum jig being wider than the covering to allow the covering to expand.

In examples: the method comprises: inserting the elongate flexible reinforcing structure into the interior of the covering while supporting the reinforcing structure on a mandrel, and removing the mandrel from the interior of the covering, leaving the reinforcing structure within the covering.

In examples: the elongate reinforcing structure comprises a plurality of ring members spaced apart, the ring members each being wider than the covering when the covering is in a contracted state.

In examples: after removing the mandrel from the interior of the covering, the air delivery conduit comprises grooves in the covering between adjacent pairs of ring members.

In examples: the mandrel comprises a plurality of teeth configured to allow the ring members to slide along the mandrel in a first direction and to prevent the ring members from sliding along the mandrel in a second direction opposite to the first direction.

In examples: the teeth each comprise a first wall and a second wall, the first wall being tapered with respect to a central axis of the mandrel and the second wall being perpendicular to the central axis of the mandrel, the first wall configured to allow the ring members to slide over the respective tooth in the first direction and the second wall configured to prevent the ring members from sliding along the mandrel in the second direction.

In examples: the mandrel comprises a plurality of sets of teeth spaced apart along the mandrel, each set of teeth configured to prevent a respective ring member from sliding along the mandrel in the second direction.

In examples: each set of teeth comprises a plurality of teeth provided concentrically about the central axis of the mandrel at a respective point along the central axis.

In examples: the teeth are biased into an outwardly projecting position with respect to the central axis of the mandrel and are able to be depressed inwardly with respect to the central axis of the mandrel to allow the ring members to slide over the teeth in the first direction.

In examples: the teeth are spring-loaded into the outwardly projecting position.

In examples: the method comprises, before removing the mandrel from the interior of the covering, at least partially bonding the covering to the reinforcing structure.

In examples: the method comprises, after removing the mandrel from the interior of the covering, bonding the covering to the reinforcing structure.

In examples: the method comprises one of heat-bonding, ultrasonic welding and adhering the covering to the reinforcing structure.

Another aspect of the present technology comprises an air delivery conduit configured to convey a flow of air under pressure from a respiratory pressure therapy device to a patient interface for providing respiratory pressure therapy to a patient, the air delivery conduit comprising:
  a flexible reinforcing structure comprising a plurality of support structures spaced apart along a length of the air delivery conduit;
  an air impermeable covering provided to the support structures along the length of the air delivery conduit, the covering forming a sealed air path through which the flow of air is able to be conveyed in use;
  wherein the covering comprises an outer surface formed from a textile material.

In examples: (a) the covering is in the form of a laminate comprising an outer layer comprising the textile material bonded to an air impermeable inner layer; (b) the air impermeable inner layer is formed from a polymer; (c) the air impermeable inner layer is formed from a thermoplastic material; (d) thermoplastic material comprises a thermoplastic polyurethane; (e) the air impermeable inner layer comprises a thickness of less than 0.5 mm; (f) the air impermeable inner layer comprises a thickness of less than 0.15 mm; (g) the textile material comprises a knitted structure; (h) the textile material comprises a woven structure; (i) the textile material comprises a non-woven structure; and/or (j) the covering comprises a weight of less than 250 GSM; the weight of the covering is less than 180 GSM.

Another aspect of the present technology comprises an air delivery conduit configured to convey a flow of air under pressure from a respiratory pressure therapy device to a patient interface for providing respiratory pressure therapy to a patient, the air delivery conduit comprising:
- a textile layer formed from a textile, the textile layer comprising:
  - at least one first portion formed from a first network of fibres of the textile, the first portion having a first stiffness;
  - at least one second portion formed from a second network of fibres of the textile, the second portion stiffened by a stiffening process to have a second stiffness greater than the first stiffness;
- wherein the air delivery conduit forms a sealed air path through which the flow of air is able to be conveyed in use.

In examples: (a) the textile layer comprises an activated material provided to the second portion, the activated material causing the second portion to be stiffened following the stiffening process; (b) the first network of fibres comprises a first material and the second network of fibres comprises the activated material; and/or (c) the second network of fibres comprises both the first material and the activated material.

In further examples: (a) the stiffening process comprises heat treatment; (b) the activated material comprises at least one of a thermosetting material and a thermoplastic material; (c) the second portion of the textile layer comprises a cured portion; (d) the second network of fibres comprises a plurality of cured thermoset fibres; (e) the second portion of the textile layer comprises a fused portion; (f) the second network of fibres comprises a plurality of fibres at least partially fused together; and/or (g) the second network of fibres comprises one or more fibres at least partially fused to surrounding fibres.

In examples: (a) the stiffening process comprises photo-activated treatment; (b) the activated material comprises a photo-activated material stiffening the second portion of the textile layer following application of visible or non-visible light to the second portion; (c) the second portion of the textile layer comprises a cured portion; (d) the second network of fibres comprises a plurality of fibres formed from the photo-activated material.

In further examples: (a) the stiffening process comprises pressure-activated treatment; (b) the activated material comprises a pressure-activated material stiffening the second portion of the textile layer following application of pressure to the second portion; (c) the activated material comprises an adhesive stiffening the second network of fibres following application of pressure to the second portion; (d) the activated material comprises microencapsulated adhesive; (e) the second network of fibres comprises a plurality of adhesive fibres each adhered to surrounding fibres by application of pressure to the second portion.

In further examples: (a) the stiffening process comprises chemically-activated treatment; (b) the activated material comprises one or more materials chemically reacted to stiffen the second portion of the textile layer following application to the second portion; (c) the activated material comprises a cross-linking agent; (d) the activated material comprises a cured material.

In further examples: (a) the textile layer is formed by knitting; (b) the textile layer is formed by circular knitting; (c) the textile layer is formed by flat knitting; (d) the textile layer comprises a woven textile; and/or (e) the textile layer comprises non-woven textile.

In further examples: (a) each of the at least one second portion comprises a substantially rigid portion; (b) the textile comprises a plurality of first portions; (c) the textile comprises a plurality of second portions; (d) the textile comprises a plurality of first portions and a plurality of second portions arranged in an alternating manner along the air delivery conduit; (e) the at least one second portion comprises a plurality of ring portions spaced apart along the air delivery conduit; (f) the at least one second portion comprises at least one helical portion extending helically along the air delivery conduit; and/or (g) the at least one second portion comprises a plurality of helical portions each extending helically along the air delivery conduit.

In further examples: (a) the textile layer is air impermeable and forms the sealed air path; (b) the air delivery conduit comprises a sealing layer within the textile layer, the sealing layer forming the sealed air path; (c) the textile layer is bonded to the sealing layer; (d) the sealing layer comprises a thermoplastic material; (e) the sealing layer comprises thermoplastic polyurethane; (f) the sealing layer is heat-bonded to the textile layer; (g) the sealing layer is adhered to the outer layer; (h) the sealing layer comprises a thickness of less than 0.5 mm; (i) the sealing layer comprises a thickness of less than 0.2 mm; and/or (j) the sealing layer comprises a thickness of less than 0.15 mm.

In further examples: (a) the textile layer comprises a circular cross section; and/or (b) the textile layer comprises a D-shaped cross section.

In further examples: (a) the sealing layer comprises a single film layer; (b) the sealing layer comprises an inner film layer and an outer film layer; (c) the inner film layer is configured to resist hydrolysis; (d) the inner film layer is anti-microbial; (e) the inner film layer comprises an Ether type TPU; and/or (f) the outer film layer comprises a lower softening temperature than the inner film layer.

In further examples: (a) the air delivery conduit comprises a first end configured to connect to tubing connected to an outlet of the respiratory pressure therapy device, and a second end configured to connect to a patient interface; (b) and/or the air delivery conduit comprises a first end configured to connect to an outlet of the respiratory pressure therapy device and a second end configured to connect to a patient interface.

In examples: the textile layer comprises an activated material provided to the second portion, the activated material causing the second portion to be stiffened following the stiffening process.

In examples: the first network of fibres comprises a first material and the second network of fibres comprises the activated material.

In examples: the second network of fibres comprises the first material in addition to the activated material.

In examples: the stiffening process comprises heat treatment.

In examples: the activated material comprises at least one of a thermosetting material and a thermoplastic material.

In examples: the second portion of the textile layer comprises a cured portion.

In examples: the second network of fibres comprises a plurality of cured thermoset fibres.

In examples: the second network of fibres comprises a fused portion.

In examples: the second network of fibres comprises a plurality of fibres at least partially fused together.

In examples: the second network of fibres comprises one or more fibres at least partially fused to surrounding fibres.

In examples: the stiffening process comprises photo-activated treatment.

In examples: the activated material comprises a photo-activated material stiffening the second portion of the textile layer following application of visible or non-visible light to the second portion.

In examples: the textile layer comprises a cured portion.

In examples: the second network of fibres comprises a plurality of fibres formed from the photo-activated material.

In examples: the stiffening process comprises pressure-activated treatment.

In examples: the activated material comprises a pressure-activated material stiffening the second portion of the textile layer following application of pressure to the second portion.

In examples: the activated material comprises an adhesive stiffening the second network of fibres following application of pressure to the second portion.

In examples: the activated material comprises microencapsulated adhesive.

In examples: the second network of fibres comprises a plurality of adhesive fibres each adhered to surrounding fibres by application of pressure to the second portion.

In examples: the stiffening process comprises chemically-activated treatment.

In examples: the activated material comprises one or more materials chemically reacted to stiffen the second portion of the textile layer following application to the second portion.

In examples: the activated material comprises a cross-linking agent.

In examples: the activated material comprises a cured material.

In examples: the textile layer is formed by knitting.

In examples: the textile layer is formed by circular knitting.

In examples: the textile layer is formed by flat knitting.

In examples: each at least one second portion comprises a substantially rigid portion.

In examples: the textile layer comprises a plurality of first portions.

In examples: the textile layer comprises a plurality of second portions.

In examples: the textile layer comprises a plurality of first portions and a plurality of second portions arranged in an alternating manner along the air delivery conduit.

In examples: the at least one second portion comprises a plurality of ring portions spaced apart along the air delivery conduit.

In examples: the at least one second portion comprises at least one helical portion extending helically along the air delivery conduit.

In examples: the at least one second portion comprises a plurality of helical portions each extending helically along the air delivery conduit.

In examples: the textile layer is air impermeable and forms the sealed air path.

In examples: the air delivery conduit comprises a sealing layer within the textile layer, the sealing layer forming the sealed air path.

In examples: the textile layer comprises a circular cross section.

In examples: the textile layer comprises a D-shaped cross section.

Another aspect of the present technology comprises a method of manufacturing an air delivery conduit configured to convey a flow of air under pressure from a respiratory pressure therapy device to a patient interface for providing respiratory pressure therapy to a patient, the method comprising:
forming a textile layer for the air delivery conduit, the textile layer comprising a textile, the textile layer comprising at least one first portion formed from a first network of fibres and at least one second portion formed from a second network of fibres;
performing a stiffening process on the second portion of the textile layer to cause the second portion to have a greater stiffness than the first portion of the textile layer;
wherein the air delivery conduit forms a sealed air path through which the flow of air is able to be conveyed in use.

In examples: (a) the method comprises knitting the textile; (b) the method comprises circular knitting the textile; (c) the method comprises flat knitting the textile; (d) the method comprises weaving the textile; (e) the method comprises knitting the textile in an elongate cylindrical shape; and/or (f) the method comprises forming the textile as an elongate flat strip and then joining edges of the textile to form an elongate cylindrical shape.

In further examples: (a) the method comprises providing an activating material to the second portion of the textile layer, wherein the activating material causes the second portion to be stiffened by the stiffening process; (b) the method comprises forming the first portion with fibres formed from a first material and forming the second portion with fibres formed from the activating material; (c) the method comprises forming the second portion both with fibres formed from the first material and with fibres formed from the activating material; (d) the method comprises forming the textile layer and subsequently providing the activating material to the second portion of the textile layer; and/or (e) the method comprises providing more than one activating material to the second portion of the textile layer.

In further examples, (a) the activating material comprises a heat treatable material; (b) the activating material comprises a lower melting point than the first material; (c) the activating material is more readily curable than the first material; (d) the activating material comprises a thermosetting material; (e) the activating material comprises a thermoplastic material; (f) the activating material comprises a photo-activating material which stiffens the second portion of the textile layer upon application of visible or non-visible light to the second portion; (g) the activating material comprises a pressure-activating material which stiffens the second portion of the textile layer upon application of pressure to the second portion; (h) the activating material comprises microencapsulated adhesive; (i) the activating material comprises one or more chemically-activating materials configured to chemically react to stiffen the second portion of the textile layer; and/or (j) the activating material comprises a cross-linking agent.

In further examples: (a) performing the stiffening process comprises heat treating the second portion of the textile layer; (b) the step of heat treating the second portion comprises heating the second portion causing fibres of the textile in the second portion to stiffen; (c) the step of heat treating the second portion comprises curing fibres of the textile in the second portion; (d) the step of heat treating the second portion comprises at least partially fusing fibres of the textile in the second portion; (e) the step of heat treating the second portion comprises heating the second portion causing fibres of the textile in the second portion to soften and allowing the softened fibres of the textile in the second portion to cool and fuse to surrounding fibres; (f) the step of heat treating the second portion comprises melting fibres of the textile in the second portion and allowing said fibres to cool and fuse to surrounding fibres; (g) the method comprises sealing the textile layer to create the sealed air path; (h) the step of sealing the textile layer comprises inserting the sealing layer into an interior of the textile layer and bonding the sealing layer to the textile layer; and/or (i) the method comprises heat-treating the second portion during the step of bonding the sealing layer to the textile layer.

In further examples: (a) performing the stiffening process comprises performing a photo-activation process to stiffen the second portion of the textile layer; (b) the method comprises applying visible or non-visible light to the second portion of the textile layer to activate a photo-activating material provided to the second portion to cause the photo-activating material to stiffen the second portion; (c) the method comprises curing the second portion of the textile layer using visible or non-visible light.

In further examples: (a) performing the stiffening process comprises applying pressure to the second portion of the textile layer to stiffen the second portion; (b) the method comprises applying pressure to the second portion causing an adhesive to stiffen the second portion; (c) the method comprises applying pressure to the second portion to activate microencapsulated adhesive.

In further examples: (a) performing the stiffening process comprises creating a chemical reaction to stiffen the second portion of the textile layer; (b) the method comprises providing one or more materials to the second portion of the textile layer to cause a chemical reaction to stiffen the second portion; (c) the method comprises providing a cross-linking agent to the second portion of the textile layer.

In further examples: (a) the method comprises forming a plurality of first portions and a plurality of second portions when forming the textile layer; (b) the method comprises forming the plurality of first portions and the plurality of second portions in an alternating manner along the textile layer; (c) the method comprises forming the plurality of second portions in the form of ring portions spaced apart along the textile layer; and/or (d) the method comprises forming a single second portion in the form of a helical portion extending helically along the air delivery conduit.

In further examples: (a) the method comprises preheating the textile layer; (b) the method comprises sealing the textile layer to create the sealed air path; (c) the step of sealing the textile layer comprises inserting the sealing layer into an interior of the textile layer and bonding the sealing layer to the textile layer (d) the method comprises blowing hot air to preheat the textile layer prior to inserting the sealing layer; (e) the method comprises blowing hot air from a mandrel inserted within the textile layer; (f) the method comprises supporting the sealing layer on a mandrel and inserting the mandrel and sealing layer into the interior of the textile layer; (g) the method comprises blowing an interior of the sealing layer with hot air to expand and bond the sealing layer to the textile layer; (h) the method comprises heat-bonding the sealing layer to the textile layer; (i) the method comprises adhering the sealing layer to the textile layer; and/or (i) the method comprises supporting the sealing layer on a balloon of the mandrel and inflating the balloon with hot air to expand the sealing layer and bond it to the textile layer.

In examples: the method comprises knitting the textile.

In examples: the method comprises circular knitting the textile.

In examples: the method comprises flat knitting the textile.

In examples: the method comprises providing an activating material to the second portion of the textile layer, wherein the activating material causes the second portion to be stiffened by the stiffening process.

In examples: the method comprises forming the first portion with fibres formed from a first material and forming the second portion with fibres formed from the activating material.

In examples: the method comprises forming the second portion both with fibres formed from the first material and with fibres formed from the activating material.

In examples: the method comprises forming the textile layer and subsequently providing the activating material to the second portion of the textile layer.

In examples: the method comprises providing more than one activating material to the second portion of the textile layer.

In examples: the activating material comprises a heat treatable material.

In examples: the activating material comprises a lower melting point than the first material.

In examples: the activating material is more readily curable than the first material.

In examples: the method comprises forming the second portion from a thermosetting material.

In examples: the method comprises forming the second portion from a thermoplastic material.

In examples: the method comprises forming the second portion using both a thermosetting material and a thermoplastic material.

In examples: the activating material comprises a photo-activating material which stiffens the second portion of the textile layer upon application of visible or non-visible light to the second portion.

In examples: the activating material comprises a pressure-activating material which stiffens the second portion of the textile layer upon application of pressure to the second portion.

In examples: the activating material comprises microencapsulated adhesive.

In examples: the activating material comprises one or more chemically-activating materials configured to chemically react to stiffen the second portion of the textile layer.

In examples: the activating material comprises a cross-linking agent.

In examples: performing the stiffening process comprises heat treating the second portion of the textile layer.

In examples: the step of heat treating the second portion comprises heating the second portion causing fibres of the textile in the second portion to stiffen.

In examples: the step of heat treating the second portion comprises curing fibres of the textile in the second portion.

In examples: the step of heat treating the second portion comprises at least partially fusing fibres of the textile in the second portion.

In examples: the step of heat treating the second portion comprises heating the second portion causing fibres of the textile in the second portion to soften and allowing the softened fibres of the textile in the second portion to cool and fuse to surrounding fibres.

In examples: the step of heat treating the second portion comprises melting fibres of the textile in the second portion and allowing said fibres to cool and fuse to surrounding fibres.

In examples: performing the stiffening process comprises performing a photo-activation process to stiffen the second portion of the textile layer.

In examples: the method comprises applying visible or non-visible light to the second portion of the textile layer to activate a photo-activating material provided to the second portion to cause the photo-activating material to stiffen the second portion.

In examples: the method comprises curing the second portion of the textile layer using visible or non-visible light.

In examples: performing the stiffening process comprises applying pressure to the second portion of the textile layer to stiffen the second portion.

In examples: the method comprises applying pressure to the second portion causing an adhesive to stiffen the second portion.

In examples: the method comprises applying pressure to the second portion to activate microencapsulated adhesive.

In examples: performing the stiffening process comprises creating a chemical reaction to stiffen the second portion of the textile layer.

In examples: the method comprises providing one or more materials to the second portion of the textile layer to cause a chemical reaction to stiffen the second portion.

In examples: the method comprises providing a cross-linking agent to the second portion of the textile layer.

In examples: the method comprises forming a plurality of first portions and a plurality of second portions when forming the textile layer.

In examples: the method comprises forming the plurality of first portions and the plurality of second portions in an alternating manner along the textile layer.

In examples: the method comprises forming the plurality of second portions in the form of ring portions spaced apart along the textile layer.

In examples: the method comprises forming a single second portion in the form of a helical portion extending helically along the air delivery conduit; In examples: the method comprises sealing the textile layer to create the sealed air path.

In examples: the step of sealing the textile layer comprises inserting the sealing layer into an interior of the textile layer and bonding the sealing layer to the textile layer.

In examples: the method comprises heat-treating the textile layer during the step of bonding the sealing layer to the textile layer.

In examples: the method comprises supporting the sealing layer on a mandrel and inserting the mandrel and sealing layer into the interior of the textile layer.

In examples: the method comprises blowing an interior of the sealing layer with hot air to expand and bond the sealing layer to the textile layer.

In examples: the method comprises heat-bonding the sealing layer to the textile layer.

In examples: the method comprises adhering the sealing layer to the textile layer.

In examples: the method comprises supporting the sealing layer on a balloon of the mandrel and inflating the balloon with hot air to expand the sealing layer and bond it to the textile layer.

Another aspect of the present technology comprises a patient interface assembly comprising a patient interface configured to sealing engage a patient's face, in use and an air delivery conduit according to any one of the aspects or examples described above, wherein the air delivery conduit is connectable to the patient interface to deliver pressurized respiratory gas to the patient interface.

Another aspect of the present technology comprises a respiratory therapy system configured to deliver pressurized respiratory gas to a patient's airways, the system comprising a respiratory therapy device configured to pressurize a flow of respiratory gas and an air delivery conduit according to any one of the aspects or examples described above, wherein the air delivery conduit is connectable to the respiratory therapy device to receive the pressurized flow of respiratory gas from the respiratory therapy device.

In examples of the present technology, there may be provided a light weight flexible tube comprising a skeletal structure attached to an air impermeable covering. The covering may comprise a textile material. The skeletal structure may comprise an array of ring members spaced apart along the tube. An air impermeable fabric may envelope and be a to the skeletal structure, forming a hollow interior through which gas can be conveyed. The air impermeable covering of the tube may be a laminate material comprising a flexible and/or stretchable textile material provided with an air impermeable film or other layer to enable pressurised air flow without significant bleed through or leakage. Sealing tape may be used to seal the joint internally where the laminate overlaps with itself, isolating the textile layer from the air path. This may provide for air delivery conduit that is sealed effectively yet is low-cost, easy to manufacture and which is appealing to the user.

Another aspect of the present technology relates to an air delivery conduit configured to convey a pressurised flow of respiratory gas from a respiratory pressure therapy device to a patient interface to deliver respiratory pressure therapy to a patient. The air delivery conduit may include a flexible reinforcing structure extending along a length of the air delivery conduit. The reinforcing structure may be configured to resist a crushing force applied to the air delivery conduit. The air delivery conduit may also include a sealing strip applied to the reinforcing structure along the length of the air delivery conduit. The air delivery conduit may further include an air impermeable textile covering wrapped around the reinforcing structure and the sealing strip. The textile covering may form a sealed gas flow path and may include a first edge extending along the length of the air delivery conduit and a second edge opposite the first edge and extending along the length of the air delivery conduit. The first and second edges of the textile covering may meet at or overlap at an inner seam. Also, the sealing strip may be aligned with the seam.

The longitudinal length of the reinforcing structure may be adjustable. In addition, the textile covering may be bonded to itself at a location proximate to the inner seam. The sealing strip may be bonded to the reinforcing structure and/or the textile covering. In addition, the sealing strip may include a thermoplastic material. The sealing strip may be heat-bonded to the reinforcing structure and/or the textile covering. The air delivery conduit may further include an outer strip bonded to an exterior side of the textile covering along the second edge of the textile covering. The first edge of the textile covering and/or the second edge of the textile covering may be serrated. The textile covering may have a laminate structure and may include an air impermeable inner layer and an outer fabric layer. The outer fabric layer may include a textile material. The air impermeable layer may include a thermoplastic material. The inner seam may be aligned along a centreline of the sealing strip. The reinforcing structure may include a plurality of ring members spaced apart along the length of the air delivery conduit.

Another aspect of the present technology relates to an air delivery conduit configured to convey a pressurised flow of respiratory gas under pressure from a respiratory pressure therapy device to a patient interface to delivering respiratory pressure therapy to a patient. The air delivery conduit may include an array of support structures spaced apart along a length of the air delivery conduit and configured to resist a crushing force applied to the air delivery conduit. Each support structure may include an outer surface, an inner surface opposite the outer surface, and a pair of intermediate faces extending from the outer surface to the inner surface. The air delivery conduit may also include an air impermeable textile covering attached to the outer surfaces of the support structures along the length of the air delivery conduit. The textile covering may form a sealed gas flow path. For each support structure, each intermediate face may meet the outer surface at an outer edge, and each outer edge may be filleted or chamfered.

For each support structure, each intermediate face may meet the inner surface at an inner edge, and each inner edge may be filleted or chamfered. The radii of curvature of the outer edges may be greater than the radii of curvature of the inner edges. A cross-section of the inner surface of each support structure may be convex. The support structures may be substantially rigid. A distance between neighboring support structures may be dynamically adjustable. In addition, each support structure may be movable toward and away from a neighboring support structure. Also, each support structure may be movable relative to a neighboring support structure to a location in which the central longitudinal axis of the support structure is offset from and parallel to the central longitudinal axis of the neighboring support structure. The spacing between the support structures may be varied along the length of the air delivery conduit. For example, the support structures may be further apart at a central portion of the air delivery tube than at end portions of the air delivery tube.

The textile covering may be wrapped around the array of support structures so that the textile covering overlaps itself at a seam. The textile covering may have a seamless tubular structure. The air delivery conduit may further include a first connector at a first end configured to connect to tubing connected to an outlet of the respiratory pressure therapy device. The air delivery conduit may also include a second connector at a second end configured to connect to a patient interface.

In examples: the covering is bonded to itself at a location proximate the seam.

In examples: the covering is bonded to the reinforcing structure.

In examples: the covering is bonded to the sealing strip.

In examples: the covering comprises a textile material and the sealing strip comprises a thermoplastic material.

In examples: the air conduit further comprises an outer strip bonded to the outer side of the covering along the second edge of the covering.

In examples: the first edge of the covering and/or the second edge of the covering is serrated.

In examples: the covering has a laminate structure.

In examples: the covering comprises an air impermeable inner layer and an outer textile layer.

In examples: the air impermeable inner layer comprises a thermoplastic material.

In examples: the inner portion of the seam is aligned along a centreline of the sealing strip.

In examples: the reinforcing structure comprises a plurality of support structures spaced apart along the length of the air delivery conduit.

In examples: the air delivery conduit comprises a first end configured to connect to tubing connected to an outlet of the respiratory pressure therapy device, and a second end configured to connect to a patient interface.

A patient interface assembly may include a patient interface configured to sealingly engage a patient's face, in use. The patient interface assembly may also include an air delivery conduit with any of the reinforcing structures, connectors, and coverings discussed above. The air delivery conduit may be connectable to the patient interface to deliver pressurized respiratory gas to the patient interface.

A respiratory therapy system may be configured to deliver pressurized respiratory gas to a patient's airways and may include a respiratory therapy device configured to pressurize a flow of respiratory gas. The respiratory therapy system may also include an air delivery conduit with any of the reinforcing structures, connectors, and coverings discussed above. The air delivery conduit may be connectable to the respiratory therapy device to receive the pressurized flow of respiratory gas from the respiratory therapy device.

Another aspect of the present technology relates to an air delivery conduit configured to convey a pressurised flow of respiratory gas from a respiratory pressure therapy device to a patient interface to delivering respiratory pressure therapy to a patient. The air delivery conduit may include a plurality of support structures spaced apart along a length of the air delivery conduit, and configured to resist a crushing force applied to the air delivery conduit. Each support structure may include an outer surface, an inner surface opposite the outer surface, and a pair of intermediate faces extending from the outer surface to the inner surface. An air impermeable textile covering may be attached to the outer surfaces of the support structures along the length of the air delivery conduit. The textile covering may form a sealed gas flow. At least one of the support structures may include a pair of thickened portions on opposing sides of the support structure corresponding widened portions of the intermediate faces of the support structure.

The shapes of the outer surfaces of the support structures may be varied along the air delivery tube. The shapes of the outer surfaces of the support structures at end portions of the air delivery conduit may be different from the shapes of the outer surfaces of the support structures at a central portion of the air delivery conduit. For example, the shapes of the outer surfaces of the of the support structures at the end portions of the air delivery conduit may be circular, and the shapes of the outer surfaces of the support structures at the central portion of the air delivery conduit may be elliptical.

The shape of the inner surface of each support structure may be non-circular. The shape of the inner surface of each support structure may be elliptical. The minor axis of the elliptical inner surface shape may extend through the pair of thickened portions. The major axis of the elliptical inner surface shape may extend through the pair of thickened portions. The shape of the outer surface of each support structure may be circular. The shape of the outer surface of each support structure may be non-circular. The shape of the outer surface of each support structure may be elliptical. The major axis of the elliptical outer surface shape may extend through the thickened portions. The textile covering may be wrapped around the array of support structures so that the textile covering overlaps itself at a seam. The textile covering may have a seamless tubular structure.

Another aspect of the technology relates to an air delivery conduit configured to convey a pressurised flow of respiratory gas from a respiratory pressure therapy device to a patient interface to deliver respiratory pressure therapy to a patient. The air delivery conduit may include a plurality of support structures spaced apart along a length of the air delivery conduit. The support structures may be configured to resist a crushing force applied to the air delivery conduit. A laminated air impermeable covering may be wrapped around the support structures to form a sealed gas flow path, the textile covering may include an outer layer made of textile material and an air impermeable inner layer. The surface area of the inner layer may be larger than the surface area of the outer layer so that a flap portion of the inner layer extends beyond the outer layer. In addition, the air impermeable covering may overlap itself at an inner seam. The flap portion of the inner layer may sealingly contact another part of the inner layer at the inner seam. The flap portion may be folded back over the outer layer at the inner seam. The flap portion may be configured to prevent the outer layer from coming into contact with pressurized respiratory gas flowing through the air delivery conduit.

The air delivery conduit may further include an inner sealing strip applied to the support structures along the length of the air delivery conduit at the inner seam. The air delivery conduit may further include an outer sealing strip applied to the outer layer at an outer seam. The air impermeable inner layer may be formed from a thermoplastic material such as, for example, a thermoplastic polyurethane. The air impermeable inner layer may have a thickness of about 0.5 mm or less or may have a thickness of about 0.15 mm or less. The textile material may have a knitted structure, a woven structure, or a non-woven structure. The covering may have a weight of about 250 GSM or less or about 180 GSM or less. The support structures may be spaced apart by a distance within a range of 1 mm to 9 mm, a range of 2 mm to 6 mm, a range of 2 mm to 3 mm, about 6 mm or less, or about 3 mm or less.

Another aspect of the technology relates to an air delivery conduit configured to convey a pressurised flow of respiratory gas from a respiratory pressure therapy device to a patient interface to deliver respiratory pressure therapy to a patient. The air delivery conduit may include a flexible reinforcing structure extending along a length of the air delivery conduit. The reinforcing structure may be configured to resist a crushing force applied to the air delivery conduit. A textile covering may be attached to the reinforcing structure along the length of the air delivery conduit. A sealing layer may form a sealed gas flow path. The reinforcing structure may be positioned between the textile covering and the sealing layer.

The reinforcing structure may include a plurality of support structures spaced apart along the length of the air delivery conduit. The sealing layer may be formed from a thermoplastic material. The textile cover may have a knitted structure. The sealing layer may be heat-bonded to the reinforcing structure and/or the textile covering. The sealing layer may include a single film layer. The sealing layer may include an inner film layer and an outer film layer. The inner film layer may be configured to resist hydrolysis and/or be anti-microbial. The inner film layer may include an Ether type TPU. The outer film layer may have a lower softening temperature than the inner film layer. The textile covering may be seamless. The textile covering may be wrapped around the reinforcing structure. The air delivery conduit may be connectable to the patient interface to deliver pressurized respiratory gas to the patient interface.

Another aspect of the technology relates to a method of manufacturing an air delivery conduit configured to convey a pressurised flow of respiratory gas from a respiratory pressure therapy device to a patient interface to deliver respiratory pressure therapy to a patient. The method may include applying a tubular textile covering to an exterior of the elongate reinforcing structure. The reinforcing structure may be configured to resist a crushing force applied to the air delivery conduit. A tubular sealing liner may be inserted into an interior of the reinforcing structure. The tubular sealing liner may be expanded so that an outer surface of the tubular sealing liner comes into contact with the inner surface of the tubular textile covering. The tubular sealing liner may be attached to the tubular textile covering. The tubular sealing liner may form a sealed gas flow path within the air delivery conduit.

The tubular textile covering may be slid over the reinforcing structure in the direction of the longitudinal axis of the mandrel. The tubular textile covering may be wrapped around the reinforcing structure. The reinforcing structure may be slid into the tubular textile covering. The tubular textile covering may be preheated prior to the tubular sealing liner being inserted. The tubular textile covering may be preheated by blowing hot air on the tubular textile covering. The tubular sealing liner may be supported on a mandrel, and the tubular sealing layer may be inserted into the interior of the reinforcing structure by inserting the mandrel into the interior of the reinforcing structure. Hot air may be blown onto an interior surface of the tubular sealing liner to expand and bond the tubular sealing liner to the tubular textile covering. The mandrel may have a low-friction surface. The tubular sealing layer may be mounted on a balloon supported on a mandrel and the tubular sealing layer may be inserted into the interior of the reinforcing structure by inserting the balloon and the mandrel into the interior of the reinforcing structure. The balloon may be inflated with hot air to expand the tubular sealing film and bond the tubular sealing film to the tubular textile covering.

Another aspect of the technology relates to a method of manufacturing an air delivery conduit configured to convey a pressurised flow of respiratory gas from a respiratory pressure therapy device to a patient interface to deliver respiratory pressure therapy to a patient. The method may include forming a tubular textile covering. An elongate reinforcing structure may be supported on a mandrel. The reinforcing structure may be configured to resist a crushing force applied to the air delivery conduit. One end of the tubular textile covering may be rolled in on itself. The rolled end of the tubular textile covering may be attached to the mandrel. The tubular textile covering may be rolled along the length of the mandrel and the reinforcing structure so that the remaining portions of the tubular textile covering roll in on itself and the tubular textile covering becomes completely inverted. The mandrel may be removed from the tubular textile covering and reinforcing structure.

The tubular textile covering may include a textile layer and an air impermeable layer. Before the tubular textile covering is rolled onto the mandrel and the reinforcing layer, the textile layer may be on an inner side of the tubular textile covering and the air impermeable layer may be on an outer side of the tubular textile covering. The textile layer may be knitted. The reinforcing structure may be supported on the mandrel by collapsing the mandrel, mounting the reinforcing structure on the mandrel, and expanding the mandrel. The mandrel may be collapsed to release the reinforcing structure after the tubular textile covering is completely inverted. The reinforcing structure may be bonded to the tubular textile covering. The reinforcing structure may be bonded to the tubular textile by way of heat-bonding or ultrasonically welding the reinforcing structure to tubular textile covering.

Another aspect of the technology relates to a method of manufacturing an air delivery conduit configured to convey a pressurised flow of respiratory gas under pressure from a respiratory pressure therapy device to a patient interface to deliver respiratory pressure therapy to a patient. The method may include securing a tubular textile covering to a support in a manner that maintains a sealed space around an exterior of the tubular textile covering. The tubular textile covering may be expanded by creating a pressure differential between the interior of the tubular textile covering and the sealed space around the exterior of the tubular textile covering. An elongate reinforcing structure may be inserted into the interior of the tubular textile covering, the reinforcing structure being configured to resist a crushing force applied to the air delivery conduit. The tubular textile covering may be contracted onto the reinforcing structure by reducing the pressure differential between the interior of the tubular textile covering and the sealed space around the exterior of the tubular textile covering.

The pressure differential may be generated by increasing the air pressure inside the tubular textile covering. The pressure differential may be generated by decreasing the air pressure in the sealed space around the exterior of the tubular textile covering. The support may be a vacuum jig. The vacuum jig may generate a vacuum in the sealed space around the tubular textile covering. The diameter of the vacuum jig may be greater than the diameter of the tubular textile covering to allow the tubular textile covering to expand. The elongate reinforcing structure may be mounted onto a mandrel and then inserted into the interior of the tubular textile covering. The mandrel may be removed from the interior of the tubular textile covering, and the reinforcing structure may remain within the tubular textile covering. The elongate reinforcing structure may include a plurality of support structures spaced apart. The diameter of the support structures may be greater than the diameter of the tubular textile covering when the tubular textile covering is in a contracted state. After the mandrel is removed from the interior of the tubular textile covering, there may be grooves in the tubular textile covering between adjacent pairs of support structures.

The mandrel may include a plurality of teeth configured to allow the support structures to slide along the mandrel in a first direction and configured to prevent the support structures from sliding along the mandrel in a second direction opposite to the first direction. Each tooth may include a first wall and a second wall, the first wall being tapered with respect to a central axis of the mandrel. The second wall may be perpendicular to the central axis of the mandrel. The first wall may be configured to allow the support structures to slide over the respective tooth in the first direction, and the second wall may be configured to prevent the support structures from sliding along the mandrel in the second direction. The plurality of teeth may be grouped into sets of teeth longitudinally spaced apart along the mandrel. Each set of teeth may be configured to prevent a respective support structure from sliding along the mandrel in the second direction. Each set of teeth may include a plurality of teeth positioned radially about the central axis of the mandrel. The teeth may be biased into an outwardly projecting position with respect to the central axis of the mandrel and may be inwardly depressible with respect to the central axis of the mandrel to allow the support structures to slide over the teeth in the first direction. The teeth may be spring-loaded into the outwardly projecting position. The tubular textile covering may be at least partially bonded to the reinforcing structure before the mandrel is removed from the interior of the tubular textile covering. The tubular textile covering may be bonded to the reinforcing structure after the mandrel is removed from the interior of the tubular textile covering. The tubular textile covering may be heat bonded, ultrasonically welded or adhered to the reinforcing structure.

Another aspect of the technology relates to an air delivery conduit that includes any of the reinforcing structures, connectors, and coverings discussed above and may further include a first connector at a first end configured to connect to tubing connected to an outlet of the respiratory pressure therapy device. The air delivery conduit may also include a second connector at a second end configured to connect to a patient interface.

Another aspect of the technology relates to a patient interface assembly that may include a patient interface configured to sealingly engage a patient's face, in use. The patient interface assembly may also include an air delivery conduit with any of the reinforcing structures, connectors, and coverings discussed above. The air delivery conduit may be connectable to the patient interface to deliver pressurized respiratory gas to the patient interface.

Another aspect of the technology relates to a respiratory therapy system that may be configured to deliver pressurized respiratory gas to a patient's airways and may include a respiratory therapy device configured to pressurize a flow of respiratory gas. The respiratory therapy system may also include an air delivery conduit with any of the reinforcing structures, connectors, and coverings discussed above. The air delivery conduit may be connectable to the respiratory therapy device to receive the pressurized flow of respiratory gas from the respiratory therapy device.

An air delivery conduit with a soft and comfortable feel may be desired by the patient. For example, the patient may find it easier to sleep with an air delivery conduit that has a soft outer covering that is comfortable to touch. The patient may be more likely to comply with therapy if the patient considers the treatment apparatus to be comfortable and desirable. A flexible tube for providing an air flow path between a respiratory pressure therapy device and the patient interface, provided with a textile surface, but with good air-holding properties and also of light weight construction, may provide the required functions for treatment as well as being comfortable and having aesthetic and consumer appeal.

An air delivery conduit having an outer surface formed from a textile material may have a soft, warm feel to it in contrast to a cold, hard feel of some existing plastic tubes. Patients may be more likely to comply with therapy when their equipment is comfortable and desirable. A textile tube may look less like medical equipment and more like bedclothes. A textile tube may also be quieter than a plastic tube when rubbing over a surface. A textile tube may also be lighter per unit length than a plastic tube, meaning tube drag may be lower. Additionally, a wider variety of tube cross sections, e.g. a low-profile cross section such as an ellipse, may be achievable with textile tubes.

Another aspect of the present technology relates to a patient interface configured to convey a flow of breathable gas under pressure from a respiratory pressure therapy device for providing respiratory pressure therapy to a patient, the patient interface comprising:

a positioning and stabilising structure, a seal forming structure, wherein the positioning and stabilising structure comprises at least one headgear tube that is configured to in use lie against at least one of a surface of the patient's head or a surface of the patient's face;
wherein the at least one headgear tube includes at least one resilient support element.

In examples: the positioning and stabilising structure comprises a first headgear tube and a second headgear tube.

In examples: the first headgear tube and the second headgear tube are configured to in use extend from a junction across a respective side of the patient's head and across a respective cheek of a patient's head and connect to the sealing forming structure.

In examples: the junction is located on a top or the rear of the patient's head.

In examples: the headgear tube(s) has a non-circular cross-sectional area in a plane substantially perpendicular to the length of the tube(s).

In examples: the headgear tube(s) comprise(s) a patient contacting portion and a non-contacting portion which together define a conduit which in use provides a pathway to facilitate delivering a flow of breathable gas to the seal forming structure.

In examples: the conduit defined by the patient contacting portion and the non-contacting portion has a substantially semi-circular cross-sectional area in a plane orientated substantially perpendicular to a longitudinal axis of the headgear tube.

In examples: the patient contacting portion is substantially planar and the non-contacting portion has a curved shaped, and wherein the planar and curved shape together define the semi-circular cross-sectional area.

In examples: the patient contacting portion and non-contacting portion are separate parts to each other.

In examples: the separate parts are attached to each other by an RF weld or an adhesive.

In examples: at least one of the patient contacting portion and the non-contacting portion comprises at least one layer of textile material.

In examples: the resilient support element is provided to the non-contacting portion.

In examples: the headgear tube comprises a plurality of resilient support elements which are spaced apart from each other along the length of the headgear tube(s).

In examples: the headgear tube comprises a single resilient support element.

In examples: the single resilient element is a single bead of material which has a spiral or helix shape which extends along the length of the tube(s).

Another aspect of the present technology is a headgear tube for a positioning and stabilising structure, the headgear tube being configured to in use convey a flow of breathable air under pressure from a respiratory pressure therapy device to a seal forming structure for providing respiratory pressure therapy to a patient, the headgear tube comprising:
a patient contacting portion configured to in use lie against at least one of a surface of the patient's head or a surface of the patient's face;
wherein the at least one headgear tube includes a resilient support member.

In examples, the positioning and stabilising structure comprises a first headgear tube and a second headgear tube, and wherein the first headgear tube and the second headgear tube are configured to in use extend from a junction, across a respective side of the patient's head and across a respective cheek of the patient's face and connect to a seal forming structure. The junction may be located on the top or rear of a patient's head. At least one of the first and second headgear tubes includes at least one resilient support element, and preferably both of the first headgear tube and the second headgear tube includes at least one resilient support element.

In examples, the headgear tube(s) according to the technology may have a non-circular cross-sectional area in a plane substantially perpendicular to the length of the tube(s). The cross-sectional area may be substantially semicircular, triangular or oval. For instance, the cross-sectional area may be defined by a substantially linear/straight portion and an arcuate portion.

In examples, the headgear tube(s) comprise(s) a patient contacting portion and a non-contacting portion which together define a conduit configured to in use facilitate delivering a flow of breathable gas to the seal forming structure.

In examples, the patient contacting portion and the non-patient contacting portion are separate parts which are attached to each other. The separate parts may be attached to each other to create at least one join. The portions may be attached together by an RF weld, an adhesive or other technique.

In examples, at least a portion of the patient contacting portion is constructed from a soft and flexible material.

In examples, at least one, and preferably both, of the patient contacting portion and the non-contacting portion comprises at least one layer of textile material. The layer(s) of textile material may provide an outer layer of the headgear tube(s).

In examples, a headgear tube according to the technology may be substantially gas impermeable. For instance, the patient contacting portion and the non-contacting portions may include at least one layer of material that is gas impermeable.

In examples, the patient contacting portion comprises a layer of textile material and at least one layer of cushioning material. The layer of cushioning material may be one or more layers of foam or other material which is soft and flexible.

In examples, the at least one resilient support member may be provided to the non-contacting portion and optionally to the patient contacting portion.

In examples, the at least one headgear tube comprises a plurality of resilient support elements which are spaced apart from each other along the length of the headgear tube. In alternate examples, the resilient support element may be a single bead having a spiral or helix shape which extends along the length of the tube.

In examples, the resilient support element(s) are formed from one or more materials selected from the list of: silicone, polyurethane (PU), TPU, or other suitable resilient material.

In examples: the conduit defined by the patient contacting portion and the non-contacting portion has a substantially semi-circular cross-sectional area in a plane orientated substantially perpendicular to a longitudinal axis of the headgear tube.

In examples: the patient contacting portion is substantially planar and the non-contacting portion has a curved shaped, and wherein the planar and curved shape together define the semi-circular cross-sectional area.

In examples: the patient contacting portion and non-contacting portion are separate parts to each other.

In examples: the separate parts are attached to each other by an RF weld or an adhesive.

In examples: at least one of the patient contacting portion and the non-contacting portion comprises at least one layer of textile material.

In examples: the resilient support element is provided to the non-contacting portion.

In examples: the headgear tube comprises a plurality of resilient support elements which are spaced apart from each other along the length of the headgear tube.

In examples: the headgear tube comprises a single resilient support element.

In examples: the textile material comprises a knitted or woven material.

In examples: the textile material includes a layer of coating material to make the textile material substantially gas impermeable.

In examples: the coating material is a glue or adhesive.

In examples: the resilient support element(s) are provided directly on the coating material.

In examples: the patient contacting portion comprises at least one layer of foam.

In examples: the headgear tube comprises a first connector located at a first end of the headgear tube and a second connector located at a second end of the headgear tube.

In examples: the first connector is configured to in use attach the headgear tube to the patient interface.

In examples: the second connector is configured to in use connect to a supply of breathable gas.

Another aspect of the present technology relates to a method of manufacturing a component of a respiratory therapy system, the method comprising
1. using a knitting technique to form at least a portion of a knitted structure;
2. applying a resilient material to the portion of the knitted structure formed in step (1);
3. continuing to use the knitting technique to form additional portion(s) of the knitted structure; and
4. applying the resilient material to the additional portion(s) of the knitted formed in step (3);
5. repeating steps (3) and (4) until a desired knitted structure has been manufactured.

In examples, the knitting technique may comprise circular knitting and therefore forms at least a portion of a knitted tubular structure. However, other knitting techniques are possible as are other shapes and structures for the components produced according to the method of the present technology.

In examples, the method may comprise attaching a second layer of material to the knitted structure. The second layer may be attached after or concurrently with the application of the resilient material to the knitted structure.

In examples, the method may comprise the step of curing the resilient material after it has been applied to the knitted structure.

In examples: the knitting technique comprises circular knitting.

In examples: step (1) forms at least a portion of a tubular structure.

In examples: the method further comprises attaching a second layer of material to the knitted structure.

In examples: the second layer is attached after or concurrently with the application of the resilient material to the knitted structure.

In examples: the method includes the step of curing the resilient material after it has been applied to the knitted structure.

Another aspect of the present technology relates to a system configured to manufacture a component of a respiratory therapy system, the system comprising a knitting module configured to manufacture at least a portion of a knitted structure; a dispensing module configured to apply a resilient material to the portion of a knitted structure manufactured by the knitting module.

In examples, the system may be configured to continuously manufacture the knitted structure and to apply the resilient material to the knitted structure after that has been manufactured. For instance, the knitting module and the dispensing module may be positioned relative to each other to enable the dispensing module to apply the resilient material to a portion of the knitted structure as the knitting module continues to manufacture an additional portion of the knitted structure.

In examples, the knitting module may comprise at least one spool of thread e.g. two or more spools of thread. The spools may contain the same or different threads which can be chosen to provide desired properties for a knitted structure manufactured by the system.

In examples, the knitting module may include a drive mechanism configured to move the thread(s) relative to a knitting element to thereby manufacture a portion of the knitted structure.

In examples, the system may comprise a curing tool configured to promote or otherwise assist in curing of the resilient material once that has been applied to a portion of the knitted structure. The curing tool may be an UV light source, a heat source or other component.

In examples: wherein the system is configured to continuously manufacture the knitted structure and to apply the resilient material to the knitted structure after that has been manufactured.

In examples: the knitting module and the dispensing module are positioned relative to each other to enable the dispensing module to apply the resilient material to a portion of the knitted structure as the knitting module continues to manufacture an additional portion of the knitted structure.

In examples: the knitting module comprises at least one spool of thread.

In examples: the system further comprises a second spool of thread.

In examples: the first spool comprises a first type of thread and the second spool comprises a second type of thread.

In examples: the knitting module comprises a drive mechanism and a knitting element, and wherein in use the drive mechanism is configured to move the thread(s) relative to the knitting element to thereby manufacture a portion of the knitted structure.

In examples: the system further comprises a curing tool configured to promote or otherwise assist in curing of the resilient material once that has been applied to the portion of the knitted structure.

In examples: the curing tool is a UV light source or a heat source.

Another aspect of the present technology relates to a method of manufacturing a component of a respiratory therapy system, the method comprising:
1. selecting, forming or manufacturing a sheet of material;
2. applying a resilient material to form at least one resilient support element to create a base sheet; and
3. manipulating the base sheet into a desired shape or structure to provide at least a portion of the component of a respiratory therapy system.

In examples, the sheet of material may be a textile material e.g. a knitted, woven or mesh material. However, the sheet of material may also be moulded or extruded from a plastic material.

In examples, the sheet of material may be a coated sheet of material manufactured according to the method described herein.

In examples, the method comprises attaching the base sheet to a second portion to form the component. The base sheet and the second portion may differ from each other in at least one aspect e.g. the second portion may not include resilient support members. Alternatively, the second portion may be formed from a different material to the sheet of material from which the base sheet is formed.

In examples, attaching the base sheet to the second portion may form a structure having a non-circular cross-sectional area in a plane substantially perpendicular to the length of the component. For instance, the component may have a semi-circular cross-sectional area.

In other examples, the base sheet may be attached to itself to form the component. For instance, the base sheet may be manipulated into a cylindrical or tubular shape, and a join formed to attach the surfaces of the base sheet together.

In examples, the method may comprise RF welding to form a join to attach parts of the component together.

In examples, the method may comprise providing a second layer of material to the base sheet. The second layer of material may be a gas impermeable layer. In embodiments, attaching second layer of material involves attaching a sheet of material to the base sheet e.g. a pre-formed thin film of material. Alternatively, the step of providing the second layer of material may involve pouring a liquid onto the base sheet, or applying discrete drops of liquid and subsequently spreading the liquid to create the second layer. The liquid may be allowed to cure once applied to the base sheet.

In examples, the step of forming the resilient support element(s) also forms a relatively thin layer of the resilient material on the sheet of material.

In examples: the sheet of material is a textile material or a plastics material.

In examples: the textile material is a knitted, woven or mesh material.

In examples: the method further comprises attaching the base sheet to a second portion to form the component.

In examples: the step of attaching the base sheet to the second portion involves forms a structure having a non-circular cross-sectional area in a plane substantially perpendicular to the length of the component.

In examples: the method further comprises the step of RF welding to form a join to attach two parts of the component together.

In examples: the method further comprises the step of providing a second layer of material to the base sheet.

In examples: the step of providing the second layer of material involves attaching a preformed thin film.

In examples: the step of providing the second layer of material involves pouring a liquid onto the base sheet and allowing the liquid to cure.

In examples: the step of forming the resilient support element(s) also forms a relatively thin layer of the resilient material on the sheet of material.

Another aspect of the technology relates to a component of a respiratory therapy system, wherein the component comprises
- a layer of textile material,
- a layer of a coating material adhered to the layer of textile material which provides a substantially gas impermeable layer for the component, wherein the coating material is an adhesive, and
- a resilient support element provided on the coating material.

In examples, the coating material may be a polyurethane (PU) glue.

In examples, the resilient element is made from a resilient material e.g. silicone.

In examples, the coating material and the resilient material are different to each other. For instance, the coating material may be a polyurethane (PU) glue and the resilient material In examples, the coating material may be at least partially in contact with an air pathway. For instance, in these embodiments, the component does not include a further liner or layer of material to completely or partially assist with making the textile material gas impermeable.

Another aspect of the technology relates to a method of forming a component of a respiratory therapy system, wherein the method comprises the steps of:
1) providing a layer of textile material;
2) applying a coating material to the textile material to create a coated textile material, and wherein the coating material creates a substantially gas impermeable layer;
3) applying a resilient material to the coating material to create a base sheet having at least one resilient support element;
4) manipulating the coated textile material to have a desired shape corresponding to the shape of the component.

In examples, the step of applying the coating material may involve applying discrete drops of coating material to the textile material, pouring a liquid onto the textile material or other suitable methods.

In examples, the method includes the step of applying a liner material to the coating material. The method may also include the step of removing the liner material e.g. after the coating material has cured. For instance, the liner may not adhere to the coating material.

In examples, the method may include the step of spreading the coating material across the textile material. For instance, the method may use a knife spreader or drum applicator as known to one skilled in the art.

In examples, the step of applying the resilient material may occur after the coating material has substantially or completely cured. However, the resilient material may be applied immediately after the coating material is applied to the textile material.

Another aspect of one form of the present technology is a patient interface that is moulded or otherwise constructed with a perimeter shape which is complementary to that of an intended wearer.

An aspect of certain forms of the present technology is a medical device that is easy to use, e.g. by a person who does not have medical training, by a person who has limited dexterity, vision or by a person with limited experience in using this type of medical device.

An aspect of one form of the present technology is a portable RPT device that may be carried by a person, e.g., around the home of the person.

An aspect of one form of the present technology is a patient interface that may be washed in a home of a patient, e.g., in soapy water, without requiring specialised cleaning equipment. An aspect of one form of the present technology is a humidifier tank that may be washed in a home of a patient, e.g., in soapy water, without requiring specialised cleaning equipment.

The methods, systems, devices and apparatus described may be implemented so as to improve the functionality of a processor, such as a processor of a specific purpose computer, respiratory monitor and/or a respiratory therapy apparatus. Moreover, the described methods, systems, devices and apparatus can provide improvements in the technological field of automated management, monitoring and/or treatment of respiratory conditions, including, for example, sleep disordered breathing.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the figures of the accompanying drawings, in which like reference numerals refer to similar elements including:

4.1 Treatment Systems

FIG. 1A shows a system including a patient 1000 wearing a patient interface 3000, in the form of nasal pillows, receiving a supply of air at positive pressure from an RPT device 4000. Air from the RPT device 4000 is humidified in a humidifier 5000, and passes along an air circuit 4170 to the patient 1000. A bed partner 1100 is also shown. The patient is sleeping in a supine sleeping position.

FIG. 1B shows a system including a patient 1000 wearing a patient interface 3000, in the form of a nasal mask, receiving a supply of air at positive pressure from an RPT device 4000. Air from the RPT device is humidified in a humidifier 5000, and passes along an air circuit 4170 to the patient 1000.

FIG. 1C shows a system including a patient 1000 wearing a patient interface 3000, in the form of a full-face mask, receiving a supply of air at positive pressure from an RPT device 4000. Air from the RPT device is humidified in a humidifier 5000, and passes along an air circuit 4170 to the patient 1000. The patient is sleeping in a side sleeping position.

4.2 Respiratory System and Facial Anatomy

Figure 1A:
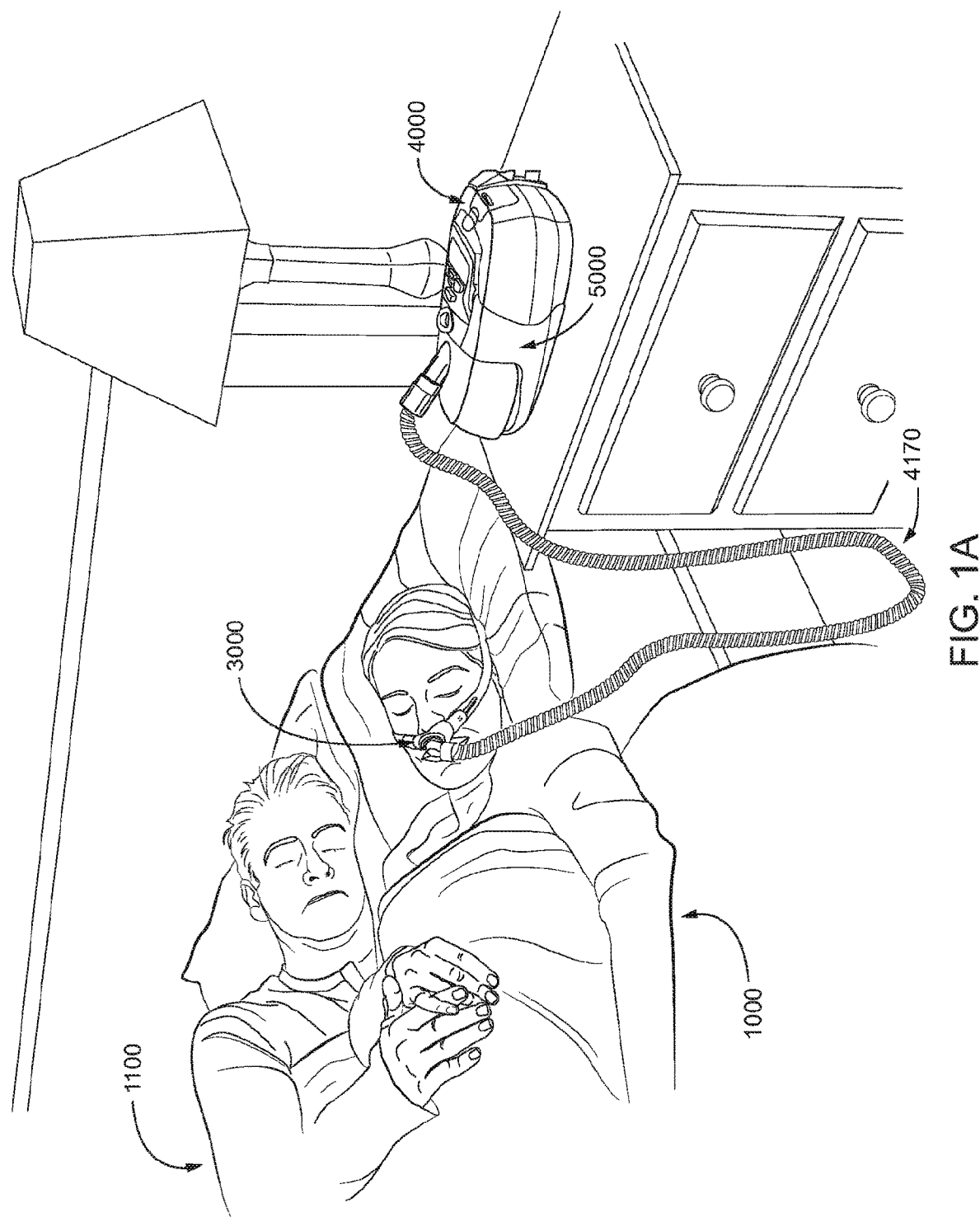
Figure 1B:
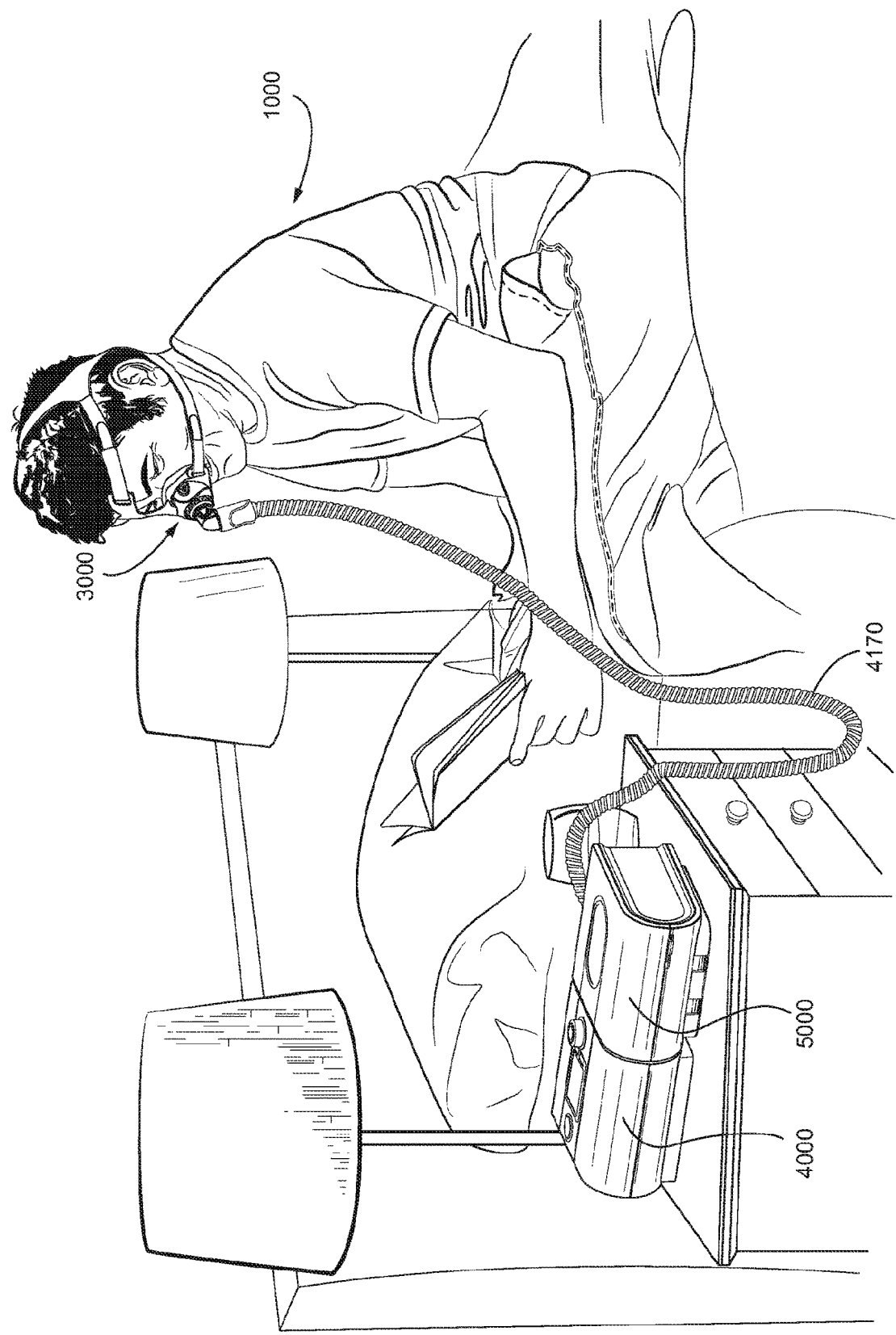
Figure 1C:
Figure 2A:
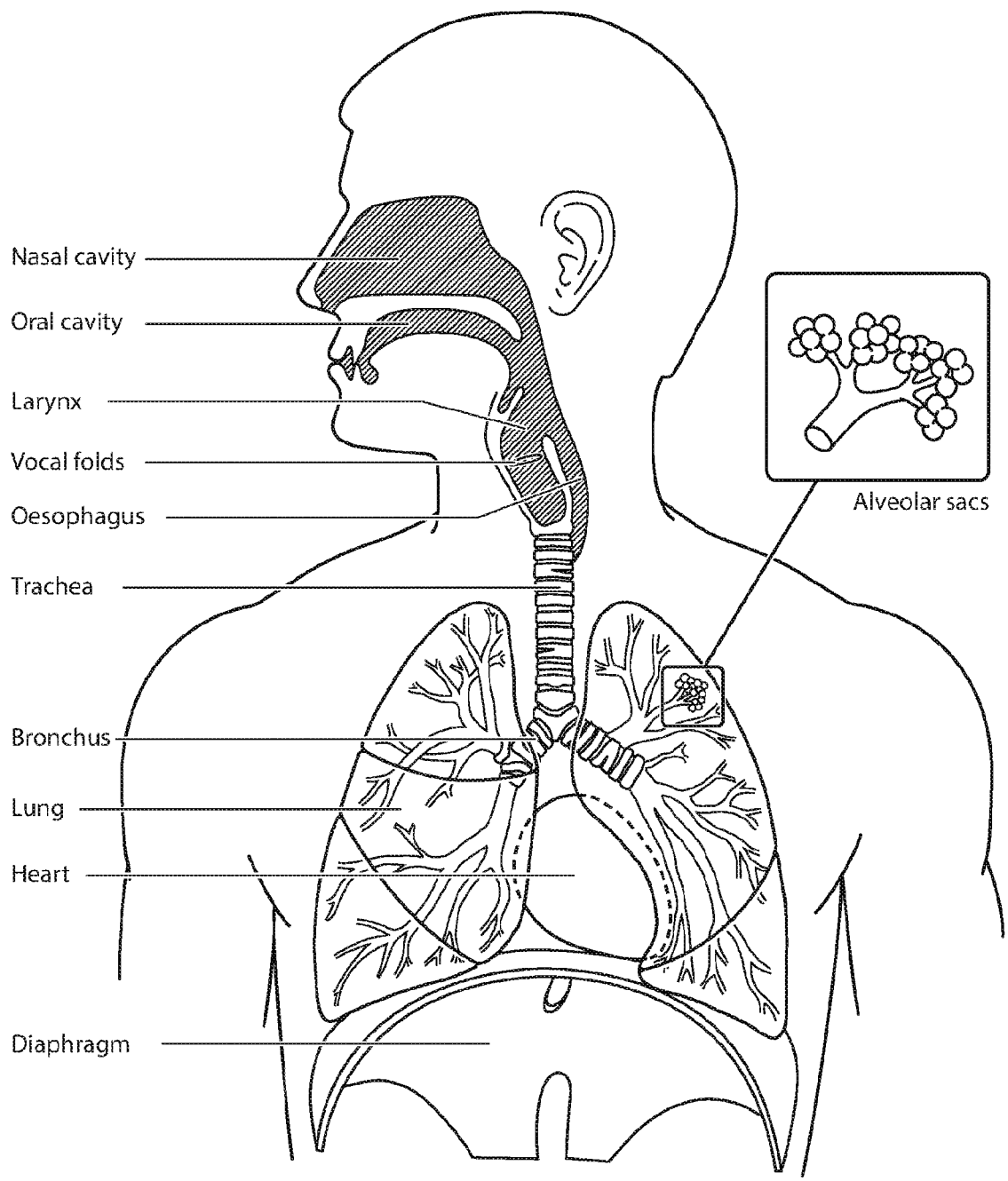
FIG. 2A shows an overview of a human respiratory system including the nasal and oral cavities, the larynx, vocal folds, oesophagus, trachea, bronchus, lung, alveolar sacs, heart and diaphragm.
Figure 2B:
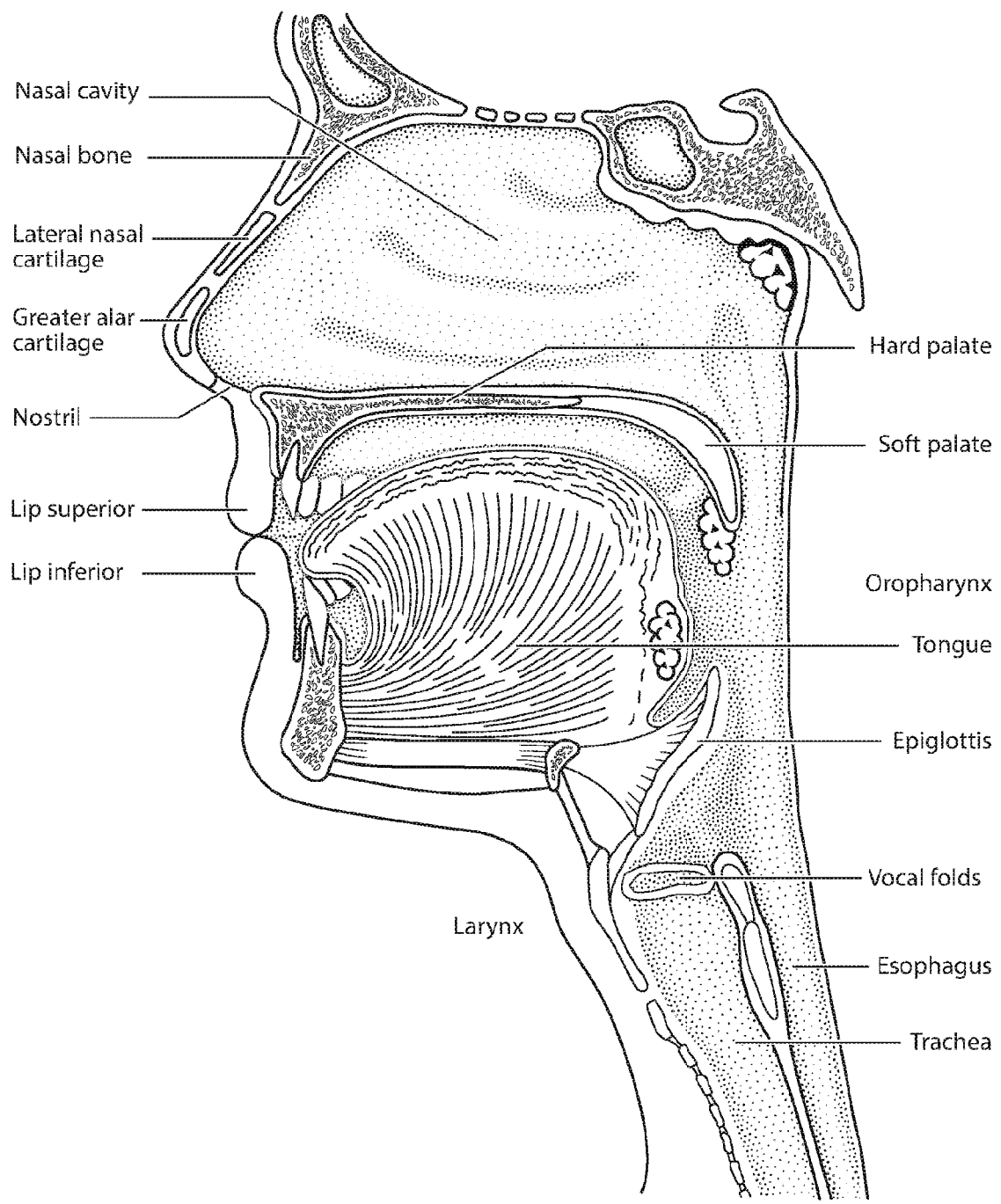
FIG. 2B shows a view of a human upper airway including the nasal cavity, nasal bone, lateral nasal cartilage, greater alar cartilage, nostril, lip superior, lip inferior, larynx, hard palate, soft palate, oropharynx, tongue, epiglottis, vocal folds, oesophagus and trachea.
Figure 2C:
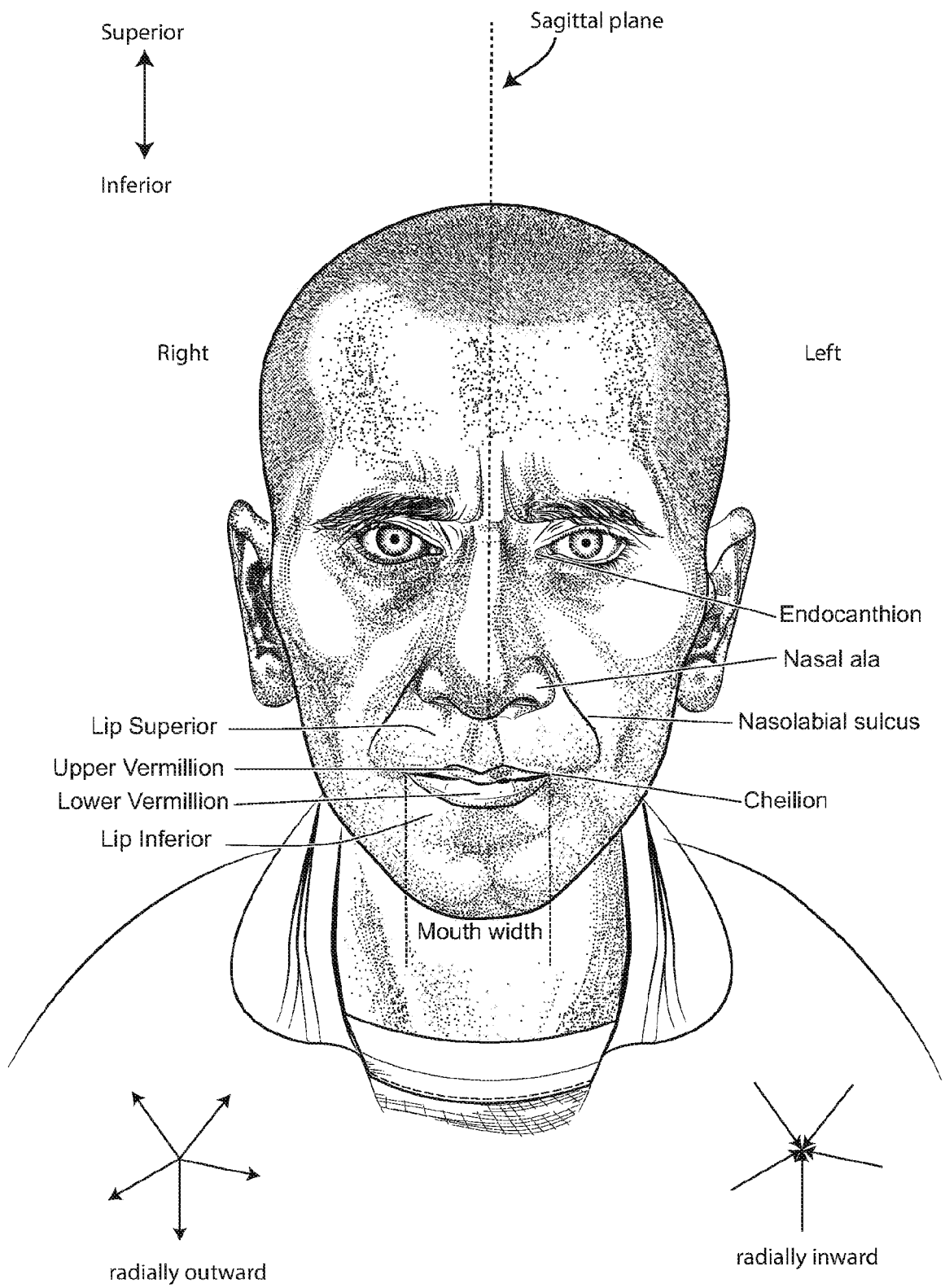
FIG. 2C is a front view of a face with several features of surface anatomy identified including the lip superior, upper vermilion, lower vermilion, lip inferior, mouth width, endocanthion, a nasal ala, nasolabial sulcus and cheilion. Also indicated are the directions superior, inferior, radially inward and radially outward.
Figure 2D:
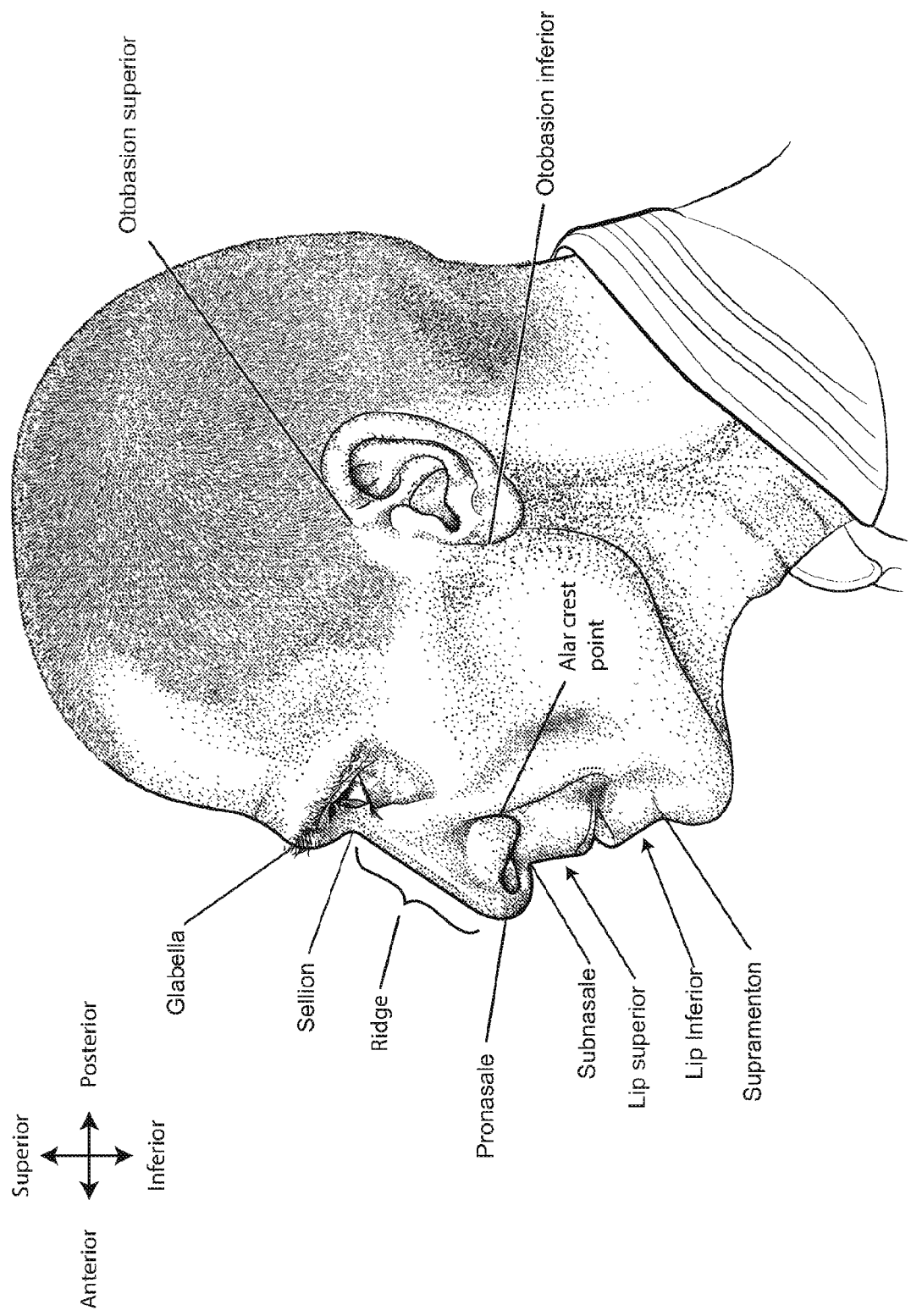
FIG. 2D is a side view of a head with several features of surface anatomy identified including glabella, sellion, pronasale, subnasale, lip superior, lip inferior, supramenton, nasal ridge, alar crest point, otobasion superior and otobasion inferior. Also indicated are the directions superior & inferior, and anterior & posterior.
Figure 2E:
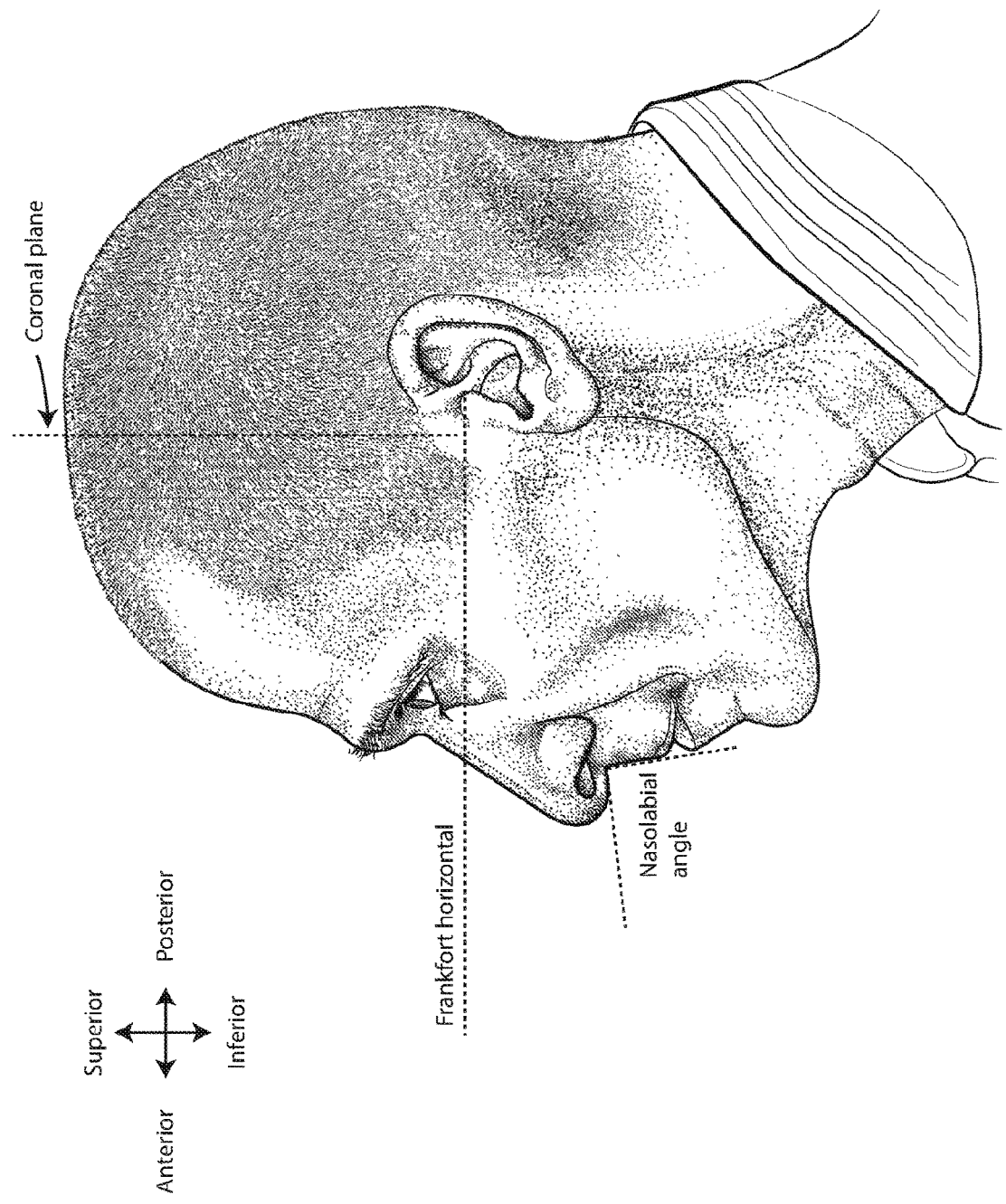

FIG. 2E is a further side view of a head. The approximate locations of the Frankfort horizontal and nasolabial angle are indicated. The coronal plane is also indicated.

Figure 2F:
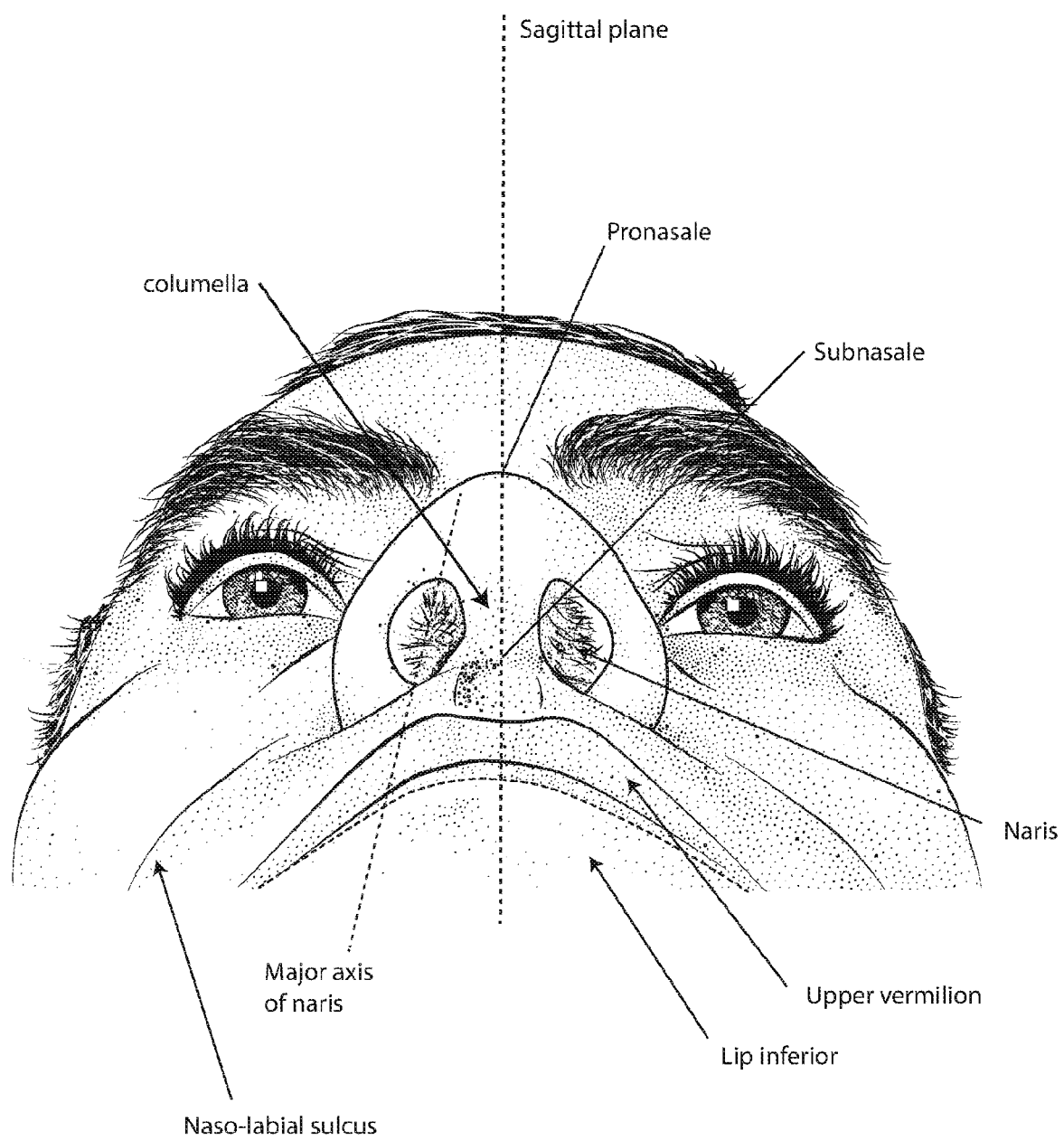

FIG. 2F shows a base view of a nose with several features identified including nasolabial sulcus, lip inferior, upper Vermilion, naris, subnasale, columella, pronasale, the major axis of a naris and the midsagittal plane.

Figure 2I:
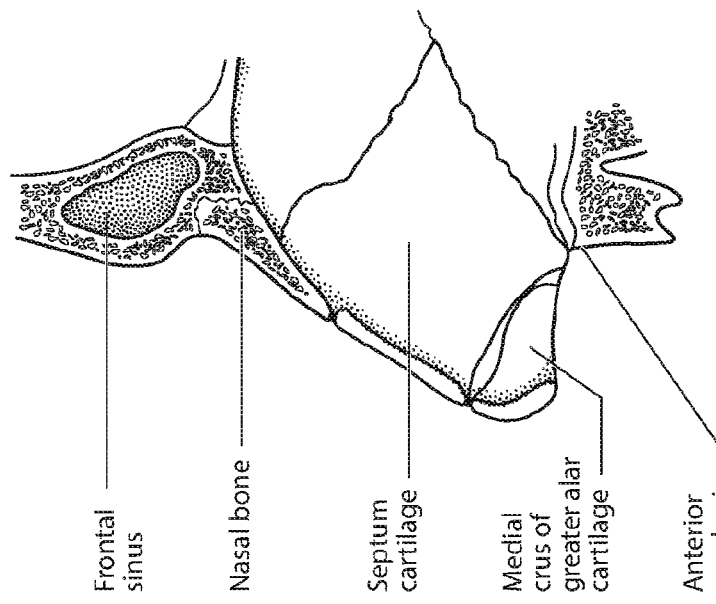
Figure 2H:
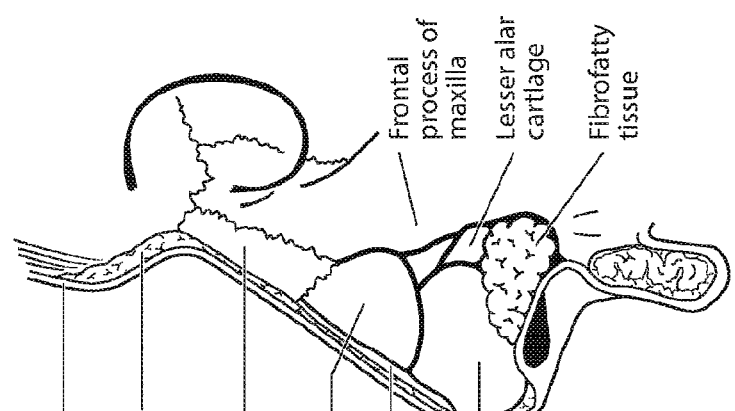
Figure 2G:
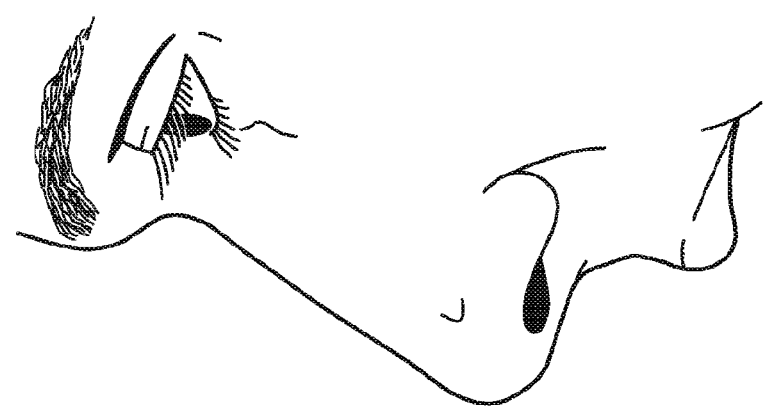

FIG. 2G shows a side view of the superficial features of a nose.

FIG. 2H shows subcutaneal structures of the nose, including lateral cartilage, septum cartilage, greater alar cartilage, lesser alar cartilage, sesamoid cartilage, nasal bone, epidermis, adipose tissue, frontal process of the maxilla and fibrofatty tissue.

FIG. 2I shows a medial dissection of a nose, approximately several millimeters from the midsagittal plane, amongst other things showing the septum cartilage and medial crus of greater alar cartilage.

FIG. 2J shows a front view of the bones of a skull including the frontal, nasal and zygomatic bones. Nasal concha are indicated, as are the maxilla, and mandible.

FIG. 2K shows a lateral view of a skull with the outline of the surface of a head, as well as several muscles. The following bones are shown: frontal, sphenoid, nasal, zygomatic, maxilla, mandible, parietal, temporal and occipital. The mental protuberance is indicated. The following muscles are shown: digastricus, masseter, sternocleidomastoid and trapezius.

Figure 2L:
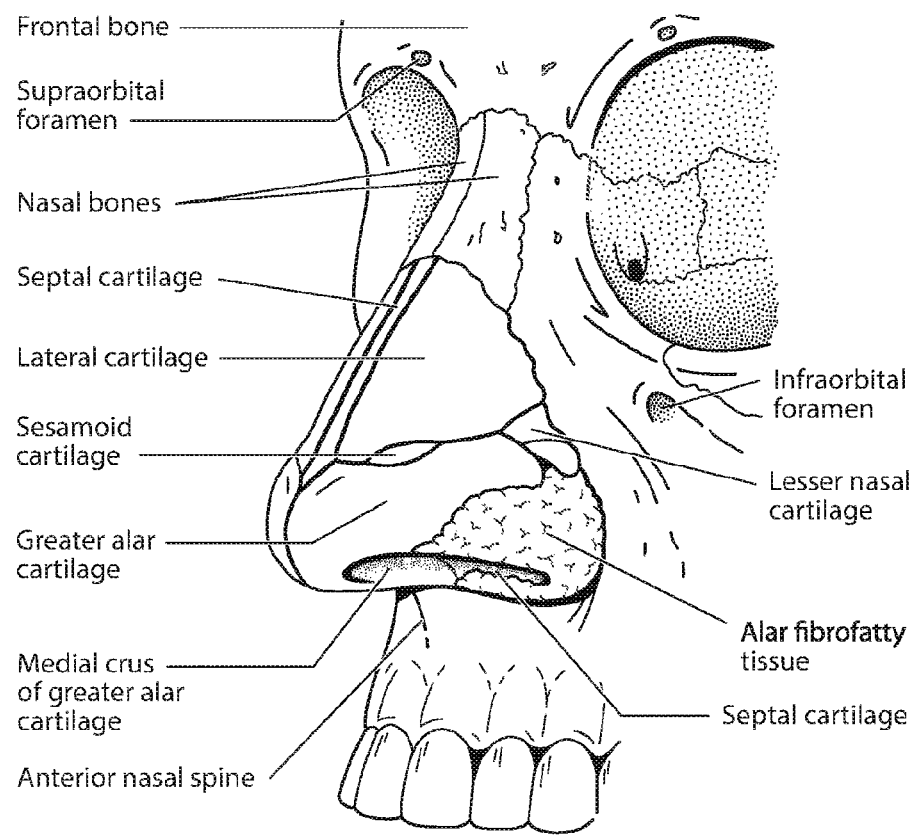

FIG. 2L shows an anterolateral view of a nose.

4.3 Patient Interface

Figure 3A:
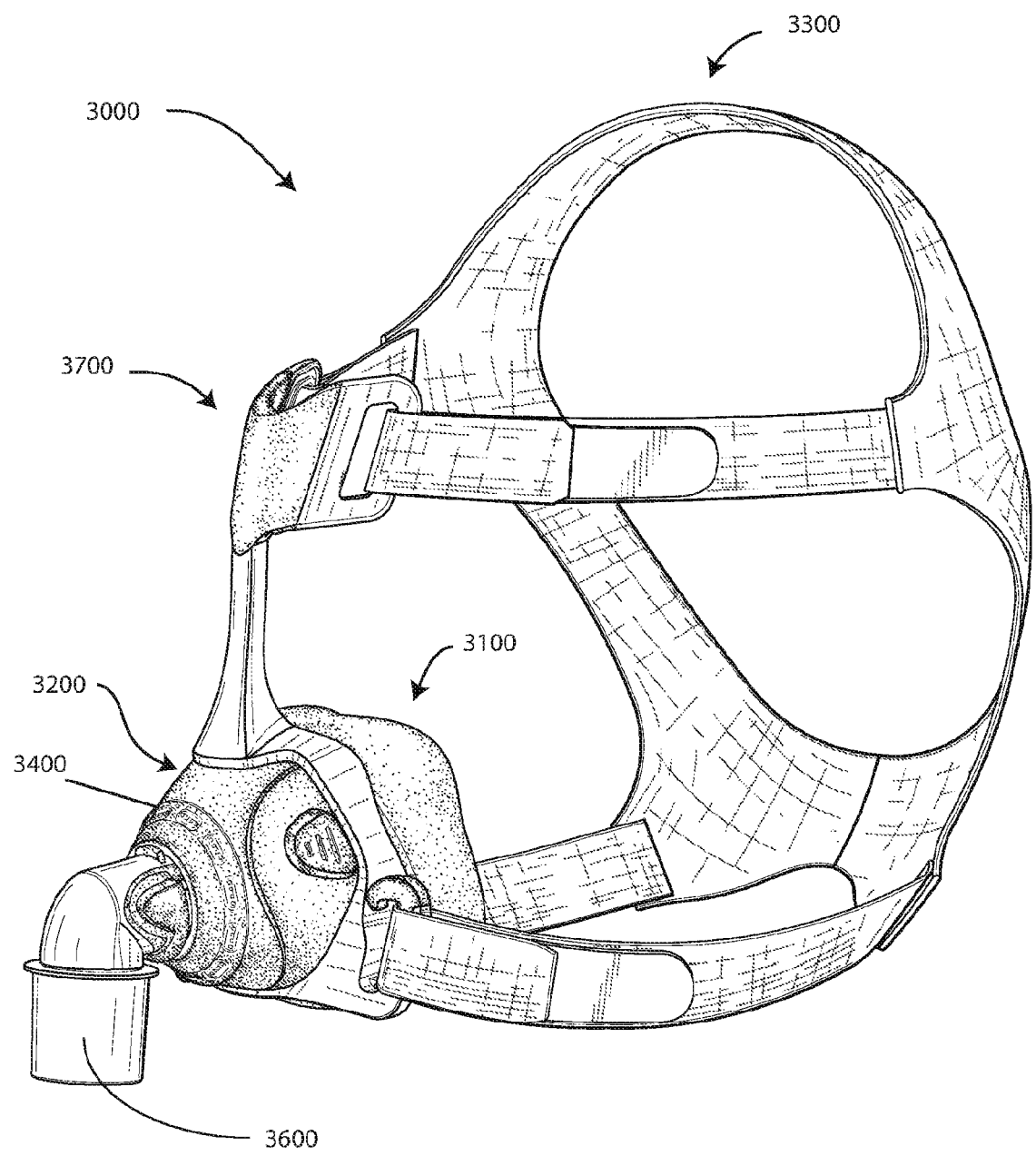

FIG. 3A shows a patient interface in the form of a nasal mask in accordance with one form of the present technology.

FIG. 3B shows a schematic of a cross-section through a structure at a point. An outward normal at the point is indicated. The curvature at the point has a positive sign, and a relatively large magnitude when compared to the magnitude of the curvature shown in FIG. 3C.

FIG. 3C shows a schematic of a cross-section through a structure at a point. An outward normal at the point is indicated. The curvature at the point has a positive sign, and a relatively small magnitude when compared to the magnitude of the curvature shown in FIG. 3B.

FIG. 3D shows a schematic of a cross-section through a structure at a point. An outward normal at the point is indicated. The curvature at the point has a value of zero.

FIG. 3E shows a schematic of a cross-section through a structure at a point. An outward normal at the point is indicated. The curvature at the point has a negative sign, and a relatively small magnitude when compared to the magnitude of the curvature shown in FIG. 3F.

FIG. 3F shows a schematic of a cross-section through a structure at a point. An outward normal at the point is indicated. The curvature at the point has a negative sign, and a relatively large magnitude when compared to the magnitude of the curvature shown in FIG. 3E.

Figure 3H:
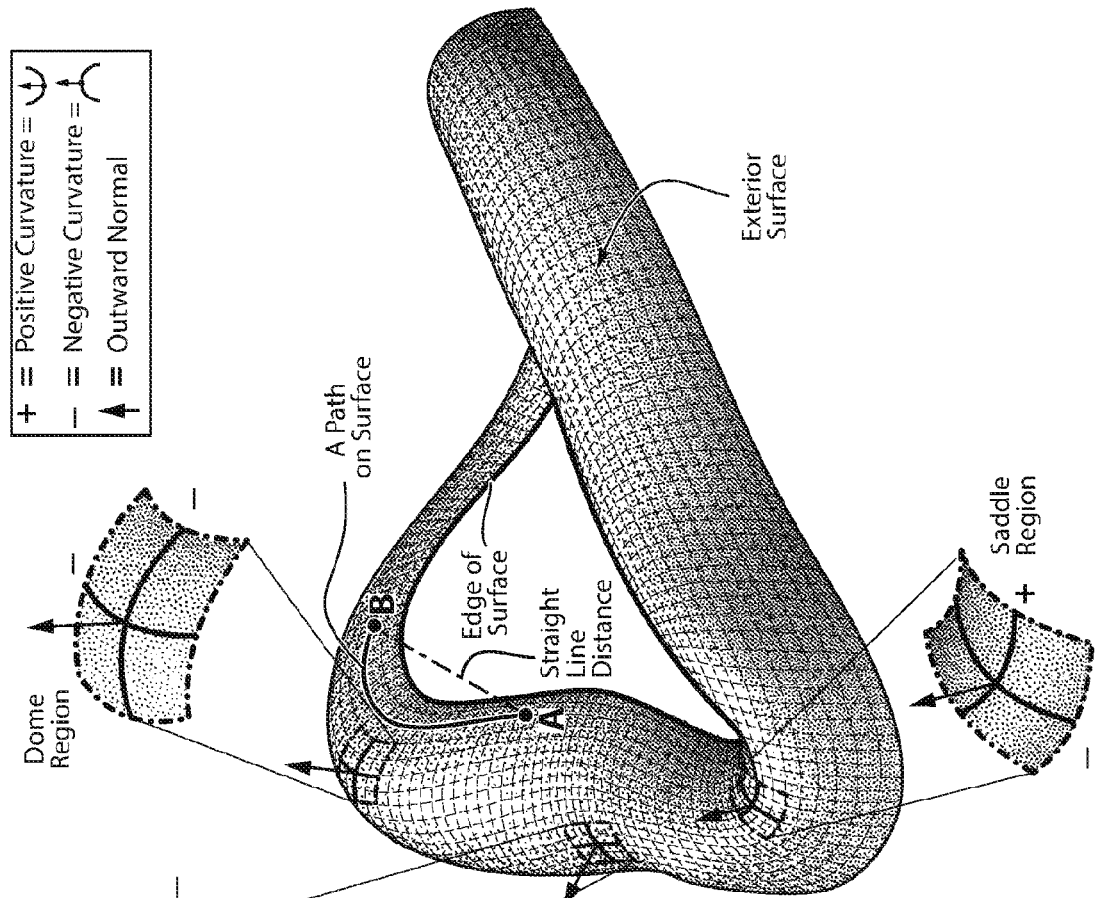
Figure 3G:
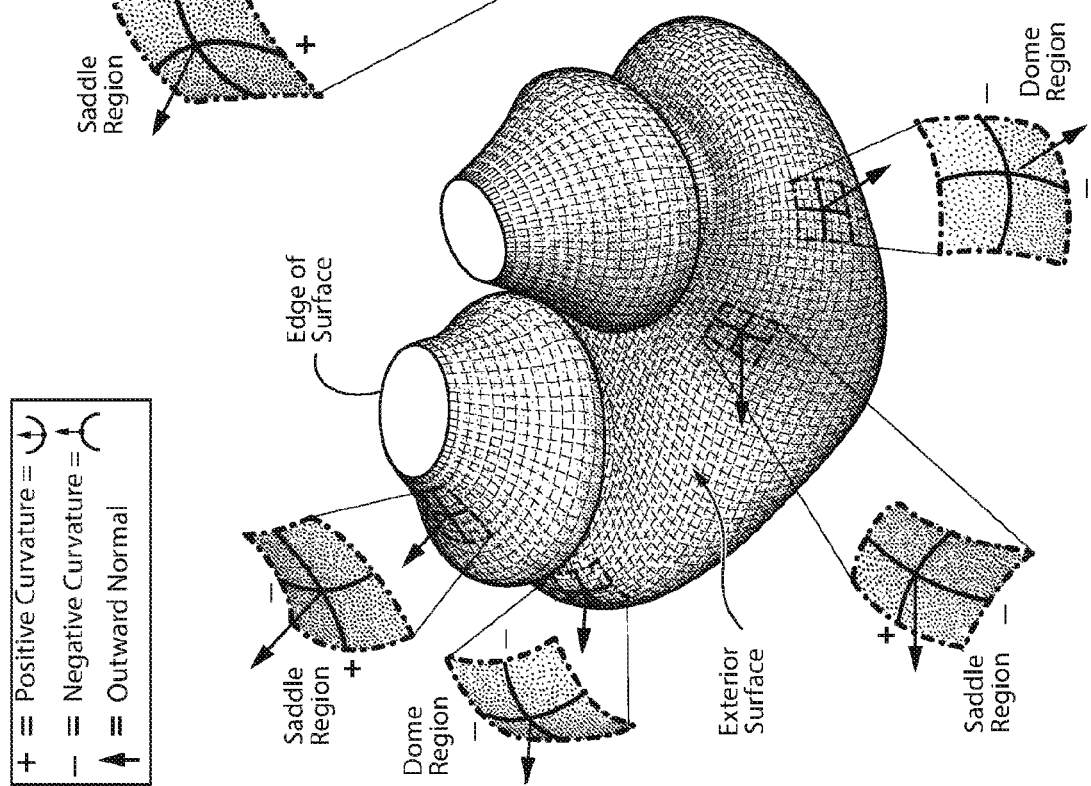

FIG. 3G shows a cushion for a mask that includes two pillows. An exterior surface of the cushion is indicated. An edge of the surface is indicated. Dome and saddle regions are indicated.

FIG. 3H shows a cushion for a mask. An exterior surface of the cushion is indicated. An edge of the surface is indicated. A path on the surface between points A and B is indicated. A straight line distance between A and B is indicated. Two saddle regions and a dome region are indicated.

Figure 3I:
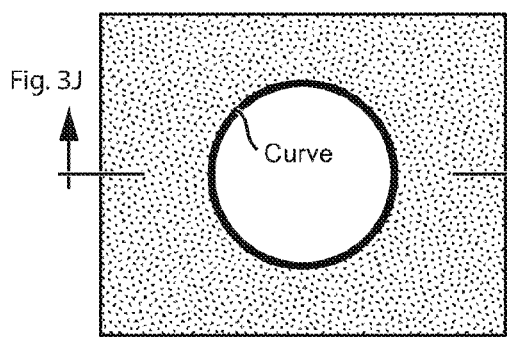

FIG. 3I shows the surface of a structure, with a one dimensional hole in the surface. The illustrated plane curve forms the boundary of a one dimensional hole.

Figure 3K:
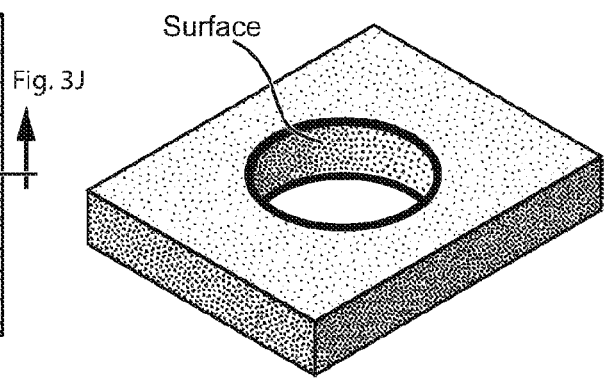
Figure 3J:
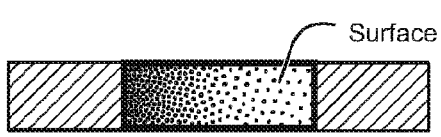

FIG. 3J shows a cross-section through the structure of FIG. 3I. The illustrated surface bounds a two dimensional hole in the structure of FIG. 3I.

FIG. 3K shows a perspective view of the structure of FIG. 3I, including the two dimensional hole and the one dimensional hole. Also shown is the surface that bounds a two dimensional hole in the structure of FIG. 3I.

Figure 3L:
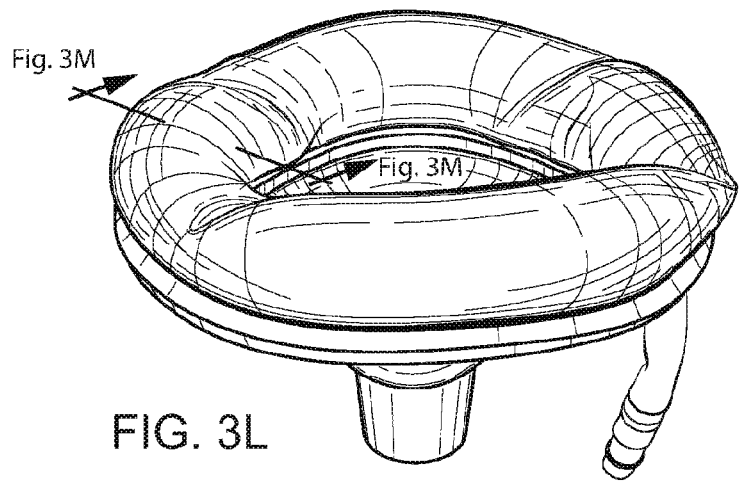

FIG. 3L shows a mask having an inflatable bladder as a cushion.

Figures 3M, 3N:
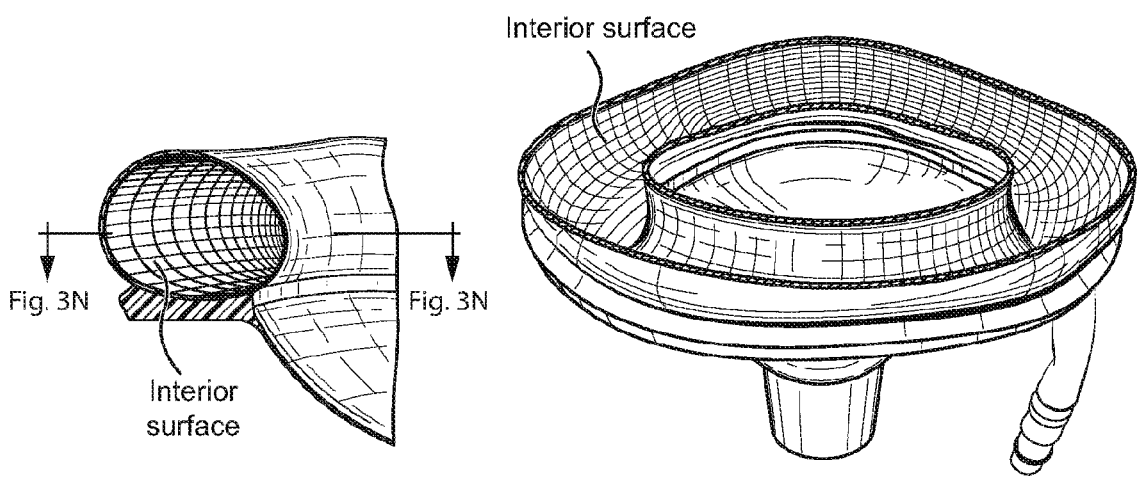

FIG. 3M shows a cross-section through the mask of FIG. 3L, and shows the interior surface of the bladder. The interior surface bounds the two dimensional hole in the mask.

FIG. 3N shows a further cross-section through the mask of FIG. 3L. The interior surface is also indicated.

FIG. 3O illustrates a left-hand rule.

FIG. 3P illustrates a right-hand rule.

FIG. 3Q shows a left ear, including the left ear helix.

FIG. 3R shows a right ear, including the right ear helix.

FIG. 3S shows a right-hand helix.

FIG. 3T shows a view of a mask, including the sign of the torsion of the space curve defined by the edge of the sealing membrane in different regions of the mask.

Figure 3U:
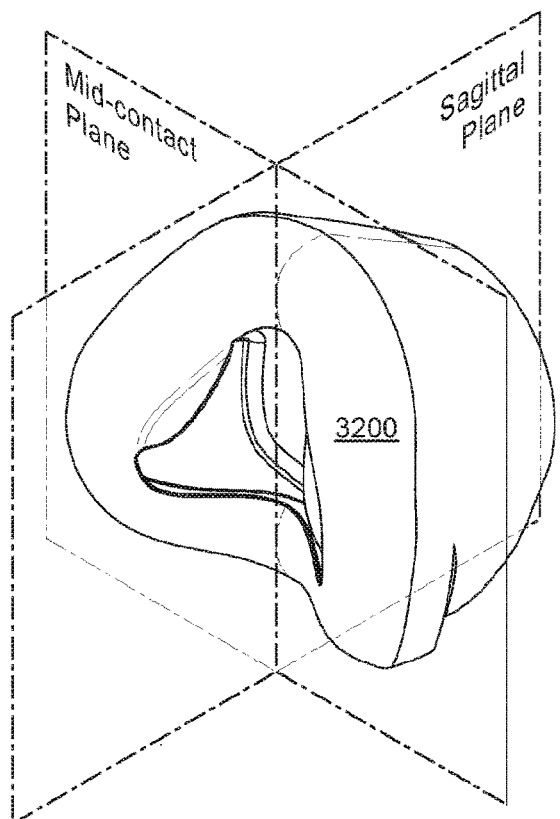

FIG. 3U shows a view of a plenum chamber 3200 showing a sagittal plane and a mid-contact plane.

Figure 3V:
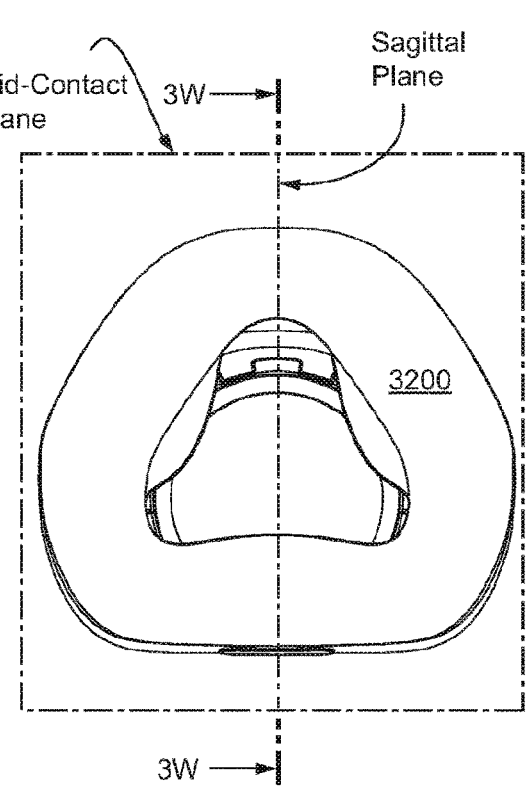

FIG. 3V shows a view of a posterior of the plenum chamber of FIG. 3U. The direction of the view is normal to the mid-contact plane. The sagittal plane in FIG. 3V bisects the plenum chamber into left-hand and right-hand sides.

Figure 3W:
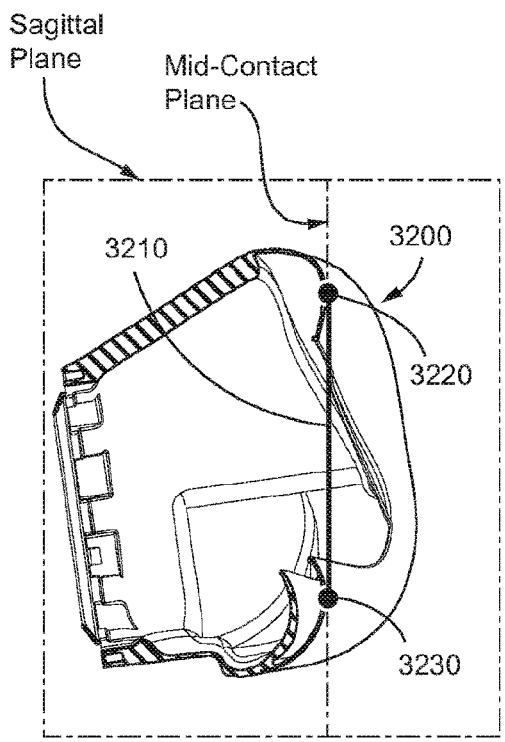

FIG. 3W shows a cross-section through the plenum chamber of FIG. 3V, the cross-section being taken at the sagittal plane shown in FIG. 3V. A 'mid-contact' plane is shown. The mid-contact plane is perpendicular to the sagittal plane. The orientation of the mid-contact plane corresponds to the orientation of a chord 3210 which lies on the sagittal plane and just touches the cushion of the plenum chamber at two points on the sagittal plane: a superior point 3220 and an inferior point 3230. Depending on the geometry of the cushion in this region, the mid-contact plane may be a tangent at both the superior and inferior points.

Figure 3X:
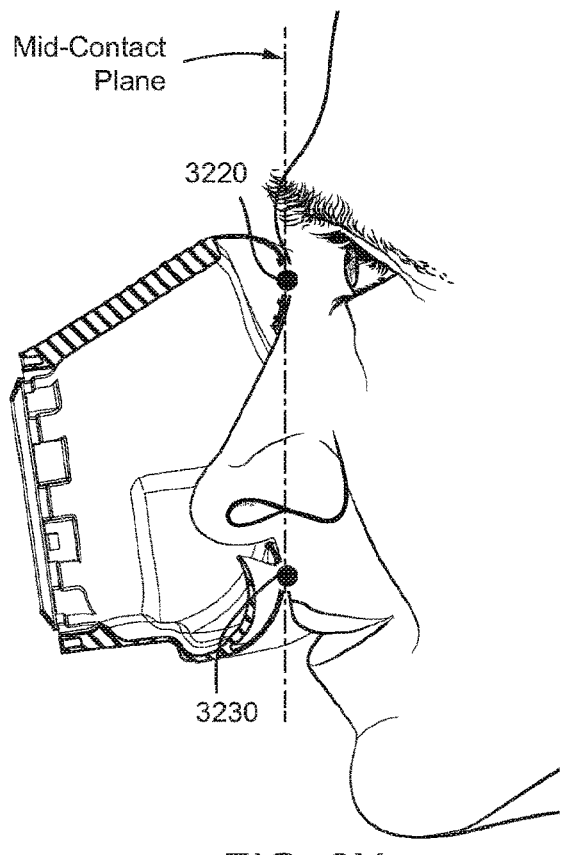

FIG. 3X shows the plenum chamber 3200 of FIG. 3U in position for use on a face. The sagittal plane of the plenum chamber 3200 generally coincides with the midsagittal plane of the face when the plenum chamber is in position for use. The mid-contact plane corresponds generally to the 'plane of the face' when the plenum chamber is in position for use. In FIG. 3X the plenum chamber 3200 is that of a nasal mask, and the superior point 3220 sits approximately on the sellion, while the inferior point 3230 sits on the lip superior.

4.4 RPT Device

Figure 4A:
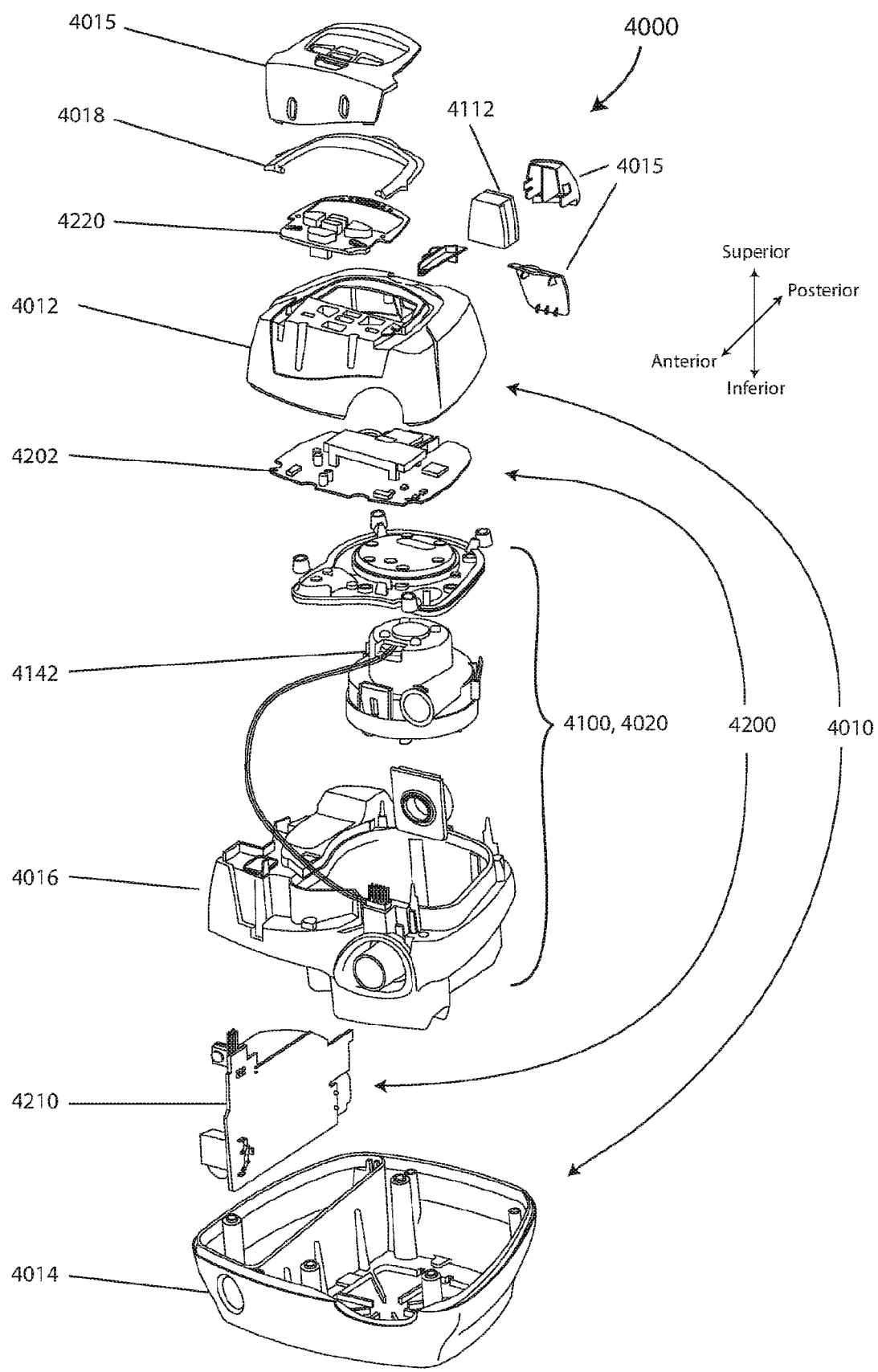

FIG. 4A shows an RPT device in accordance with one form of the present technology.

Figure 4B:
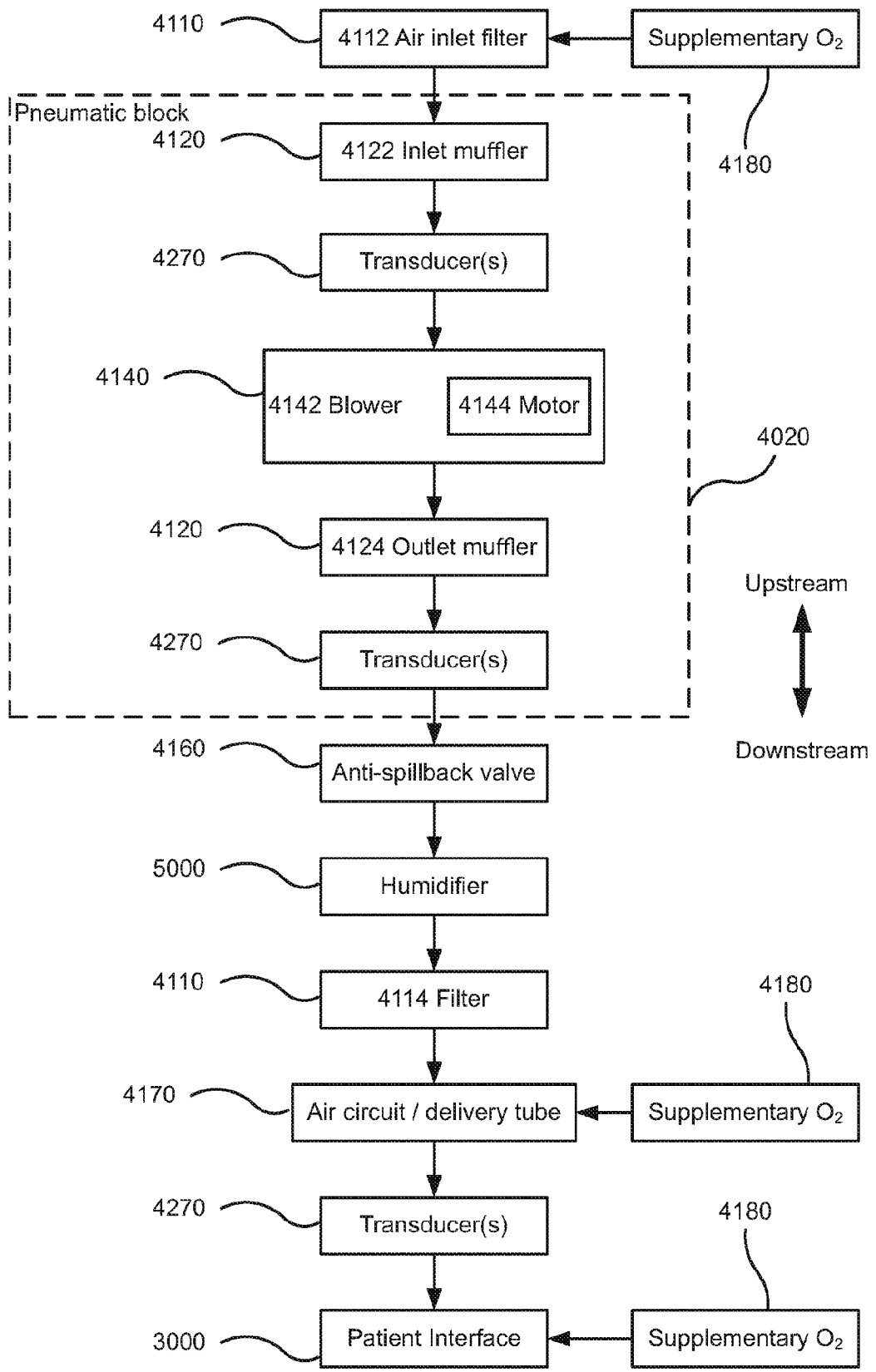

FIG. 4B is a schematic diagram of the pneumatic path of an RPT device in accordance with one form of the present technology. The directions of upstream and downstream are indicated with reference to the blower and the patient interface. The blower is defined to be upstream of the patient interface and the patient interface is defined to be downstream of the blower, regardless of the actual flow direction at any particular moment. Items which are located within the pneumatic path between the blower and the patient interface are downstream of the blower and upstream of the patient interface.

4.5 Humidifier

Figure 5A:
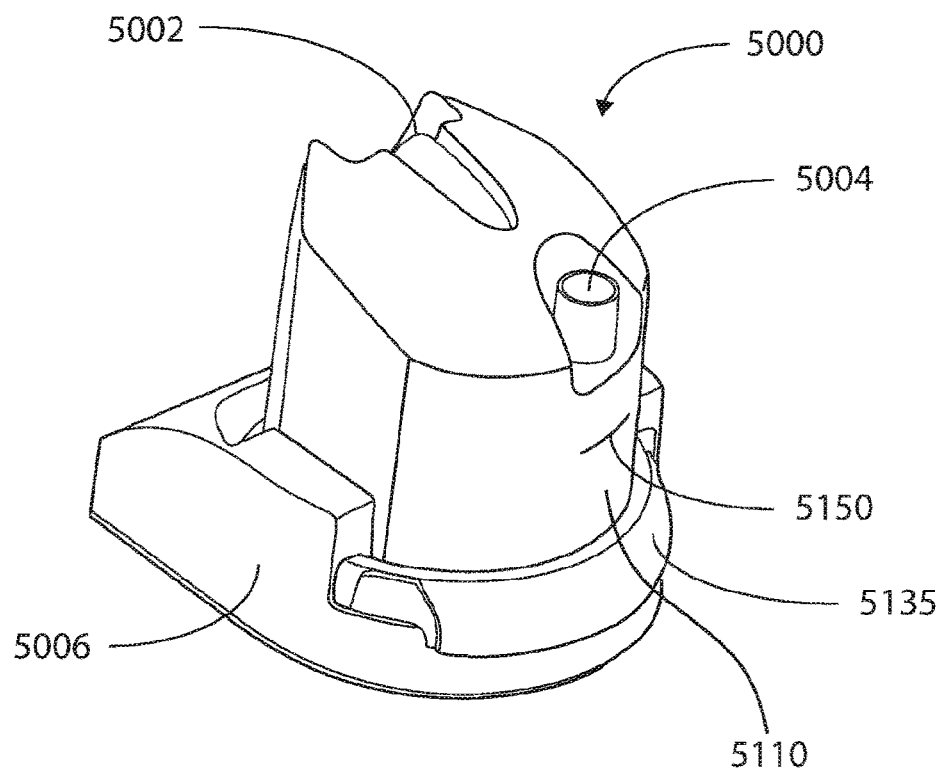

FIG. 5A shows an isometric view of a humidifier in accordance with one form of the present technology.

Figure 5B:
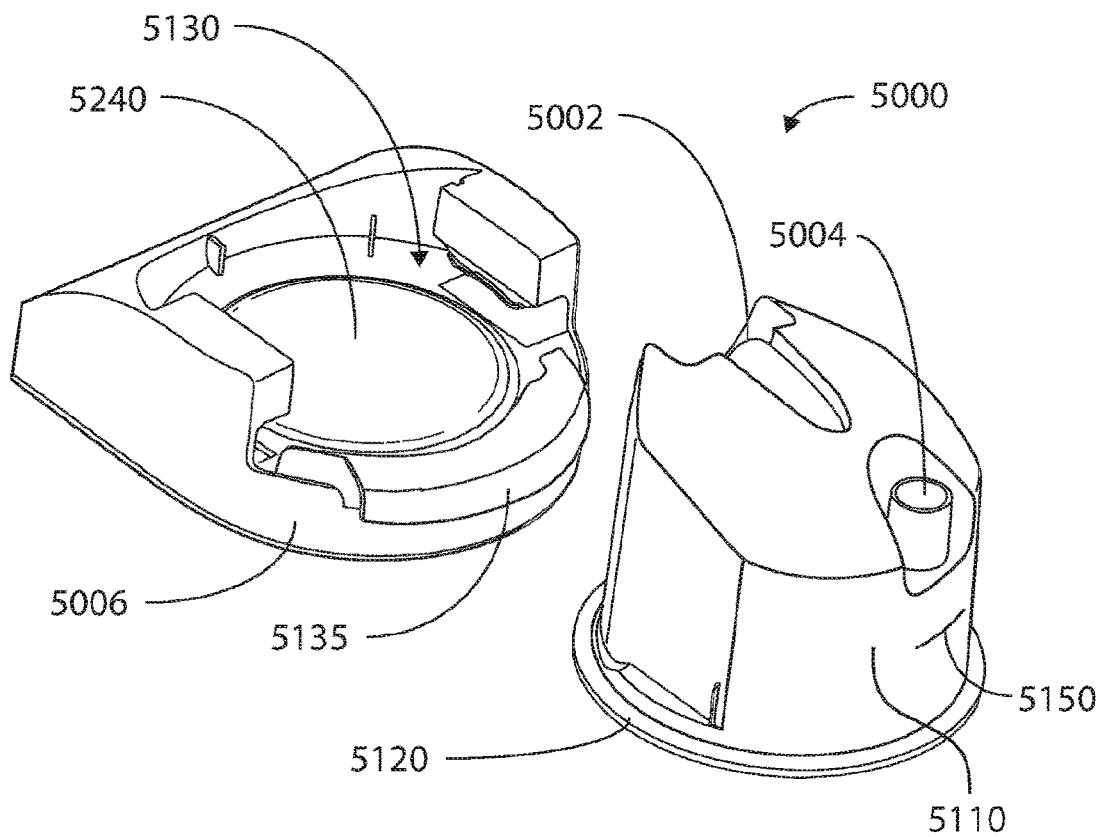

FIG. 5B shows an isometric view of a humidifier in accordance with one form of the present technology, showing a humidifier reservoir 5110 removed from the humidifier reservoir dock 5130.

4.6 Breathing Waveforms

Figure 6A:
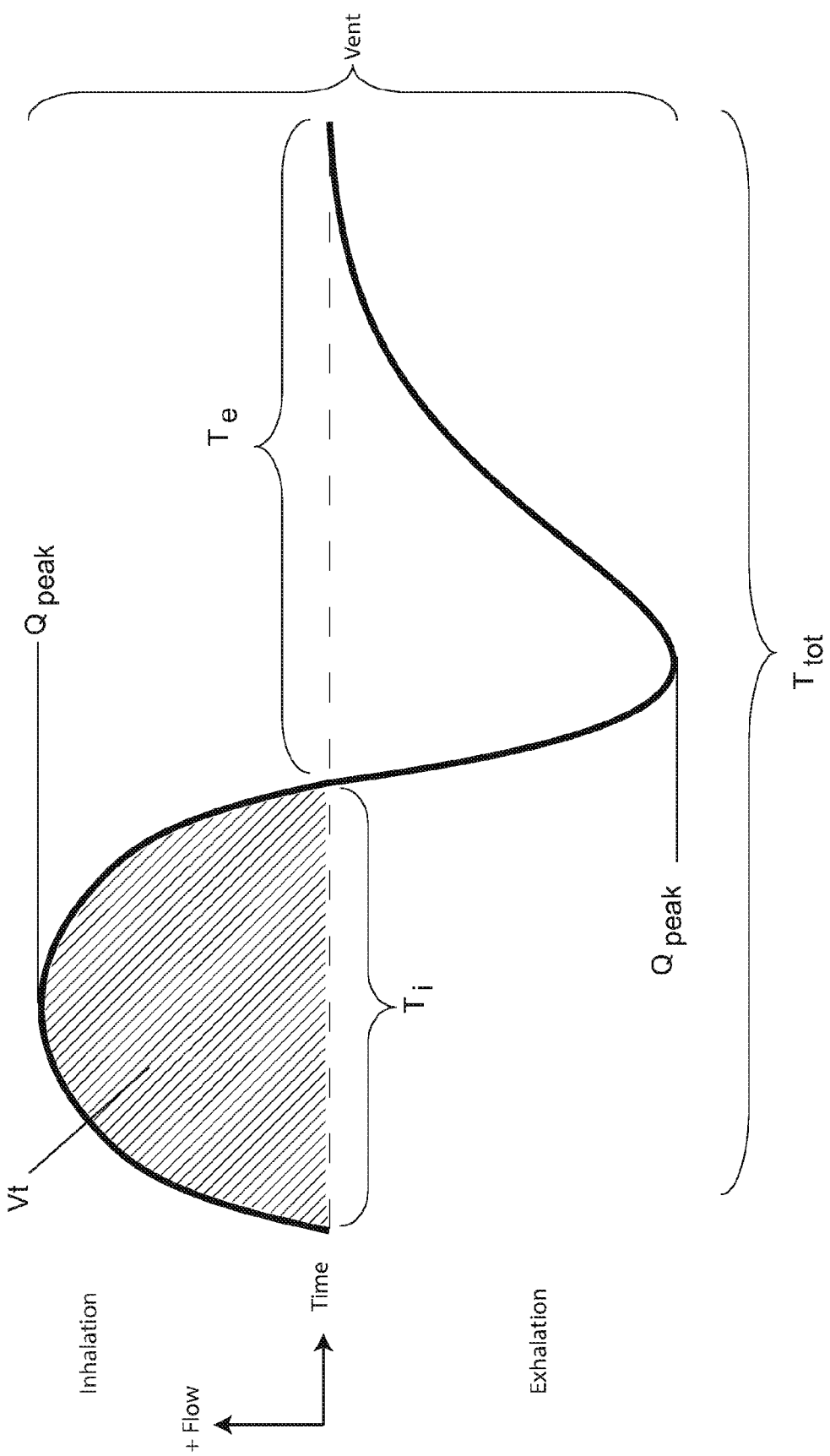

FIG. 6A shows a model typical breath waveform of a person while sleeping.

4.7 Examples of the Present Technology

Figure 7A:
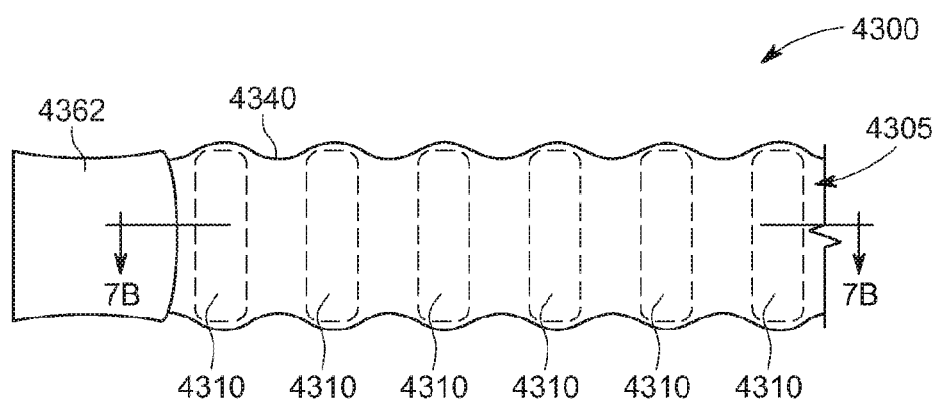

FIG. 7A shows a side view of a portion of an air delivery conduit 4300 according to an example of the present technology.

Figure 7B:
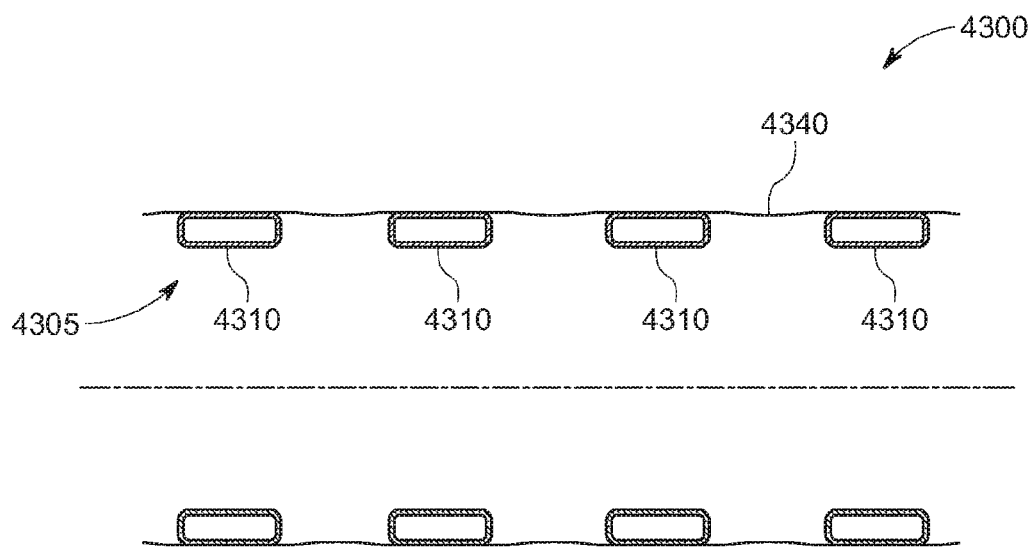

FIG. 7B shows a cross section view of the air delivery conduit 4300 shown in FIG. 7A.

Figure 7C:
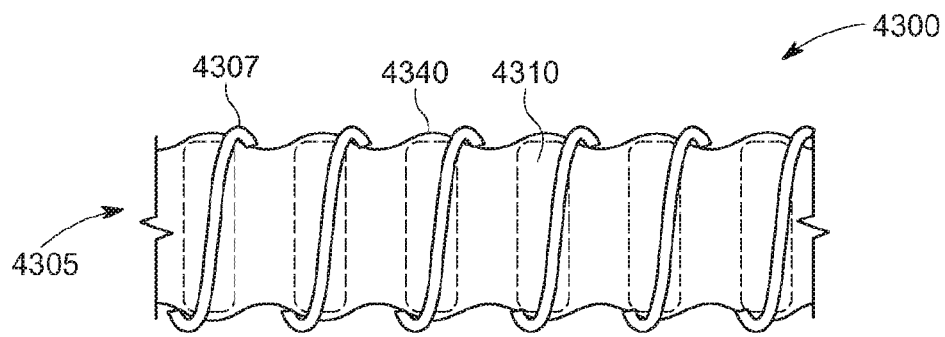

FIG. 7C shows a side view of an air delivery conduit 4300 according to another example of the present technology.

Figure 8:
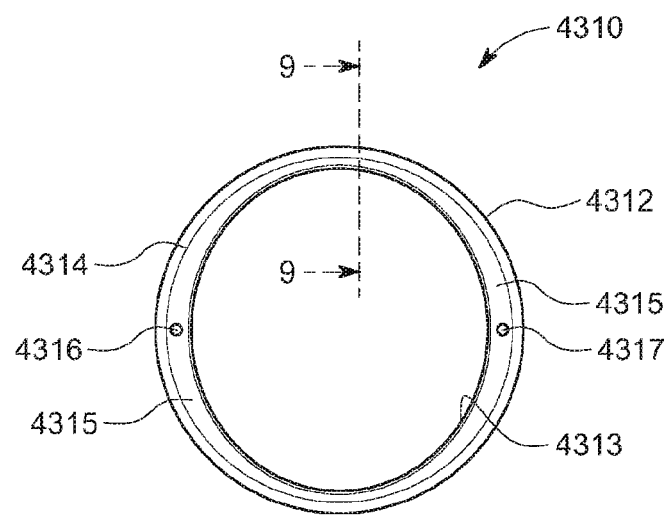

FIG. 8 shows a support structure 4310 according to an example of the present technology.

Figure 9:
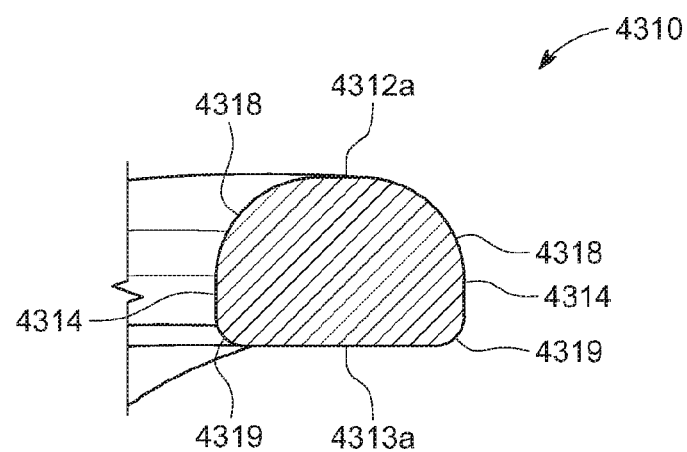

FIG. 9 shows a cross section view of the support structure 4310 of FIG. 8.

Figure 10:
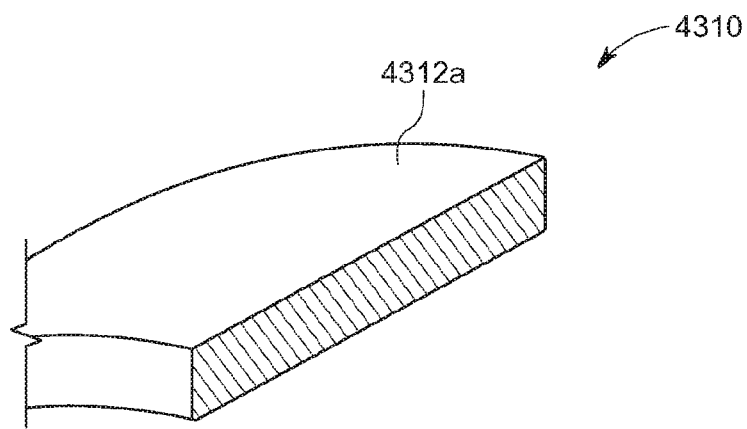

FIG. 10 shows a cross section view of a support structure 4310 according to another example of the present technology.

Figure 11:
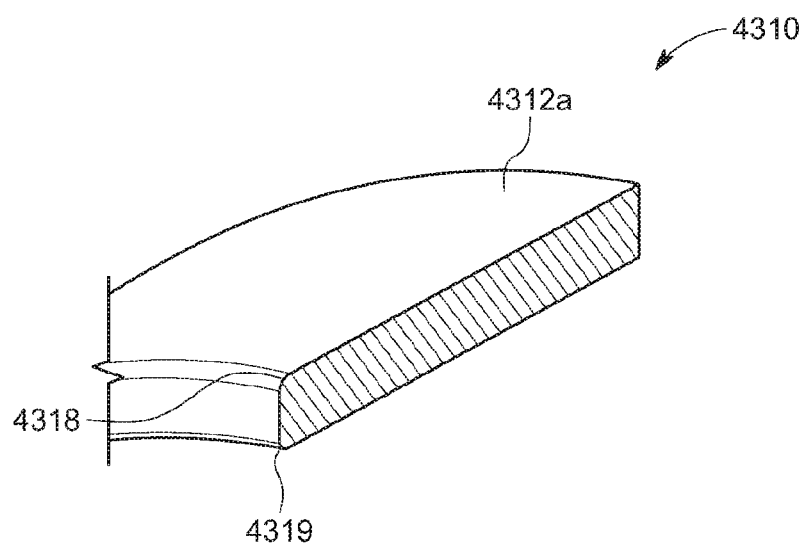

FIG. 11 shows a cross section view of a support structure 4310 according to another example of the present technology.

Figure 12A:
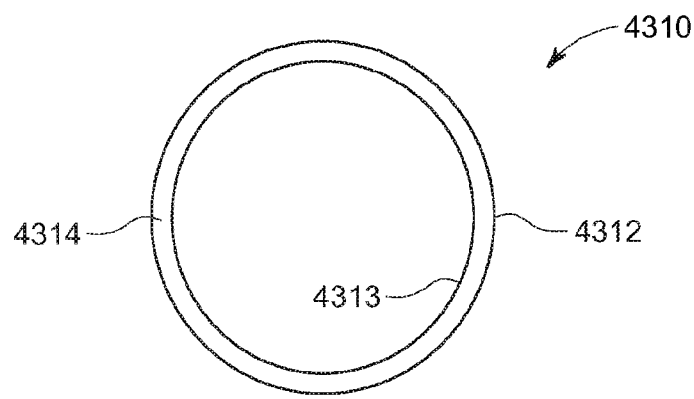

FIG. 12A shows a support structure 4310 according to another example of the present technology.

Figure 12B:
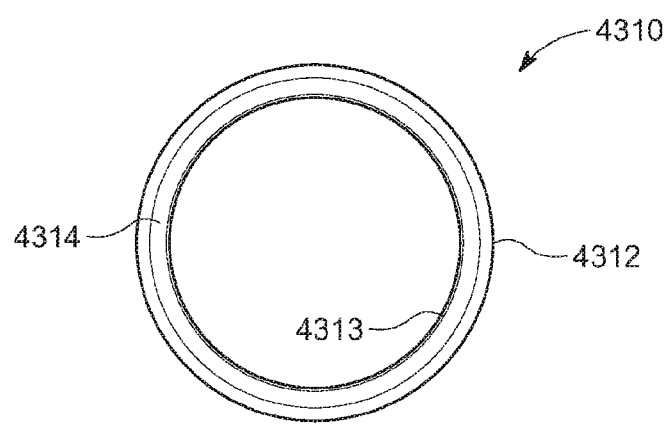

FIG. 12B shows a support structure 4310 according to another example of the present technology.

Figure 12C:
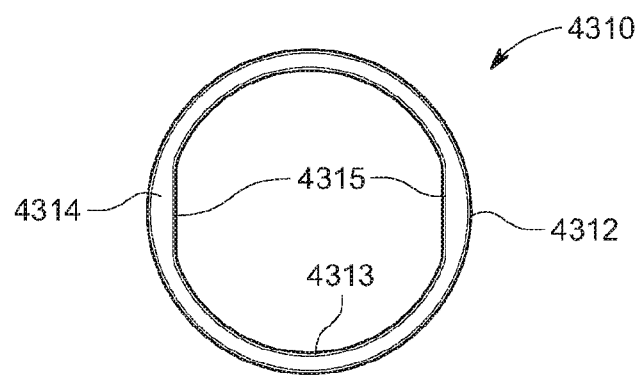

FIG. 12C shows a support structure 4310 according to another example of the present technology.

Figure 12D:
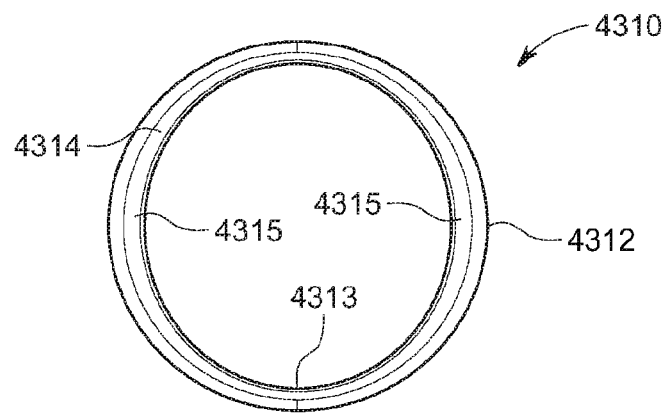

FIG. 12D shows a support structure 4310 according to another example of the present technology.

Figure 12E:
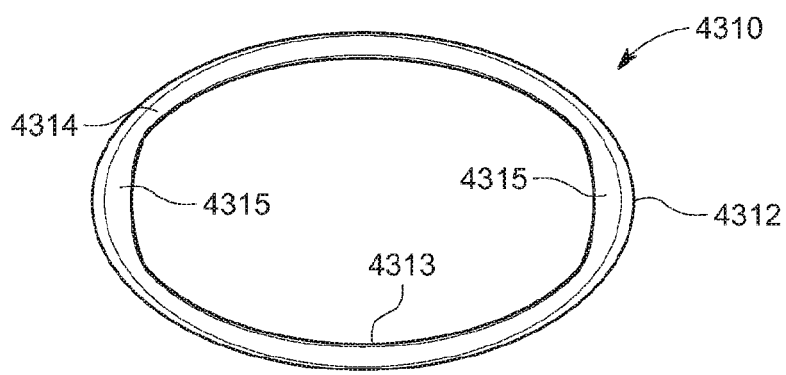

FIG. 12E shows a support structure 4310 according to another example of the present technology.

Figure 12F:
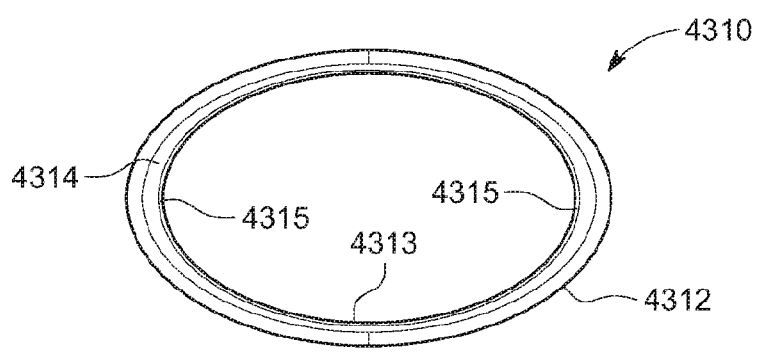

FIG. 12F shows a support structure 4310 according to another example of the present technology.

Figure 12G:
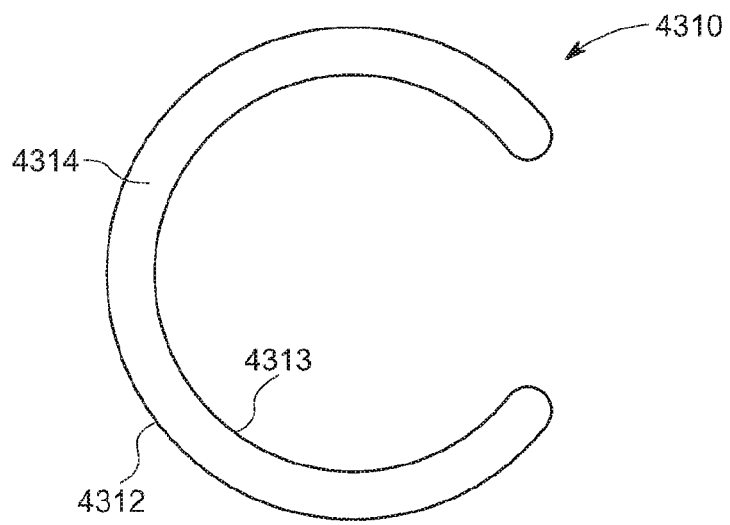

FIG. 12G shows a support structure 4310 according to another example of the present technology.

Figure 12H:
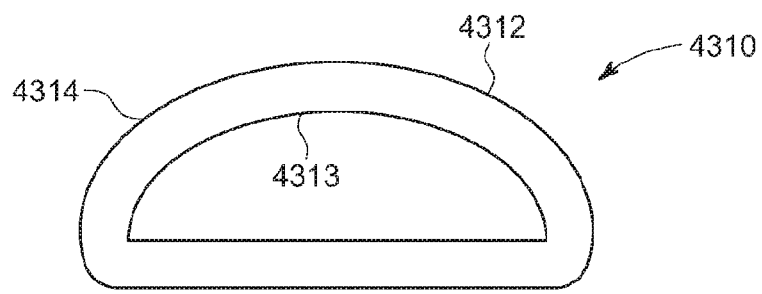

FIG. 12H shows a support structure 4310 according to another example of the present technology.

Figure 12I:
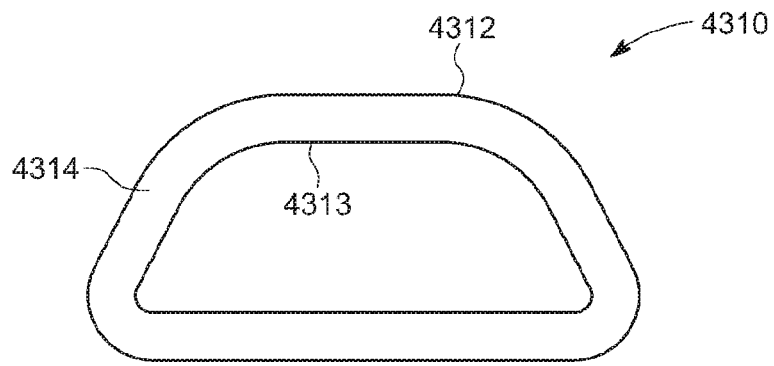

FIG. 12I shows a support structure 4310 according to another example of the present technology.

Figure 13:
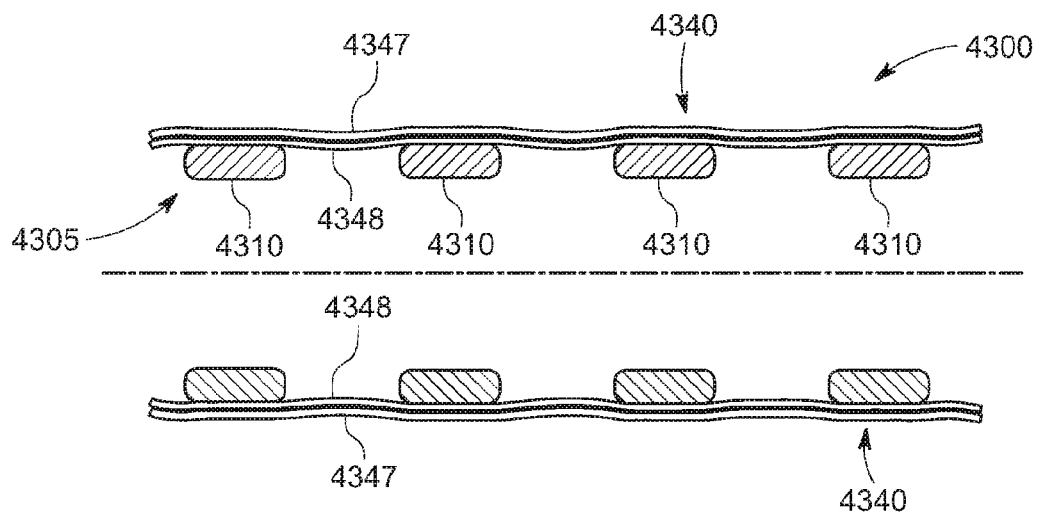

FIG. 13 shows a cross section view of an air delivery conduit 4300 according to another example of the present technology.

Figure 14:
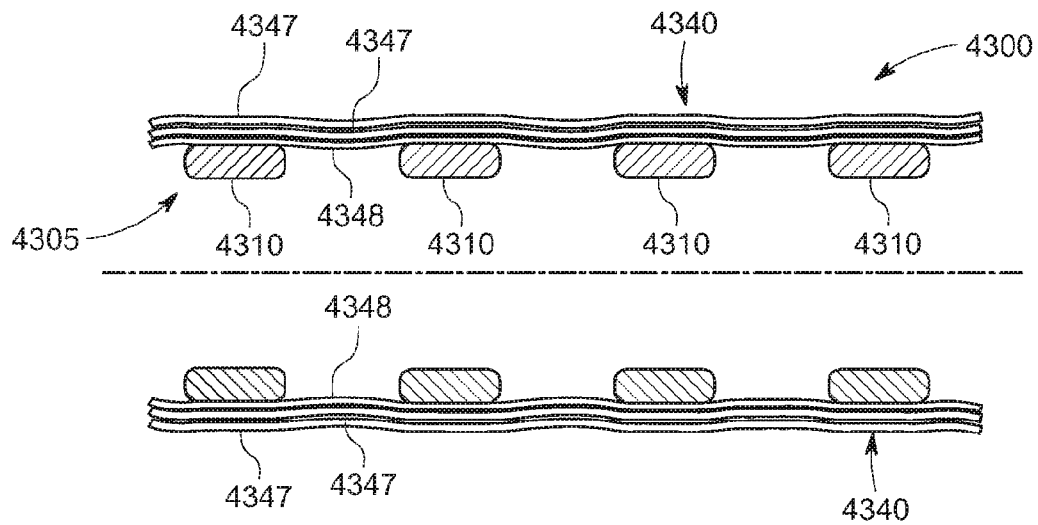

FIG. 14 shows a cross section view of an air delivery conduit 4300 according to another example of the present technology.

Figure 15:
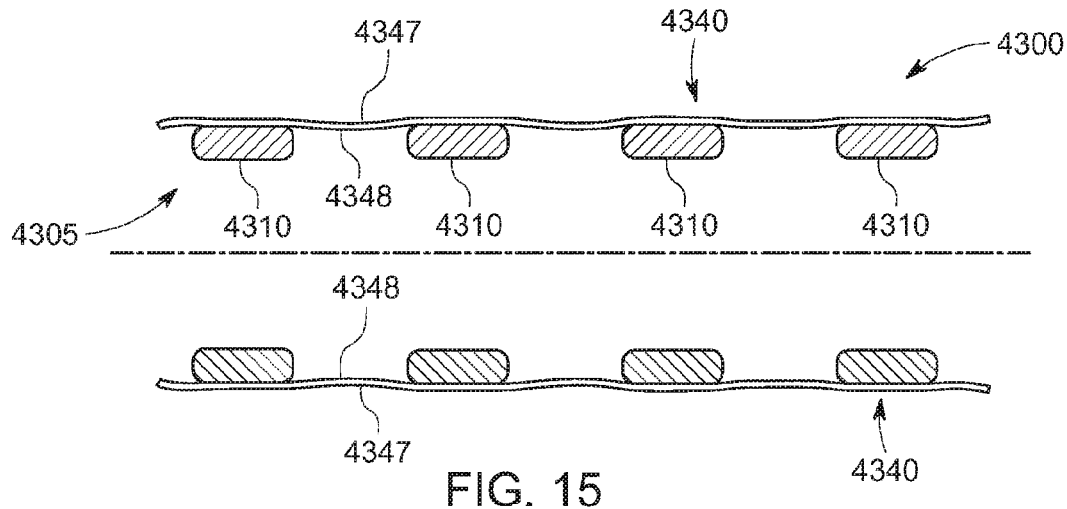

FIG. 15 shows a cross section view of an air delivery conduit 4300 according to another example of the present technology.

Figure 16A:
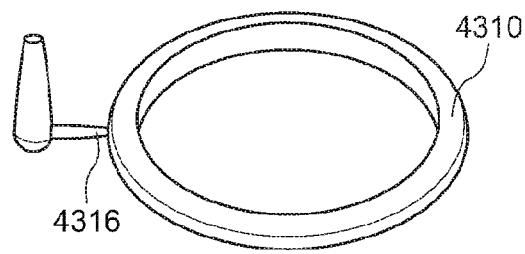

FIG. 16A shows a ring member 4310 according to another example of the present technology.

Figure 16B:
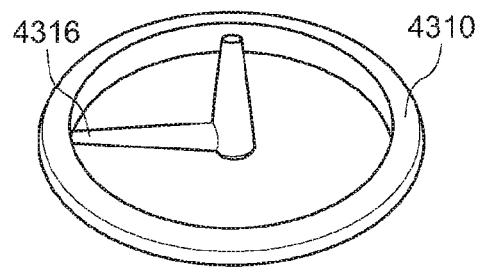

FIG. 16B shows a ring member 4310 according to another example of the present technology.

Figure 17:
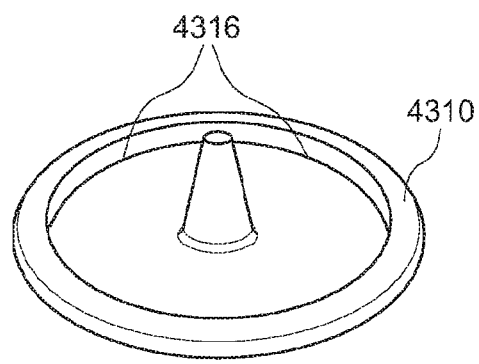

FIG. 17 shows a ring member 4310 according to another example of the present technology.

Figure 18:
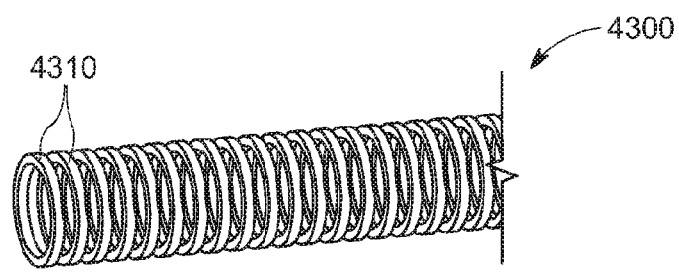

FIG. 18 shows a plurality of support structures 4310 in an array, according to another example of the present technology.

Figure 19:
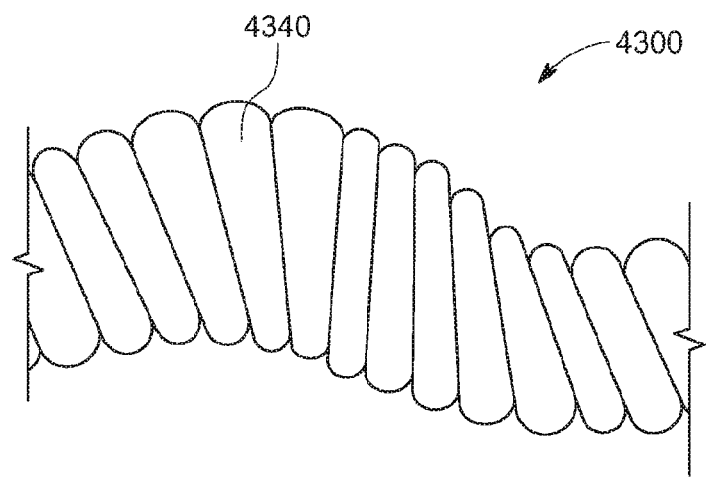

FIG. 19 shows a portion of an air delivery conduit 4300 according to another example of the present technology, comprising the support structures 4310 of FIG. 18.

Figure 20:
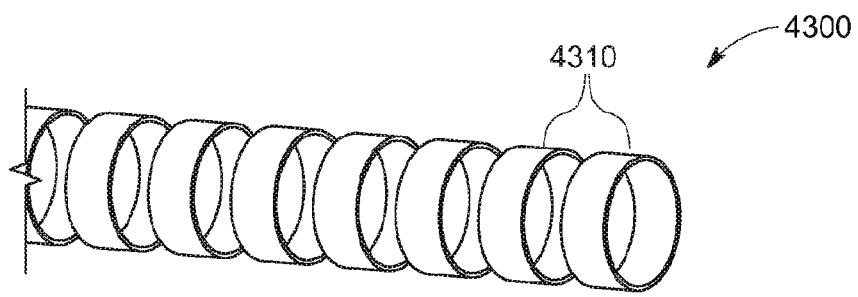

FIG. 20 shows a plurality of support structures 4310 in an array, according to another example of the present technology.

Figure 21:
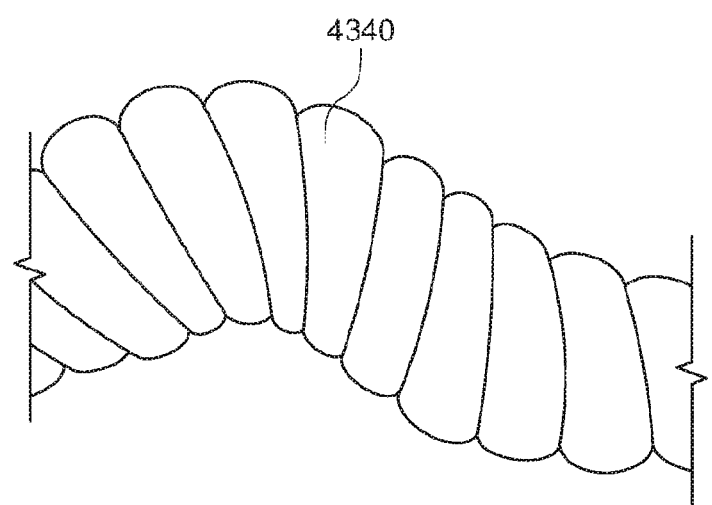

FIG. 21 shows a portion of an air delivery conduit 4300 according to another example of the present technology, comprising the support structures 4310 of FIG. 20.

Figure 22:
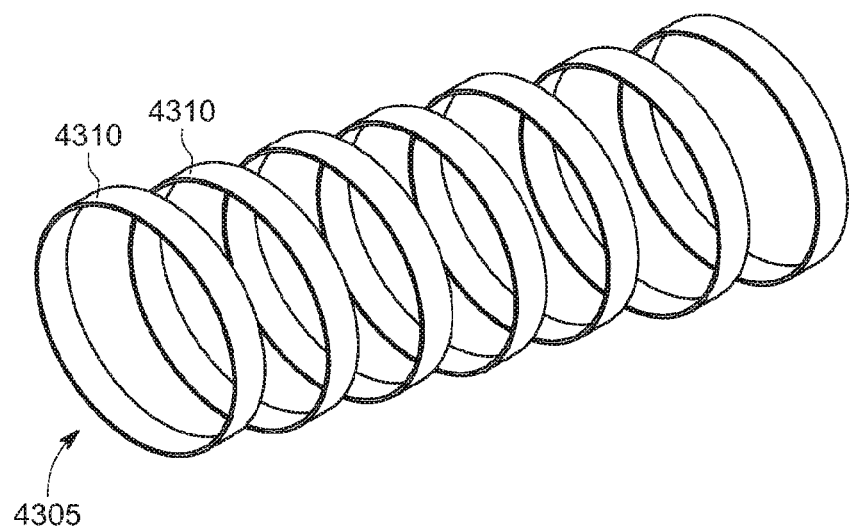

FIG. 22 shows a reinforcing structure 4305 according to another example of the present technology, the reinforcing structure 4305 comprising support structures 4310.

Figure 23:
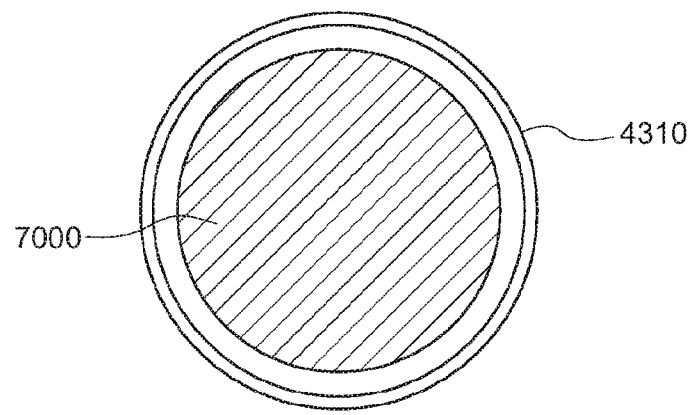

FIG. 23 shows a schematic view of the support structures 4310 of FIG. 22 around a mandrel 7000.

Figure 24:
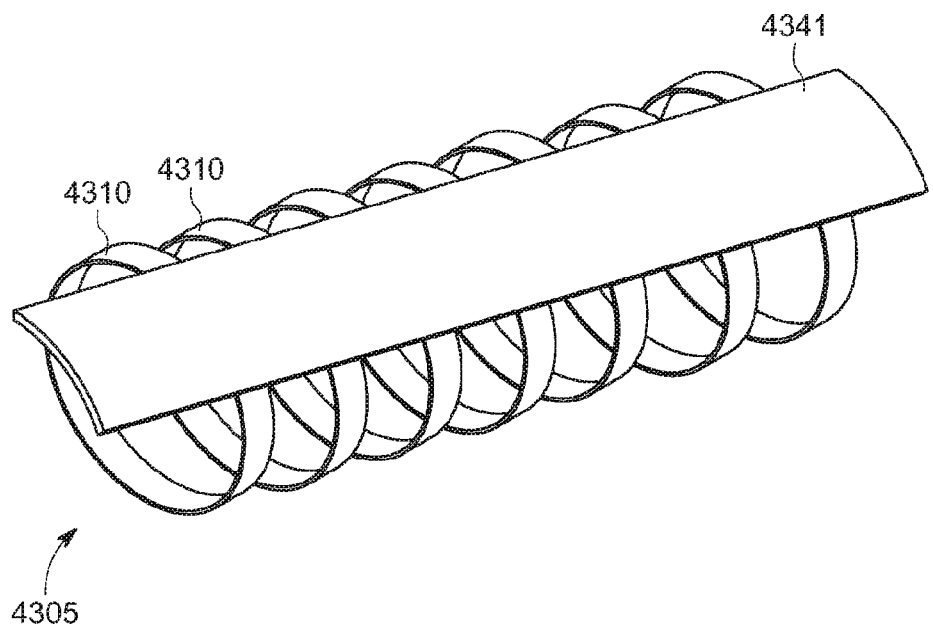

FIG. 24 shows the reinforcing structure 4305 of FIG. 22 together with a sealing layer 4341.

Figure 25:
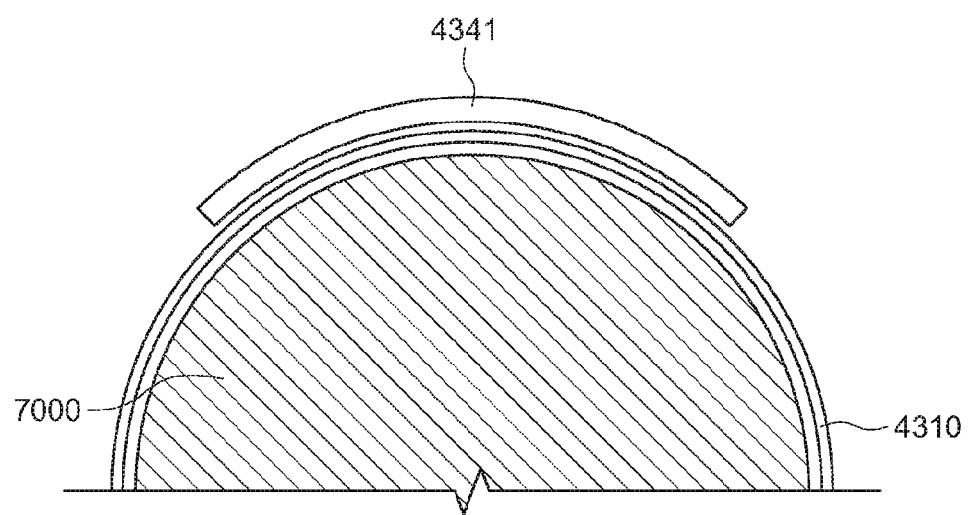

FIG. 25 shows a schematic view of the assembly shown in FIG. 24.

Figure 26:
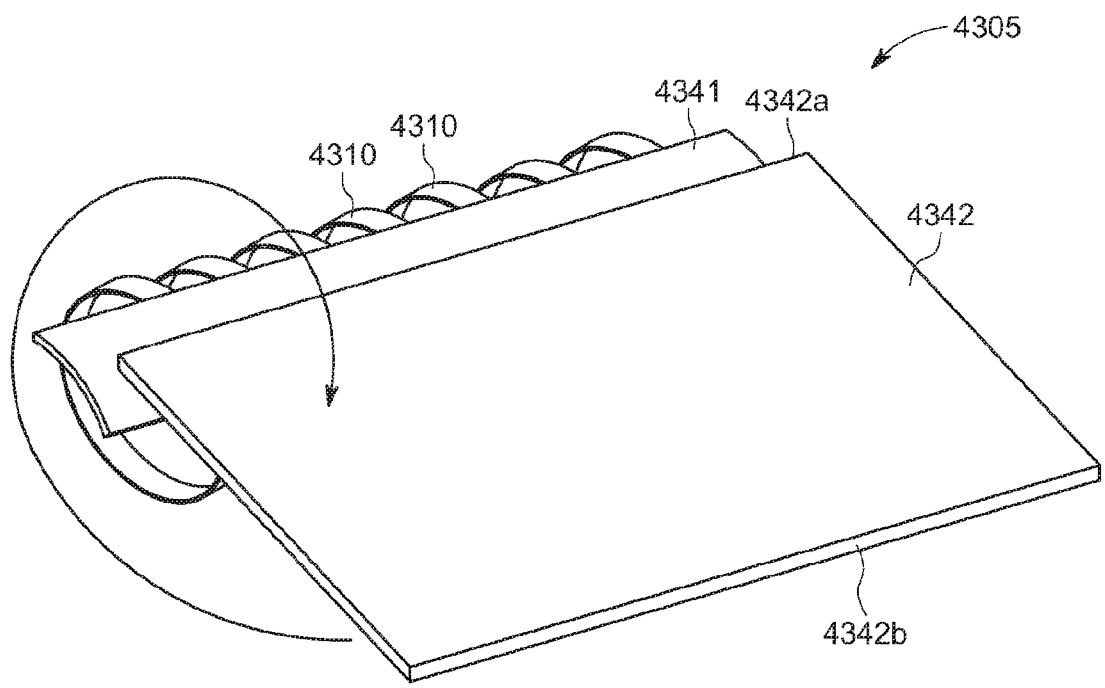

FIG. 26 shows the reinforcing structure 4305 and sealing layer 4351 of FIG. 24 together with an outer sheet 4342.

Figure 27:
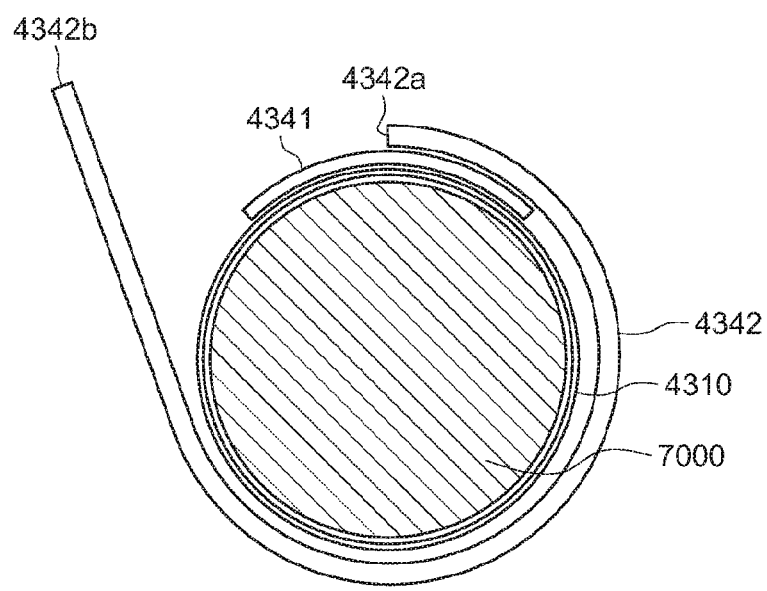

FIG. 27 shows a schematic view of the assembly shown in FIG. 26 while the outer sheet 4342 is being wrapped around the reinforcing structure 4305.

Figure 28:
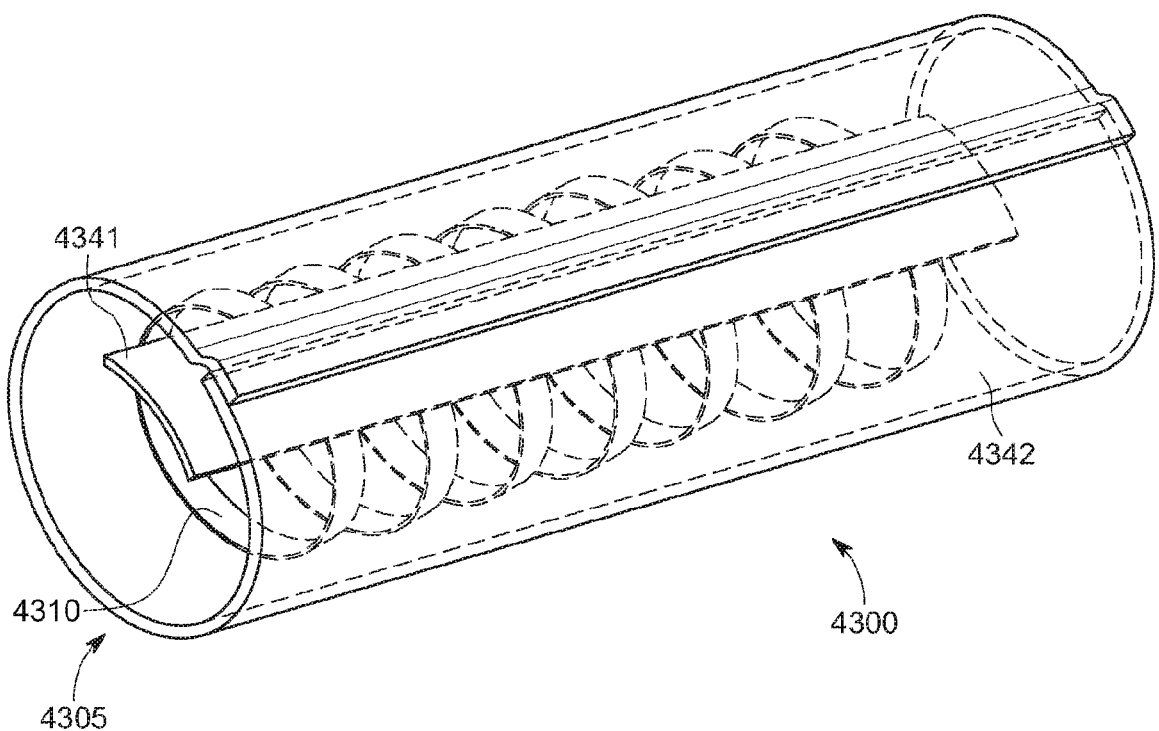

FIG. 28 shows a portion of an air delivery tube 4300 according to an example of the present technology.

Figure 29:
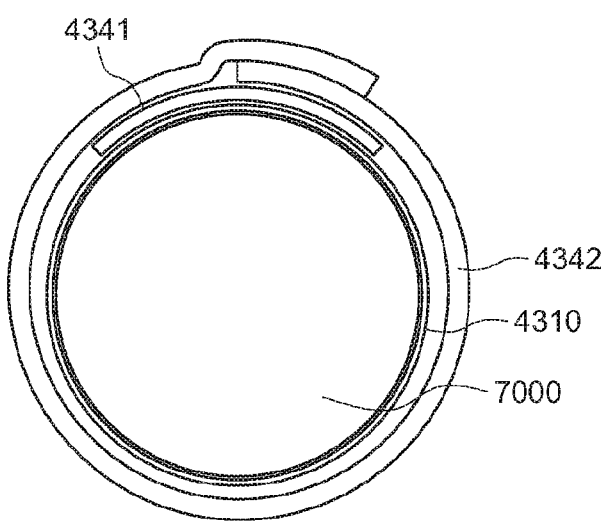

FIG. 29 shows a schematic view of the air delivery tube 4300 of FIG. 28.

Figure 30:
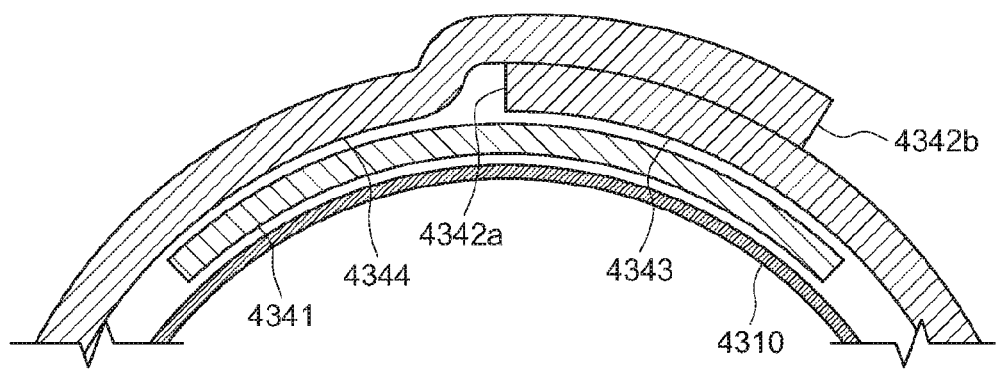

FIG. 30 shows a schematic cross section view of a portion of the air delivery tube 4300 of FIG. 28.

Figure 31:
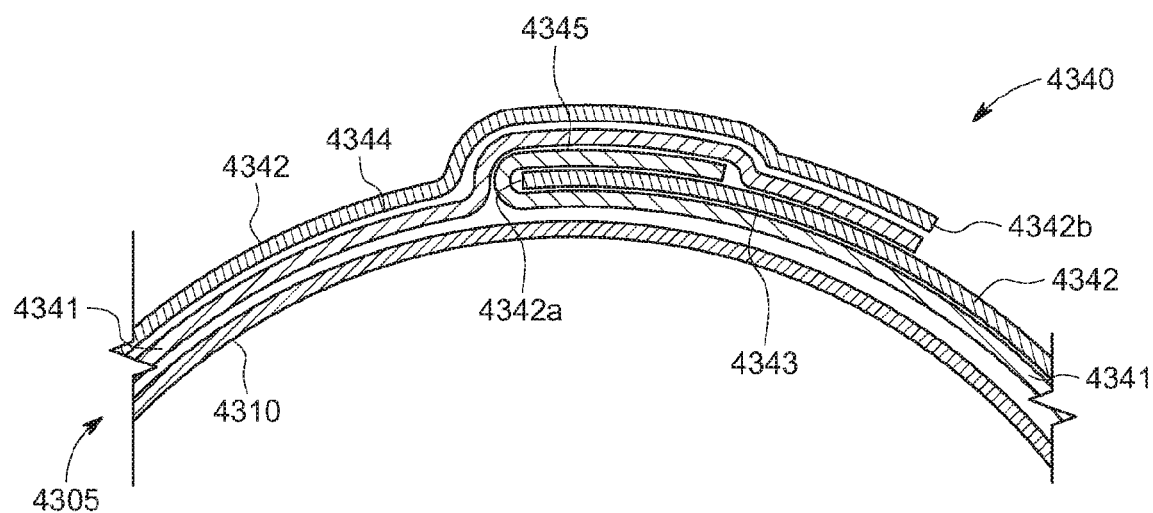

FIG. 31 shows a schematic cross section view of a portion of an air delivery tube 4300 according to another example of the present technology.

Figure 32:
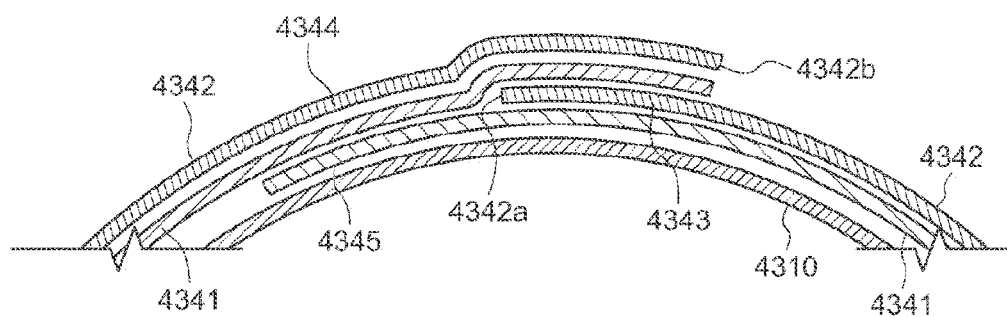

FIG. 32 shows a schematic cross section view of a portion of an air delivery tube 4300 according to another example of the present technology.

Figure 33:
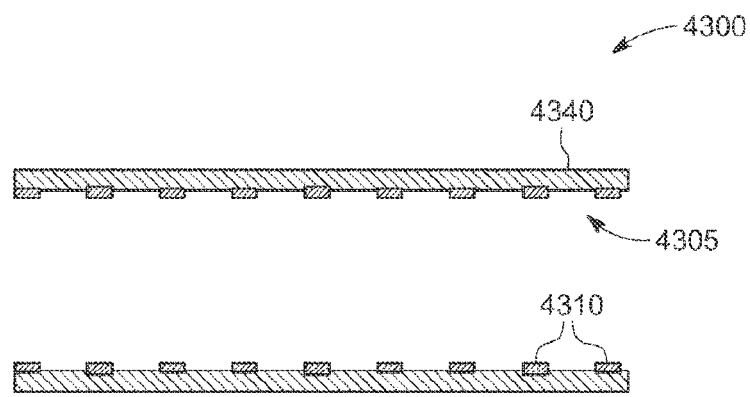

FIG. 33 shows a cross section view of a portion of an air delivery conduit 4300 according to another example of the present technology, before a sealing layer 4341 is applied.

Figure 34:
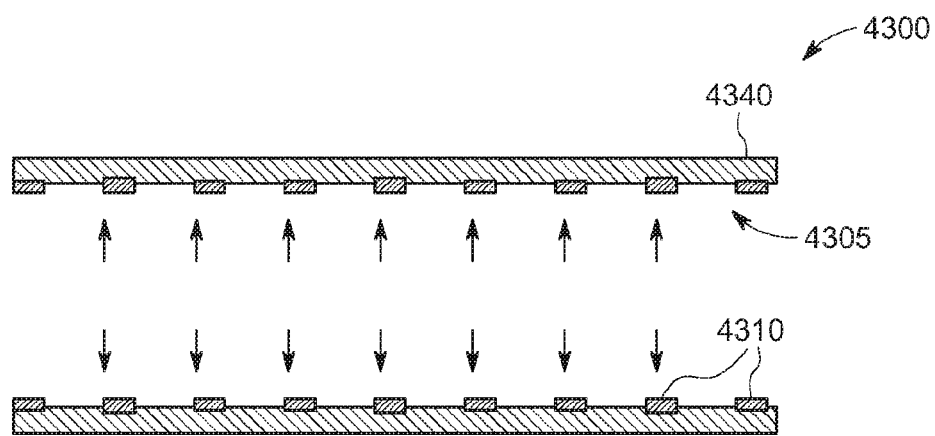

FIG. 34 shows a cross section view of the air delivery conduit 4300 of FIG. 33, during a preheating step.

Figure 35:
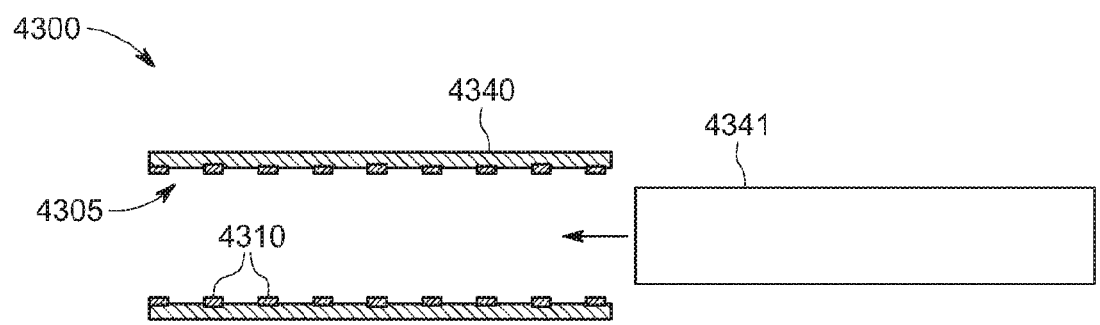

FIG. 35 shows a cross section view of the air delivery conduit 4300 of FIG. 33 while a sealing layer 4341 is inserted.

Figure 36:
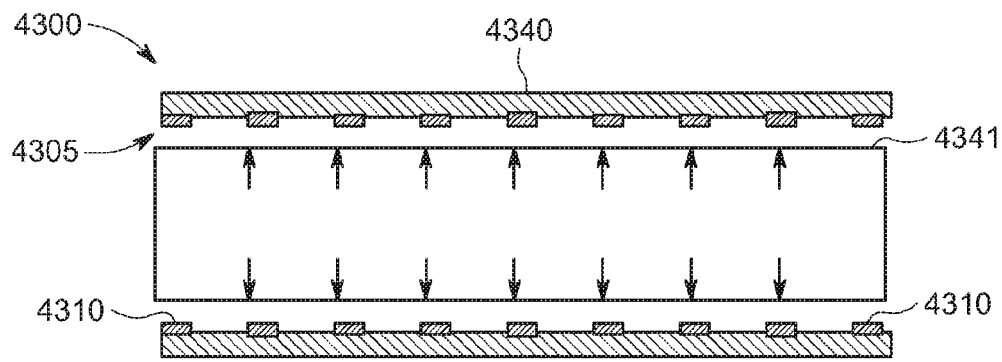

FIG. 36 shows a cross section view of the air delivery conduit 4300 of FIG. 33 during a bonding step.

Figure 37:
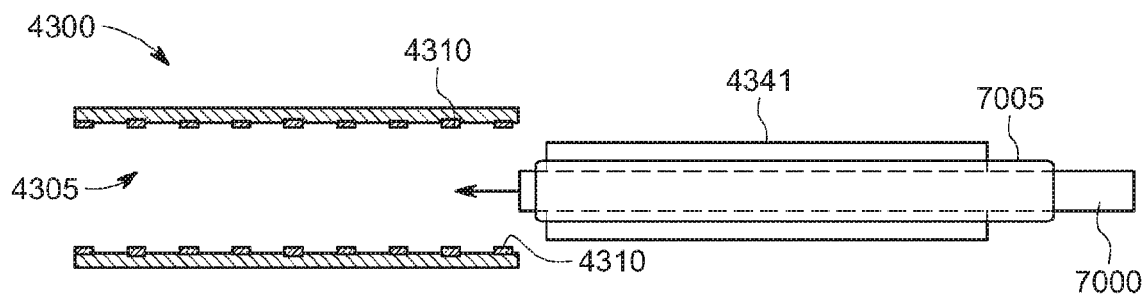

FIG. 37 shows a cross section view of an air delivery conduit 4300 while a sealing layer 4341 is inserted according to another example of the present technology.

Figure 38:
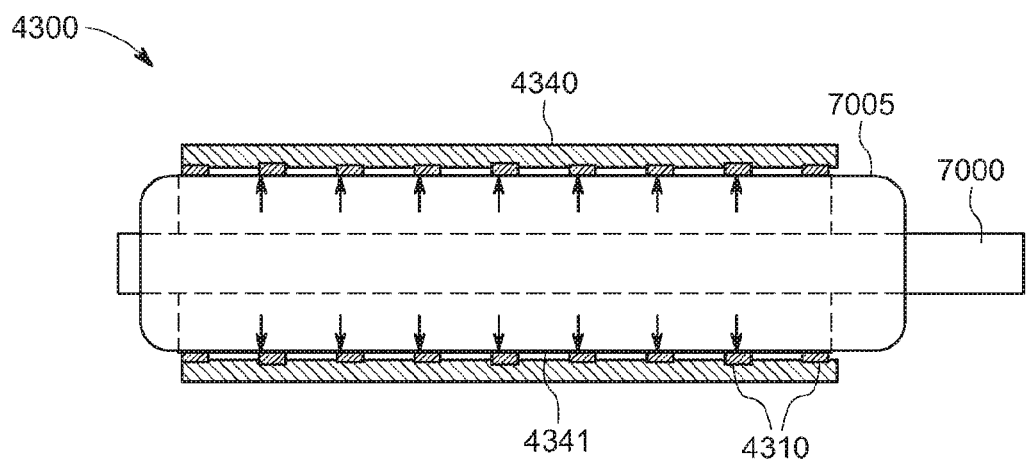

FIG. 38 shows a cross section view of the air delivery conduit 4300 of FIG. 37 during a bonding step.

Figure 39:
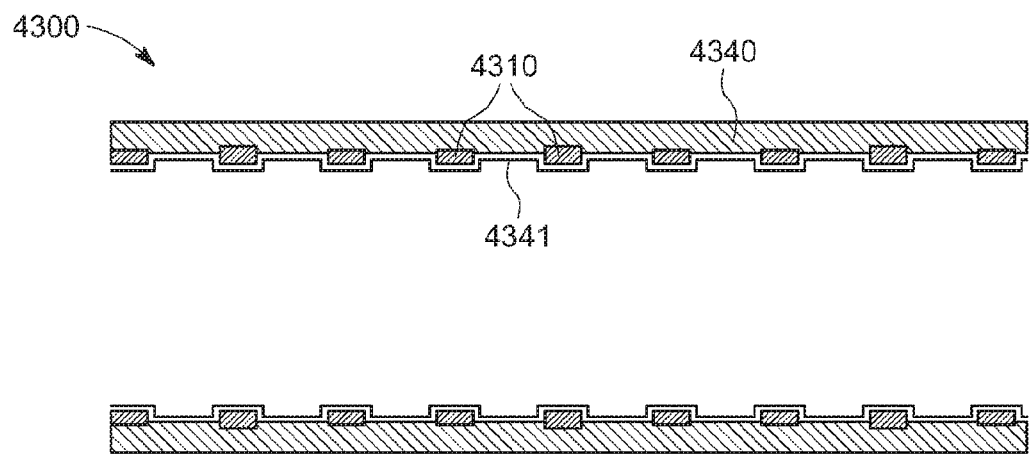

FIG. 39 shows a cross section view of the air delivery conduit 4300 of FIG. 33 with a sealing layer 4341 applied.

Figure 40A:
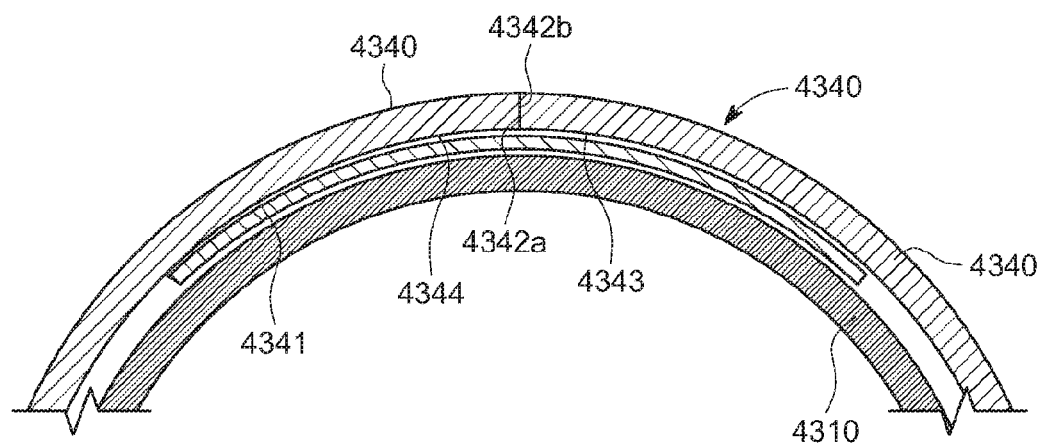

FIG. 40A shows a cross section view of a portion of an air delivery conduit 4300 according to another example of the present technology.

Figure 40B:
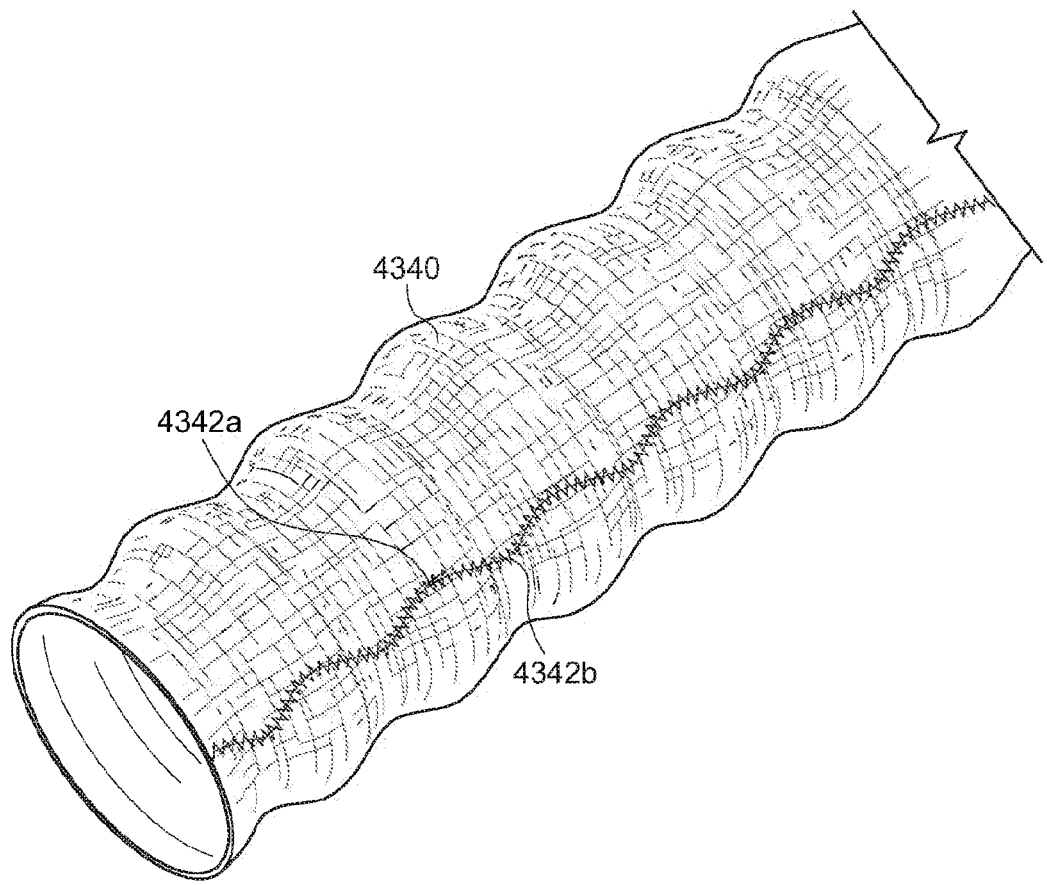

FIG. 40B shows a perspective view of a portion of an air delivery conduit 4300 according to another example of the present technology.

Figure 40C:
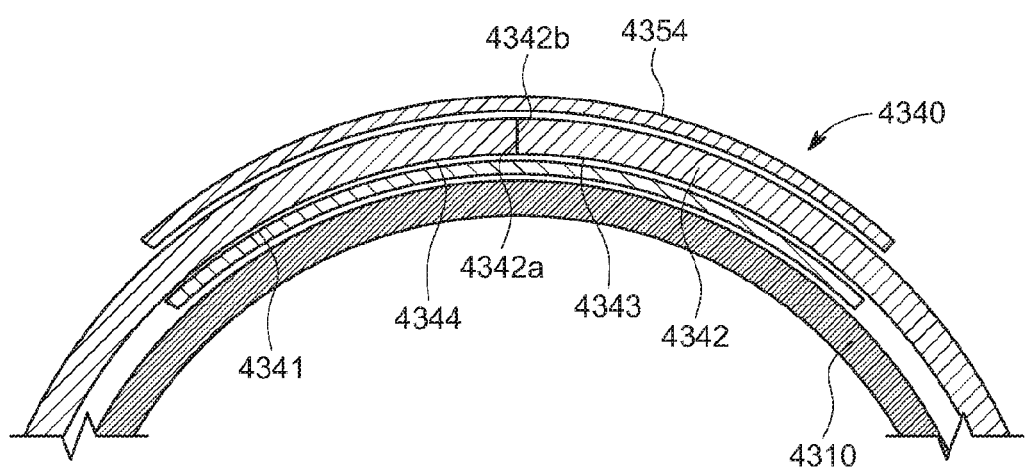

FIG. 40C shows a cross section view of a portion of an air delivery conduit 4300 according to another example of the present technology.

Figure 41:
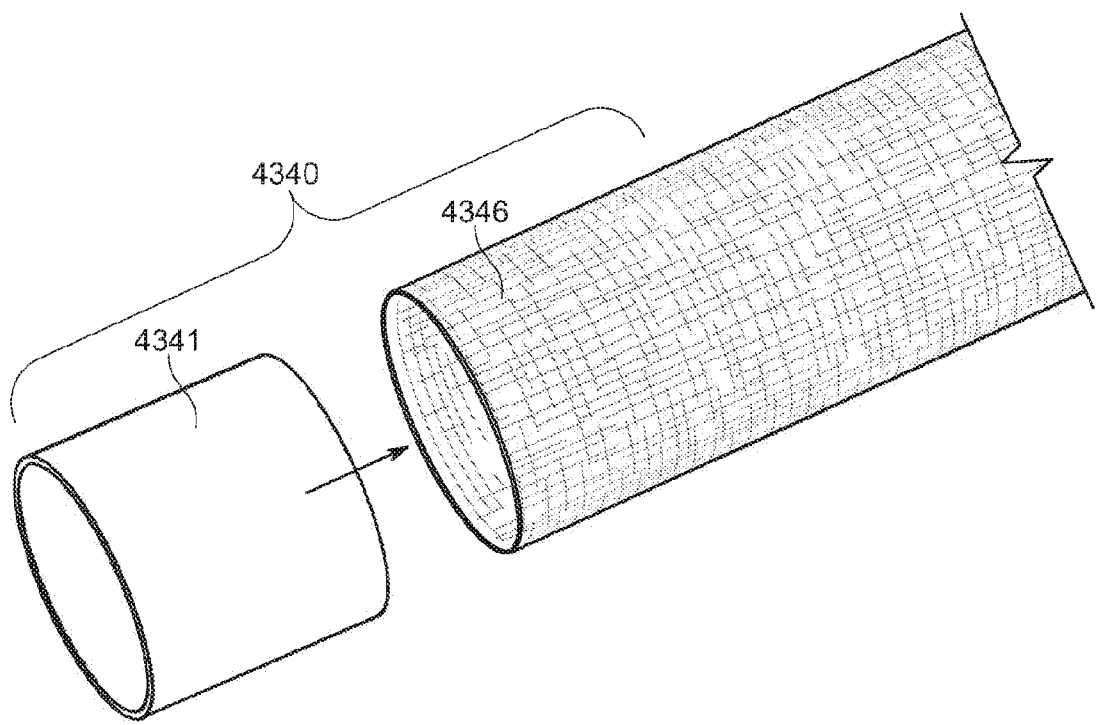

FIG. 41 shows a schematic view of a sealing layer 4341 being inserted into an outer layer 4342 to form a covering 4340 according to one example of the present technology.

Figure 42:
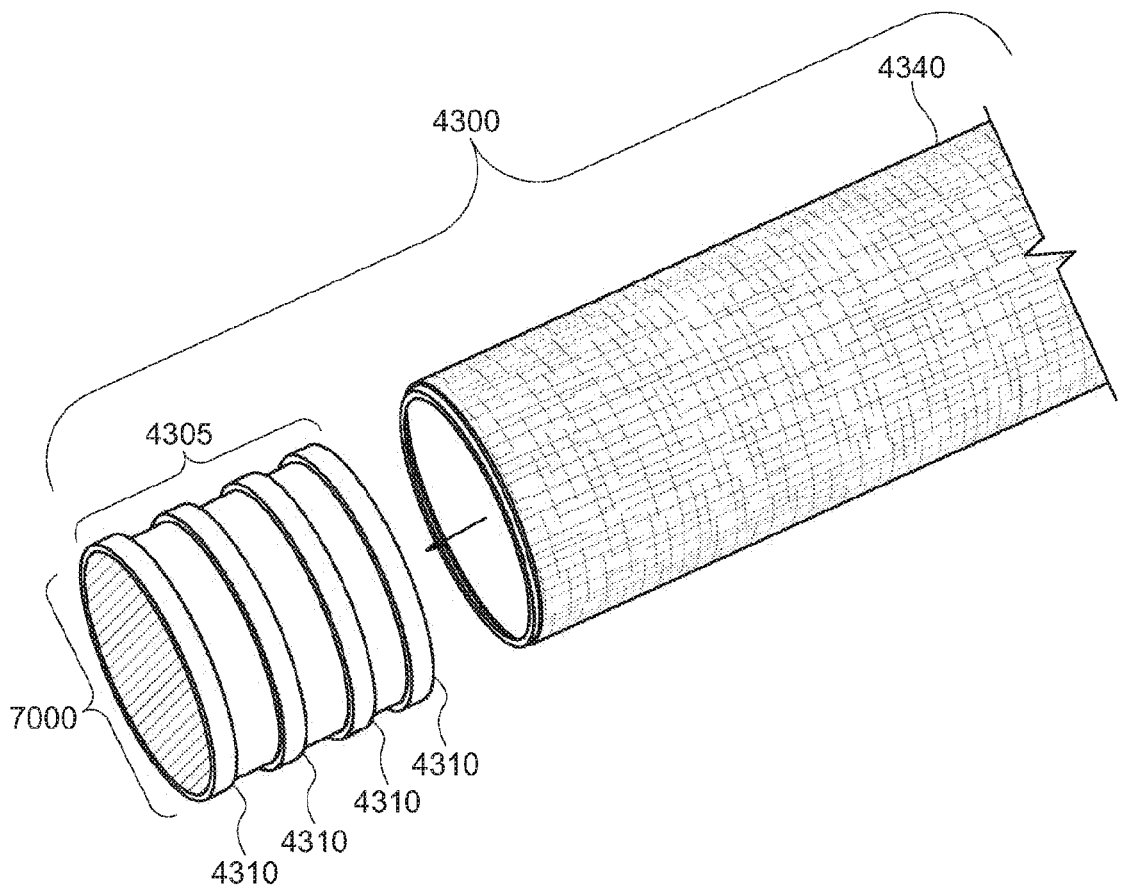

FIG. 42 shows a schematic view of the covering 4340 of FIG. 41 being applied to a reinforcing structure 4305.

Figure 43:
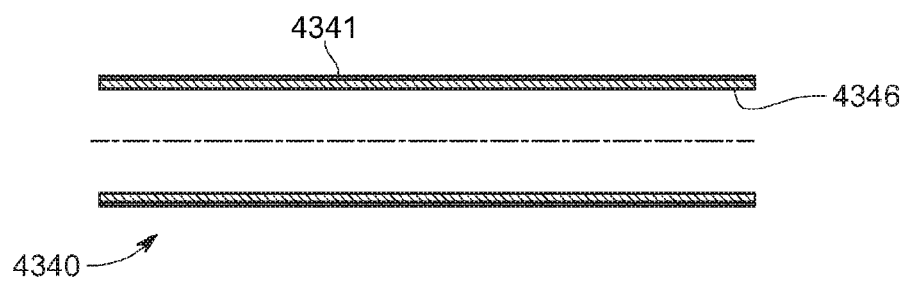

FIG. 43 shows a schematic view of a covering 4340 according to another example of the present technology.

Figure 44:
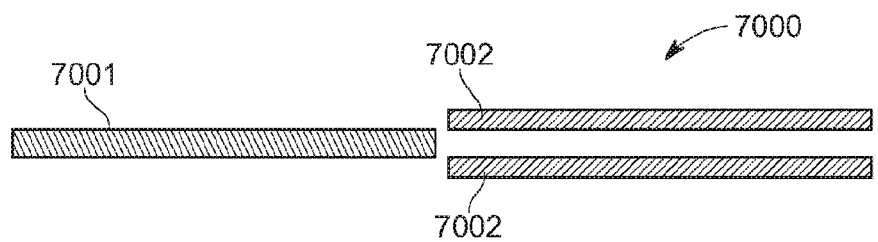

FIG. 44 shows a schematic view of a mandrel 7000 according to an example of the present technology in a collapsed state, according to another example of the present technology.

Figure 45:
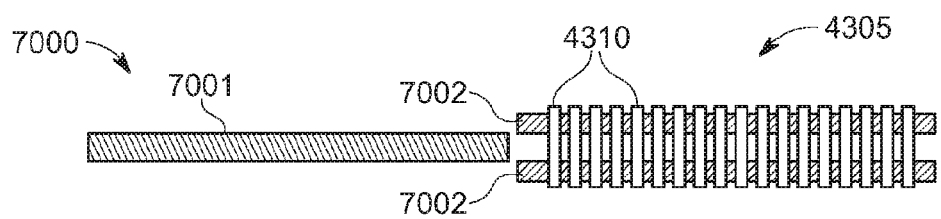

FIG. 45 shows a schematic view of the mandrel 7000 of FIG. 44 in a collapsed state while supporting a reinforcing structure 4305.

Figure 46:
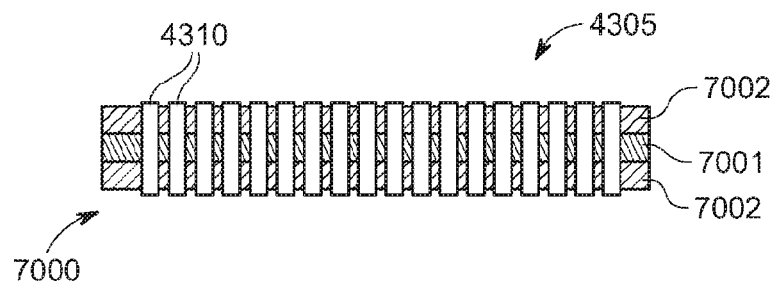

FIG. 46 shows a schematic view of the mandrel 7000 of FIG. 44 in an expanded state while supporting the reinforcing structure 4305 of FIG. 45.

Figure 47:
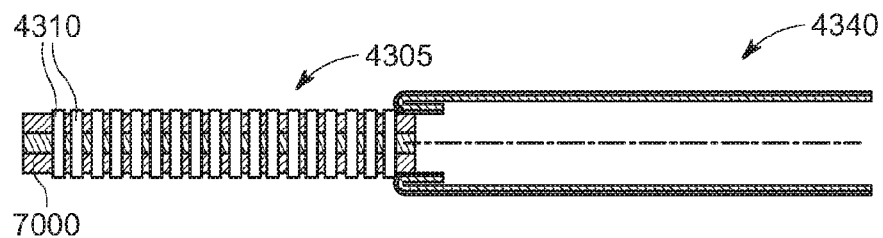

FIG. 47 shows a schematic view of application of a covering 4340 to a reinforcing structure 4305 supported on the mandrel 7000 of FIG. 44.

Figure 48:
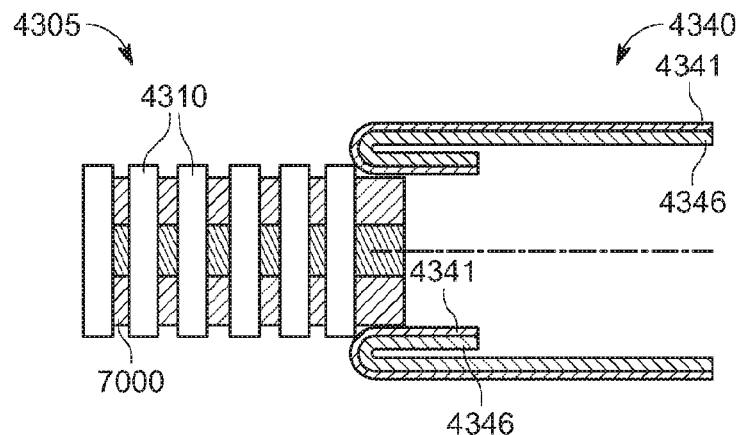

FIG. 48 shows a close-up schematic view of application of a covering 4340 to a reinforcing structure 4305 supported on the mandrel 7000 of FIG. 44.

Figure 49:
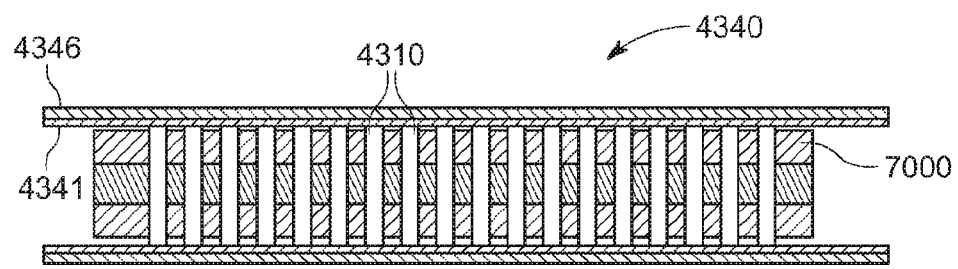

FIG. 49 shows a schematic view of a covering 4340 applied to a reinforcing structure 4305 supported on the mandrel 7000 of FIG. 44.

FIG. 50 shows a schematic view of the mandrel 7000 of FIG. 44 in a collapsed state during removal from the reinforcing structure 4305.

FIG. 51 shows a schematic view of the mandrel 7000 of FIG. 44 having been removed from an air delivery conduit 4300.

Figure 52:
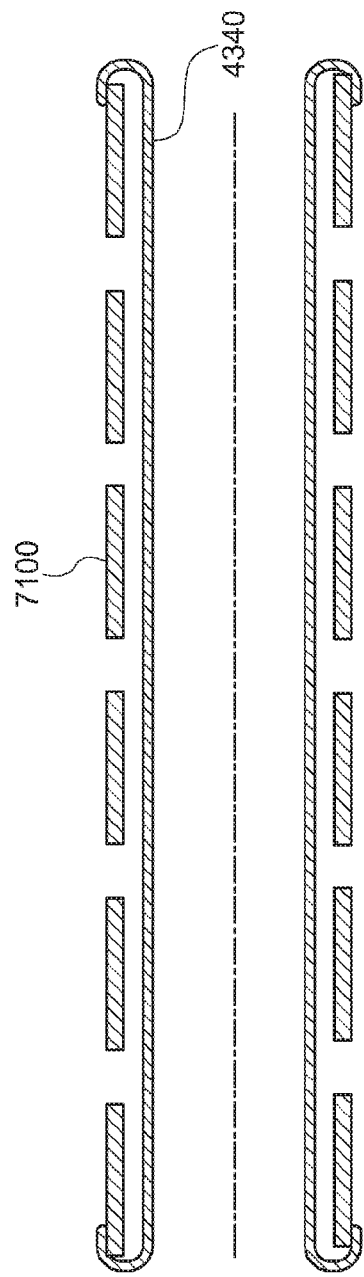

FIG. 52 shows a schematic view of a covering 4340 supported by a vacuum jig 7100, according to another example of the present technology.

Figure 53:
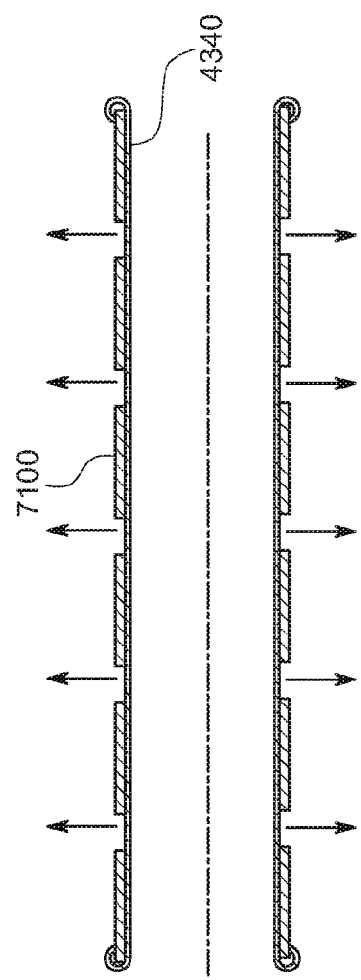

FIG. 53 shows a schematic view of the covering 4340 of FIG. 52 supported by the vacuum jig 7100 with a vacuum applied.

FIG. 54 shows a schematic view of a mandrel 7000 while a ring member 4310 of a reinforcing structure 4305 is sliding on to the mandrel 7000, according to another example of the present technology.

FIG. 55 shows a close-up schematic view of the mandrel 7000 and ring member 4310 of FIG. 54.

Figure 56:
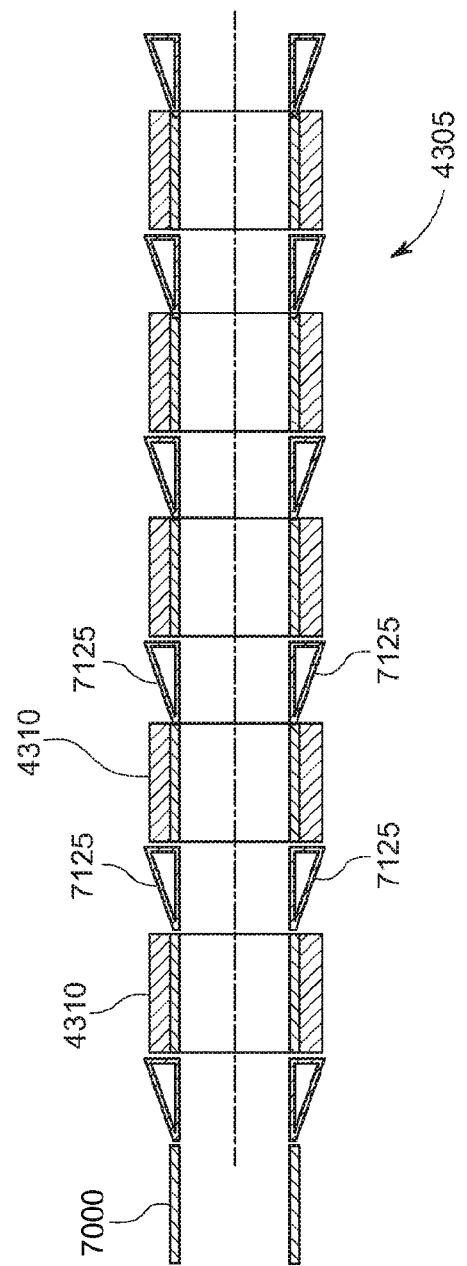

FIG. 56 shows a schematic view of the mandrel 7000 of FIG. 54 supporting a reinforcing structure 4305.

Figure 57:
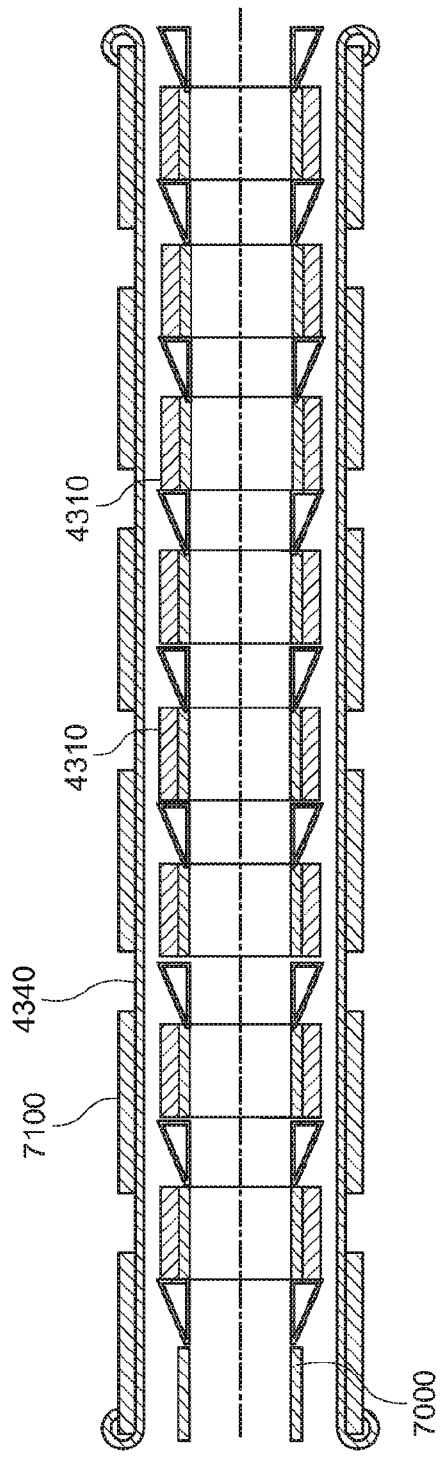

FIG. 57 shows a schematic view of the mandrel 7000 and reinforcing structure 4305 inserted within the covering 4340 of FIG. 52 with vacuum applied by the vacuum jig 7100.

Figure 58:
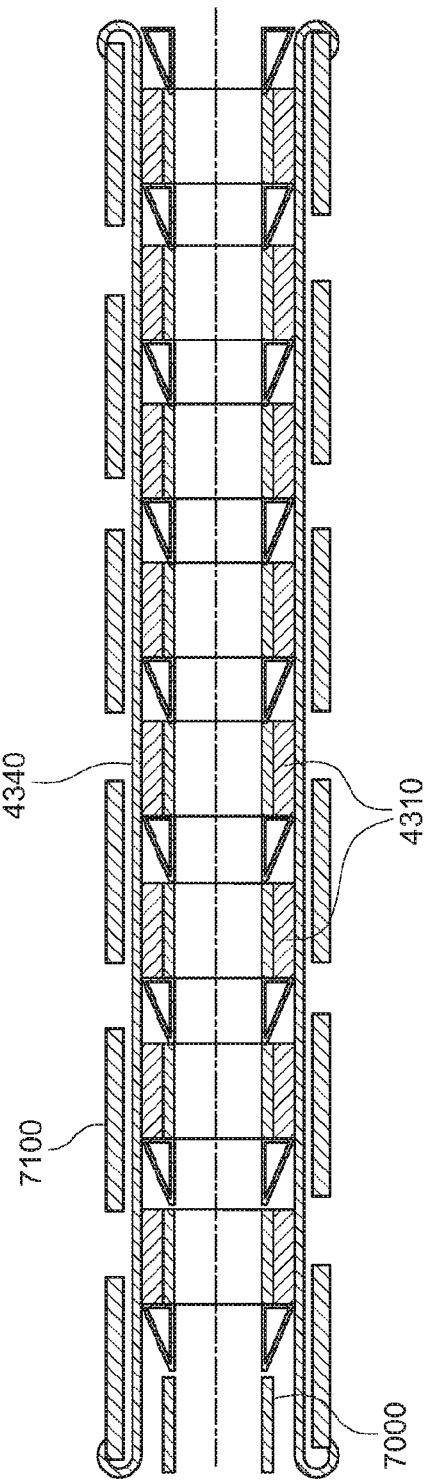

FIG. 58 shows a schematic view of the mandrel 7000 and reinforcing structure 4305 inserted within the covering 4340 of FIG. 52 after the vacuum has been released.

Figure 59:
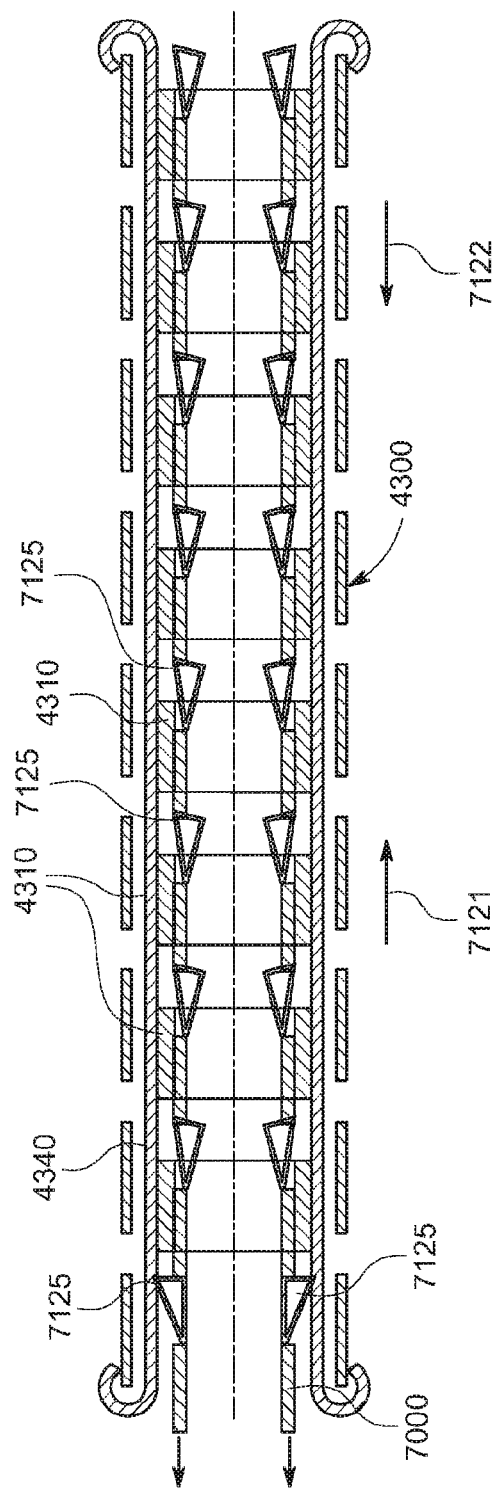

FIG. 59 shows a schematic view of the mandrel 7000 during retraction from the interior of the covering 4340 of FIG. 52.

Figure 60:
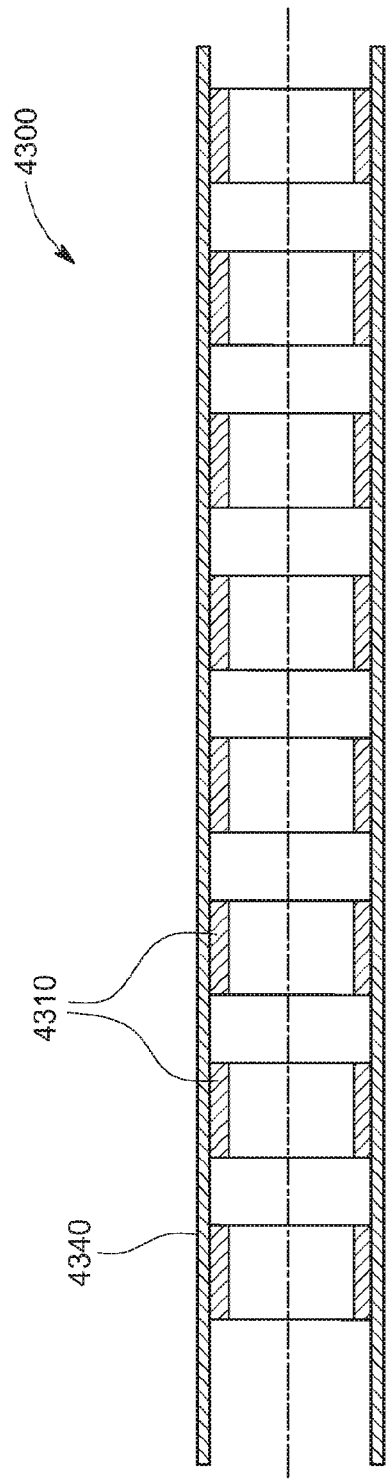

FIG. 60 shows a schematic view of an air delivery conduit 4300, according to another example of the present technology.

Figure 61:
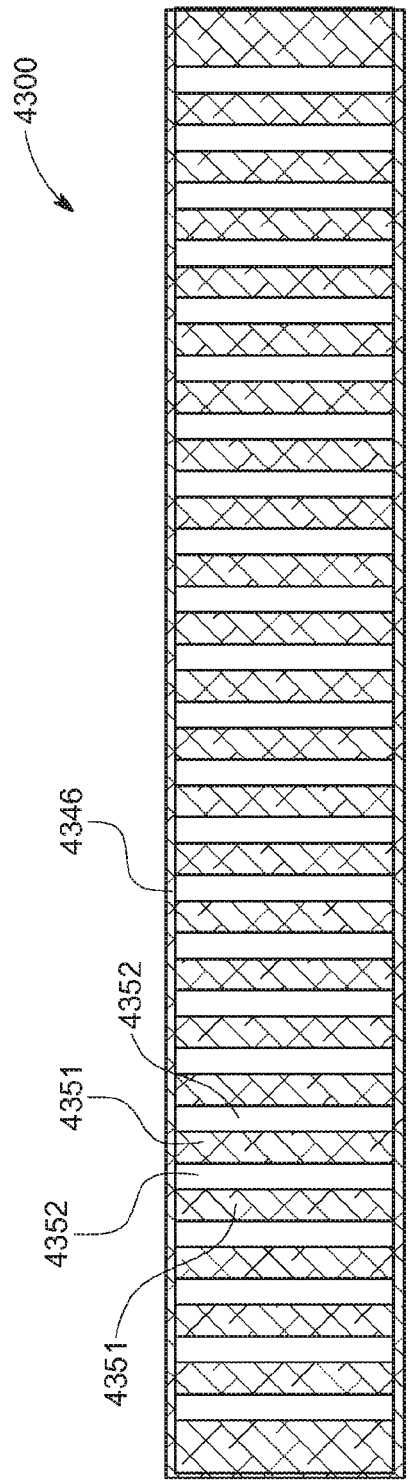

FIG. 61 shows a schematic view of an air delivery conduit 4300, according to another example of the present technology.

Figure 62:
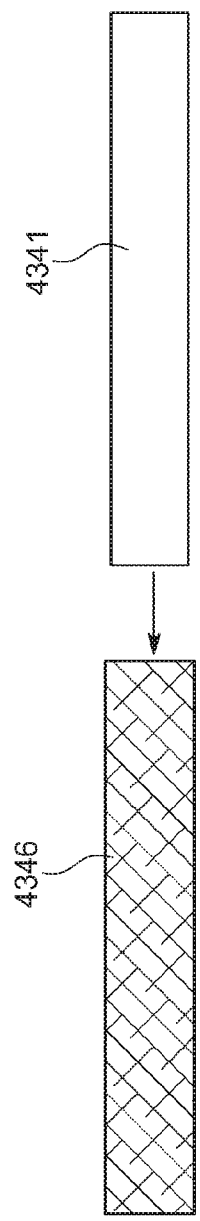

FIG. 62 shows a schematic view of a sealing layer 4341 prior to insertion into an outer layer 4346, during manufacturing of the air delivery conduit 4300 of FIG. 61.

Figure 63:
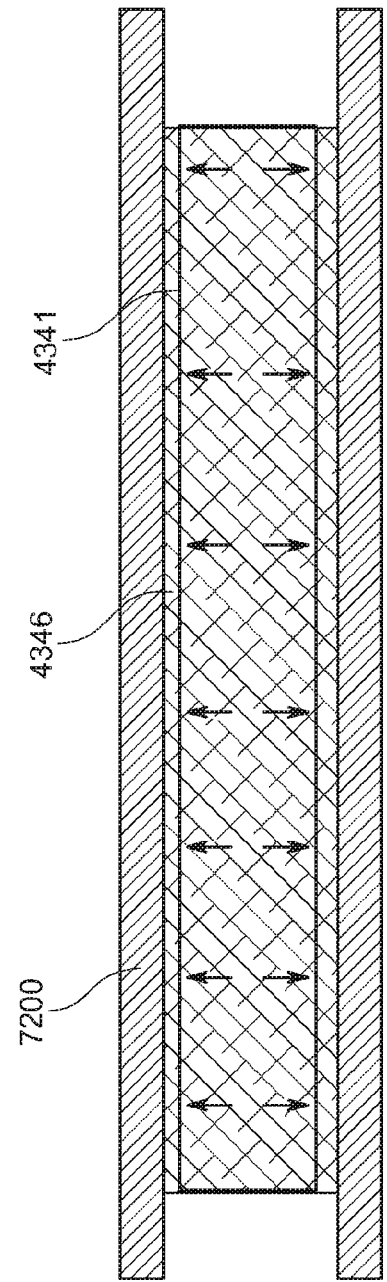

FIG. 63 shows a schematic view of the sealing layer 4341 and outer layer 4346 of FIG. 62 in a mould 7200.

Figure 64:
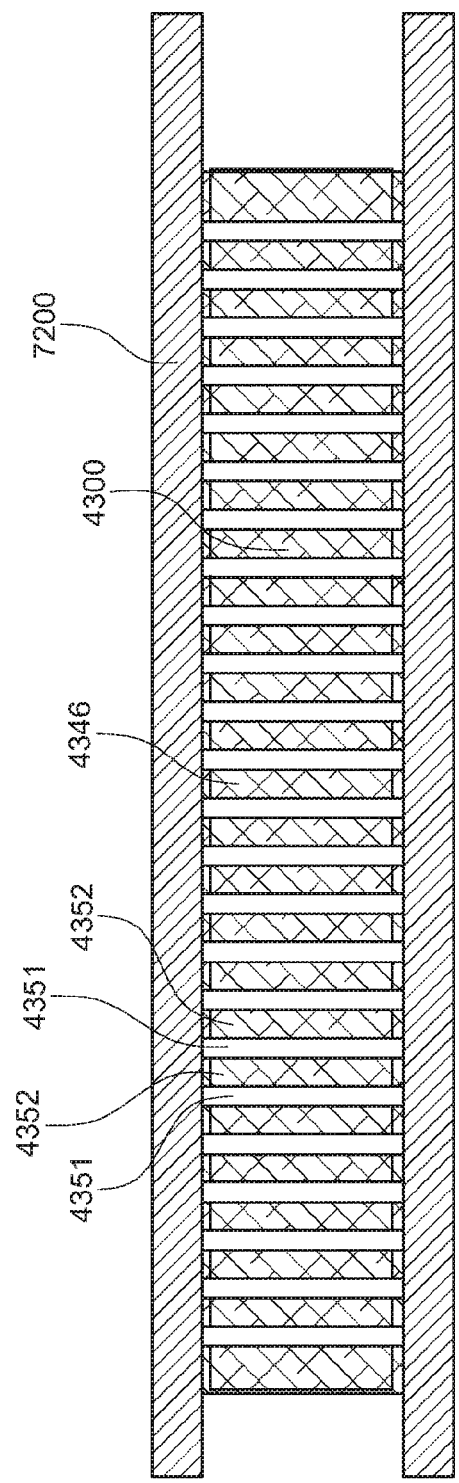

FIG. 64 shows a schematic view of the air delivery conduit 4300 of FIG. 61 formed in the mould 7200 of FIG. 63.

Figure 65:
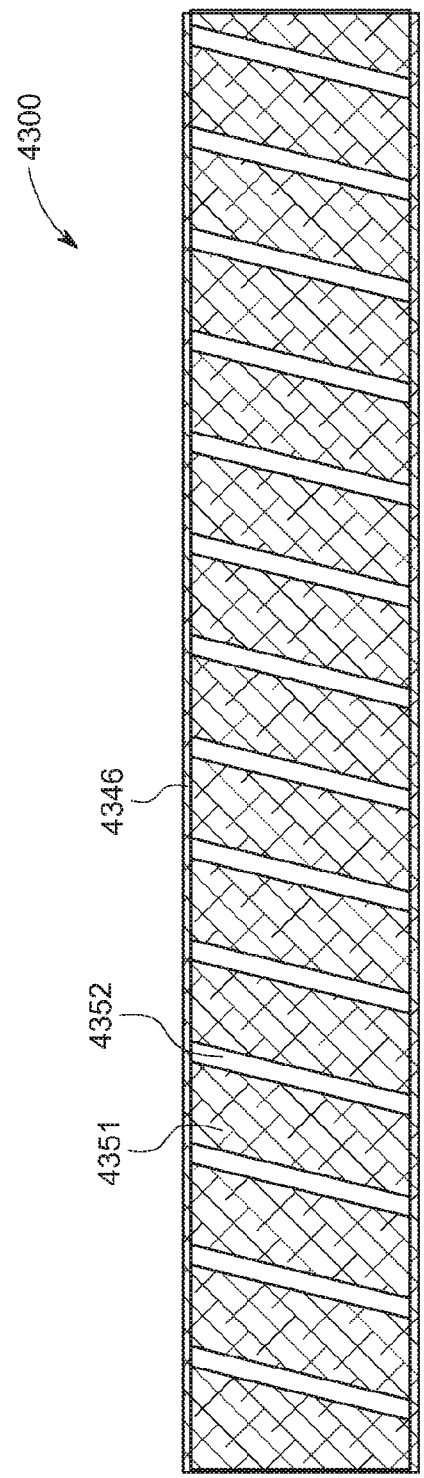

FIG. 65 shows a schematic view of an air delivery conduit 4300 according to another example of the present technology.

Figures 1, 66:
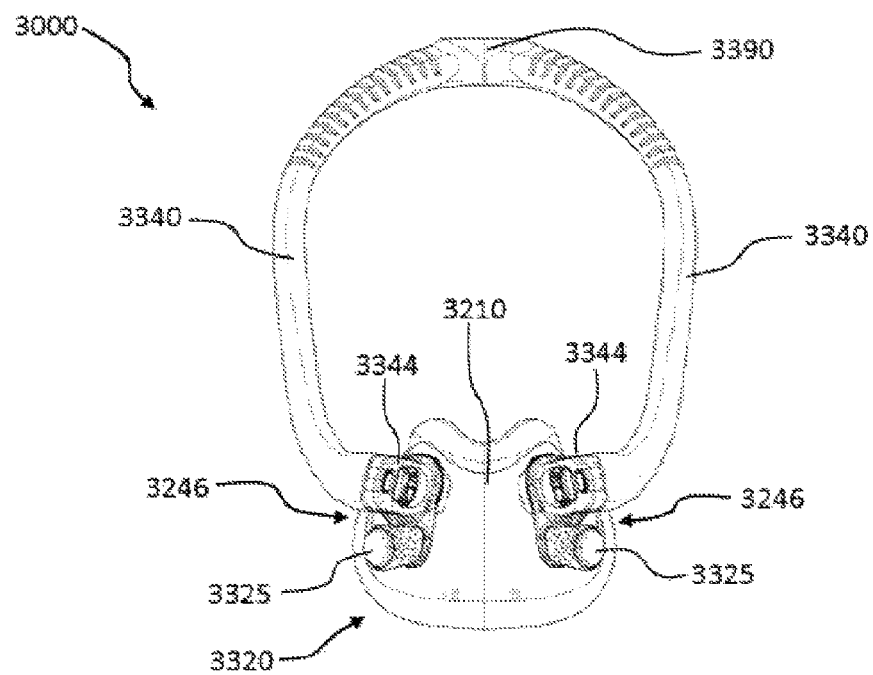

FIG. 66-1 is a front view of a patient interface 3000 according to another example of the present technology.

Figures 2, 66:
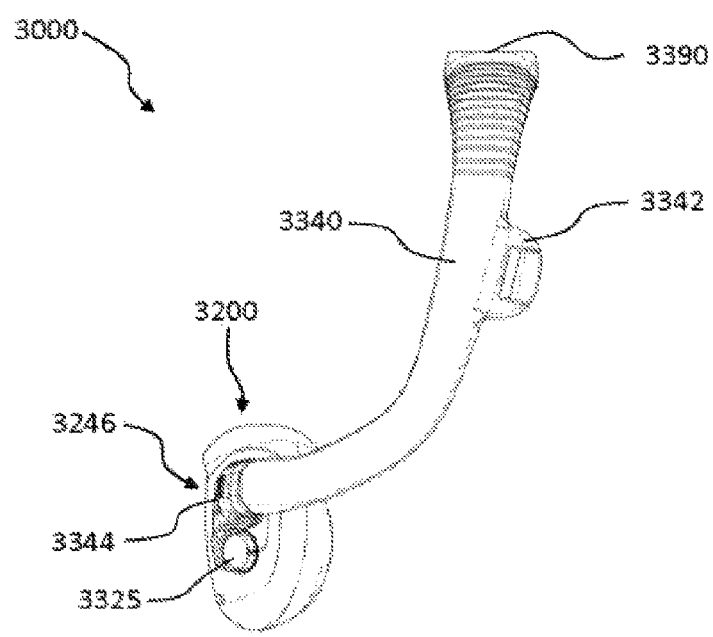

FIG. 66-2 is a side view of the patient interface 3000 of FIG. 66-1.

Figures 3, 66:
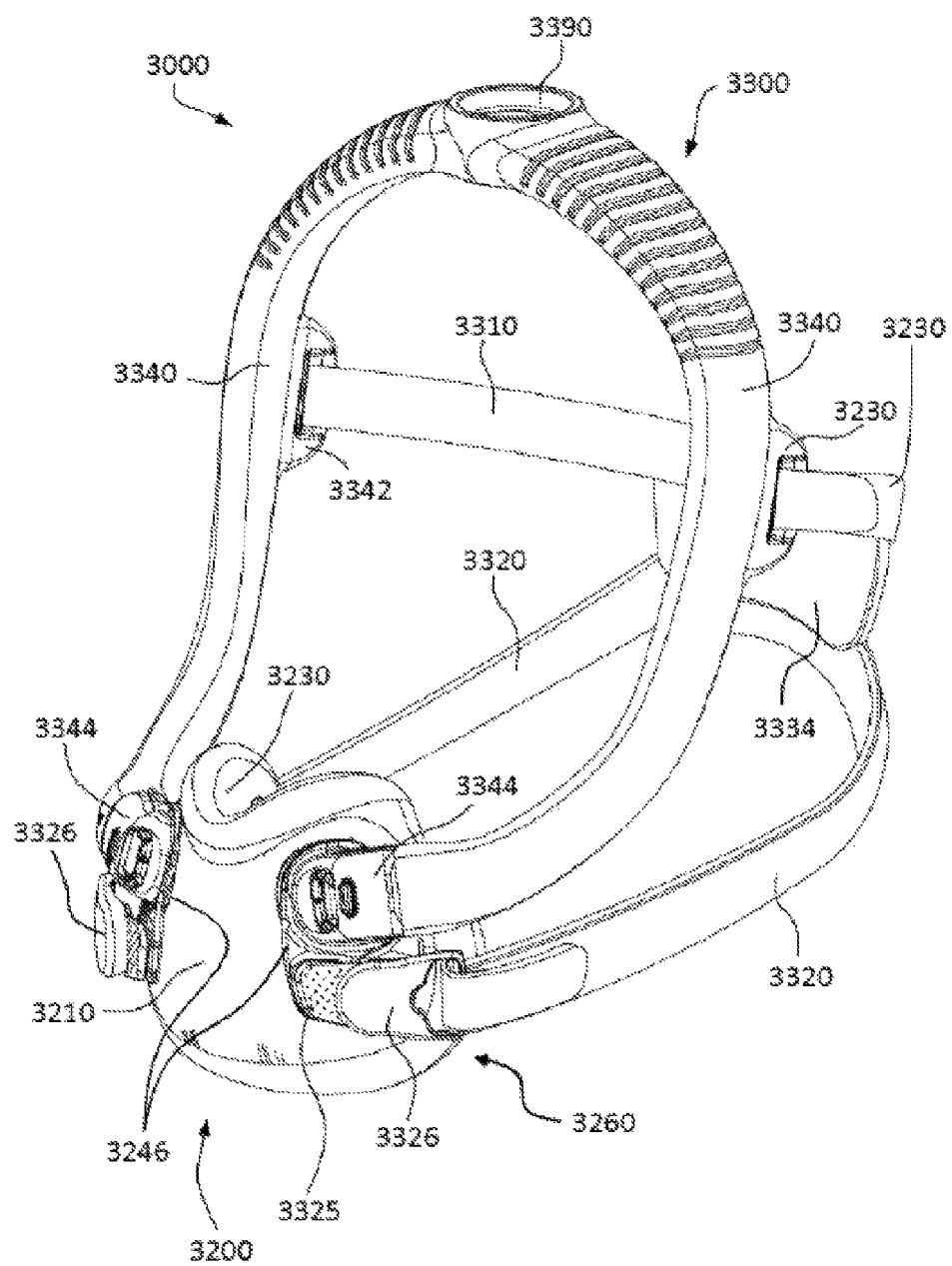

FIG. 66-3 is a perspective view of the patient interface 3000 of FIG. 66-1.

Figures 1, 67:
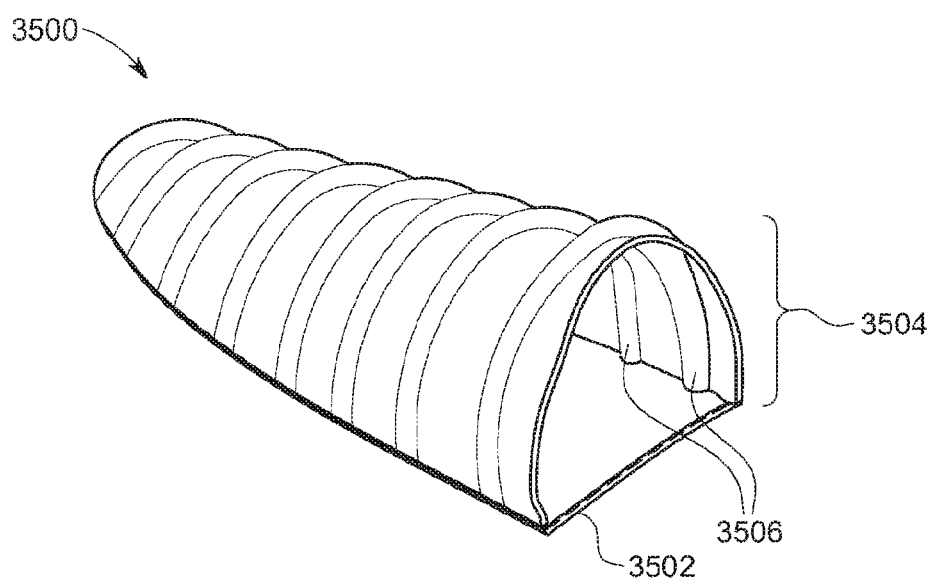
Figures 2, 67:
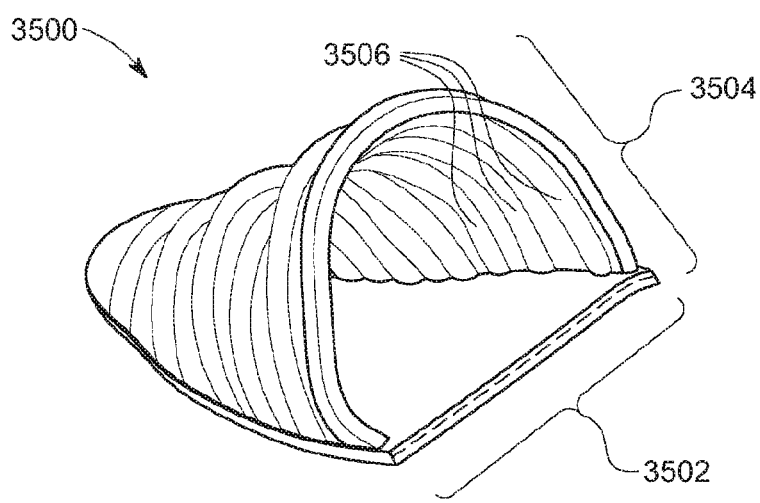
Figures 3, 67:
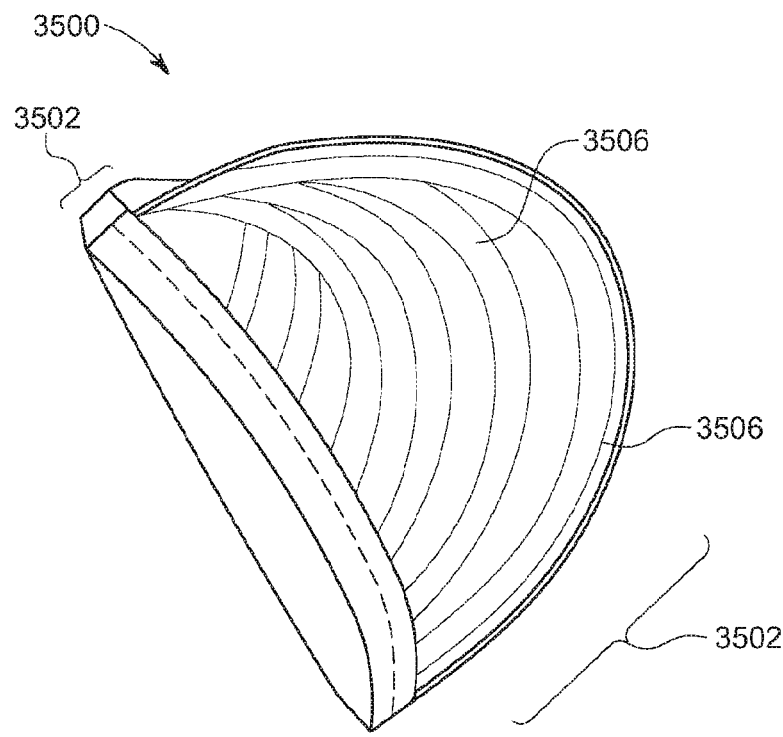

FIG. 67-1 shows a first perspective view of a headgear tube according to an aspect of the technology.

FIG. 67-2 shows a second perspective view of the headgear tube of FIG. 67-1.

FIG. 67-3 is an end on view of the headgear tube of FIGS. 67-1 and 67-2.

Figures 4, 67:
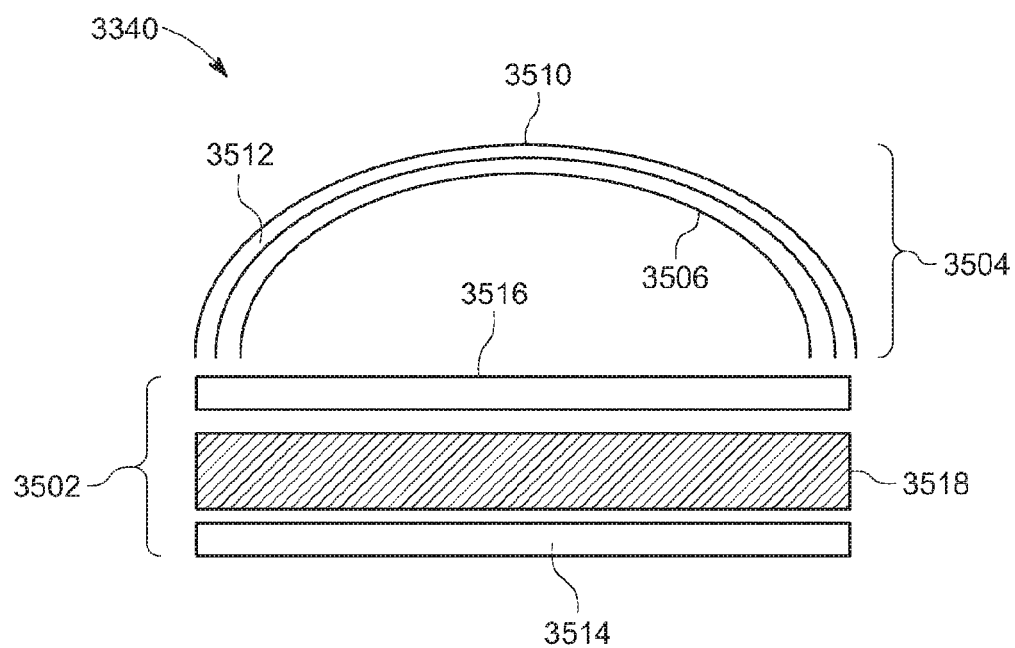

FIG. 67-4 is a cross-sectional view a headgear tube according to an aspect of the technology.

Figure 68:
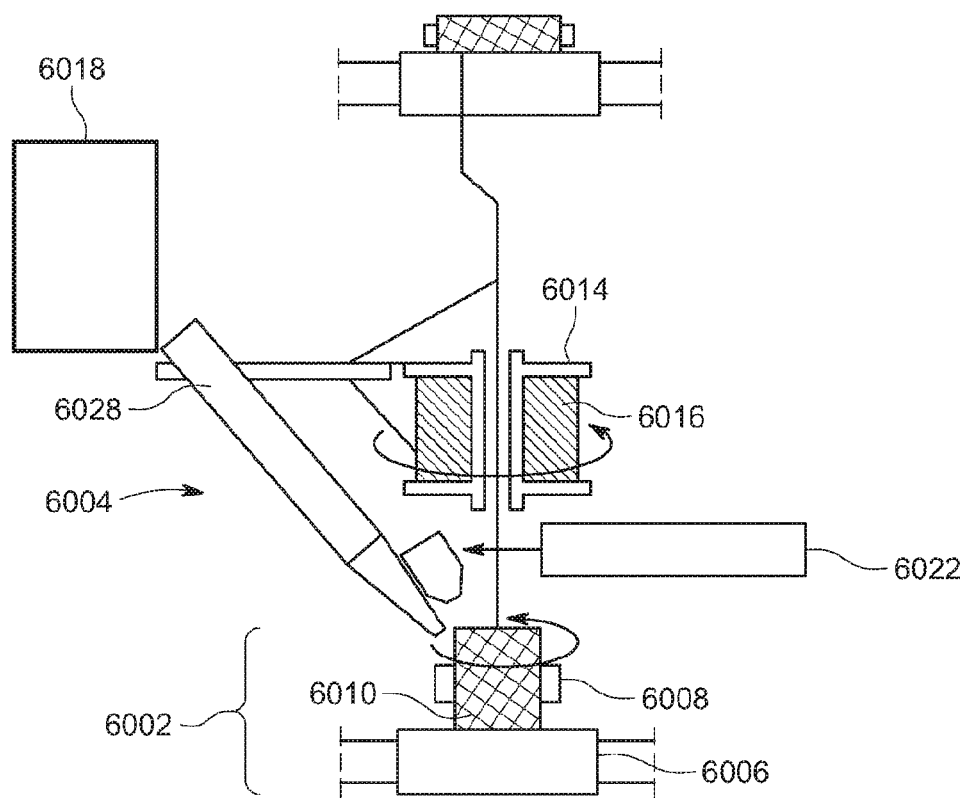

FIG. 68 is a schematic view of a system configured for use in a method of manufacturing an air delivery conduit according to an aspect of the technology.

Figure 69:
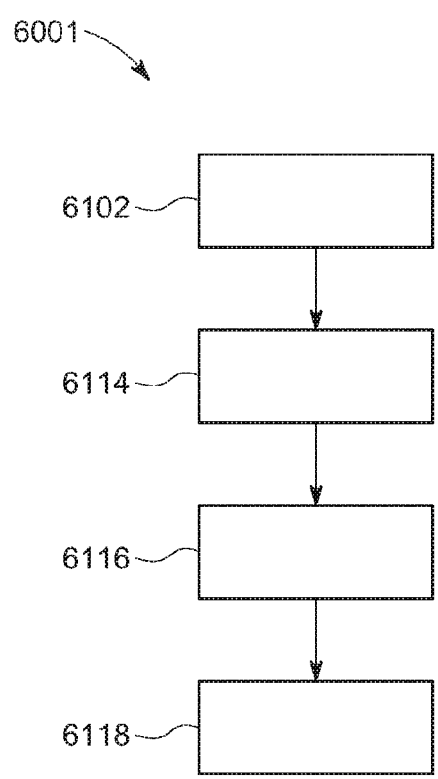

FIG. 69 shows representative steps in a method of creating resilient support members on a textile material according to an aspect of the technology.

Figure 70:
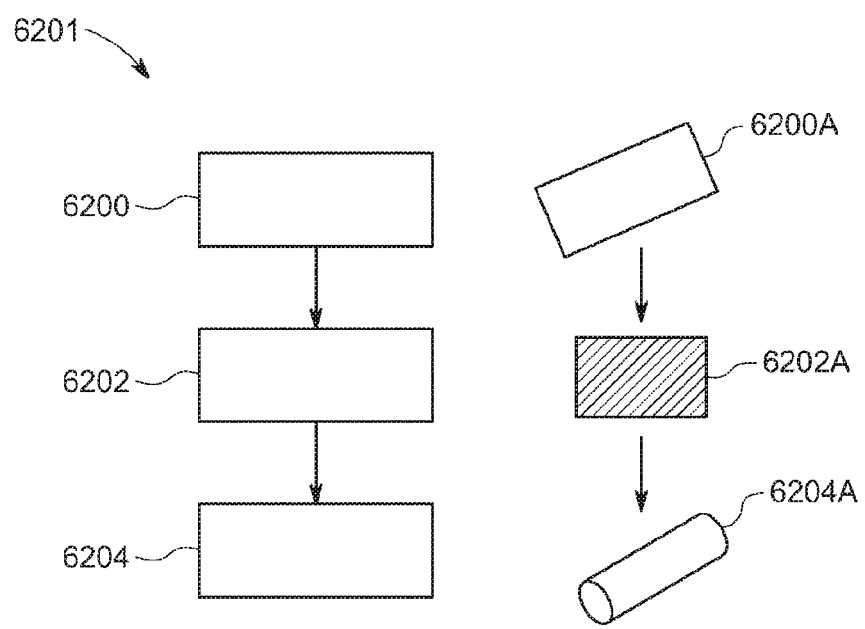

FIG. 70 shows representative steps in a method according to an aspect of the present technology, and a representative component for a respiratory device manufactured according to the method.

Figures 1, 71:
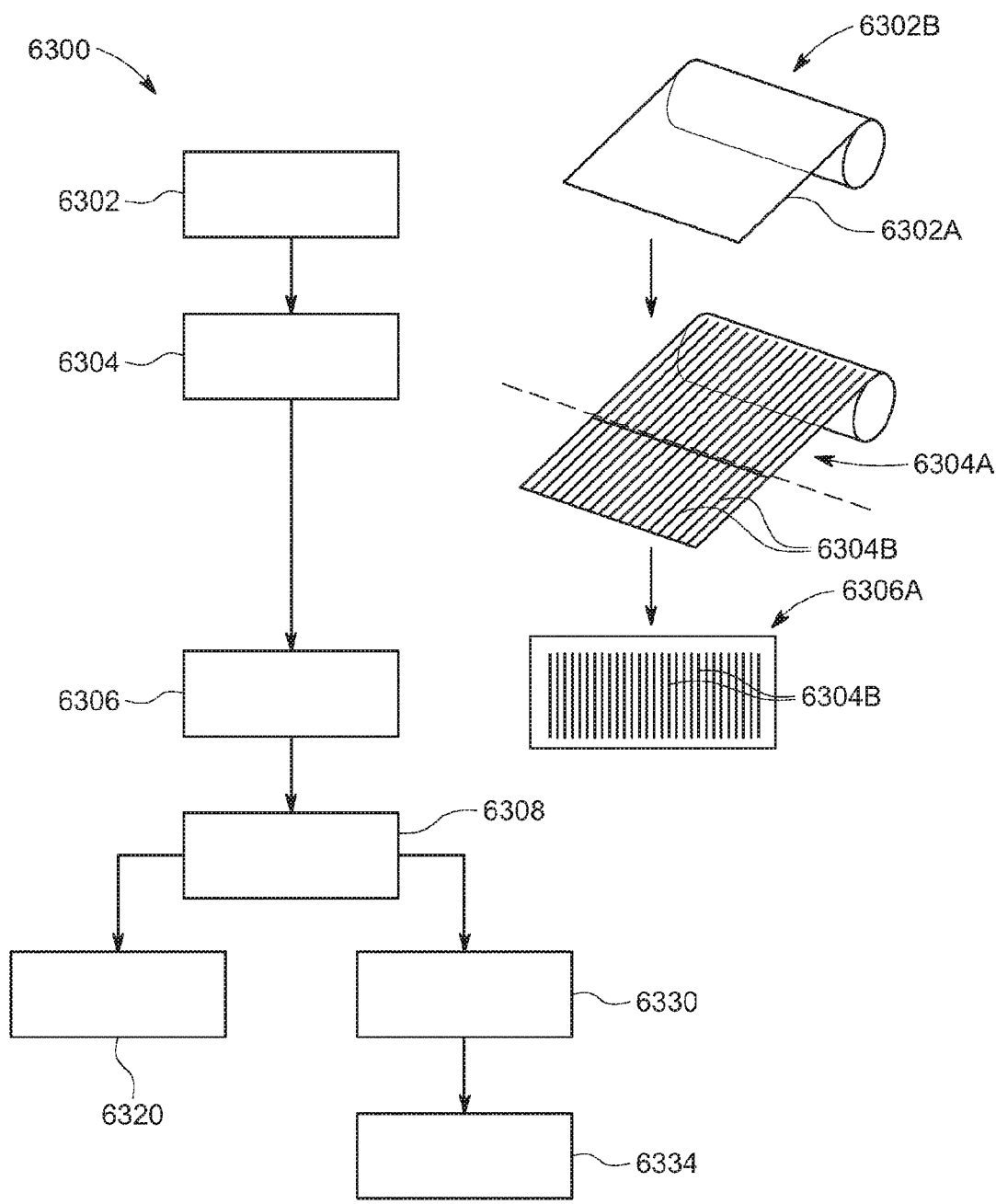
Figures 2, 71:
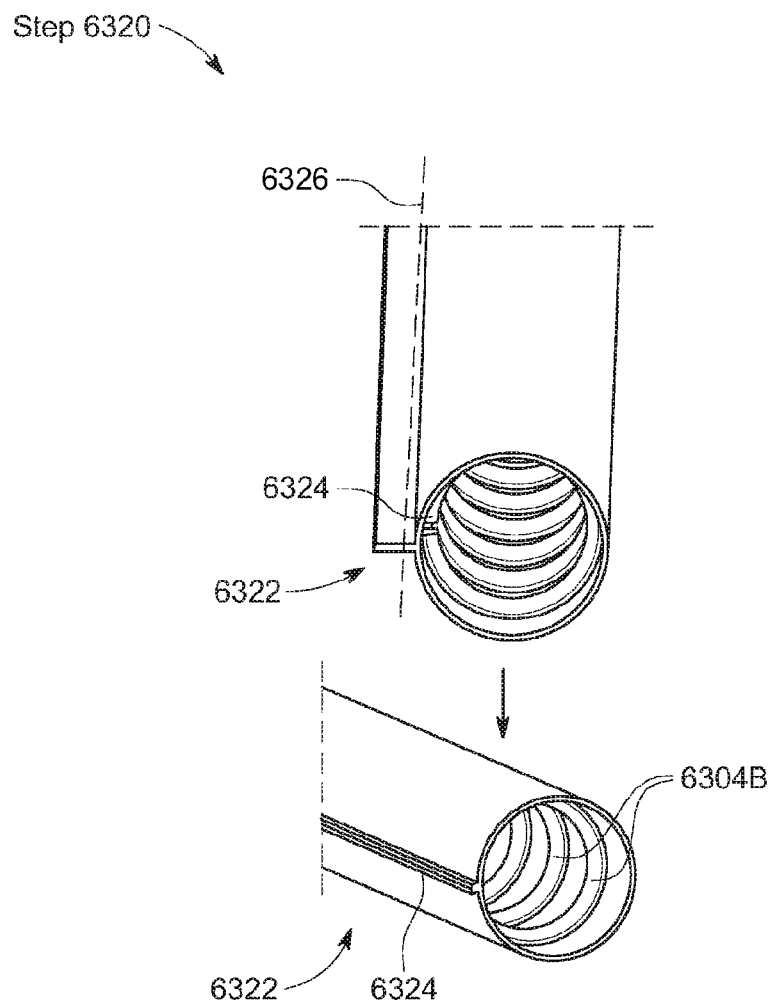
Figures 3, 71:
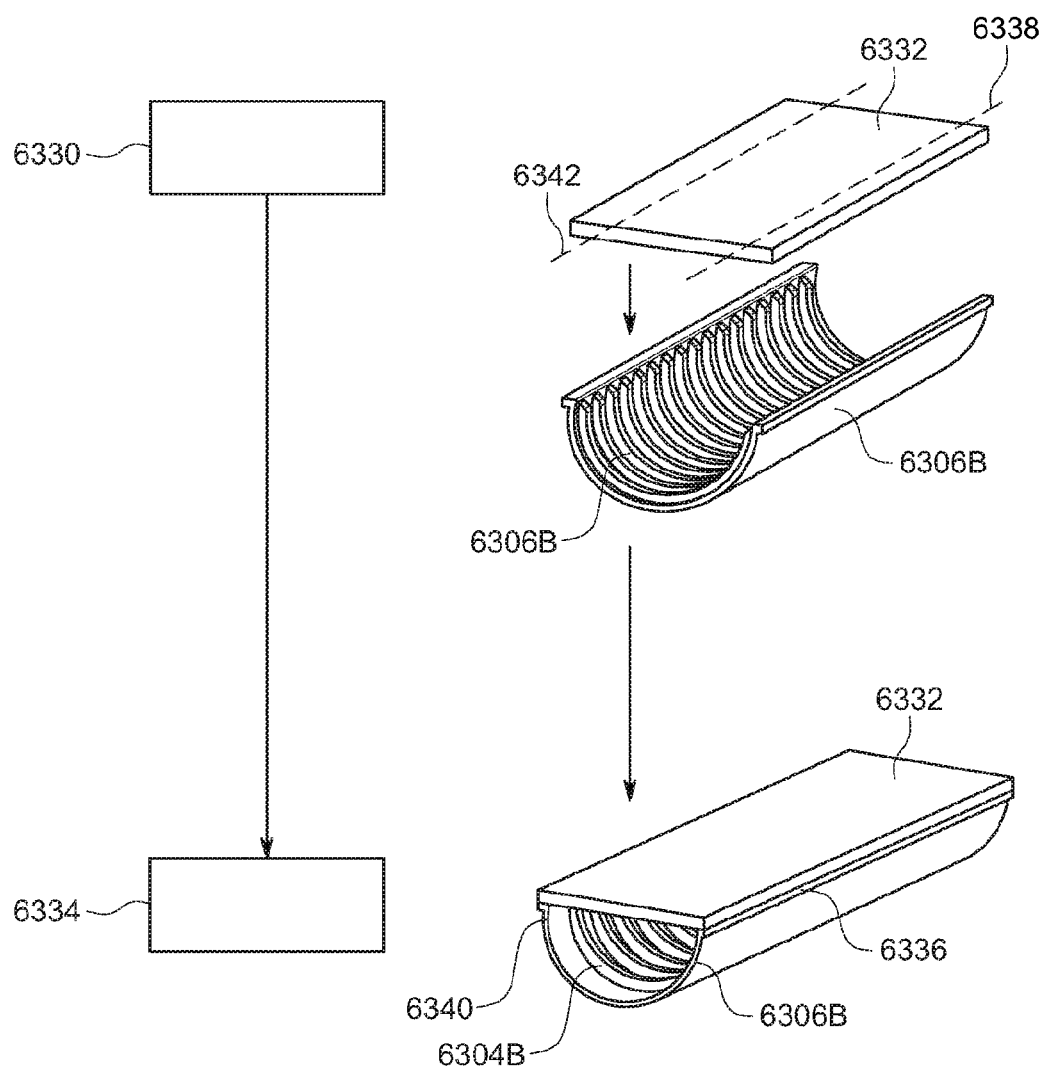

FIG. 71-1 shows further aspects of the method of FIG. 70 and components manufactured according to the method.

FIG. 71-2 shows further aspects of the method of FIG. 71-1 and components manufactured according to the method.

FIG. 71-3 shows further aspects of the method of FIG. 71-1 and components manufactured according to the method.

Figure 72:
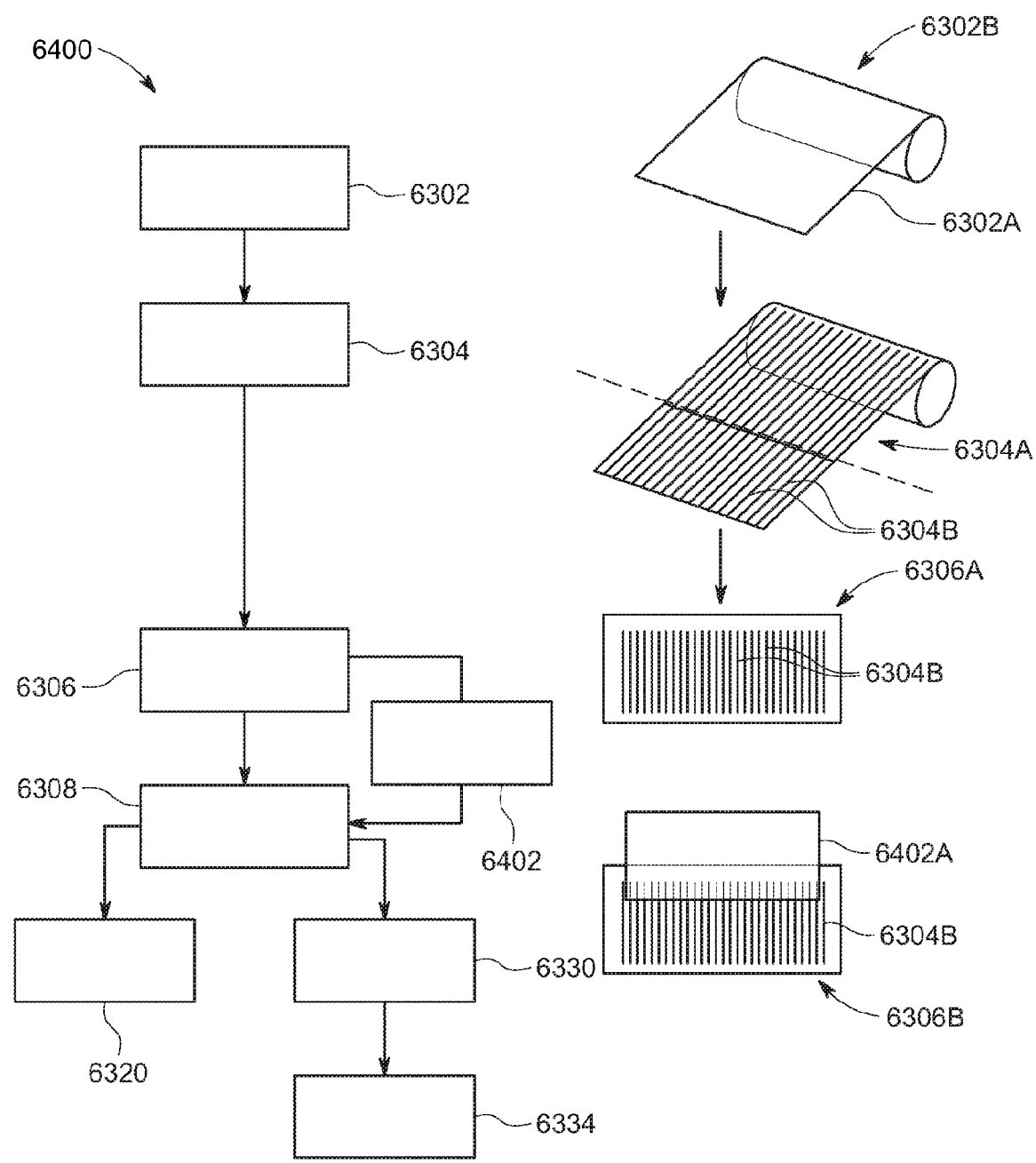

FIG. 72 shows further aspects of the method of FIG. 70 and components manufactured according to the method.

Figure 73:
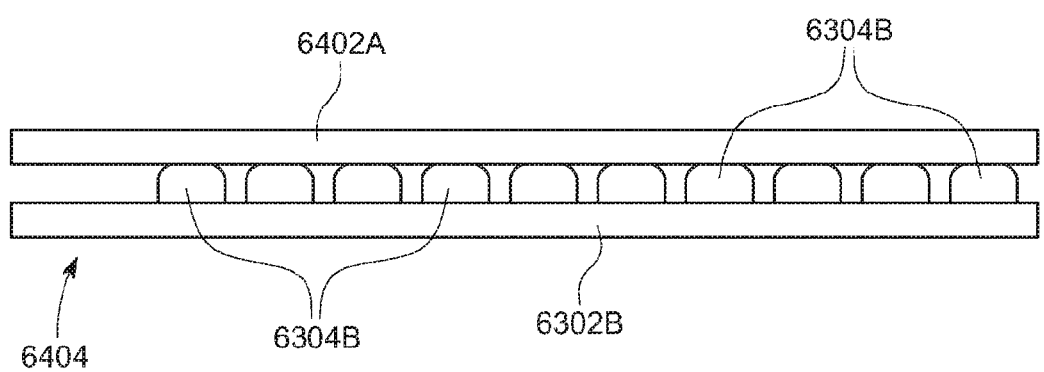

FIG. 73 is a cross sectional view of a multi-layer structure manufactured according to the method of FIG. 72.

Figure 74:
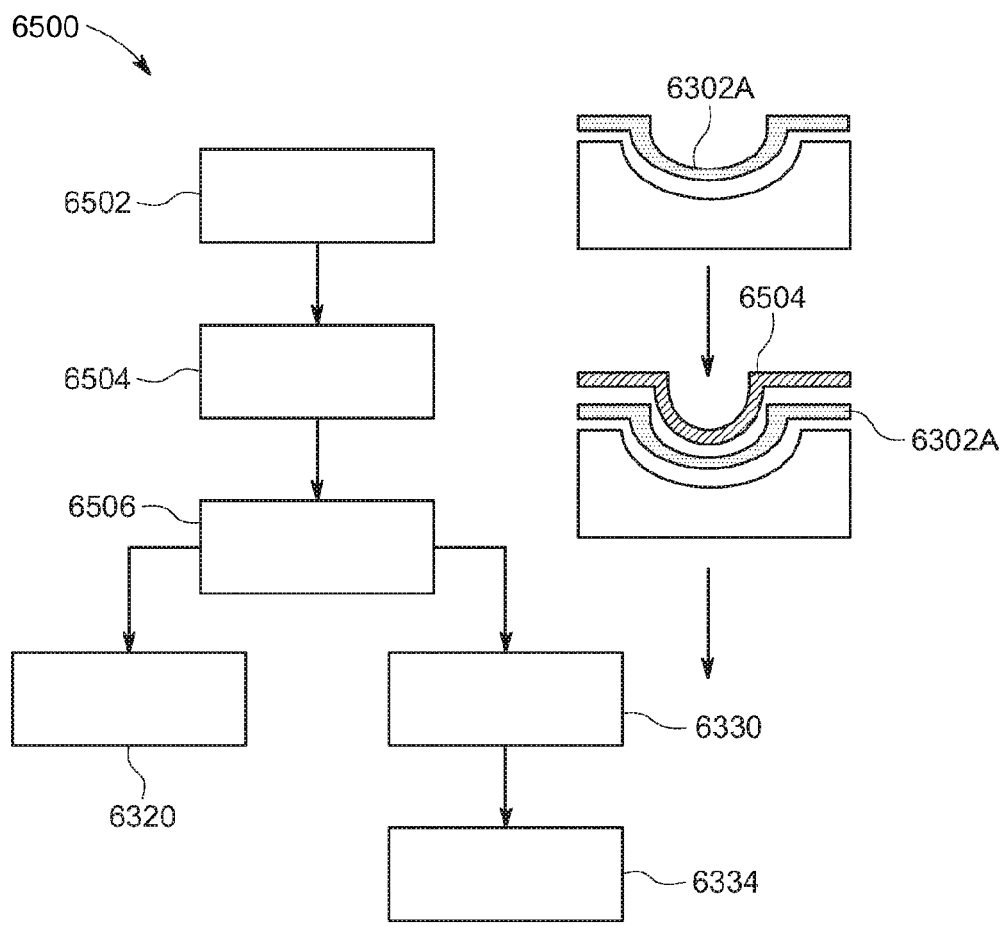

FIG. 74 shows further aspects of the method of FIG. 73 and components manufactured according to the method.

Figure 75:
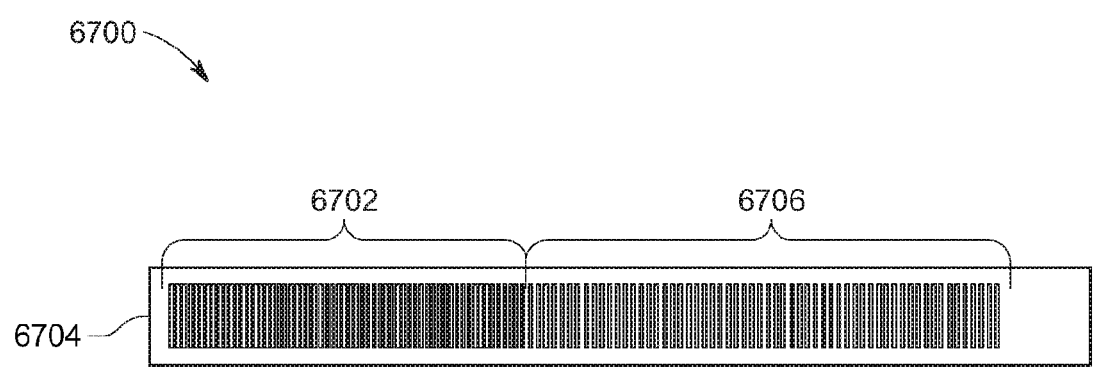

FIG. 75 shows a cross sectional view of a conduit according to one aspect of the technology.

Figure 76:
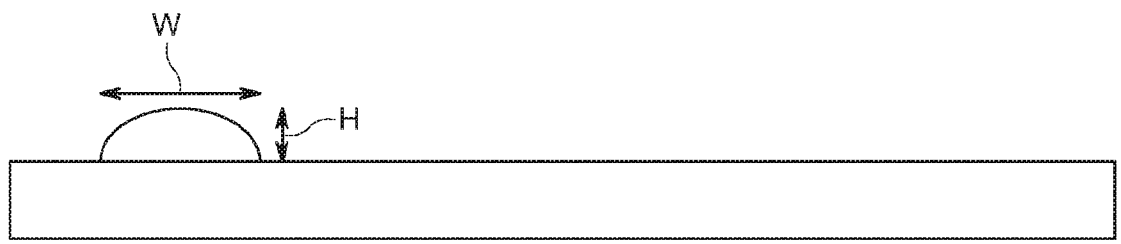

FIG. 76 shows a representative view of a resilient support element according to an aspect of the technology.

Figure 77:
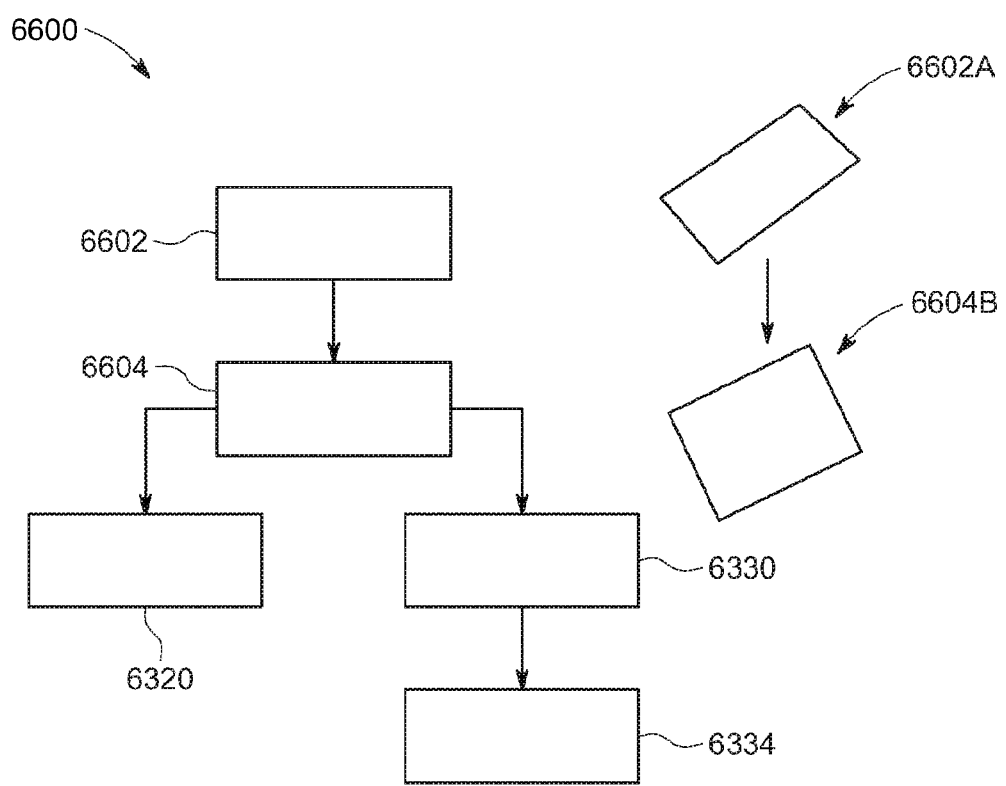

FIG. 77 shows representative steps in a method 6600 according to an aspect of the technology and components produced according to the method.

Figure 78:
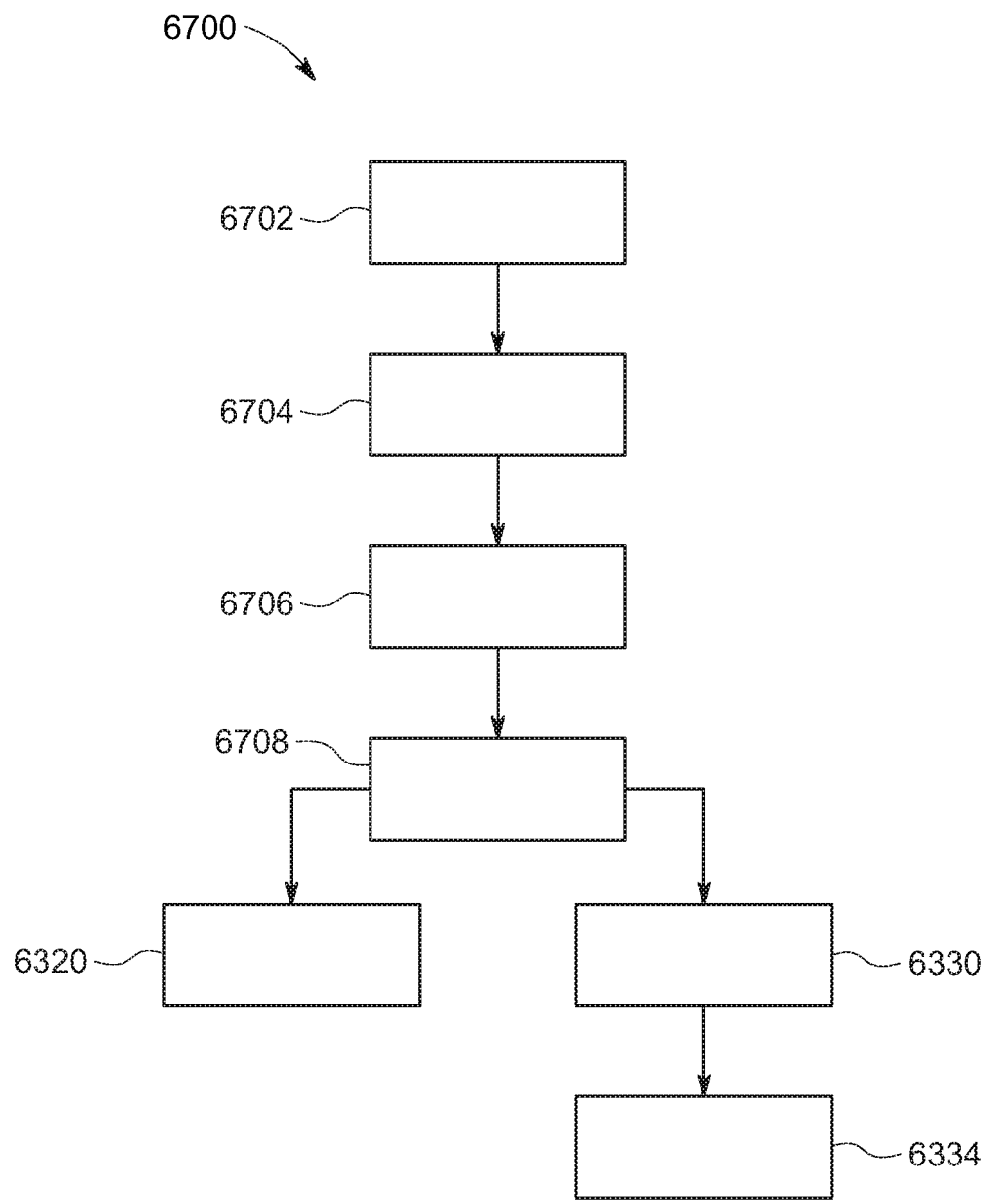

FIG. 78 shows representative steps in a method 6700 according to an aspect of the technology.

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

5.1 Therapy

In one form, the present technology comprises a method for treating a respiratory disorder comprising the step of applying positive pressure to the entrance of the airways of a patient 1000.

In certain examples of the present technology, a supply of air at positive pressure is provided to the nasal passages of the patient via one or both nares.

In certain examples of the present technology, mouth breathing is limited, restricted or prevented.

5.2 Treatment Systems

In one form, the present technology comprises an apparatus or device for treating a respiratory disorder. The apparatus or device may comprise an RPT device 4000 for supplying pressurised air to the patient 1000 via an air circuit 4170 to a patient interface 3000.

5.3 Patient Interface

A non-invasive patient interface 3000 in accordance with one aspect of the present technology comprises the following functional aspects: a seal-forming structure 3100, a plenum chamber 3200, a positioning and stabilising structure 3300, a vent 3400, one form of connection port 3600 for connection to air circuit 4170, and a forehead support 3700. In some forms a functional aspect may be provided by one or more physical components. In some forms, one physical component may provide one or more functional aspects. In use the seal-forming structure 3100 is arranged to surround an entrance to the airways of the patient so as to facilitate the supply of air at positive pressure to the airways.

If a patient interface is unable to comfortably deliver a minimum level of positive pressure to the airways, the patient interface may be unsuitable for respiratory pressure therapy.

The patient interface 3000 in accordance with one form of the present technology is constructed and arranged to be able to provide a supply of air at a positive pressure of at least 6 cmH$_2$O with respect to ambient.

The patient interface 3000 in accordance with one form of the present technology is constructed and arranged to be able to provide a supply of air at a positive pressure of at least 10 cmH$_2$O with respect to ambient.

The patient interface 3000 in accordance with one form of the present technology is constructed and arranged to be able to provide a supply of air at a positive pressure of at least 20 cmH$_2$O with respect to ambient.

5.3.1 Seal-Forming Structure

In one form of the present technology, a seal-forming structure 3100 provides a target seal-forming region, and may additionally provide a cushioning function. The target seal-forming region is a region on the seal-forming structure 3100 where sealing may occur. The region where sealing actually occurs—the actual sealing surface—may change within a given treatment session, from day to day, and from patient to patient, depending on a range of factors including for example, where the patient interface was placed on the face, tension in the positioning and stabilising structure and the shape of a patient's face.

In one form the target seal-forming region is located on an outside surface of the seal-forming structure 3100.

In certain forms of the present technology, the seal-forming structure 3100 is constructed from a biocompatible material, e.g. silicone rubber.

A seal-forming structure 3100 in accordance with the present technology may be constructed from a soft, flexible, resilient material such as silicone.

In certain forms of the present technology, a system is provided comprising more than one a seal-forming structure 3100, each being configured to correspond to a different size and/or shape range. For example the system may comprise one form of a seal-forming structure 3100 suitable for a large sized head, but not a small sized head and another suitable for a small sized head, but not a large sized head.

5.3.1.1 Sealing Mechanisms

In one form, the seal-forming structure includes a sealing flange utilizing a pressure assisted sealing mechanism. In use, the sealing flange can readily respond to a system positive pressure in the interior of the plenum chamber 3200 acting on its underside to urge it into tight sealing engagement with the face. The pressure assisted mechanism may act in conjunction with elastic tension in the positioning and stabilising structure.

In one form, the seal-forming structure 3100 comprises a sealing flange and a support flange. The sealing flange comprises a relatively thin member with a thickness of less than about 1 mm, for example about 0.25 mm to about 0.45 mm, which extends around the perimeter of the plenum chamber 3200. Support flange may be relatively thicker than the sealing flange. The support flange is disposed between the sealing flange and the marginal edge of the plenum chamber 3200, and extends at least part of the way around the perimeter. The support flange is or includes a spring-like element and functions to support the sealing flange from buckling in use.

In one form, the seal-forming structure may comprise a compression sealing portion or a gasket sealing portion. In use the compression sealing portion, or the gasket sealing portion is constructed and arranged to be in compression, e.g. as a result of elastic tension in the positioning and stabilising structure.

In one form, the seal-forming structure comprises a tension portion. In use, the tension portion is held in tension, e.g. by adjacent regions of the sealing flange.

In one form, the seal-forming structure comprises a region having a tacky or adhesive surface.

In certain forms of the present technology, a seal-forming structure may comprise one or more of a pressure-assisted sealing flange, a compression sealing portion, a gasket sealing portion, a tension portion, and a portion having a tacky or adhesive surface.

5.3.1.2 Nose Bridge or Nose Ridge Region

In one form, the non-invasive patient interface 3000 comprises a seal-forming structure that forms a seal in use on a nose bridge region or on a nose-ridge region of the patient's face.

In one form, the seal-forming structure includes a saddle-shaped region constructed to form a seal in use on a nose bridge region or on a nose-ridge region of the patient's face.

5.3.1.3 Upper Lip Region

In one form, the non-invasive patient interface 3000 comprises a seal-forming structure that forms a seal in use on an upper lip region (that is, the lip superior) of the patient's face.

In one form, the seal-forming structure includes a saddle-shaped region constructed to form a seal in use on an upper lip region of the patient's face.

5.3.1.4 Chin-Region

In one form the non-invasive patient interface 3000 comprises a seal-forming structure that forms a seal in use on a chin-region of the patient's face.

In one form, the seal-forming structure includes a saddle-shaped region constructed to form a seal in use on a chin-region of the patient's face.

5.3.1.5 Forehead Region

In one form, the seal-forming structure that forms a seal in use on a forehead region of the patient's face. In such a form, the plenum chamber may cover the eyes in use.

5.3.1.6 Nasal Pillows

In one form the seal-forming structure of the non-invasive patient interface 3000 comprises a pair of nasal puffs, or nasal pillows, each nasal puff or nasal pillow being constructed and arranged to form a seal with a respective naris of the nose of a patient.

Nasal pillows in accordance with an aspect of the present technology include: a frusto-cone, at least a portion of which forms a seal on an underside of the patient's nose, a stalk, a flexible region on the underside of the frusto-cone and connecting the frusto-cone to the stalk. In addition, the structure to which the nasal pillow of the present technology is connected includes a flexible region adjacent the base of the stalk. The flexible regions can act in concert to facilitate a universal joint structure that is accommodating of relative movement both displacement and angular of the frusto-cone and the structure to which the nasal pillow is connected. For example, the frusto-cone may be axially displaced towards the structure to which the stalk is connected.

5.3.2 Plenum Chamber

The plenum chamber 3200 has a perimeter that is shaped to be complementary to the surface contour of the face of an average person in the region where a seal will form in use. In use, a marginal edge of the plenum chamber 3200 is positioned in close proximity to an adjacent surface of the face. Actual contact with the face is provided by the seal-forming structure 3100. The seal-forming structure 3100 may extend in use about the entire perimeter of the plenum chamber 3200. In some forms, the plenum chamber 3200 and the seal-forming structure 3100 are formed from a single homogeneous piece of material.

In certain forms of the present technology, the plenum chamber 3200 does not cover the eyes of the patient in use. In other words, the eyes are outside the pressurised volume defined by the plenum chamber. Such forms tend to be less obtrusive and/or more comfortable for the wearer, which can improve compliance with therapy.

In certain forms of the present technology, the plenum chamber 3200 is constructed from a transparent material, e.g. a transparent polycarbonate. The use of a transparent material can reduce the obtrusiveness of the patient interface, and help improve compliance with therapy. The use of a transparent material can aid a clinician to observe how the patient interface is located and functioning.

In certain forms of the present technology, the plenum chamber 3200 is constructed from a translucent material. The use of a translucent material can reduce the obtrusiveness of the patient interface, and help improve compliance with therapy.

5.3.3 Positioning and Stabilising Structure

The seal-forming structure 3100 of the patient interface 3000 of the present technology may be held in sealing position in use by the positioning and stabilising structure 3300.

In one form the positioning and stabilising structure 3300 provides a retention force at least sufficient to overcome the effect of the positive pressure in the plenum chamber 3200 to lift off the face.

In one form the positioning and stabilising structure 3300 provides a retention force to overcome the effect of the gravitational force on the patient interface 3000.

In one form the positioning and stabilising structure 3300 provides a retention force as a safety margin to overcome the potential effect of disrupting forces on the patient interface 3000, such as from tube drag, or accidental interference with the patient interface.

In one form of the present technology, a positioning and stabilising structure 3300 is provided that is configured in a manner consistent with being worn by a patient while sleeping. In one example the positioning and stabilising structure 3300 has a low profile, or cross-sectional thickness, to reduce the perceived or actual bulk of the apparatus. In one example, the positioning and stabilising structure 3300 comprises at least one strap having a rectangular cross-section. In one example the positioning and stabilising structure 3300 comprises at least one flat strap.

In one form of the present technology, a positioning and stabilising structure 3300 is provided that is configured so as not to be too large and bulky to prevent the patient from lying in a supine sleeping position with a back region of the patient's head on a pillow.

In one form of the present technology, a positioning and stabilising structure 3300 is provided that is configured so as not to be too large and bulky to prevent the patient from lying in a side sleeping position with a side region of the patient's head on a pillow.

In one form of the present technology, a positioning and stabilising structure 3300 is provided with a decoupling portion located between an anterior portion of the positioning and stabilising structure 3300, and a posterior portion of the positioning and stabilising structure 3300. The decoupling portion does not resist compression and may be, e.g. a flexible or floppy strap. The decoupling portion is constructed and arranged so that when the patient lies with their head on a pillow, the presence of the decoupling portion prevents a force on the posterior portion from being transmitted along the positioning and stabilising structure 3300 and disrupting the seal.

In one form of the present technology, a positioning and stabilising structure 3300 comprises a strap constructed from a laminate of a fabric patient-contacting layer, a foam inner layer and a fabric outer layer. In one form, the foam is porous to allow moisture, (e.g., sweat), to pass through the strap. In one form, the fabric outer layer comprises loop material to engage with a hook material portion.

In certain forms of the present technology, a positioning and stabilising structure 3300 comprises a strap that is extensible, e.g. resiliently extensible. For example the strap may be configured in use to be in tension, and to direct a force to draw a seal-forming structure into sealing contact with a portion of a patient's face. In an example the strap may be configured as a tie.

In one form of the present technology, the positioning and stabilising structure comprises a first tie, the first tie being constructed and arranged so that in use at least a portion of an inferior edge thereof passes superior to an otobasion superior of the patient's head and overlays a portion of a parietal bone without overlaying the occipital bone.

In one form of the present technology suitable for a nasal-only mask or for a full-face mask, the positioning and stabilising structure includes a second tie, the second tie being constructed and arranged so that in use at least a portion of a superior edge thereof passes inferior to an otobasion inferior of the patient's head and overlays or lies inferior to the occipital bone of the patient's head.

In one form of the present technology suitable for a nasal-only mask or for a full-face mask, the positioning and stabilising structure includes a third tie that is constructed and arranged to interconnect the first tie and the second tie to reduce a tendency of the first tie and the second tie to move apart from one another.

In certain forms of the present technology, a positioning and stabilising structure 3300 comprises a strap that is bendable and e.g. non-rigid. An advantage of this aspect is that the strap is more comfortable for a patient to lie upon while the patient is sleeping.

In certain forms of the present technology, a positioning and stabilising structure 3300 comprises a strap constructed to be breathable to allow moisture vapour to be transmitted through the strap.

In certain forms of the present technology, a system is provided comprising more than one positioning and stabilizing structure 3300, each being configured to provide a retaining force to correspond to a different size and/or shape range. For example the system may comprise one form of positioning and stabilizing structure 3300 suitable for a large sized head, but not a small sized head, and another. suitable for a small sized head, but not a large sized head.

5.3.3.1 Positioning and Stabilising System with Conduit Headgear

FIGS. 66-1 to 66-3, and more particularly FIG. 66-3, show a patient interface 3000 comprising a plenum chamber 3200. The patient interface 3000 in this example also comprises a positioning and stabilising structure 3300 to hold the plenum chamber 3200 in sealing position on the patient's face in use. The positioning and stabilising structure 3300 in this example comprises a pair of headgear tubes 3340. The pair of headgear tubes 3340 are connected to each other at their superior ends and are each configured to lie against superior and lateral surfaces of the patient's head in use. Each of the headgear tubes 3340 may be configured to lie between an eye and an ear of the patient in use. The inferior end of each headgear tube 3340 is configured to fluidly connect to the plenum chamber 3200. In this example, the inferior end of each headgear tube 3340 connects to a headgear tube connector 3344. The headgear tube connector 3344 may be permanently or releasably connected to a headgear connector 3246 configured to connect to an inlet port 3240 of the plenum chamber 3200. The positioning and stabilising structure 3300 comprises a conduit headgear inlet 3390 at the junction of the two headgear tubes 3340. The conduit headgear inlet 3390 is configured to receive a pressurised flow of gas, for example via an elbow comprising a connection port 3600, and allow the flow of gas into hollow interiors of the headgear tubes 3340. The headgear tubes 3340 supply the pressurised flow of gas to the plenum chamber 3200.

The positioning and stabilising structure 3300 may comprise one or more straps in addition to the headgear tubes 3340. In this example the positioning and stabilising structure 3300 comprises a pair of upper straps 3310 and a pair of lower straps 3320. The posterior ends of the upper straps 3310 and lower straps 3320 are joined together. The junction between the upper straps 3310 and lower strap 3320 is configured to lie against a posterior surface of the patient's head in use, providing an anchor for the upper strap 3310 and lower straps 3320. Anterior ends of the upper straps 3310 connect to the headgear tubes 3340. In this example each headgear tube 3340 comprises a tab 3342 having an opening through which a respective upper strap 3310 can be passed through and then looped back and secured onto itself to secure the upper headgear strap 3310 to the headgear tube 3340. The positioning and stabilising structure 3300 also comprises a lower strap clip 3326 provided to the anterior end of each of the lower straps 3320. Each of the lower strap clip 3326 is configured to connect to a lower connection point 3325 on the plenum chamber 3200—in the example of FIG. 61-1 to 61-3, the lower connection point 3325 is provided on the headgear connector 3246. In this example, the lower strap clips 3326 are secured magnetically to the lower connection points 3325. In some examples, there is also a mechanical engagement between the lower strap clips 3326 and the lower connection points 3325.

The headgear tube connectors 3344 may be configured to allow the patient to breathe ambient air in the absence of pressure within the plenum chamber 3200. Each headgear tube connector 3344 may comprise an anti-asphyxia valve (AAV). The AAV in each headgear tube connector 3344 may be configured to open in the absence of pressure within the plenum chamber 3200 in order to allow a flow of air between the interior of the plenum chamber 3200 and ambient. Each AAV may be biased into a configurations which blocks the flow of air from the interior of the plenum chamber 3200 into a respective headgear tube 3340 but allows for the exchange of air between the plenum chamber 3200 and ambient. When the headgear tubes 3340 are pressurised the AAV in each headgear tube connector 3344 may prevent the exchange of air between the interior of the plenum chamber 3200 and ambient but allow for a flow of air from the respective headgear tube 3340 into the plenum chamber 3204 breathing by the patient.

The examples shown in FIG. 66-1 to 66-3 have a common support base for the upper and lower headgear connectors. That is, on each side of the plenum chamber 3200, the upper headgear strap 3310 (or headgear tube 3340) and the lower headgear strap 3320 both connect to a common rigid connector. However, in some examples the plenum chamber 3200 may have separated upper and lower headgear connectors. It is envisaged that differences in tension between the upper headgear straps and the lower headgear straps influence deformation of the plenum chamber 3200, and behaviour of the seal-forming structure 3100. Separate upper and lower headgear connections (i.e. upper and lower headgear connections that are able to move relative to one another when the cushion flexes) may allow some bending about the horizontal axis to assist with achieving a suitable fit with a wider range of patients, while also allowing that bending to be adjustable to further improve the fit range and the extent to which the patient interface 3000 may be adjusted to achieve a more comfortable and effective fit. As discussed in relation to the headgear supports 3302, separated headgear connectors may be used to assist with providing at least a part of requisite rigidity to the fascia portion 3210.

Referring now to FIGS. 67-1 to 67-3 which show a preferred example of a headgear tube 3500 according to an aspect of the present technology. The headgear tube 3500 can be manufactured using a method as described herein, or any other suitable method. It should be understood that the headgear tube 3500 can be used in place of the headgear tube 3340 described herein. Alternatively, the headgear tube 3500 may be configured for use with alternate patient interfaces, and alternatively or additionally sold as a separate component.

The headgear tube 3500 has a non-circular cross section defined by a patient contacting portion 3502 and a non-contacting portion 3504.

The patient contacting portion 3502 is formed from at least one layer of material which in use contacts a surface of a patient's skin. The at least one layer of material is therefore preferably at least one of biocompatible, soft and flexible.

The patient contacting portion 3502 may be a multilayer structure e.g. it has at least two layers. The additional layer(s) may be one or more of a gas impermeable layer, a layer of foam and a second textile layer. For instance, FIG. 67-4 shows a cross sectional-view of the headgear tube 3340 in a plane substantially perpendicular to the length of the headgear tube 3340. The patient contacting portion 3502 may be formed of a foam laminate, having an outer layer of textile material 3514 that in use comes into contact with the patient's skin, a distal layer 3516 e.g. a textile or plastics material, and a layer of foam 3518 in between the outer layer 3514 and the distal layer 3516. At least one of the foam layer 3518, outer layer 3514 and the distal layer 3516 may be gas impermeable or coated with a gas impermeable material. It should also be appreciated that the patient contacting portion 3502 may be a coated textile material manufactured according to a method described herein, and therefore comprises only a layer of textile material and a layer of a gas impermeable material e.g. a polyurethane (PU) glue.

The non-contacting portion 3504 includes at least one layer of textile material 3510 and at least one resilient support element 3506. In the illustrated embodiment, the non-contacting portion 3504 includes a plurality of resilient support elements 3506 which are each spaced apart from each other along the length of the headgear tube 3500.

The resilient support elements 3506 are formed from a resilient material, preferably using a method as described herein.

The resilient support elements 3506 are constructed and arranged to resist, or substantially prevent, obstruction of the headgear tube 3500 in use. For instance, the resilient support elements 3506 provide resistance to the non-contacting portion 3504 collapsing onto the patient contacting portion 3502 if force is applied to the headgear tube 3500 e.g. a patient rolls onto the headgear tube 3500 or it is otherwise occluded.

The provision of resilient support elements 3506 may be beneficial for providing respiratory treatment to a patient.

For instance, the resilient support elements 3506 are able to bend and flex in response to forces applied to the headgear tube 3500. This may reduce or eliminate pressure into the surfaces of a patient with which the headgear tube 3500 is in contact, whereas use of a rigid support element or ring in the headgear tube 3500 may be more uncomfortable for the patient.

Furthermore, the resilient support elements 3506 may be more cost effective, easier or faster to manufacture than previously available structures for headgear tubes used in conduit headgear.

As shown in FIG. 67-4, the non-contacting portion may be a multi-layer structure having an outer layer 3510 and at least one other layer of material 3512 attached thereto. The outer layer 3510 may be a textile material manufactured as described herein. In such embodiments, the inner layer 3512 can be a layer of textile material, a layer of moulded or extruded material e.g. plastics, or a layer of other material e.g. a polyurethane (PU) glue. Resilient support elements 3506 are provided to the non-contacting portion 3504 e.g. on an inner surface of the headgear tube 3500.

The headgear tube 3500 may be provided with other components e.g. headgear connectors 3246, a conduit inlet 3390 or tab 3342 as described above with reference to the headgear tube 3450.

Further aspects of the headgear tube 3506 according to the present technology should become clearer from the discussion of its methods of manufacture described herein.

5.3.4 Vent

In one form, the patient interface 3000 includes a vent 3400 constructed and arranged to allow for the washout of exhaled gases, e.g. carbon dioxide.

In certain forms the vent 3400 is configured to allow a continuous vent flow from an interior of the plenum chamber 3200 to ambient whilst the pressure within the plenum chamber is positive with respect to ambient. The vent 3400 is configured such that the vent flow rate has a magnitude sufficient to reduce rebreathing of exhaled $CO_2$ by the patient while maintaining the therapeutic pressure in the plenum chamber in use.

One form of vent 3400 in accordance with the present technology comprises a plurality of holes, for example, about 20 to about 80 holes, or about 40 to about 60 holes, or about 45 to about 55 holes.

The vent 3400 may be located in the plenum chamber 3200. Alternatively, the vent 3400 is located in a decoupling structure, e.g., a swivel.

5.3.5 Decoupling Structure(s)

In one form the patient interface 3000 includes at least one decoupling structure, for example, a swivel or a ball and socket.

5.3.6 Connection Port

Connection port 3600 allows for connection to the air circuit 4170.

5.3.7 Forehead Support

In one form, the patient interface 3000 includes a forehead support 3700.

5.3.8 Anti-Asphyxia Valve

In one form, the patient interface 3000 includes an anti-asphyxia valve.

5.3.9 Ports

In one form of the present technology, a patient interface 3000 includes one or more ports that allow access to the volume within the plenum chamber 3200. In one form this allows a clinician to supply supplemental oxygen. In one form, this allows for the direct measurement of a property of gases within the plenum chamber 3200, such as the pressure.

5.4 RPT Device

An RPT device 4000 in accordance with one aspect of the present technology comprises mechanical, pneumatic, and/or electrical components and is configured to execute one or more algorithms 4300, such as any of the methods, in whole or in part, described herein. The RPT device 4000 may be configured to generate a flow of air for delivery to a patient's airways, such as to treat one or more of the respiratory conditions described elsewhere in the present document.

In one form, the RPT device 4000 is constructed and arranged to be capable of delivering a flow of air in a range of −20 L/min to +150 L/min while maintaining a positive pressure of at least 6 $cmH_2O$, or at least 10$cmH_2O$, or at least 20 $cmH_2O$.

The RPT device may have an external housing 4010, formed in two parts, an upper portion 4012 and a lower portion 4014. Furthermore, the external housing 4010 may include one or more panel(s) 4015. The RPT device 4000 comprises a chassis 4016 that supports one or more internal components of the RPT device 4000. The RPT device 4000 may include a handle 4018.

The pneumatic path of the RPT device 4000 may comprise one or more air path items, e.g., an inlet air filter 4112, an inlet muffler 4122, a pressure generator 4140 capable of supplying air at positive pressure (e.g., a blower 4142), an outlet muffler 4124 and one or more transducers 4270, such as pressure sensors 4272 and flow rate sensors 4274.

One or more of the air path items may be located within a removable unitary structure which will be referred to as a pneumatic block 4020. The pneumatic block 4020 may be located within the external housing 4010. In one form a pneumatic block 4020 is supported by, or formed as part of the chassis 4016.

The RPT device 4000 may have an electrical power supply 4210, one or more input devices 4220, a central controller 4230, a therapy device controller 4240, a pressure generator 4140, one or more protection circuits 4250, memory 4260, transducers 4270, data communication interface 4280 and one or more output devices. Electrical components 4200 may be mounted on a single Printed Circuit Board Assembly (PCBA) 4202. In an alternative form, the RPT device 4000 may include more than one PCBA 4202.

5.4.1 RPT Device Mechanical & Pneumatic Components

An RPT device may comprise one or more of the following components in an integral unit. In an alternative form, one or more of the following components may be located as respective separate units.

5.4.1.1 Air Filter(s)

An RPT device in accordance with one form of the present technology may include an air filter 4110, or a plurality of air filters 4110.

In one form, an inlet air filter 4112 is located at the beginning of the pneumatic path upstream of a pressure generator 4140.

In one form, an outlet air filter 4114, for example an antibacterial filter, is located between an outlet of the pneumatic block 4020 and a patient interface 3000.

5.4.1.2 Muffler(s)

An RPT device in accordance with one form of the present technology may include a muffler 4120, or a plurality of mufflers 4120.

In one form of the present technology, an inlet muffler 4122 is located in the pneumatic path upstream of a pressure generator 4140.

In one form of the present technology, an outlet muffler 4124 is located in the pneumatic path between the pressure generator 4140 and a patient interface 3000.

5.4.1.3 Pressure Generator

In one form of the present technology, a pressure generator 4140 for producing a flow, or a supply, of air at positive pressure is a controllable blower 4142. For example the blower 4142 may include a brushless DC motor 4144 with one or more impellers. The impellers may be located in a volute. The blower may be capable of delivering a supply of air, for example at a rate of up to about 120 litres/minute, at a positive pressure in a range from about 4 $cmH_2O$ to about 20 $cmH_2O$, or in other forms up to about 30 $cmH_2O$. The blower may be as described in any one of the following patents or patent applications the contents of which are incorporated herein by reference in their entirety: U.S. Pat. Nos. 7,866,944; 8,638,014; 8,636,479; and PCT Patent Application Publication No. WO 2013/020167.

The pressure generator 4140 is under the control of the therapy device controller 4240.

In other forms, a pressure generator 4140 may be a piston-driven pump, a pressure regulator connected to a high pressure source (e.g. compressed air reservoir), or a bellows.

5.4.1.4 Transducer(s)

Transducers may be internal of the RPT device, or external of the RPT device. External transducers may be located for example on or form part of the air circuit, e.g., the patient interface. External transducers may be in the form of non-contact sensors such as a Doppler radar movement sensor that transmit or transfer data to the RPT device.

In one form of the present technology, one or more transducers 4270 are located upstream and/or downstream of the pressure generator 4140. The one or more transducers 4270 may be constructed and arranged to generate signals representing properties of the flow of air such as a flow rate, a pressure or a temperature at that point in the pneumatic path.

In one form of the present technology, one or more transducers 4270 may be located proximate to the patient interface 3000.

In one form, a signal from a transducer 4270 may be filtered, such as by low-pass, high-pass or band-pass filtering.

5.4.1.5 Anti-Spill Back Valve

In one form of the present technology, an anti-spill back valve 4160 is located between the humidifier 5000 and the pneumatic block 4020. The anti-spill back valve is constructed and arranged to reduce the risk that water will flow upstream from the humidifier 5000, for example to the motor 4144.

5.4.2 RPT Device Electrical Components

5.4.2.1 Power Supply

A power supply 4210 may be located internal or external of the external housing 4010 of the RPT device 4000.

In one form of the present technology, power supply 4210 provides electrical power to the RPT device 4000 only. In another form of the present technology, power supply 4210 provides electrical power to both RPT device 4000 and humidifier 5000.

5.4.2.2 Input Devices

In one form of the present technology, an RPT device 4000 includes one or more input devices 4220 in the form of buttons, switches or dials to allow a person to interact with the device. The buttons, switches or dials may be physical devices, or software devices accessible via a touch screen. The buttons, switches or dials may, in one form, be physically connected to the external housing 4010, or may, in another form, be in wireless communication with a receiver that is in electrical connection to the central controller 4230.

In one form, the input device 4220 may be constructed and arranged to allow a person to select a value and/or a menu option.

5.4.2.3 Central Controller

In one form of the present technology, the central controller 4230 is one or a plurality of processors suitable to control an RPT device 4000.

Suitable processors may include an x86 INTEL processor, a processor based on ARM® Cortex®-M processor from ARM Holdings such as an STM32 series microcontroller from ST MICROELECTRONIC. In certain alternative forms of the present technology, a 32-bit RISC CPU, such as an STR9 series microcontroller from ST MICROELECTRONICS or a 16-bit RISC CPU such as a processor from the MSP430 family of microcontrollers, manufactured by TEXAS INSTRUMENTS may also be suitable.

In one form of the present technology, the central controller 4230 is a dedicated electronic circuit.

In one form, the central controller 4230 is an application-specific integrated circuit. In another form, the central controller 4230 comprises discrete electronic components.

The central controller 4230 may be configured to receive input signal(s) from one or more transducers 4270, one or more input devices 4220, and the humidifier 5000.

5.5 Air Circuit

An air circuit 4170 in accordance with an aspect of the present technology is a conduit or a tube constructed and arranged to allow, in use, a flow of air to travel between two components such as RPT device 4000 and the patient interface 3000.

In particular, the air circuit 4170 may be in fluid connection with the outlet of the pneumatic block 4020 and the patient interface. The air circuit may be referred to as an air delivery tube or air delivery conduit. In some cases there may be separate limbs of the circuit for inhalation and exhalation. In other cases a single limb may be used.

In some forms, the air circuit 4170 may comprise one or more heating elements configured to heat air in the air circuit, for example to maintain or raise the temperature of the air. The heating element may be in a form of a heated wire circuit, and may comprise one or more transducers, such as temperature sensors. In one form, the heated wire circuit may be helically wound around the axis of the air circuit 4170. The heating element may be in communication with a controller such as a central controller 4230. One example of an air circuit 4170 comprising a heated wire circuit is described in U.S. Pat. No. 8,733,349, which is incorporated herewithin in its entirety by reference.

Some existing air delivery conduits for respiratory pressure therapy comprise corrugated plastic tubes that may have a hard feel against the skin. Some existing conduits comprise plastic corrugated tubing formed by a helical plastic support structure and a plastic tape. Some tubes comprising a textile covering may lack a degree of flexibility available with the plastic corrugated tubes or may lack sufficient flexibility while also being crush resistant.

An air delivery conduit with a soft and comfortable feel may be desired by the patient. For example, the patient may find it easier to sleep with an air delivery conduit that has a soft outer covering that is comfortable to touch. The patient may be more likely to comply with therapy if the patient considers the treatment apparatus to be comfortable and desirable. A flexible tube for providing an air flow path between a respiratory pressure therapy device and the patient interface, provided with a textile surface, but with good air-holding properties and also of light weight construction, may provide the required functions for treatment as well as being comfortable and having aesthetic and consumer appeal.

In examples of the present technology, there is provided a light weight flexible tube comprising a skeletal structure bonded to an air impermeable covering. The covering may comprise a textile material. The skeletal structure may comprise an array of ring members spaced apart along the tube. An air impermeable fabric may envelope and be bonded to the skeletal structure, forming a hollow interior through which gas can be conveyed. The air impermeable covering of the tube may be a laminate material comprising a flexible and/or stretchable textile material provided with an air impermeable film or other layer to enable pressurised air flow without significant bleed through or leakage. Sealing tape may be used to seal the joint internally where the laminate overlaps with itself, isolating the textile layer from the air path. This may provide for air delivery conduit that is sealed effectively yet is low-cost, easy to manufacture and which is appealing to the user.

FIG. 7A illustrates part of an exemplary air delivery conduit (or air delivery tube) 4300 of the air circuit 4170. FIG. 7B shows a cross-section view of the air delivery conduit 4300 shown in FIG. 7A. In examples of the present technology, the air delivery conduit 4300 is or forms part of an air circuit 4170. The air delivery conduit 4300 is configured to provide/convey a flow of air under pressure from an RPT device 4000 to a patient interface 3000 for providing respiratory pressure therapy to a patient.

The air delivery conduit 4300 comprises a reinforcing (or skeletal) structure 4305. The reinforcing structure 4300 provides form to the air delivery conduit 4300 and resists occlusion and/or the crushing of the air delivery conduit 4300, for example under a force tending to crush the air delivery conduit 4300. The air delivery conduit 4300 may be both crush resistant and flexible. The reinforcing structure 4305 may comprise a single continuous structure or may comprise a plurality of discrete structures. The reinforcing structure 4305 may be elongate. The reinforcing structure 4305 may be flexible, for example to allow the air delivery conduit 4300 to bend. The reinforcing structure 4305 may be configured to resist a crushing force applied to the air delivery conduit 4300. The longitudinal length of the reinforcing structure 4305 and/or the resulting air delivery conduit 4300 may be adjustable.

As shown in FIG. 7B, the reinforcing structure 4305 comprises a plurality (or array) of support structures 4310. The support structures 4310 may be ring members, tubular members, hollow member, semi-enclosed member, or any other type of structure that may form a boundary for a gas flow path while also providing structural support. The distance between the support structures 4310 may be the same or may vary along the length of the air delivery conduit 4300. In addition, each support structure 4310 may be a fully enclosed ring, C-shaped (or semi-enclosed member), rectangular, or any other shape that can maintain an unobstructed flow path through the air delivery conduit 4300.

In the example illustrated in FIG. 7B the reinforcing structure 4305 comprises a plurality of discrete/separate support structures 4310. The support structures 4310 may be separated from each other, rather than connected to each other. Each support structure 4310 is a distinct unitary structure rather than a portion of a larger unitary. The support structures 4310 in this example are not connected to one another other than by a covering 4340. However, the support structures 4310 together form a reinforcing structure 4305 of the air delivery conduit 4300. Each support structure 4310 is not joined to adjacent support structures 4310 within the reinforcing structure 4305, although may be joined to adjacent support structures 4310 by a covering 4340.

In other examples, the reinforcing structure 4305 comprises one or more helical rib members or another skeletal structure. In one example, the helical rib may be a heating element (or wire) 4307 wrapped helically around the air delivery conduit 4300 (see FIG. 7C). Alternatively, the helical rib may be a separate component from the heating element 4307. If not in helical form, the heating element 4307 may extend lengthwise along a wall of the air delivery conduit 4300. It should be understood that the heating element 4307 is optional and may be omitted from the air delivery conduit 4300.

The air delivery conduit 4300 also comprises an air impermeable covering 4340. The covering 4340 is provided to the reinforcing structure 4305 along the length of the air delivery conduit 4300. The covering 4340 forms a sealed air path (or lumen) through which the flow of air is able to be conveyed by the air delivery conduit 4300 to a patient interface 3000. In some examples, the covering 4340 comprises an outer surface formed by a textile material. In other examples, the covering 4340 comprises a plastic material (e.g. a thermoplastic material) such as a plastic tape wrapped or wound around the reinforcing structure 4305. In some examples, the covering 4340 comprises a sealing layer laminated to or otherwise bonded to an outer textile layer. The covering 4340 may comprise a textile sheet, being a sheet comprising textile material and optionally additional material to make the textile sheet air impermeable. In some examples the covering 4340 comprises a textile layer comprising a textile material and may also comprise a sealing layer. The textile sheet may therefore comprise a laminate structure. In some examples, one of more layers of the textile sheet may comprise a laminate construction. For example, the textile sheet may comprise a textile layer and a sealing layer, the sealing layer comprising a laminate formed from multiple layers, such as two layers of material.

The covering 4340 in some examples comprises nylon, polyester, spandex or combinations thereof. In some examples, parts of the air delivery conduit 4300 comprise a covering 4340 formed from a polymer or elastomeric film and in other parts of the air delivery conduit 4300 the covering 4340 is formed from a textile material. In some examples, the covering 4340 may comprise more than one fabric material to provide localised features or functions, including for visual appeal. In some examples, the covering 4340 comprises a region being softer than adjacent regions. In some examples, the covering 4340 comprises a transparent region. A transparent region may enable the user to inspect the inside of the tube for cleanliness.

The air delivery conduit 4300 may comprise a layer of textile material and layer of a substantially air impermeable material, such as a TPU film. The air impermeable film may interface with the layer of textile material and structural rings. In some examples, a sealing layer isolates the textile material from air path at a longitudinal edge of an outer textile layer, when the outer textile layer is wrapped around the reinforcing structure. The sealing layer in some examples comprises a sealing strip and in other examples is a sheet laminated to an outer sheet of the covering. The covering 4340 in some examples comprises a textile and film laminate, which comprises a layer of textile material and a layer of air impermeable film (which may be TPU, for example). The air impermeable film may interface between the layer of textile material and the support structures 4310 (or other reinforcing structure 4305), creating a barrier to air transfer between the textile material and the sealed air path within the tube. In some examples of the present technology, an air delivery conduit 4300 having a textile covering 4340 may be coated with silicone or a similar material (e.g. TPE) to achieve air impermeability.

The air delivery conduit 4300 may comprise a short tube attached to a patient interface. Alternatively, the air delivery conduit 4300 may comprise a long tube configured to connect a flow generator to a patient interface or a flow generator to a short tube of a patient interface.

An air delivery conduit 4300 comprising an outer surface formed from a textile material may have a soft, warm feel to it in contrast to a cold, hard feel of some existing plastic tubes. Patient's may be more likely to comply with therapy when their equipment is comfortable and desirable. A textile tube may look less like medical equipment and more like bedclothes. A textile tube may also be quieter than a plastic tube when rubbing over a surface. A textile tube may also be lighter per unit length than a plastic tube, meaning tube drag may be lower. Additionally, a wider variety of tube cross sections, e.g. a low-profile cross section such as an ellipse, may be achievable with textile tubes.

5.5.1 Support Structures

As shown in FIG. 7B, the air delivery conduit 4300 comprises a plurality of support structures 4310. The geometry of the support structures 4310 may be optimised for mass production while providing for an air delivery conduit 4300 with good flow characteristics and structural strength with a low weight. The geometry of the support structures 4310 may also provide for low noise levels in use. The geometry of the ring members may be selected to provide for a range of tube cross sections with equivalent air flow and impedance.

In some examples, the support structures 4310 may be ring members. The support structures 4310 may be rings or substantially ring-shaped components. In other examples the support structure 4310 may have other shapes.

The support structures 4310 may comprise cross-sectional shapes and spacing that provides low impedance and low noise levels. Each support structure 4310 may comprise an outer surface profiled to ensure good bonding to the covering 4340 and ensure a low risk of rupturing the covering 4340 in use or during manufacturing. The inner surface of each support structure 4310 may be profiled to prevent turbulent flow, reduced impedance, and/or excessive noise. The inner and/or outer profiles of the support structure 4310 may comprise curved portions. The support structures 4310 may comprise different shapes (e.g. circular, elliptical, etc.) to provide different overall tube cross sections.

As will be described in more detail below, for example with reference to FIG. 8, a support structure 4310 may comprise an outer surface 4312a configured to be attached to the covering 4340 by way of, for example, bonding, adhesion, sewing, knitting, or any other method of attachment. The outer surface 4312a of each support structure 4310 may be profiled (e.g. shaped) to ensure sufficient bonding to the covering 4340 (e.g., minimal or no peeling) and reduce the risk of rupturing the covering 4340 in use or during manufacturing. The shape or profile of the outer surface may be an outer shape or outer profile 4312 of the support structure 4310.

The support structure 4310 may also comprise an inner surface 4313a opposing the outer surface 4312a. The inner surface 4313a may be directly exposed to the flow of pressurized gas flowing through the air delivery conduit 4300. Alternatively, an air impermeable film or layer may be attached to the inner surface 4313a by way of, for example, bonding, adhesion, sewing, knitting, or any other method of attachment. The inner surface 4313a of each support structure 4310 may be profiled (e.g. shaped) to prevent turbulent flow, reduce impedance, and reduce noise kinetic generation. The shape or profile of the inner surface 4313a may be an inner shape or inner profile 4313 of the support structure 4310.

The outer profile 4312, outer surface 4312a, inner profile 4313 and inner surface 4313a of a support structure 4310 are described in greater detail below.

A support structure 4310, for example a ring member, may comprise a pair of intermediate faces 4314 connecting the outer surface 4312a to the inner surface 4313a. That is, a pair of intermediate faces 4314 may extend from the outer surface 4312a to the inner surface 4313a. In addition, edges connecting the intermediate faces 4314 to the outer surface 4312a may be filleted (e.g. curved, rounded or the like). Similarly, the edges connecting the intermediate faces 4314 to the inner surface 4313a may also be filleted (e.g. curved, rounded or the like). The support structure 4310 may comprise a cross section having rounded corners, such as outer rounded corners connecting the outer surface 4312a and the intermediate faces 4314.

The support structures 4310 may be substantially rigid or semi rigid. In examples, the support structures 4310 may be formed from polycarbonate, nylon, PEEK, polyester, NORYL, and the like, or copolymers or blends such as PETG, polycarbonate-ABS, nylon-polyurethane etc. The support structures 4310 may be formed from a material that is stiff, tough and/or resilient. In some examples the support structures 4310 are formed from plastic or elastomeric materials. The support structures 4310 may be formed from a material having a softening temperature above 80° C. The support structures 4310 may be formed from materials which bond well to an air impermeable material, such as a plastic film, for example a thermoplastic polyurethane (TPU) film. In some examples, the support structures 4310 may comprise surfaces having finishes, moulded patterns, structures and/or other treatment aid or enhance bonding of the support structures 4310 with an air impermeable material. Such treatments may be mechanical (e.g. roughening/sanding) or surface energy modification (e.g. plasma/corona/flame) or chemical (e.g. adhesive/primer) or the like.

In some examples of the present technology, the support structures 4310 are formed from an elastomer, e.g. an elastomeric material. The support structures 4310 may be formed from silicone or TPE, in examples. Support structure 4310 formed from elastomeric material may comprise a sufficient stiffness to resist a crushing force applied to the air delivery conduit 4300. Additionally, the support structures 4310 may be flexible and resilient such that the air delivery conduit 4300 is comfortable to the touch. Support structures 4310 formed from silicone may comprise a durometer hardness high enough that the support structure 4310 have sufficient stiffness to resist occlusion of the air delivery conduit 4300 in use. Correspondingly, support structures 4310 formed from TPE may be cured such that the support structures 4310 are stiff enough to maintain an open air path within the air delivery conduit 4300 upon occluding forces.

FIG. 8 shows the shape of a support structure 4310 of an air delivery conduit 4300 according to one example of the present technology. In this example, the support structure 4310 is formed in the shape of a ring and may be considered a ring member.

The support structure 4310 comprises a circular outer profile 4312. A support structure 4310 with a circular outer profile 4312 facilitates an air delivery conduit 4300 that itself comprises a circular outer profile or overall circular cross-section. In this example the support structure 4310 comprises a non-circular inner profile 4313. In particular, the inner profile 4313 is elliptical.

The support structure 4310 shown in FIG. 8 comprises a pair of thickened portions 4315. The thickened portions 4315 are provided on opposing sides of the support structure 4310. The thickened portions 4315 advantageously provide the support structure 4310 with more strength than the support structure 4310 would have if it had a uniform thickness.

The support structure 4310 may be injection moulded. The support structure 4310 comprises a gate location 4316 and an overflow location 4317 for moulding of the support structure 4310. Advantageously, the gate location 4316 and overflow location 4317 are provided at the thickened portions 4315. Providing the gate and overflow locations at the thickened portion 4315 advantageously results in any weld line formation during moulding being located at a thickened portion 4315. As the weld line may be a point of weakness of the support structure 4310, the extra thickness of the thickened portion 4315 provides extra strength to the support structure 4310 at the location of any weld line.

In this example the gate location 4316 is provided to a face 4314 of the support structure 4310. Similarly, the overflow location 4317 is provided to the face 4314. In some examples the overflow location 4317 and gate location 4316 may be provided to opposing faces of the support structure 4310. It is advantageous for the overflow and gate locations to be provided to the faces of the support structure 4310 or to the inner surface, because any vestige is not on the outer surface which bonds to the covering 4340. Defects on the outer surface of the support structure 4310 could cause tearing of the covering 4340 or a layer thereof.

FIGS. 16A, 16B and 17 show alternative gate locations 4316 for moulding a support structure 4310. In these examples the support structure 4310 is in the form of a ring member. In the FIG. 16A example, the gate location 4316 is on the outer circumferential surface (e.g. outer surface 4312*a*) of the support structure 4310. In the FIG. 16B example, the gate location 4316 is on the inner circumferential surface (e.g. inner surface 4313*a*) of the support structure 4310. In both of these examples, material may be used efficiently. The FIG. 16B example has an advantage in that any vestige or defect left at the gate location is not on a bonding surface of the support structure 4310 and will therefore present little or no risk of tearing a film or covering applied to the support structure 4310. In the FIG. 17 example, the gate location 4316 is provided at the inner circumferential surface of the support structure 4310 in a continuous arc about the full circumference of the support structure 4310. In this example the support structure 4310 may have no potential problems caused by a weld lines, may have good concentricity although may be less efficient in material usage than the examples shown in FIGS. 16A and 16B.

In some examples, the support structures 4310 comprise an open shape. For example, the support structures 4310 in some examples are ring members having a circular shape but which does not form a full circle. Such a support structure 4310 may comprise an open portion and may resemble a circlip, such as shown in FIG. 12G. An open support structure 4310 may have the advantage of increased flexibility, which may facilitate assembly with the covering 4340.

In some examples, the support structures 4310 each comprise a flat and thin cross section, to enable a low weight tube. In some examples, the support structures 4310 are provided with features or patterns for better strength and better bonding to the covering 4340.

FIG. 9 shows a cross section view of the support structure 4310 shown in FIG. 8. As illustrated, the support structure 4310 comprises a cross section comprising outer rounded corners 4318 at an outer surface 4312*a* of the support structure 4310. The support structure 4310 comprises rounded outer edges in this example, as a result of the outer rounded corners 4318 of its cross-sectional shape. The outer rounded corners 4318 of the support structure 4310 may present a low risk of tearing the covering 4340 or a film thereof when applied to the support structures 4310 or during use. If the outer circumference of the support structure 4310 comprises sharp corners, there may be some risk of tearing a film or covering applied to the support structure 4310. The support structure 4310 also comprises a convex inner surface 4313*a* in this particular example. A convex inner surface 4313*a* may improve flow characteristics within the air delivery conduit 4300. The cross section of the support structure 4310 may also comprise inner rounded corners 4319 at an inner surface 4313*a* of the support structure 4310. The support structure 4310 comprises rounded inner edges in this example, as a result of the inner rounded corners 4319 of its cross-sectional shape.

The radius of curvature of the outer rounded corners 4318 may be larger than the radius of curvature of the inner rounded corners 4319. However, the radii of curvature for the outer rounded corners 4318 and the inner rounded corners 4319 may be the same. Also, the radius of curvature of the inner rounded corners 4319 may be greater than the radius of curvature of the outer rounded corners 4318. It is contemplated that the outer and inner rounded corners 4318, 4319 may be chamfered or bevelled instead of being curved or filleted. Of course, any of the outer and inner rounded corners 4318, 4319 may not have rounded, filleted, chamfered, or beveled edges, if desired. Also, each of the outer rounded corners 4318 may have a different treatment (i.e., fillet, chamfer, bevel, or no treatment). Correspondingly, each of the inner rounded corners 4319 may have different treatments (i.e., fillet, chamfer, bevel, or no treatment).

The outer and inner rounded corners 4318, 4319 of the support structure 4310 may be a defect prone area of the air delivery conduit 4300. In particular, if left untreated, the outer and inner rounded corners 4318, 4319 may tear or otherwise damage the covering 4340. Treating the outer and inner rounded corners 4318, 4319 (e.g., filleting, chamfering, or beveling) may reduce the likelihood of tearing the covering 4340.

In the FIG. 9 example, the cross section of the support structure 4310 is substantially rectangular (e.g. having right angled sides save for the rounded corners, which may occupy a large portion of the sides of the cross section). In other examples the cross sectional shape of the support structure 4310 may be, for example, square, trapezoidal, circular, triangular, polygonal, crescent shaped, semicircular or any other suitable shape.

FIG. 10 and FIG. 11 show cross-section views of support structures 4310 according to other examples of the present technology. The support structure 4310 in these examples may also be identified as ring members. The support structure 4310 shown in FIG. 10 comprises sharp corners. An advantage of this support structure 4310 is that the parting line of a mould tooling arrangement in which the support structure 4310 is injection moulded can be aligned with one of the side faces of the support structure 4310. This may simplify tooling and may reduce the likelihood of parting line vestige on the outer surface 4312*a* of the support structure 4310. The support structure 4310 shown in FIG. 10 comprises sharp corners on one side, allowing for the parting line to be provided at that side, but includes an outer rounded corner 4318 and a inner rounded corner 4319 on the other side, reducing the risk of these corners tearing the covering 4340 or a sealing layer 4341.

FIGS. 12A-12I show a number of different support structures 4310 according to examples of the present technology. It should be understood that the support structure 4310 are not limited to the shapes illustrated in FIGS. 12A-12I.

The support structure 4310 of FIG. 12A comprises a circular outer profile 4312 and a circular inner profile 4313. In this example the support structure 4310 is a ring member. The support structure 4310 is of uniform thickness and cross-sectional shape around the support structure 4310 in this example.

The support structure 4310 of FIG. 12B comprises a circular outer profile 4312 and a circular inner profile 4313 and is of uniform thickness and cross-sectional shape around the support structure 4310. In this example the cross-sectional shape of the support structure 4310 comprises rounded corners and a convex inner surface like the support structure 4310 shown in FIG. 8.

The widths of the intermediate faces of the support structures 4310 shown in FIGS. 12A and 12B may be uniform and unvarying. These support structures 4310 may each have a uniform thickness and cross-sectional shape. The outer profile 4312 and the inner profile 4313 may have the same shape (e.g. a circular shape) and, as a result, the outer surface and the inner surface may have the same shape.

As illustrated, the support structure 4310 of FIG. 12B may be thicker than the support structure 4310 of FIG. 12A. That is, the intermediate faces 4314 of the support structure 4310 in FIG. 12B, joining the outer surface and the inner surface may be wider than the intermediate faces 4314 of FIG. 12A. In addition, the edges of the outer surface 4312 of the support structure 4310 of FIG. 12B may be rounded or filleted.

The support structures 4310 of FIGS. 12C-12F may have thickened portions 4315 on two opposing sides, which may be achieved by varying the widths of the intermediate faces 4314. As a result, the outer surface 4312 and the inner surface 4313 may have different shapes. A configuration that utilizes thickened portions may increase the ability of the air delivery conduit 4300 to resist being crushed and/or reduce the likelihood of blockages due to the collapse of the air delivery conduit 4300.

The support structure 4310 of FIG. 12C comprises a circular outer profile 4312 and rounded corners. The inner profile 4313 of the support structure 4310 is circular on first and second (e.g. top and bottom) opposing sides of the support structure 4310 and comprises straight portions on the other two opposing sides of the support structure 4310. The support structure 4310 comprises thickened portions 4315 formed by the straight sides of the inner profile 4313. The thickened portions 4315 are on opposing sides of the support structure 4310.

As described in more detail below, for example in relation to FIGS. 8 and 9, the support structures 4310 may each comprise an outer surface 4312*a*, an inner surface 4313*a* opposite the outer surface 4312*a*, and a pair of intermediate faces 4314 connecting between outer surface 4312*a* and the inner surface 4313*a*.

The thickened portions 4315 may each correspond to widened portions of the intermediate faces 4314 of the support structure 4310. The intermediate faces 4314 may be wider at the thickened portions 4315 than at other locations on the support structure 4310.

The support structure 4310 of FIG. 12D comprises a circular outer profile 4312 and a non-circular inner profile 4313. The support structure 4310 may be identified as an elliptical ring member in this example. The support structure 4310 also comprises a pair of thickened portions 4315 on opposing sides of the support structure 4310. The non-circular inner profile 4313 is elliptical in this example. The thickened portion 4315 are aligned with the minor axis of the elliptical inner profile 4313 of the support structure 4310. The increased spacing between the inner profile 4313 and the outer profile 4312 at the minor axis of the elliptical inner profile 4313 forms the thickened portions 4315. In addition, the major axis of the ellipse may extend through the thinnest portions of the support structure 4310 (i.e. the portions of the support structure 4310 at which the intermediate faces 4314 are thinnest).

The support structure 4310 of FIG. 12E comprises an elliptical outer profile 4312. A plurality (e.g. a series, an array) of support structure 4310 having elliptical outer profiles may form an air delivery conduit 4300 comprising an elliptical outer profile or overall elliptical cross section. An air delivery conduit 4300 comprising an elliptical outer shape may comprise a low profile and may be comfortable for the patient. The support structure 4310 comprises thickened portions 4315 in this example. The thickened portions are aligned with the major axis of the elliptical outer profile 4312. More generally, the thickened portions are provided to opposing sides of the support structure 4310. The support structure 4310 comprises an elliptical inner profile 4313. The inner profile 4313 in this example comprises a pair of linking walls at opposing ends having a low curvature (e.g. high radius of curvature), in order to create a spacing between the ends of the elliptical inner profile 4313 along the major axis and the outer profile 4312, forming the thickened portions 4315. In other examples the linking walls may have no curvature and may be straight sides of the inner profile 4313.

The support structure 4310 of FIG. 12F comprises an elliptical outer profile 4312, elliptical inner profile 4313 and thickened portions 4315. The thickened portions 4315 are provided on opposing sides of the ring member 4315 and are opposing along the major axis of the elliptical shape of the elliptical inner profile 4313. In this example the thickened portions are formed by a spacing between the major axis of the elliptical inner profile 4313 and the major axis of the elliptical outer profile 4312. The ratio of the major axis to the minor axis of the elliptical inner profile 4313 is lesser than the ratio of the major axis to the minor axis of the elliptical outer profile 4312, in this example. The result is that the thickness of the support structure 4310 is not uniform around the ring member 4310, with portions having a greater thickness being provided at the major axes of the elliptical inner and outer profiles.

Alternatively, the minor axis of the ellipse formed by the inner profile 4313 may coincide with the major axis of the ellipse formed by the outer profile 4312, while the major axis of the ellipse formed by the inner profile 4313 may coincide with the minor axis of the ellipse formed by the outer profile 4312. It is also contemplated that the major axis of the ellipse formed by the inner profile 4313 may be offset from the major axis of the ellipse formed by the outer profile 4312 by any angle between 0 and 90 degrees. Similarly, the minor axis of the ellipse formed by the inner profile 4313 may be offset from the minor axis of the ellipse formed by the outer profile 4312 by any angle between 0 and 90 degrees.

In some other examples the support structure 4310 comprises an elliptical outer profile 4312 and a non-elliptical inner profile 4312, such as a circular inner profile. In further examples the support structure 4310 may be D-shaped, trapezoidal or may comprise another suitable shape.

The support structure 3410 of FIG. 12G may be open shaped (or C-shaped) with a gap between opposing ends that prevents the loop from being closed. It is contemplated that the width of the intermediate faces 4314 may be uniform throughout the support structure 4310. Alternatively, the width of the support structure may vary to create the thickened portions 4315. It is contemplated that the gap in the C-shape of the support structure 4310 may allow the support structure (and the air delivery tube) to be radially compressed without suffering a structural failure that may occlude the air path in the air delivery conduit 4300. The radial compression may also facilitate assembly with the covering 4340.

It is contemplated that the outer profile 4312 of the support structure 4310 may be elliptical, while the inner profile 4313 may be non-elliptical (e.g., circular). FIG. 12H shows a D-shaped support structure 4310. FIG. 81 shows a trapezoidal support structure 4310. Both shapes may also achieve a low profile air delivery conduit 3400. Of course, shapes of the outer and inner profiles 4312, 4313 (or the inner and outer surfaces) of the support structure 4310 are not limited to the ones described above. It should be understood that the outer and inner profiles 4312, 4313 and surfaces of the support structure 4310 may have other suitable shapes.

In some examples, a distance between neighboring support structures 4310 may be dynamically adjustable. In addition, each support structure 4310 may be movable toward and away from a neighboring support structure 4310, for example to allow the length of the air delivery conduit 4300 to change. The longitudinal length of the reinforcing structure 4305 and/or the air delivery conduit 4300 may be adjustable. Also, each support structure 4310 may be movable relative to a neighboring support structure 4310 to a location in which the central longitudinal axis of the support structure 4310 is offset from and parallel to the central longitudinal axis of the neighboring support structure 4310.

The spacing between the support structures 4310 may be varied along the length of the air delivery conduit 4300. For example, the support structures 4310 may be further apart at a central portion of the air delivery tube 4300 than at end portions of the air delivery tube 4300.

The support structures 4310 may comprise a uniform width along the circumference. This may facilitate cost-effective manufacturing. In other examples an air delivery conduit 4300 comprises a plurality of support structures 4310 comprising differing widths, in order to provide the air delivery conduit 4300 with different levels of flexibility to bending in differing directions.

Air delivery conduits 4300 according to various examples of the present technology may be formed from a plurality of the support structures 4310 described above, wrapped or otherwise enveloped in a covering to form a sealed air path.

5.5.2 Air Impermeable Covering

FIGS. 13-15 illustrate different exemplary configurations of the covering 4340. For all of these illustrated configurations, the covering 4340 may comprise a fabric and may be impermeable. FIGS. 13 and 14 illustrate a covering 4340 with a laminate structure. In FIG. 13, the laminate structure may include a fabric layer 4347 made of flexible and/or stretchable textile material (e.g. a textile layer). The laminate material may also include an air impermeable inner layer (or film) 4348 (e.g. a sealing layer) attached to the fabric layer 4347 by way of, for example, bonding, adhesion, sewing, knitting, or any other method of attachment.

The textile material may include nylon, polyester, spandex, or some combination thereof. It should be understood that the above list of materials is not limiting. In addition, the textile material may have a knit, woven, or non-woven structure and may be provided with one-way, or two-way stretch properties. For one-way stretching, the textile may be manufactured and oriented so that the direction of stretch is in a direction that is parallel to the longitudinal axis of the air delivery conduit 3400. For two-way stretching, the textile may be manufactured and oriented so that a first direction of stretch is parallel to the longitudinal axis of the air delivery conduit and a second direction of stretch is normal or perpendicular to the longitudinal axis of the air delivery conduit. It is contemplated that the stretch properties may be achieved by way of material incorporation (e.g., elastane) or by way of structure (e.g., knit pattern), in some examples.

The outward-facing side of the textile material (i.e., the side configured to come in contact with the user or other external objects) may be treated to have a finish that enhances comfort and hand-feel. For example, the textile material may be subject to a brushing, silicone, or other type of treatment. The textile material may also be subjected to treatments that enhance properties such as washability, dryability, stain resistance, dirt resistance, moisture wicking, etc. In addition, the inward-facing side of the textile material (i.e., the side facing the air impermeable inner layer 4348 and interior of the air delivery conduit 4300) may be prepared or treated to improve adhesion and/or bonding with the air impermeable inner layer 4348.

By using fabric in the covering 4340, the weight of the air delivery conduit 4300 may be reduced, thereby reducing drag forces associated with the air delivery conduit 4300 that may destabilize the seal between the patient interface and the user's face. For example, the fabric may have an areal density of about 250 g/m$^2$ (GSM) or less. Preferably, the areal density of the fabric may be about 180 g/m$^2$ (GSM) or less.

It is contemplated that the covering 4340 may comprise more than one type of fabric material to achieve localised features or functions, including visual appeal. For example, the covering 4340 may comprise a region of the fabric layer 4347 made of a fabric that is softer than another type of fabric used in adjacent regions that is rougher. Also, it is contemplated that, the covering 4340 may comprise a transparent region to enable the user to inspect the inside of the air delivery conduit 4300.

The air impermeable inner layer 4348 may be sandwiched between and attached to the fabric material of the fabric layer 4347 and the support structures 4310 of the air delivery conduit 4300. In addition, the air impermeable inner layer 4348 may be formed from a resilient polymer or elastomer. For example, the air impermeable inner layer 4348 may be a thermoplastic polyurethane (TPU) or thermoplastic elastomer (TPE). The thickness of the air impermeable inner layer 4348 may be about 0.5 mm or less. Preferably, the thickness of the inner layer may be about 150 microns or less.

Although the covering 4340 may be formed at least in part by a textile fabric, it may be desired to insulate the textile fabric from the pressurized gas flowing through the air delivery conduit 4300. In particular, it may be desired to prevent microorganisms or other contaminates that may be growing or trapped in the fabric from contaminating the pressurized flow of gas. Accordingly, the air impermeable inner layer 4348 may have a larger surface area than the fabric material of the fabric layer 4347. This way, the inner layer 4348 may intervene between all parts of the fabric material of the fabric layer 4347 and the lumen inside the air delivery conduit 4300.

FIG. 13 illustrates a configuration in which the covering 4340 includes one fabric layer 4347 and one air impermeable inner layer 4348. FIG. 14 illustrates a configuration in which the covering 4340 includes multiple fabric layers 4347 and an air impermeable inner layer 4348. Adding more fabric layers may increase the softness of the air delivery conduit 4300. In addition, although only two fabric layers 4347 are shown in FIG. 11B, the number of fabric layers 4347 is not necessarily limited to two.

FIG. 15 illustrates a configuration in which the covering 4340 utilizes only a fabric layer 4347. The air impermeable inner layer 4348 in this configuration is omitted. For a configuration without an impermeable inner layer 4348, the fabric layer 4347 may be coated with a material that may make the fabric layer 4347 air impermeable. For example, the fabric layer 4347 may be coated with a silicone or similar material. This configuration may further reduce the bulkiness of the air delivery conduit 4300 by limiting the number of layers forming the covering 4340.

In each of the examples illustrated in FIGS. 13-15, the fabric layer 4347 may be formed from an outer sheet 4342 or outer layer 4346 according to any one of the embodiments described herein.

5.5.3 End Connectors

Referring back to FIG. 7A, each end of the air delivery conduit 4300 may include an end connector 4362, for example at each end of the air delivery conduit 4300. The end connectors 4362 may enable the air delivery conduit 4300 to be connected to a flow generator (RPT device) and patient interface (in a long tube configuration). Also, the end connectors 4362 may enable the air delivery conduit 4300 to be connected with a patient interface 3000 and another air delivery conduit (in a short tube configuration). It is contemplated that at least one end connector 4362 may be a swivel connection. It is further contemplated that at least one end connector 4362 may be an elbow connection. It is yet further contemplated that at least one end connector 4362 may be a rigid straight connector. Both end connectors 4362 may have the same structure. Alternatively, the end connectors 4362 may have different structures. For example, the end connector 4362 configured to connect to the inlet of the patient interface may be in the form of an elbow, while the end connector configured to connect to an outlet of the RPT device or another air delivery conduit may be a swivel connector or a fixed connection. At least one of the end connectors 4362 may include a vent assembly, HMX assembly and/or or an anti-asphyxiation assembly.

5.5.4 Air Delivery Conduit

A plurality of structures 4310, such as the ring member shown in FIG. 8 or in any of the other examples of support structure 4310, can be arranged in a linear pattern (e.g. array) and then enveloped with a covering to form an air delivery conduit 4300. An air delivery conduit 4300 may comprise a plurality of support structures 4310 spaced apart along a length of the air delivery conduit 4300 and an air impermeable covering 4340 provided to the support structures 4310 along the length of the air delivery conduit 4300, the covering 4340 forming a sealed air path through which the flow of air is able to conveyed in use.

FIG. 18 shows a plurality of support structures 4310 arranged in an array. FIG. 19 shows an air delivery tube 4300 with a covering 4340 applied to the support structures 4310 shown in FIG. 18. In FIG. 19, the air delivery tube 4300 is being forced into a curve.

FIG. 20 shows another plurality of support structures 4310 arranged in an array. FIG. 21 shows an air delivery tube 4300 with a covering 4340 applied to the support structures 4310 shown in FIG. 20. In FIG. 21, the air delivery tube 4300 is being forced into a curve.

The support structures 4310 shown in the FIG. 18-21 examples are in the form of ring members.

The array of support structures 4310 shown in FIG. 18 and which form the air delivery tube 4300 shown in FIG. 19 are spaced apart by 2 mm in a neutral state (e.g. unextended and uncompressed), while the array of support structures 4310 shown in FIG. 20 and which form the air delivery tube 4300 shown in FIG. 21 are spaced apart by 9 mm in a neutral state (e.g. unextended and uncompressed). The support structures 4310 shown in FIG. 18 are narrower than the support structures 4310 shown in FIG. 20.

As shown in FIG. 21, the air delivery tube 4300 comprising wider ring members spaced apart by a wide distance is more bendable than the air delivery tube 4300 shown in FIG. 19 which comprises narrower ring members spaced apart by a small distance.

The spacing between support structures 4310 and the width of each support structure 4300 may vary between different examples of the present technology. In some examples, the spacing between support structure 4310 is relatively large (e.g. around 9 mm), which may provide a highly bendable tube (e.g. having good drape) that may function better as a decoupling component, especially when the tube is a short tube. In other examples, the spacing between support structures 4310 is relatively small (e.g. around 2 mm), as a small spacing allows less bunching of the covering 4340 between ring members 4310 and a low amount of possible misalignment between support structures 4310, which reduces the possibility of occlusion of the tube. In some examples, the spacing between the support structures 4310 is small or moderate, but the air delivery tube 4300 comprises a highly flexible and/or extensible covering 4340 in order to provide good flexibility/drape to the air delivery conduit 4300. The spacing between the support structures 4310 and the stretchability of the covering 4340 may be selected to achieve a predetermined flexibility and/or elongation of the air delivery conduit 4300.

In some examples of present technology, the air delivery conduit 4300 comprises a plurality of support structures 4300 spaced apart by a distance of between 1 mm and 10 mm. In further examples, the spacing is by a distance of between 2 mm and 6 mm, or between 2 mm and 3 mm. In some examples, the support structures 4310 of an air delivery conduit 4300 are spaced apart by a distance of less than 6 mm, or less than 3 mm. In some examples, the support structures 4310 comprise ring members having an internal diameter of between 11 and 19 mm. The internal diameter may be between 13 mm and 17 mm, or 15 mm in some examples. The area within each ring member or other support structure 4310 may be between 150 mm$^2$ and 200 mm$^2$, such as between 160 mm$^2$ and 185 mm$^2$. In one example, the area within each support structure 4310 is about 175 mm$^2$. The support structures 4310 may comprise a non-circular shape (e.g. an elliptical shape) and comprise an internal area, within the above ranges, though which air can flow.

In some examples of the present technology, an air delivery conduit 4300 may comprise a flexibility and/or stretchability that is non-uniform along the length of the tube. In some examples, the air delivery conduit 4300 comprise a different level of flexibility and/or stretchability at the ends of the tube than at the central portion of the tube. For example, the air delivery conduit 4300 may comprise highly flexible end portions and a moderately flexible central portion. Alternatively, the air delivery conduit 4300 may comprise a central portion that is more flexible and/or stretchable than the end portions. In some examples, the support structures 4310 of a particular air delivery conduit 4300 may not all comprise the same properties, geometries and spacing. In some examples, an air delivery conduit 4300 comprises a plurality of ring members, some of which comprise an elliptical outer profile and some of which comprise a circular outer profile, in order to transition from a circular connector at one end which connects to a long tube connected to an RPT device, to a lower profile elliptical connector at the other end which connects to a patient interface. In some examples, the air delivery conduit 4300 comprises support structures 4310 spaced further apart from each other in a central portion of the air delivery conduit 4300 than at the ends of the air delivery conduit 4300, or spaced further apart at the ends of the air delivery conduit 4300 than at the ends of the air delivery conduit 4300, to vary the flexibility of the air delivery conduit 4300 along its length.

The covering 4340 of the air delivery conduit may be as described above, e.g. it may be air-impermeable and may comprise an outer surface formed from a textile material. In some examples, the covering 4340 is in the form of a laminate. The covering 4340 may comprise an outer layer comprising a textile material bonded to an air impermeable inner layer. The air impermeable layer in some examples is formed from a polymer material and may be formed from a thermoplastic material, for example thermoplastic polyurethane (TPU). In other examples the air impermeable layer may be formed from silicone, a thermoplastic elastomer or other elastomer.

5.5.5 Application of Covering to Reinforcing Structure

There are multiple ways in which a covering 4340 may be applied to a reinforcing structure 4305, according to aspects of the present technology.

5.5.5.1 Wrapping of Covering Around Reinforcing Structure

The covering 4340 may be wrapped around a reinforcing structure 4305 and bonded to it to make sealed tubing comprising a reinforcing structure. The covering 4340 may forma sealed air path through which a flow of air is able to be conveyed in use by the air delivery conduit 4300. In some examples, the reinforcing structure may comprise an array of support structures 4310. As described above, the covering 4340 may comprise a laminate construction in which an outer layer is formed from a textile material and an inner layer is formed from an air impermeable material, such as a TPU film. In order to prevent exposure of the textile material to the air path, a sealing layer is provided along the inside of the tube to seal off the edge of the textile layer. This ensures the air path remains sealed, preventing ingress of particles from the textile layer and preventing any leak that may occur through the textile layer.

FIGS. 22-29 show a method of applying a covering 4340 to a reinforcing structure 4305 comprising a plurality of support structures 4310 according to an aspect of the present technology. In this particular example the support structures 4310 are each in the form of a ring member. The method is also applicable to applying a covering 4340 to another reinforcing structure, such as one or more helical members extending along the length of the tube to be formed.

As shown in FIG. 22, in one step, a plurality of support structures 4310 may be arranged in an array. As shown in FIG. 23, the support structures 4310 may be supported on a mandrel (or rack) 7000. The support structures 4310 may be aligned concentrically with each other but spaced apart along a length of the mandrel 7000 and of the tubing to be formed.

As shown in FIG. 24, in another step, a sealing layer 4341 in the form may be provided to the support structures 4310. In this example the sealing layer 4341 is a sealing strip. The sealing strip may be applied to the reinforcing structure 4305. The sealing strip in this example is aligned longitudinally along the length of the of the series of ring members 4310. The sealing layer 4341 is then bonded to the ring members 4341. The sealing layer 4341 in some examples comprises TPU film and is heat bondable. The sealing strip may comprise a tape applied along the reinforcing structure 4305. In other examples the sealing layer 4341 may be wider than the sealing strip shown in FIG. 24 and may cover more of the circumference or sides of the support structures 4310.

In some examples, the sealing layer 4341 comprises an adhesive layer as an alternative to a heat bondable layer. In such examples, the adhesive may be biocompatible and fully cured during manufacturing of the tube.

FIG. 25 shows an end view of the mandrel 7000 and array of support structures 4310, with the sealing layer 4341 applied in the form of a sealing strip. The sealing layer 4341 bonds to the support structures 4310 and forms an arc. The sealing layer 4341, being in the form of a sealing strip, occupies only a portion of the circumference of the support structures 4310 and air delivery conduit 4300 to be formed. A sealing strip used to provide a sealing layer 4341 may be sealing tape.

In other examples the sealing layer 4341 may occupy more of the circumference of the air delivery conduit 4300 to be formed. In some examples, the sealing layer 4341 may be formed by winding a sealing strip (e.g. in tape form) helically around the reinforcing structure 4305 at a small angle such that the sealing strip overlaps with itself to fully envelop the reinforcing structure 4305. In a further example, a sealing layer 4341 in the form of a sealing sheet is wrapped around the entire circumference of the reinforcing structure 4305 such that the sealing sheet fully envelopes the reinforcing structure 4305.

The air impermeable covering 4340 may be wrapped around the reinforcing structure 4305 and sealing layer 4341. In one form, the covering 4340 may be wrapped around the reinforcing structure 4305 and sealing strip.

As shown in FIGS. 26 and 27, in a further step, an outer sheet 4342 is wrapped around the reinforcing structure 4305. That is, the outer sheet 4342 may be formed as a sheet and then wrapped around the reinforcing structure 4305 (for example into a cylindrical shape) when forming a covering 4340 for the air delivery conduit 4300. The outer sheet 4342 may not form the outer most layer of the air delivery conduit 4300 and may not provide an exterior surface exposed to the surroundings of the air delivery conduit 4300, but may be "outer" with respect to another layer of the air delivery conduit 4300 or may be "outer" with respect to the reinforcing structure 4305. In some examples the outer sheet 4342 comprises a textile material, and may be identified as a textile sheet in such examples.

The outer sheet 4342 comprises a first edge 4342*a* which is aligned along the length of the air delivery conduit 4300 to be formed. The first edge 4342*a* may be aligned over the sealing strip previously applied to the reinforcing structure 4305. The outer sheet 4342 also comprises a second edge 4342*b* opposite to the first edge 4342*a*. The first edge 4342*a* and second edge 4342*b* may be parallel to each other in some examples of the present technology and may be non-parallel in other examples (although they may both extend along the air delivery conduit 4300). The outer sheet 4342 may be bonded to the sealing layer 4341 and the reinforcing structure 4305 during (for example using adhesive) or after (for example using heat bonding) wrapping around the reinforcing structure 4305. The outer sheet 4342, in this example, comprises an outer side (facing towards the surroundings of the air delivery conduit 4300 although not necessarily the outermost layer) and an inner side (facing towards the axis of the air delivery conduit 4300). The inner side may define at least some of the sealed air path within the air delivery conduit 4300 in some examples.

The outer sheet 4342 in one example comprises a laminate. The outer sheet 4342 may comprise an outer layer comprising a textile material. The textile material may make the tube comfortable to the touch. The outer sheet 4342 may also comprise an inner layer comprising an air impermeable material. The air impermeable material may be bondable to a sealing layer and/or to the reinforcing structure 4305. The air impermeable material may comprise a plastic material and may comprise a thermoplastic material, such as TPU. In some examples, the outer layer and the inner layer of the outer sheet 4342 are bonded together by dot glue lamination. In an alternative example, they are bonded by heat lamination. In some examples, the outer sheet 4342 may include one or more fabric layers 4347 and one or more air impermeable layers 4348 as described above in relation to FIGS. 13-15. In some examples the outer sheet 4342 or covering 4340 may comprise at least one textile layer and at least one non-textile layer provided outside of the textile layer, such as a film layer provided to the exterior of the textile layer.

As shown in FIGS. 28-30, in a further step the wrapping of the outer sheet 4342 around the reinforcing structure 4305 and bonding of the outer sheet 4342, sealing layer 4341 and reinforcing structure 4305 together is completed. The second edge 4342*b* of the outer sheet 4342 is wrapped around the reinforcing structure 4305 and past the first edge 4342*a*. After the outer sheet 4342 is wrapped around the reinforcing structure 4305, the first edge 4342*a* and second edge 4342*b* extend along the air delivery conduit 4300. The inner side of the outer sheet 4342 proximate the second edge 4342*b* is bonded to the outer side of the outer sheet 4342 proximate the first edge 4342*a*. The second edge 4342*b* is bonded back onto the exterior surface of the outer sheet 4342 proximate but spaced from the first edge 4342*a* so that the outer sheet 4342 overlaps with itself. The outer sheet 4342 is wrapped more than 360 degrees around the cross section of the tube. The air impermeable covering 4340 now forms a sealed air path and an air delivery conduit 4300. The sealing layer 4341, in this example the sealing strip, seals an overlapping portion of the outer sheet 4342. The outer sheet 4342 may be wrapped onto itself to form a seam. The sealing layer 4341, such as the sealing strip, may seal the seam. The sealing strip seals along the length of the seam.

In some examples, the second edge 4342*b* of the outer sheet 4342 extending along the air delivery conduit 4300 comprises a serrated profile. The serrated profile may be configured to resist peeling of the second edge 4342*b* of the outer sheet 4342 away from the outer side of the outer sheet 4342. The second edge 4342*b* may comprise a profile that is crinkle cut, wavy, serrated, triangular or the like. This type of profile may resist peeling of the outer sheet 4342 away from itself. If a portion of a second edge 4342*b* of the outer sheet 4342 having this type of profile begins to peel, the peeling may be less likely to propagate along the edge in comparison with an outer sheet 4342 which comprises a straight second edge 4342*b*.

In some examples, a single outer sheet 4342 is wrapped around the entire length of the reinforcing structure 4305 (e.g. the entire length of the air delivery conduit 4300). In other examples, multiple outer sheets 4342 form the covering 4340. In one example, a first outer sheet 4342 is wrapped around a first half of the reinforcing structure 4305 and a second outer sheet 4342 is wrapped around a second half of the reinforcing structure 4305. The first edges 4342*a* and second edges 4342*b* of the first and second outer sheets 4342 extend along the air delivery conduit 4300 in such an example. Although, the first edges 4342*a* of the first outer sheet 4342 and the second outer sheet 4342 may not be colinear with each other. Similarly, the second edges 4342*b* of the first outer sheet 4342 and the second outer sheet 4342 may not be colinear with each other.

The bonding surfaces of the outer sheet 4342 at and proximate the second edge 4342*b* may also be configured to encourage good bonding of the outer sheet 4342 onto itself at the second edge 4342*b*. In some examples of the present technology, the bonding surfaces may comprise dimples, roughening or the like configured to increase the bonding contact area and the strength of the bond.

The sealing layer 4341 in some examples is bonded to the reinforcing structure 4305. The outer sheet 4342 may also be bonded to the sealing layer 4341. The sealing layer 4341 may be heat-bonded to the reinforcing structure 4305 and/or the outer sheet 4342, or may be adhered to the reinforcing structure 4305 and/or the outer sheet 4342. The sealing layer 4341 may comprise a heat-bondable material such as a thermoplastic material, in some examples TPU.

End connectors 4362 (such as those described with reference to FIG. 7A) for the air delivery conduit 4300 to enable it to be connected between a flow generator and patient interface (either as a short tube configured to connect a patient interface to a long tube, or, as long tube configured to connect to a respiratory pressure therapy device) can be attached in a further step. In one example, the air delivery conduit 4300 comprises a first end configured to connect to tubing connected to an outlet of a respiratory pressure therapy device 4000, and a second end configured to connect to a patient interface 3000. In another example, the air delivery conduit 4300 comprises a first end configured to connect to an outlet of the respiratory pressure therapy device 4000 and a second end configured to connect to a patient interface 3000.

With reference to FIG. 30, the inner side of the outer sheet 4342 comprises a first portion (or first region) 4343 proximate the first edge 4342*a*. Additionally, the inner side of the outer sheet 4342 comprises a second portion (or first region) 4344 proximate the first edge 4342*a*. The first portion 4343 is located on a first side of the first edge 4342*a* and the second portion 4344 is located on a second side of the first edge 4342*a*. That is, the first portion 4343 and second portion 4344 are located on opposite sides of the first edge 4342*a*. The sealing layer 4341 (a sealing strip in this example) seals between the first portion 4343 and second portion 4344. For example, the sealing layer 4341 may seal a gap between the first portion 4343 and the second portion 4344 where the outer sheet 4342 overlaps with itself. The sealing layer 4341 isolates the outer surface of the outer sheet 4342 from the air path within the tube.

This is particularly advantageous when the outer surface of the outer sheet 4342 is formed from a textile material, as without a seal across the first edge 4342*a* the textile material forming the outer surface would be exposed to the air path and gas and/or particles could exchange between the textile outer surface and the sealed air path. This may be also help prevent or provide further resistance to microbes/bacteria that may be present in the textile layer from reaching the air path. The sealing layer 4341 isolates the textile layer from the air path by bonding to the air impermeable inner layer of the outer sheet 4342 on either side of the internal overlap of the outer sheet 4342 with itself. In this way the internal surface of the covering 4340 exposed to the air flow within the tube is only formed by sealing material (e.g. plastic such as TPU, TPE, silicone etc.) and there is no textile layer exposed to the flow of gas within the air delivery conduit 4300.

FIG. 40A shows another configuration in which the inner side of the outer sheet 4342 proximate the second edge 4342*b* is bonded to the sealing layer 4341 (a sealing strip in this example, or a sheet or inner tube in other examples), rather than onto an outer side of the outer sheet 4342. The second edge 4342*b* is in contact with the first edge 4342*a*, in order to avoid a gap and provide an exterior of the air delivery conduit 4300 that is substantially formed from textile, without creating a doubling of thickness due to an overlap. The outer layer 4342 is wrapped around the reinforcing structure such that the second edge 4342*b* of the outer layer 4342 abuts the first edge 4342*a*. In this example, the sealing layer 4341 still seals between a first portion 4343 of an inner side of the outer sheet 4342 on a first side of the first edge 4342*a* and a second portion 4344 of the inner side of the outer sheet on a second side of the first edge 4342*a*. The first portion 4343 is the portion of the inner side of the outer sheet proximate the first edge 4342*a*. The second portion 4344 in this example is the portion of the inner side of the outer sheet proximate the second edge 4342*b* (which is abutting the first edge 4342*a*). The sealing layer 4341 seals between the first portion 4343 and the second portion 4344. The sealing layer 4341 seals across the joint or seam between the first edge 4342*a* and the second edge 4342*b*.

FIG. 40B illustrates another configuration in which the first edge 4342*a* and the second edge 4342*b* abut each other. In this configuration they are sewn together. In the "abutment" configuration examples shown in FIGS. 40A and 40B, the inner seam formed by the abutment of the first edge 4342*a* against the second edge 4342*b* may be aligned with the sealing layer 4350 so that the sealing layer 4350 still seals the fabric layer 4341 of the covering 4340 from pressurized respiratory gas in the air passage. In some examples, both the first edge 4342*a* and the second edge 4342*b* may be attached to the sealing layer 4350 by way of, for example, bonding, adhesion, sewing, knitting, or any other method of attachment. It is contemplated that the first edge 4342*a* may also be attached to the second edge 4342*b* by way of, for example, bonding, adhesion, sewing, knitting, or any other method of attachment. It may be desired to have the first edge 4342*a* and the second edge 4342*b* be precisely aligned to abut properly in order to avoid an unsightly and/or uncomfortable gap between the first edge 4342*a* and the second edge 4342*b*. It is noted that the first edge 4342*a* and the second edge 4342*b* may be serrated as illustrated in FIG. 40B.

Whether the outer sheet 4342 overlaps with itself or only the sealing layer 4341, an outer strip 4354 may be bonded to the outer side of the outer sheet 4342 along the second edge 4342*b* of the outer sheet 4342. The outer strip 4354 may be bonded over and along the second edge 4342*b* of the outer sheet 4342. FIG. 40C shows cross section view of a portion of an air delivery conduit 4300 including an outer strip 4354 sealing the exterior of the joint between the first edge 4342*a* and the second edge 4342*b*. The outer strip may comprise a tape and may comprise a textile material. The outer strip may provide sealing over the second edge 4342*b* of the outer sheet in an "overlapping" configuration (e.g. the type of configuration shown in FIG. 30) or over both the first edge 4342*a* and the second edge 4342*b* in an "abutting" configuration (e.g. as shown in FIGS. 40B and 40C). The outer strip 4353 may provide further sealing to the tube. The outer strip 4354 may be provided to an external seam/junction of the covering 4340 of an air delivery conduit 4300 of any example of the present technology. The outer strip 4354 may also provide a clean-looking seam. The strip may be of a colour, pattern and/or structure different from the outer textile layer of the air delivery conduit 4300. The outer strip 4354 along the length of the air delivery conduit 4300 and across the first edge 4342*a* and/or second edge 4342*b* of the outer sheet 4342.

In the example shown in FIG. 30, the outer sheet 4342 is bonded to the sealing strip 4341 with the first edge 4342*a* of the outer sheet 4342 lying along the sealing strip 4341 proximate a centreline along the sealing strip. It is the gap between the first edge 4342*a* and the interior surface of the outer sheet 4342 to which the first edge 4342*a* is bonded that may benefit from sealing, and locating the first edge 4342*a* centrally along the sealing strip maximises the area of the first portion 4343 and second portion 4344 of the interior surface of the outer sheet 4342, on either side of the first edge 4342*a*, to which the sealing strip 4341 can be bonded. The inner side of the outer sheet 4342 proximate the second edge 4342*b* is bonded to the outer side of the outer sheet 4342 proximate the first edge 4342*a*. The second edge 4342*b* is spaced from the first edge 4342*a* such that the outer sheet 4342 overlaps with itself.

With reference to the examples shown in FIGS. 28-30, 40A and 40C, the sealing layer 4341 in the form of a sealing strip seals across an inner portion of a seam of the covering 4340 to prevent air leaking through the seam. The air impermeable covering 4340 has a first edge (e.g. the first edge 4342*a* of the outer sheet 4342) and a second edge (e.g. the second edge 4342*b* of the outer sheet 4342). The first edge and second edge each extend along the air delivery conduit 4300. As illustrated, in each of the examples shown the first edge and the second edge of the covering 4340 meet at or overlap to form the seam. The sealing layer 4341 (or sealing strip in particular examples) seals across an inner portion of the seam. The sealing strip may seal along and across the seam.

As shown in FIGS. 28-30 the covering 4340 is bonded to itself at a location proximate the seam. In each of the FIGS. 28-30, 40A and 40C examples, the covering is bonded to the reinforcing structure 4305. In the example shown in FIG. 40C, the air delivery conduit 4300 comprises an outer strip 4354 bonded to an outer side of the covering 4340 along the second edge of the covering 4340. Either of the first and second edges of the covering 4340 may be serrated. The inner portion of the seam is aligned along a centreline of the sealing strip, as shown in FIGS. 28-30, 40A and 40C.

FIG. 31 shows the way a sealing layer 4341 and outer sheet 4342 overlap to form a covering 4340 in another example of an air delivery conduit 4300 according to the present technology. The covering 4340 is provided to a reinforcing structure 4305, which in this example also comprises a plurality of support structures 4310. The support structures 4310 are ring members in this example but may have other shapes in other examples of the technology.

The outer sheet 4342 in this example comprises a textile material and may therefore be identified as a textile sheet or a textile layer. The sealing layer 4341 is laminated to the outer sheet 4342. The covering 4340 therefore comprises a laminate formed by a textile outer sheet 4342 forming a textile layer and an air impermeable sealing layer 4341 in this example. The outer sheet 4342 comprises a first edge 4342*a* and a second edge 4342*b*. The sealing layer 4341 extends from the first edge 4342*a* to second edge 4342*b* in this example although in other examples may be provided to some but not all of the textile layer, depending on the particular configuration of the textile layer.

In this example, the sealing layer 4341 also comprises a sealing flap 4345. The sealing layer 4341 in this example extends beyond the first edge 4342*a* of the outer sheet 4342 to form the sealing flap 4345. The sealing flap 4345 is sealed to another portion the sealing layer 4341 proximate the first edge 4342*a* of the outer layer in this example.

In this particular example, the sealing flap 4345 is wrapped over the first edge 4342*a* of the textile outer layer 4342. The sealing flap 4345 seals to the portion of the sealing layer 4341 which bonds to the exterior surface of the outer sheet 4342 proximate the first edge 4342*a* of the outer sheet 4342.

As shown, the sealing flap 4345 is sealed to both the outer side of the outer sheet 4342 proximate the first edge 4342*a*, and the inner side of the sealing layer 4341 proximate the second edge 4342*b* of the outer sheet 4342. Similarly to the example shown in FIG. 30, inner side of the outer sheet 4342 comprises a first portion 4343 on a first side of the first edge 4342*a* proximate the first edge 4342*a*, and also comprises a second portion 4344 proximate the first edge 4342*a* on a second side of the first edge 4342*a*. The sealing layer 4341, in this example in the form of a layer laminated to the outer sheet 4342 and a sealing flap 4345, seals between the first portion 4343 and the second portion 4344 of the inner side of the outer sheet 4342. The air path within the air delivery conduit 4300 is therefore sealed and isolated from the textile material forming the exterior surface of the outer sheet 4342. The sealing flap 4345 is sealed to another portion of the sealing layer 4341 to prevent leaks flowing between the first portion 4343 of the inner side of the outer sheet 4342 (e.g. textile layer) and the second portion 4344 of the inner side of the outer sheet 4342.

It is to be understood that the covering 4340 in some examples of the present technology may comprise more than two layers. Each of the outer sheet 4342 and the sealing layer 4341 may comprise one or more layers. Additionally, the covering 4340 may comprise one or more layers additional to the outer sheet 4342 and the sealing layer 4341. For example, the sealing flap 4345 may wrap over edges of two or more layers to seal to another portion of the sealing layer 4341. The sealing flap 4345 may be a flap portion of the sealing layer 4341.

The outer sheet 4342 and sealing layer 4341 may be laminated together prior to assembly with the reinforcing structure 4305. The sealing flap 4345 may also be wrapped over the first edge 4342*a* prior to assembly with the reinforcing structure 4305, ready for the outer sheet 4342 and sealing layer 4341 proximate the second edge 4342*b* of the outer sheet 4342 to be wrapped around onto the sealing flap 4345 and possibly the external surface of the outer sheet 4342.

FIG. 32 shows another example of an air delivery conduit 4300 according to the present technology in which the sealing layer 4341 comprises a layer of air-impermeable material laminated to the outer sheet 4342, which is formed from textile material (and may be identified as a textile layer). The sealing layer 4341 also comprises a sealing flap 4345 which extends beyond the first edge 4342*a* of the outer sheet 4342, but is not wrapped over the first edge 4342*a*. The sealing flap 4345 in this example seals to an inner side of the sealing layer 4341 on the second side of the first edge 4342*a* of the outer sheet 4342. The sealing flap 4345 may adhere to the reinforcing structure 4305. As shown in FIG. 30, the inner side of the outer sheet 4342 comprises a first portion 4343 on a first side of the first edge 4342*a* proximate the first edge 4342*a* and a second portion 4344 proximate the first edge 4342*a* on a second side of the first edge 4342*a*. The sealing layer 4341, with its integral sealing flap 4345 seals between the first portion 4343 and the second portion 4344. The sealing flap 4345 is therefore sealed to another portion of the sealing layer 4341 to prevent leaks flowing between the first portion 4343 of the inner side of the outer sheet 4342 and the second portion 4344 of the inner side of the outer sheet 4342. The textile material of the outer sheet 4342 is therefore isolated from the flow air within the air delivery conduit 4300. An advantage of this example of the present technology is that no more than four layers material are stacked on top of each other at any point around the circumference of the air delivery conduit 4300.

In the above described examples comprising a sealing flap 4345, there is no sealing strip. However, in some examples, a sealing strip may also be provided to the interior of the air delivery conduit 4300 to provide further sealing at the junction between the sealing flap 4345 and the interior surface of the sealing layer 4341 to which it is bonded.

5.5.5.2 Seamless Knitted Sleeve

In further examples of the present technology, the covering 4340 may comprise a textile sleeve, which may be a knitted sleeve. The knitted sleeve may advantageously have no seam as it may comprise a unitary construction. The sleeve may be introduced over a reinforcing structure 4305, such as an array of ring members 4310, and then bonded to the reinforcing structure 4305 to form the air delivery conduit 4300. An air impermeable layer, such as a sealing layer 4341, may be inflated within the knitted sleeve to bond the sealing layer 4341 to the knitted sleeve.

The bonding between the textile material and the air impermeable material, in any of the examples of the present technology described herein, may be achieved by one or more of chemical, thermal, vibrational, ultrasonic bonding process or any other suitable process. In some examples, the textile material and air impermeable material are glued together.

FIGS. 41 and 42 illustrate an assembly process that utilizes a covering 4340 comprising an outer layer 4346 in the form of a knitted seamless sleeve. The knitted sleeve may have a seamless tubular construction. It is contemplated that the covering 4340 may be knitted by way of circular knitting, 3D knitting, or any other knitting process capable of producing a seamless tubular structure. The covering 4340 also comprises a sealing layer 4341 in this example. The sealing layer 4341 may be an air impermeable inner layer which defines a sealed air path through which air can be conveyed. The sealing layer 4341 may also be formed into a tubular shape and then inserted into the knitted sleeve (the outer layer 4346). Once inside the knitted sleeve, the sealing layer 4341 may be inflated so that an outer surface of the sealing layer 4341 abuts an inner layer of the knitted sleeve. After being inflated, the sealing layer 4341 may be attached to the knitted sleeve to form the covering 4340 by way of, for example, bonding, adhesion, sewing, knitting, or any other method of attachment. The bonding between the outer layer 4346 and the sealing layer 4341 may be achieved by one or more of chemical, thermal, vibrational, ultrasonic bonding process or any other suitable process.

At the same time, the reinforcing structure 4305 (e.g., an array of support structures 4310) may be arranged on a mandrel (or rack) 7000 similar to the "wrapping around" method previously described. The laminated covering 4340 may be slid onto the reinforcing structure 4305 so that the laminated covering 4340 surrounds or encompasses the reinforcing structure 4305. Once the laminated covering 4340 is slid onto the reinforcing structure 4305, the laminated covering 4340 may be attached to the reinforcing structure 4305 by way of, for example, bonding, adhesion, sewing, knitting, or any other method of attachment.

5.5.5.3 Mandrel Assisted Inversion

FIG. 43 shows a covering 4340 according to an example of the present technology. The covering 4340 is configured for use in an air delivery conduit 4300, together with other components, such as a reinforcing structure 4305. A method of manufacturing an air delivery conduit 4300 comprising the covering 4340 will be described in the foregoing.

The covering 4340 comprises an elongate cylindrical shape. The covering 4340 comprises a first side providing an external surface of the covering 4340 and a second side providing an internal surface of the covering 4340, in the state shown in FIG. 43. The covering 4340 in this example comprises a first layer on the first side of the covering 4340 and a second layer on the second side of the covering 4340.

The first layer of the covering 4340 comprises a sealing layer 4341 in this example. The second layer of the covering 4340 comprises an outer layer 4346 (although in the state shown in FIG. 43 the outer layer 4346 forms an interior surface of the covering 4340 because the covering 4340 is inverted from an in use configuration, for reasons that will be described). The sealing layer 4341 and outer layer 4346 may be similar to layers which are described elsewhere in the present disclosure. For example, the sealing layer 4341 may comprise an air-impermeable plastic layer (e.g. a thermoplastic material, TPU, TPE, silicone etc.). The outer layer 4346 may comprise a textile layer configured to provide a comfortable and appealing look and feel. In the state shown in FIG. 43, the sealing layer 4341 is on first side of the covering 4340, forming the external surface. The outer layer 4346 is on the second side of the covering 4340, forming the internal surface.

One step in a method of forming an air delivery conduit 4300 comprises forming the covering 4340 in the configuration shown in FIG. 43. In one example, the method comprises forming the covering 4340 into the elongate cylindrical shape from a sheet by joining opposing edges of the sheet. The sheet may be a laminate formed by the first layer and the second layer (e.g. the sealing layer 4341 and the outer layer 4346). In another example, the method comprises forming the covering into the elongate cylindrical shape by forming the second layer into the elongate cylindrical shape and then providing the first layer to the exterior of the second layer. For example, the first layer may be wrapped onto the outside of the second layer, sprayed on, or otherwise coated or laminated to the second layer after the second layer already comprises an elongate cylindrical shape. In one example, the method comprises knitting the second layer, for example by circular knitting or 3D knitting. It is to be understood that in some examples of the present technology, there are more than two layers forming the covering 4340, for example three, four or more layers.

Another step in the method comprises supporting a reinforcing structure 4305 on a mandrel 7000. In one form of the present technology, the method comprises supporting the reinforcing structure 4305 on the mandrel 7000 by collapsing the mandrel 7000, mounting the reinforcing structure 4305 on the mandrel 7000 and expanding the mandrel 7000. FIG. 44 shows a mandrel 7000 according to an example of the present technology. The mandrel 7000 in this example comprises an actuator 7001 and expanding supports 7002. The actuator 7001 can be inserted within the expanding supports 7002 to expand the mandrel 7000 and withdrawn from the expanding supports 7002 to collapse the mandrel

7000. FIG. 44 shows in the mandrel 7000 in a collapsed state in which the reinforcing structure 4305 can be mounted on the mandrel 7000 by mounting it on the expanding supports 7002. As shown in FIG. 45, a reinforcing structure 4305 in the form of a plurality of support structures 4310 is supported on the mandrel 7000. In this particular example, the support structures are ring members. After the reinforcing structure 4305 is mounted on the mandrel 7000, the mandrel 7000 is expanded to hold the reinforcing structure 4305 securely. FIG. 46 shows the mandrel 7000 in an expanded state supporting the reinforcing structure 4305. In this example, the actuator 7001 of the mandrel 7000 is inserted into the expanding supports 7002 of the mandrel 7000 to expand them and tighten the support structures 4310 against the mandrel 7000.

Another step of the method comprises inserting the mandrel 7000 and reinforcing structure 4305 into the interior of the covering 4340 while inverting the covering 4340 such that the first side provides the internal surface of the covering 4340 and the second side provides the external surface of the covering 4340. That is, in this step of the method, the cylindrical covering 4340 is turned inside out. The initially interior side of the cylindrical shape of the covering 4340 becomes the exterior side, and the initially exterior side becomes the interior side. As described above, the covering 4340 in the state shown in FIG. 43 comprises a first layer in the form of an air impermeable sealing layer 4341 on the exterior side of the covering 4340 and a second layer in the form of an outer layer 4346 on the interior side of the covering 4340. For use in an air delivery conduit 4300, the sealing layer 4341 must form an inside of the covering 4340 to define a sealed air path through which air can be conveyed, with the outer layer 4346 on the exterior side. As mentioned above, the outer layer 4346 may comprise a textile material suited to use as an external surface of the air delivery conduit 4300 due to its soft feel and appearance of bedclothes.

FIG. 47 shows the mandrel 7000 and reinforcing structure 4305 being inserted into the interior of the covering 4340. During insertion, the covering 4340 is inverted such that the first side of the covering 4340 provides the internal surface of the covering 4340 and the second side of the covering 4340 provides the external surface. FIG. 48 shows a corresponding close-up view of the inversion of the covering 4340. In this example of the present technology, the method comprises inverting the covering 4340 by rolling the covering 4340 inwards towards a central axis of the covering 4340 and onto the mandrel. As shown in FIG. 48, as the mandrel 7000 and reinforcing structure 4305 is inserted into the interior of the covering 4340, the covering 4340 rolls inwardly and on to the mandrel 7000. The covering 4340 therefore turns inside-out as it receives the mandrel 7000 into its interior.

FIG. 49 shows the mandrel 7000 and reinforcing structure 4305 after they have been completely inserted into the covering 4300. Since the covering 4340 inverts during its assembly with the mandrel 7000 and reinforcing structure 4305, after insertion the first side of the covering 4340 (in this example the sealing layer 4341) provides the internal surface of the covering 4340 and the second side of the covering 4340 (in this example the outer layer 4346) provides the external surface of the covering 4340. The mandrel 7000 may be inserted into the covering 4340 while the covering 4340 remains stationary, or the covering 4340 may be rolled onto a stationary mandrel 7000, or both the covering 4340 and mandrel 7000 may move together to insert the mandrel 7000 and reinforcing structure 4305 into the interior of the covering 4340.

Another step of the method comprises removing the mandrel 7000 from the covering 4340 leaving the reinforcing structure 4305 within the covering 4340. As previously described, the mandrel 7000 in this example of the technology is collapsible. FIG. 50 shows the removal of the mandrel 7000 from the covering 4340. The method according to the present example of the technology comprises collapsing the mandrel 7000 to release the reinforcing structure 4310. This may be achieved by retracting the actuator 7001 of the mandrel 7000 which allows the expanding supports 7002 to collapse, releasing the reinforcing structure 4305. Once the mandrel 7000 is collapsed, the method comprises removing the mandrel 7000 from the interior of the covering 4340. The mandrel 7000 may be removed by withdrawing it while holding the covering 4340 stationary or by removing the covering 4340 while the mandrel 7000 remains stationary. FIG. 51 shows the mandrel 7000 after removal from the covering 4340. The reinforcing structure 4305 remains in the covering 4340, forming an air delivery conduit 4300. The covering 4340 may grip the reinforcing structure 4305 in this state. In some examples of the present technology, the covering 4340 may be stretched when the reinforcing structure 4305 is inserted into its interior. In examples of the present technology in which the reinforcing structure 4305 comprises a plurality of spaced apart support structures 4310 (e.g. ring members in one example), this stretch may leave grooves in the covering 4340 between the support structures 4310, which may enable the air delivery conduit 4300 to bend to a large extent. The ability to bend well (e.g. to a small radius) may enable the air delivery conduit 4300 to provide good decoupling of forces. This may be particularly advantageous when the air delivery conduit 4300 comprises a short tube, for connection between a patient interface 3000 and a long tube connected to an RPT device 4000.

Another step of the method comprises bonding the reinforcing structure 4305 to the covering 4340. In some examples of the present technology, the method comprises heat-bonding or ultrasonically welding the reinforcing structure 4305 to the covering 4340. The sealing layer 4341 may comprise a material which is configured to bond to the reinforcing structure 4305, such as a thermoplastic material (e.g. TPU film). In other examples, the inner layer of the covering or the outer surfaces of the reinforcing structure 4305 may be provided with adhesive to adhere to the reinforcing structure 4305 to the covering 4340.

Further method steps to finish the air delivery conduit 4300 may comprise trimming excess covering 4340 from the ends of the air delivery conduit 4300 and adding end connectors 4362 (e.g. connectors configured to enable the air delivery conduit 4300 to connect to a patient interface 3000 at one end and, at the other end, to a long tube connected to an RPT device 4000).

The method and steps described above may be applied to the manufacture of an air delivery conduit 4300 having features of any example of the present technology described herein. That is, the reinforcing structure 4305 may comprise support structures 4310 having any of the features of support structures 4310 described herein. The covering may comprise any of the materials or material properties described herein.

5.5.5.4 Vacuum Assisted Assembly of Covering to Reinforcing Structure

FIG. 52 shows a covering 4340 for an air delivery conduit 4300. With reference to FIG. 52-60, a method of manufacturing an air delivery conduit 4300 according to another example of the present technology and exemplary variations of that method will be described.

The covering 4340 shown in FIG. 52 may be air impermeable. In some examples, the covering 4340 is of the type described elsewhere in the present disclosure. For example, the covering may comprise an air impermeable sealing layer and an outer layer formed from a textile material. The covering 4340 comprises an elongate cylindrical shape comprising an exterior and an interior. In this example, the covering 4340 is stretchable. The covering 4340 may comprise stretchable elastic materials. The covering 4340 may be stretchable such that the width/diameter of its cylindrical shape is able to be stretched to expand. The covering 4340 may be elastic so as to return to a smaller diameter, such as an original/unexpanded diameter, following expansion. The covering 4340 may be formed using methods described elsewhere in the present disclosure, such as by laminating together a sealing layer 4341 and an outer layer 4346 formed form a textile material, and then joining opposing edges to from a tube. Alternatively, a textile sleeve may be knitted and then a sealing layer may be bonded to the inside thereof to form an air impermeable covering with a textile outer surface. Alternatively, a sealing layer may be bonded to the exterior of a textile sleeve and then the resulting dual-layer covering may be turned inside-out.

One step of the method comprises supporting the air impermeable covering 4340. In FIG. 52, the covering 4340 is supported at its ends with a vacuum jig 7100. The ends of the covering 4340 may be sealingly attached to the vacuum jig 7100. In other examples of the present technology, the covering 4340 may be supported by another jig. The method also comprises expanding the covering 4340. The method may comprise expanding the covering 4340 with a greater air pressure applied to the interior of the covering 4340 than to the exterior of the covering 4340. In this example, the covering 4340 is expanded by application of a vacuum to the exterior of the covering 4340. In other examples, the method may comprise creating a region of high air pressure interior to the covering 4340. Since the covering 4340 is air impermeable in order to create a sealed air path for conveying air under pressure, the greater air pressure applied to the interior of the covering 4340, such as due to the vacuum applied around its exterior, expands the covering 4340. The covering 4340 is expanded to have a greater diameter. FIG. 53 shows the covering 4340 in an expanded state while supported in the vacuum jig 7100. The vacuum jig 7100 is in this example wider than the covering 4340 to allow the covering 4340 to expand. The vacuum jig 7100 comprises a cylindrical chamber with a larger diameter than the diameter of the 4340 at rest. The vacuum jig 7100 in this example comprises a pocket/volume surrounding the covering 4340 between the covering 4340 and interior of the vacuum jig 7100. Air is evacuated within the interior of the vacuum jig 7100 to expand the covering 4340 to the larger diameter of the vacuum jig. The vacuum jig may comprise multiple ports, such as suction ports, vacuum release ports and blowing ports.

In a further step, the method comprises inserting an elongate reinforcing structure 4305 into the interior of the covering 4340. In one example, the method comprises inserting the reinforcing structure 4305 while supporting it on a mandrel 7000. Alternatively, if the particular structure of the reinforcing structure 4305 allows, the reinforcing structure 4305 may be inserted into the cover 4340 while supported at one end or placed inside the covering 4340 by hand. The reinforcing structure 4310 may be wider than the covering 4340 when the covering 4340 is in a contracted state, to allow the covering 4340 to contract onto the reinforcing structure 4305 to grip the reinforcing structure. The covering 4340 may shrink-wrap the reinforcing structure 4305. This may facilitate good contact between the covering 4340 and the reinforcing structure 4305, which may result in a good bond (which may be created in a subsequent step of the method).

FIG. 54 shows a mandrel (or rack) 7000 configured to support a reinforcing structure 4305 comprising a plurality of support structures 4310, which may be ring members or other support structures having a form as described elsewhere in the present disclosure. The mandrel 7000 is elongate and is configured to support a plurality of support structures 4310 thereon. The support structures 4310 may be spaced equally along the mandrel. The support structures 4310 may each be wider than the covering 4340 when the covering is in a contracted state.

The mandrel 7000 comprises a plurality of teeth 7125. The teeth 7125 are configured to allow the support structures 4310 to slide along the mandrel in a first direction 7121. Additionally, the teeth 7125 are configured to prevent the support structures 4310 from sliding along the mandrel 7000 in a second direction 7122 opposite to the first direction 7121. The teeth 7125 function as ring retainers or ring retaining portions in this particular example in which they support ring members. The first direction 7121 and second direction 7122 are directions relative to the orientation of the mandrel 7000 and are aligned with a central axis of the mandrel 7000. The teeth 7125 may be movable, collapsible, slidable, pivotable and/or resilient. In this example of the present technology, the teeth 7125 are biased into an outwardly projecting position with respect to the central axis of the mandrel 7000. The teeth 7125 are biased into a position in which the protrude out from a surface of the mandrel 7000 along which the support structures 4310 slide over. The teeth 7125 are able to be depressed inwardly with respect to the central axis of the mandrel 7000 to allow the support structures 4310 to slide over the teeth 7125 in the first direction 7121. In this example, the teeth 7125 are spring-loaded into the outwardly projecting position.

FIG. 55 shows a close-up view of teeth 7125 on the mandrel 7000 and a ring member 4310 sliding along the mandrel 7000 in the first direction 7121. FIG. 55 shows a first set of teeth 7125 partially depressed by a support structures 4310 in the process of sliding in the first direction 7121 and a second set of teeth 7125 in an outwardly projecting position.

The teeth 7125 may comprise any suitable profile to function in the manner of ratchet teeth, allowing each support structures 4310 to slide in the first direction 7121 but not to slide backwards in the second direction 7122. In this example, each tooth 7125 comprises a first wall 7126 and a second wall 7127. The first wall 7126 of each tooth 7125 is tapered with respect to the central axis of the mandrel 7000. A first wall 7126 that is tapered, ramped, sloped or the like allows the ring members 4310 to depress the tooth 7125 as the ring member 4310 slides along the mandrel 7000. The second wall 7127 is perpendicular to the central axis of the mandrel. A second wall 7127 that is perpendicular to the second direction 7122 prevents a support structures 4310 from sliding in the second direction 7122 because there is no force acting on the second wall 7127 in a direction that would depress the tooth 7125 (e.g. a direction partially towards the central axis of the mandrel 7000).

The mandrel 7000 in this example of the present technology comprises a plurality of sets of teeth 7125. The sets of teeth 7125 are spaced apart along the mandrel 7000. Each set of teeth 7125 is configured to prevent a respective support structures 4310 from sliding along the mandrel 7000 in the second direction 7122. When the mandrel 7000 is fully loaded with support structures, as shown in FIG. 56, the mandrel 7000 comprises, in an alternating fashion, support structures 4310 and sets of teeth 7125. The sets of teeth 7125 may also function to space the support structures 4310 apart on the mandrel 7000. The teeth 7125 may also provide a small amount of resistance to movement of the support structures 4310 in the first direction 7121, since a small amount of force may be required to depress each tooth 7125. This small resistance may function to keep the support structures 4310 in the intended place on the mandrel 7000 and prevent unintended movement of each support structures 4310 in the first direction 4310. Each set of teeth 7125 may comprise a plurality of teeth 7125 provided concentrically about the central axis of the mandrel 7000 at a point along the central axis. In some examples each set of teeth 7125 may comprise only one tooth 7215. Each set of teeth 7125 may comprise two, three, four or more teeth 7125 provided concentrically around a point along the mandrel 7000.

The sets of teeth 7125 may be spaced apart equally along the length of the mandrel 7000. In some examples, the size of the teeth 7125 and/or the spacing between adjacent sets of teeth 7125 may vary along the length the mandrel 7000, for example to space support structures 4310 closer together at the ends of the air delivery conduit 4300 to be manufactured by the present method.

FIG. 57 shows the step of inserting the reinforcing structure 4305 into the interior of the covering 4340. As shown, the reinforcing structure 4305, in this example a plurality of support structures 4310, is supported on the mandrel 7000. The mandrel 7000 and reinforcing structure 4305 are inserted together into the interior of the covering 4340 while the covering 4340 is expanded. The covering 4340 is expanded such that the interior diameter of the covering 4340 is larger than the outer diameter of the support structures 4310. The larger internal diameter of the covering 4340 in comparison to the reinforcing structure 4305 allows the reinforcing structure 4305 to be inserted without interference.

Another step of the method comprises releasing the covering 4340 to allow the covering 4340 to contract on the reinforcing structure 4305. FIG. 58 shows the covering 4340 contracted onto the reinforcing structure 4305. The method may comprise releasing the covering 4340 by removing the greater air pressure applied to the interior of the covering 4340 than to the exterior thereof. In this example, the method comprises releasing the covering 4340 by releasing the vacuum applied by the vacuum jig 7100. As shown in FIG. 58, the vacuum jig 7100 has released the covering 4340 and it has contracted onto the reinforcing structure 4305. As shown, the covering 4340 contacts the outer surfaces of the support structures 4310 supported on the mandrel 7000. The support structures 4310 may each be wider than the covering 4340 when the covering 4340 is in a contracted state. In the assembled state shown in FIG. 58, the covering 4340 may have contracted towards an original diameter but may be prevented from reaching its original diameter by the ring members 4310. In some examples, the covering 4340 comprises grooves between the support structures 4310 due to residual tension in the covering 4340 caused by the support structures 4340 being wider than the original width of the covering 4340.

In some examples, the method comprises at least partially bonding the covering 4340 to the reinforcing structure 4305 before removing the mandrel 7000 from the assembly. This bonding may be heat-bonding or ultrasonic welding, in examples. The covering 4340 may comprise a heat-bondable or weldable film applied to the interior thereof, which may also function as the air impermeable sealing layer of the covering 4340. This layer may be a thermoplastic material such as a TPU film. In some examples, the reinforcing structure 4305 may be completely bonded to the covering 4340 at this stage, although even a partial bond may enable the mandrel 7000 to be removed from the assembly without affecting the positioning of the reinforcing structure 4305 within the covering (e.g. without misaligning the ring members 4310 in this example). In some examples the covering 4340 may be wrapped tightly enough to the support structures 4310 that no bonding prior to removal of the mandrel 7000 is required, or the reinforcing structure 4305 may have a structure which is sufficiently rigid or self-supporting that the wrapping of the covering 4340 holds the reinforcing structure 4305 in position while the mandrel 7000.

The air delivery conduit 4300 is effectively formed at this stage although further steps may be required to finish it, such as trimming of the ends of the covering 4340 and the addition (e.g. overmoulding) of end connectors 4362, such as to connect the air delivery conduit between a patient interface 3000 and tubing connected to an RPT device 4000, or between an RPT device 4000 and a patient interface 3000.

The method may comprise removing the mandrel 7000 from the interior of the covering 4340, leaving the reinforcing structure 4305 within the covering 4340. FIG. 59 shows the mandrel 7000 during removal from the covering 4340. The mandrel 7000 may be removed from the interior of the covering 4340 by holding the covering 4340 stationary (e.g. within the vacuum jig 7100) and withdrawing the mandrel 7000 from the air delivery conduit 4300. Alternatively, the mandrel 7000 may be removed by holding the mandrel 7000 stationary and moving the air delivery conduit 4300 away from the mandrel 7000 (e.g. by moving the vacuum jig 7100).

As the mandrel 7000 allows the reinforcing structure 4305 to slide along the mandrel 7000 in the first direction 7121, the mandrel 7000 is able to slide out of the covering 4340 in the second direction 7122 leaving the reinforcing structure 4305 within the covering 4340, since the resulting relative motion of the reinforcing structure 4305 will then be in the first direction 7121 with respect to the mandrel 7000. As shown in FIG. 59, as the mandrel 7000 is withdrawn, the teeth 7125 depress to allow the mandrel 7000 to move towards the second direction 7122 with respect to the support structures 4310 forming the reinforcing structure 4305 in this example of the present technology. As shown by the left-most set of two teeth 7125, once the support structures 4310 pass over the teeth 7125, the teeth spring back into their outwardly protruding positions.

The method may also comprise the step of releasing the ends of the covering 4340 from the vacuum jig 7100. This step may be performed before, after or during extraction of the mandrel 7000 from the covering 4340.

FIG. 60 shows the completed air delivery conduit 4300 prior to finishing steps such as further bonding of the reinforcing structure 4305 to the covering 4340 and the addition of end connectors 4362. The air delivery conduit 4300 comprises a plurality of support structures 4310 forming a reinforcing structure 4305 which reinforces a covering 4340 to resist occlusion on the air delivery conduit 4300, for example by being able to resist a crushing force on the air delivery conduit 4300. If bonding of the reinforcing structure 4305 to the covering 4340 has not already been completed prior to removal from the mandrel 7000, the covering 4340 and reinforcing structure can be bonded by heat-bonding, ultrasonic welding or the like. In some examples, the internal surface of the covering 4340 comprises an adhesive which bonds to the support structures 4310 or other reinforcing structure 4305 when it is released into contact with the support structures 4310. FIG. 7A shows another illustration of a portion of an air delivery conduit 4300, in a finished state with an end connector 4362.

The method and steps described above may be applied to the manufacture of an air delivery conduit 4300 having features of any example of the present technology described herein. That is, the reinforcing structure 4305 may comprise support structures 4310 having any of the features of support structures 4310 described herein. The covering may comprise any of the materials or material properties described herein.

5.5.6 Application of Sealing Layer to Interior of Conduit

In some examples of the present technology there is provided an air delivery conduit 4300 comprising a reinforcing structure 4305, a covering 4340 provided around the reinforcing structure 4305 and a sealing layer 4341 provided to the inside of the reinforcing structure. The covering 4340 may be formed from a textile material. In some examples the covering 4340 is not air impermeable. The sealing layer 4341 may be air impermeable and, upon application to the reinforcing structure 4305 and covering 4340, may form a sealed air path within the air delivery conduit 4300. The sealing layer 4341 may be provided to the reinforcing structure 4305 and covering 4340 from the interior of the reinforcing structure 4305 (and interior of the covering 4340).

A reinforcing structure 4305, for example in the form of an array of support structures 4310 (e.g. ring members) or a helical rib member, may be covered in a covering 4340 comprising a textile sleeve. A sealing layer 4341, for example in form of a film lining, may be inserted into an interior of a reinforcing structure 4305. The sealing layer 4341 may comprise a sheet of thermoplastic material, such as TPU, rolled and bonded at the edges to form a hollow cylinder, after which it is inserted into the interior of the reinforcing structure 4305 and covering 4340. A hot blow process may be used to expand and bond the cylindrical sealing layer 4341 to the support structures 4310 and the outer textile layer.

FIGS. 33-39 show steps of a method of applying a sealing layer 4341 to the interior of an air delivery conduit 4300 during manufacturing of the air delivery conduit 4300. In this example the air delivery conduit 4300 comprises a reinforcing structure 4305 comprising a plurality of support structures 4310, ring members in particular. In other examples the reinforcing structure 4305 may comprise one or more helical rib members or another skeletal structure.

As shown in FIG. 33, in a first step, an array of support structures 4310 are sheathed by a covering 4340. The covering 4340 comprises a textile material in this example. In some examples the covering 4340 may comprise a seamless knitted sleeve. The support structures 4310 may be supported on a mandrel or jig (not shown) and the covering 4340 may be slidden or slipped over the support structures 4310 while on the mandrel or jig. Alternatively, the covering 4340 may be wrapped around the support structures 4310. Alternatively, the covering 4340 may be held open and the support structures 4310 may be inserted by a mandrel into the interior of the covering 4340. Once the support structures 4310 are inserted in the covering 4340, the assembly may be held in place.

With reference to FIG. 34, in another step, the interior of the tube may be preheated with hot air. This preheating may assist with good bonding between the sealing layer 4341 and the covering 4340. The hot air may be provided from a mandrel inserted into the tube or blown through the tube. The reinforcing structure 4305 and the covering 4340 may be heated in this step.

With reference to FIG. 35, in another step, the sealing layer 4341 may be inserted into the assembly. The sealing layer 4341 may be inserted into the interior of the reinforcing structure 4305 and covering 4340. The sealing layer 4341 may be provided to a mandrel (not shown), which inserts the sealing layer 4341 into the interior of the reinforcing structure 4305 and covering 4340. The mandrel may be provided with a non-stick surface, such as with PTFE.

The sealing layer 4341 may comprise a cylindrical tube of film and may be formed from TPU or another plastic material. In some examples, the sealing layer 4341 comprises a laminate comprising two film layers. The sealing layer 4341 may comprise an inner layer and an outer layer. The two layers may comprise different softening points. In one example, the inner film (facing the inside of the tube and defining the sealed air path) may comprise an Ether type TPU which, advantageously, is hydrolysis resistant and anti-microbial. The outer film may comprise a lower softening temperature range than the inner film. Advantageously, this may assist the outer film to bond to the ring members 4310 and covering 4340.

In alternative examples, the sealing layer 4310 may comprise a single layer of film. The single layer may be provided with an adhesive on the outer surface for subsequent bonding to the reinforcing structure 4305 and covering 4340.

The sealing layer 4341 may be produced by tube extrusion, which may be followed by a wall thinning process, or by joining the edges of a sheet or strip of film. When edges of a strip/sheet are joined to form the sealing layer 4341 into a tube, one strip may be rolled and bonded to itself, or two strips may be joined along their edges to create two bonded edges.

In some examples, the sealing layer 4341 comprises a thickness of less than 200 microns and, in some particular examples, less than 100 microns.

As shown in FIG. 36, in a further step, once the sealing layer 4341 is positioned within the covering 4340, the method comprises blowing the interior of the sealing layer 4341 with hot air to soften the sealing layer 4341 and bond it to the interior of the covering 4340 and reinforcing structure 4305, either by heat-bonding or adhering (in examples in which the sealing layer 4341 is provided with an adhesive layer).

As shown in FIG. 39, the bonding of the sealing layer 4341 to the interior of the covering 4340 and the reinforcing structure 4305 is complete and the tubing of the air delivery conduit 4300 is formed (end connectors of the air delivery conduit 4300 can be added as a subsequent step, for example by overmoulding or bonding end connectors to the tube that has been formed). The sealing layer 4341 fits to the shape of the covering 4340 and reinforcing structure 4305. The sealing layer seals the interior of the air delivery conduit 4300 to form a sealed air path within the air delivery conduit 4300.

FIGS. 37 and 38 show an alternative method of inserting the sealing layer 4341 into the interior of the covering 4340 and bonding it thereto. With reference to FIG. 37, the sealing layer 4341 may be mounted to a balloon 7005 on a mandrel 7000. The mandrel 7000, balloon 7005 and sealing layer 4341 may be inserted into the interior of the reinforcing structure 4305 and covering 4340 assembly. With reference to FIG. 38, once the mandrel and sealing layer 4341 mounted thereon is inserted within the tube, the balloon 7005 can be inflated with hot air, expanding the film tube and bonding it to the reinforcing structure 4305 (support structures 4310 in this example) and the covering 4340. Once this is complete, the tubing of the air delivery conduit 4300 as shown in FIG. 39 is formed, with a sealed air path in the interior formed by the sealing layer 4341.

An advantage of the method described with reference to FIGS. 35 and 36 is that the sealing layer 4341 may be easy to mount to the mandrel, since the mandrel may be provided with a low friction surface, such as PTFE or another suitable material. An advantage of the method described in relation to FIGS. 37 and 38 is that the balloon 7005 may enable a high level of control over the force applied to the sealing layer 4341 during bonding and the uniformity of that force along the length of the tube.

5.5.7 Stiffness of Outer Layer

In some examples of the present technology, the air delivery conduit 4300 comprises an outer layer 4346 which comprises variations in stiffness between different regions of the outer layer 4346.

5.5.7.1 First and Second Portions of the Outer Layer

FIG. 61 shows an air delivery conduit 4300 according to one example of the present technology. The air delivery conduit 4300 comprises an outer layer 4346. The air delivery conduit 4300 may also comprise a sealing layer 4341 (not shown in FIG. 61) within the outer layer 4346. The sealing layer 4341 forms a sealed air path through which the flow of air is able to be conveyed in use, in this example. In other examples of the present technology, the air delivery conduit 4300 does not comprise a separate sealing layer 4341, for example if the outer layer 4346 is otherwise sealed, such as with a coating on inner and/or outer surfaces of the outer layer 4346 or by any other suitable manner of making a textile material air impermeable. Accordingly, in one form of the present technology the outer layer 4346 is air impermeable and forms a sealed air path. In another form the air delivery conduit 4300 comprises a sealing layer 4341 within the outer layer 4346, the sealing layer 4341 forming the sealed air path. In either form, the air delivery conduit 4300 forms a sealed air path through which a flow of air is able to be conveyed in use. The sealed air path enables the air delivery conduit 4300 to convey a flow of air under pressure from a respiratory pressure therapy device to a patient interface for providing respiratory pressure therapy to a patient. The outer layer 4346 may also be identified as a textile layer formed from a textile. The textile layer may be the only layer forming the air delivery conduit 4300 or, as described above, a sealing layer 4341 may be provided within the textile layer. The outer (textile) layer 4346 may comprise a circular cross section, a non-circular cross section, an elliptical cross section, a D-shaped cross section, a rectangular cross section (optionally with rounded corners), or a trapezoidal cross section or any other suitable cross section.

In this example, the outer (textile) layer 4346 comprises a plurality of different portions with varying properties. The outer layer 4346 comprises a plurality of first portions 4351 and a plurality of second portions 4352. Each of the first portions 4351 has a first stiffness and each of the second portions 4352 has a second stiffness greater than the first stiffness. That is, the second portions 4352 are stiffer than the first portions 4351. In some examples, there may be additional portions having stiffnesses other than the first stiffness or the second stiffness.

In this example, the first portions 4351 are flexible to enable the air delivery conduit 4300 to bend. The first portions 4351 may provide the air delivery conduit 4300 with a high degree of bendability to allow it to deform in response to external forces rather than transfer those forces to a patient interface 3000 to which it is connected. When the air delivery conduit 4300 is a short tube, connecting a patient interface 3000 with tubing connected to a respiratory pressure therapy device 4000, high flexibility in the air delivery conduit 4300 may enable it to function as an effective decoupling structure.

In this example, the second portions 4352 are stiffer than the first portions 4351 to prevent occlusion of the air delivery conduit 4300. The second portions 4352 may be substantially rigid. The second portions 4352 may be rigidised portions. In this example of the present technology, the air delivery tube 4300 comprises a plurality of first portions 4351 and a plurality of second portions 4352 arranged in an alternating manner along the air delivery conduit 4300. There is a first portion 4351 on either side of each second portion 4352, in this example. In this example, the second portions 4352 comprise a plurality of ring portions spaced apart along the air delivery conduit 4300. In this example, the second portions 4352 provide the same functions as the ring members 4310 of other examples of the present technology and may each comprise a similar stiffness and/or strength. The second portions 4352 together function as a reinforcing structure for the air delivery conduit 4300. The size and spacing of the second portions 4352 may be similar to or the same as the disclosed sizes and spacings of the ring members 4310 disclosed herein. The second portion(s) 4352 may enable the air delivery conduit 4300 to hold a shape.

In some examples of the present technology, the outer layer 4346 of the air delivery conduit 4300 may comprise only one first portion 4351 and only one second portion 4352. FIG. 65 shows an air delivery conduit 4300, according to an example of the present technology, comprising a single first portion 4351 and a single second portion 4352. The second portion 4352 comprises a helical portion extending helically along the air delivery conduit 4300. The second portion 4352 is contiguous along air delivery conduit 4300 in this example. The remainder of the outer layer 4346 comprises the first portion 4351, which also extends helically along the air delivery conduit 4300. The second portion 4352 may be stiffer than the first portion 4351 and may function as a helical reinforcing structure in a similar manner to prior art tubes comprising a helical extruded plastic rib member. The second portion 4352 may provide some rigidity to the air delivery conduit 4300 to prevent occlusion thereof. In some examples, the air delivery conduit 4300 comprises a pair of helical second portions 4352 and a pair of helical first portions 4351. Each of the pair of helical second portions 4352 may comprise a greater stiffness than the helical first portions 4351. The second portions 4352 in such an example may each extend along the tube in parallel in a double helix formation. In further examples the air delivery conduit 4300 may comprise more than two second portions 4352 having a helical form, such as three, four or more.

5.5.7.2 Textile Outer Layer

The outer layer 4346 may be formed from a textile and may be formed from one of knitting, weaving or the like. In some examples the outer layer 4346 comprises a knitted sleeve. The outer layer 4346 may comprise a woven textile or a non-woven textile, in some examples. In examples of the present technology in which the outer layer 4346 is formed by knitting, the outer layer 4346 may be formed from circular knitting or flat knitting. If formed by circular knitting, the outer layer 4346 may be formed in a cylindrical shape similar to the shape and size of the air delivery conduit 4300 to be formed. If formed by flat knitting, the outer layer 4346 may be formed from a flat textile strip and rolled into a cylindrical shape, after which the long edges of the strip are joined by a suitable method, for example by stitching or bonding.

The textile forming the outer layer may comprise fibres formed from nylon, polyester, polyurethane, spandex, cotton, wool and/or any other suitable natural or synthetic material. In some forms of the present technology the textile comprises multiple types of fibres formed from different materials, e.g. some fibres formed from nylon and some fibres formed from spandex.

In examples of the present technology in which the outer layer 4346 is formed from a textile, the at least one first portion 4351 may be formed from a first network of fibres of the textile. The at least one second portion 4352 may be formed from a second network of fibres of the textile. The network of fibres may comprise a structure such as formed by knitting, weaving, bonding etc. In some examples the network of fibres may comprise a felt material.

In some examples of the present technology, portions of the outer layer 4346 (either the entire outer layer 4346 or one or more portions thereof) may be formed from material that is any one or more of: hydrophobic, oleo-phobic, anti-staining, quick-drying, moisture-wicking, anti-microbial, infrared reflective and/or heat treatable. The outer layer 4346 may comprise portions comprising particular materials having these properties. In examples of the present technology in which the outer layer 4346 comprises a knitted textile, these properties may be provided to the textile by knitting certain portions of the textile using fibres having these properties (e.g. yarns, threads and the like). Similarly, where the outer layer 4346 comprises a woven textile, these properties may be imparted to the textile by weaving the textile from specific fibres having these properties.

As described above, in some examples the outer layer 4346 may be air impermeable. In other examples the outer layer 4346 may be air permeable and the air delivery conduit 4300 comprises a separate sealing layer 4341.

5.5.7.2.1 Stiffened Portions of the Outer Layer

In some examples of the present technology, one or more portions of the outer layer 4346 may be stiffened. In some examples, the one or more second portions 4352 of the outer layer 4346 may be stiffened. The second portions 4352 may be stiffened by a stiffening process performed on the second portions 4352 such that they have a greater stiffness than a stiffness of the first portions 4351. Each second portion 4352 may comprise a network of fibres that is stiffened.

In some forms, the outer layer 4362 of the air delivery conduit 4300 comprises an activated material provided to the second portion(s) 4352. The activated material may cause the second portion 4352 to be stiffened following the stiffening process. That is, during the stiffening process the second portion 4352 may stiffen and after the stiffening process the second portion 4352 may have an increased stiffness.

The activated material may be identified as an activating material when first provided to the second portion 4352 and prior to the stiffening process. The activating material may then become an activated material after it is activated during the stiffening process.

In some examples, the activated material is provided to the second portion 4352 during formation of the second portion 4352. The activated material may form part of the second portion 4352 or form some or all of the second portion 4352. In some forms, the first network of fibres forming the first portion 4351 of the air delivery conduit 4300 may comprise fibres formed from a first material and the second network of fibres forming the second portion 4352 may comprise fibres formed from the activated material. That is, the textile forming the outer layer 4346 may comprise fibres formed from the activated material (or activating material at the time of forming the textile). In some examples, the second network of fibres, forming the second portion 4352, may comprise fibres formed from a first material and fibres formed from the activated material.

In other forms, the activated material is provided to the second portions 4352 in addition to the fibres forming the second network of fibres. In some examples, the activated material may not be in the form of fibres. In some examples, the activated material may be a coating applied to the second portions 4352. In some examples the activated material may be impregnated into the network of fibres forming the textile material in the second portions 4352.

5.5.7.2.2 Heat-Treated Outer Layer

In some examples of the present technology, one or more portions of the outer layer 4346 may be heat-treated. The stiffening process performed on the second portion 4352 to stiffen the second portion 4352 may be heat treatment. In some examples, the one or more second portions 4352 may be heat-treated and, in particular examples, may each be formed from a heat-treated network of fibres of the textile forming the outer layer 4346. The second portions 4352 may be heat-treated to provide heat-treated networks of fibres in the second portions 4352.

In some examples, the air delivery conduit 4300 is subjected to heat during or after manufacturing, which results in the second portions 4352 becoming heat-treated (e.g. the networks of fibres in the second portions 4352 become heat-treated). During and/or after such heating of the air delivery conduit 4300, there may be a change in one or more properties of the second portions 4352. In some examples, heat is focused on the second portions 4352 rather than the air delivery conduit 4300 as a whole, which results in the networks of fibres in the second portions 4352 becoming heat treated.

In some examples of the present technology, heat-treatment of the outer layer 4346 to cause a change in a property of the outer layer 4346 comprises heating the outer layer 4346 or portions thereof. In other examples of the present technology, heat-treatment of the outer layer 4346 to cause the change comprises both heating and cooling the outer layer 4346 (or allowing it to cool). That is, heat-treatment may comprise heating and/or cooling, and the change in a property may occur during either heating or cooling stages of heat-treatment, or after heat-treatment but at least partially as a result of the heat-treatment.

In some examples of the present technology, the second network of fibres of the textile in the one or more second portions 4352 are stiffened by heat-treatment. The one or more second portions 4352 may be stiffened by heat-treatment such that they have a stiffness greater than that of the one or more first portions 4352 of the outer layer 4346. Other properties may be modified or imparted to the second portions 4352 or to other parts of the air delivery conduit 4300 by heat-treatment, such as hardness or appearance, among others.

Where the outer layer 4346 or portions thereof are formed from a plurality of different materials, the textile may be formed from fibres formed from the different materials. In the case of a knitted or woven textile, the textile may be knitted or woven, respectively, using multiple yarns formed from the different materials.

In some examples, the second portions 4352 comprise an activated material in the form of a heat treatable material. The activated material may be stiffened by heat treatment. In some examples, the activated material may comprise at least one of a thermosetting material and a thermoplastic material.

5.5.7.2.3 Thermosetting Second Portions

In some forms, the second portions 4352 of the outer layer 4346 may comprise a cured portion. The second network of fibres of the second portion(s) 4352 may comprise a heat-treated network of fibres which form the cured portion. For example, the second network of fibres may comprise a curable material cured to stiffen the second portion 4352. In some examples the activated material provided to the second portion 4352 to stiffen the second portion 4352 may be a cured material. In particular examples, the second network of fibres may comprise a thermoset material as the activating material. The second network of fibres may comprise a material that stiffens and/or hardens when heated. Such material may stiffen at a relatively low temperature (e.g. with only minor heating). Some or all of the fibres of the second network of fibres may be fibres formed from a thermoset material. The second network of fibres may comprise one or more thermoset fibres.

In the case of a knitted textile forming the outer layer 4346, yarn formed from a thermoset material may be knitted into the textile. In the example shown in FIG. 61, the second portions 4352 of the outer layer 4346 are formed from thermosetting yarn knitted into the textile forming the outer layer. Sufficient thermosetting material is knitted into the textile at the second portions 4352 such that after heat-treatment during manufacturing, the network of fibres in the second portions 4352 have a greater stiffness than the first portions 4351 (which lack the curable material) and can prevent occlusion of the tube in use.

In some examples each entire second portion 4352 is formed from a network of thermosetting fibres which stiffen during heat-treatment. In other examples each second portion 4352 is formed from multiple types of fibres, not all of which are thermoset fibres.

In some examples, the second network of fibres may comprise multiple different thermosetting materials, some of which stiffen more readily than others, such as at a lower temperature and/or more quickly. In some examples, the entire outer layer 4346 is formed from thermosetting materials. The outer layer 4346 may comprise a first thermosetting material in the first portions 4351 and may comprise a second thermosetting material in the second portions 4352. The second thermosetting material may stiffen more readily than the first thermosetting material, for example at a lower temperature and/or more quickly, enabling the second portions 4352 to be heat-treated to stiffen the second portions 4352 without also stiffening the first portions 4351.

In some examples, the second network of fibres in the second portions 4352 may comprise a combination of thermosetting and thermoplastic fibres. The thermoplastic fibres may be formed from a thermoplastic material that does not melt or excessively soften during a heat treatment process during which the thermosetting material is stiffened to achieve the desired stiffness of the outer layer 4346 in the second portions 4352.

In some examples, the textile forming the outer layer 4346 may comprise a first material throughout the entire outer layer 4346 and may comprise an activated material provided only to the second portions 4352 of the outer layer 4346. The activated material provided to the second portions 4352 may be a thermosetting material which stiffens during heat treatment of the second portions 4352. In some examples, the first material provided throughout the entire outer layer 4346 is a thermosetting material which does not stiffen as readily as the activated material, allowing for stiffening of the activated material (and thereby stiffening of the second portions 4352) during heat treatment without stiffening, or with less stiffening, of the first material and first portions 4351. In other examples, the first material provided throughout the entire outer layer 4346 is a thermoplastic material which does not melt or overly soften at the temperature at which the activated material cures, allowing for stiffening of the activated material (and thereby stiffening of the second portions 4352) during heat treatment without melting or damaging the first material and first portions 4351.

5.5.7.2.4 Thermoplastic Second Portions

In some forms of the present technology, the second portion 4352 of the outer layer 4346 comprises a fused portion. In some examples, the second network(s) of fibres of the textile comprises a fused portion(s), forming a heat-treated network of fibres. The second network of fibres forming the second portions 4352 may comprise a fusible material. In some forms, the second portion 4352 is provided with an activated material in the form of a fusible material. A fused portion may comprise material that is at least partially fused together, such as a plurality of fibres forming part of a network that are fully or partially fused together to stiffen the fused portion of the network. For example, the second network of fibres may comprise a plurality of fibres at least partially fused together. In some examples, the second network(s) of fibres comprises one or more fibres at least partially fused to surrounding fibres. The surrounding fibres to which fibres of a heat-treated network are fused may be other fibres of that heat-treated network and/or may be fibres or another network of fibres (for example a non-heat-treated network of fibres). In particular examples, the second network of fibres may comprise an activated material that softens or melts when heated. Such material may melt at a relatively low temperature although well above room temperature, in some examples.

In particular examples of the present technology, the second network of fibres in the second portion 4352 comprises a thermoplastic material. The heat-treated network of fibres may comprise one or more thermoplastic fibres. The thermoplastic fibres may be formed from a thermoplastic material. The thermoplastic fibres may be at least partially fused to surrounding fibres, which may be thermoplastic or non-thermoplastic fibres. In some examples, the thermoplastic material is an activated material which stiffens the second portion following a stiffening process, such as a heat treatment process. During heat treatment of the outer layer 4346 or the second portions 4352 thereof, the thermoplastic material within the outer layer 4346 may melt or sufficiently soften such that upon cooling the thermoplastic material fuses with surrounding material in the outer layer 4346, resulting in a stiffer structure within the outer layer 4346. For example, the second portions 4352 of the outer layer 4346 may comprise a network of fibres at least partially formed from thermoplastic fibres. During heat treatment, the thermoplastic fibres activate by melting or sufficiently softening such that upon cooling they fuse with surrounding fibres in the second network of fibres, resulting in a heat-treated network of fibres with an increased stiffness.

In the case of a knitted textile forming the outer layer 4346, yarn formed from a thermoplastic material may be knitted into the textile. In some examples, the second portions 4352 of the outer layer 4346 are formed from thermoplastic yarn knitted into the textile forming the outer layer 4346. Sufficient thermoplastic material is knitted into the textile at the second portions 4352 such that after heat treatment during manufacturing, there is sufficient fusing of thermoplastic material with surrounding fibres within the networks of fibres in the second portions 4352 that the second portions 4352 have a greater stiffness than the first portions 4351 (which may lack, or have less, fused material) and can prevent occlusion of the tube in use.

In some examples each entire second portion 4352 is formed from a network of thermoplastic fibres which melt or sufficiently soften during heat treatment to fuse with surrounding fibres upon cooling, resulting in a heat-treated network of fibres. The fibres within the heat-treated network of fibres may fuse with each other and/or may fuse with fibres of another network of fibres, such as an adjacent network of fibres. A heat-treated network of fibres may comprise a plurality of fibres that have melted and fused together. Alternatively or additionally, a heat-treated network of fibres may comprise a plurality of fibres that have melted and fused to fibres that have not melted.

In other examples each second portion 4352 is formed from multiple types of fibres, not all of which are thermoplastic fibres.

In some examples, the heat-treated network of fibres may comprise multiple different thermoplastic materials, some of which often and/or melt more readily than others, such as at a lower temperature. In some examples, the entire outer layer 4346 is formed from thermoplastic materials. The outer layer 4346 may comprise a first thermoplastic material in the first portions 4351 and may comprise a second thermoplastic material in the second portions 4352. The second thermoplastic material may melt more readily than the first thermoplastic material, for example at a lower temperature, enabling the second portions 4352 to be heat-treated to allow the second thermoplastic material to melt and fuse without causing the first thermoplastic material to melt and fuse, thereby increasing the stiffness of the second portions 4352 without also increasing the stiffness of the first portions 4351.

In some examples, the heat-treated network of fibres in a second portion 4352 may comprise a combination of thermoplastic and thermosetting fibres. The thermosetting fibres may be formed from a thermosetting material that does not cure or excessively stiffen during a heat treatment process of the network of fibres during which the thermoplastic material is melted and allowed to re-fuse to achieve the desired stiffness of the outer layer 4346 in the second portions 4352.

In some examples, the textile forming the outer layer 4346 may comprise a first material throughout the entire outer layer 4346 and may comprise an activated material provided only to the second portions 4352 of the outer layer 4346. The activated material may be a thermoplastic material which melts and fuses during the heat treatment of the second portions 4352. In some examples the first material provided throughout the entire outer layer 4346 is a thermoplastic material which does not melt as readily as the activated material, allowing for melting of the activated material (and thereby fusing and stiffening of the second portions 4352) during heat treatment without stiffening, or with less stiffening of the first material and first portions 4351. In other examples, the first material provided throughout the entire outer layer 4346 is a thermosetting material which does not cure or overly stiffen at the temperature at which the activated material melts, allowing for stiffening of the activated material (and thereby stiffening of the second portions 4352) during heat treatment without curing or stiffening the first material and first portions 4351.

In some examples of the present technology, the second portions 4352 may comprise both cured and fused material. The combination of fused and cured material may contribute to the greater stiffness of the second portions 4352 in comparison to the first portions 4351 of the outer layer 4346. For example, the second portions 4352 of an outer layer 4346 formed from a textile may comprise a thermosetting material and a thermoplastic material (e.g. fibres formed from a thermosetting material and fibres formed from a thermoplastic material). During heat treatment, the thermosetting material may cure and stiffen while the thermoplastic material melts and then, during cooling, fuses with surrounding fibres, resulting in second portions 4352 that are stiffened by heat treatment.

In some examples, the second portion 4352 may comprise one or more fibres formed from polyolefin. The fibres formed from polyolefin may comprise a low melting point, allowing them to be readily melted so that they can fuse with each other and/or surrounding fibres to stiffen the second portions 4352. In other examples, the second portions 4352 may comprise amorphous thermoplastic polyester as an activated material stiffening the second portions 4352.

5.5.7.2.5 Photo-Activated Outer Layer

In some examples of the present technology, the stiffening process which stiffens the second portion(s) 4352 of the outer layer may comprise photo-activated treatment. Photo-activated treatment may include the application of non-visible or visible light to change a property of the second portion 4352. The second portion 4352 may comprise an activated material in the form of a photo-activated material stiffening the second portion 4352 following application of visible or non-visible light to the second portion 4352 or at least the photo-activated material. The photo-activated material may be a material which stiffens during or after application of light (e.g. a particular type of light such as visible light or UV light). In some examples the photo-activated material is a material that has been UV-cured. In such examples the second portion 4352 of the outer layer 4346 comprises a cured portion. Before activation, the photo-activated material may be considered a photo-activating material.

In some forms, the second network of fibres forming the second portion 4352 may comprise one or more fibres formed form the photo-activated material. That is, fibres formed from a photo-activated material may be woven together (possibly with other fibres) to form the textile from which the outer layer 4346 is formed. In other forms the photo-activated material is provided to the outer layer after formation of the textile, for example by applying photo-activating material to the second portions 4352 of the outer layer 4346, such as by coating, after the outer layer is formed.

In some forms, the outer layer 4346 comprises an aliphatic urethane acrylate stiffening the second portions 4352. In another example the outer layer 4346 comprises an epoxy acrylate stiffening the second portions 4352.

In other examples, the stiffening process comprises electron beam (EB) curing. The outer layer 4346 may comprise an activated material comprising a material stiffened by curing during application of an electron beam.

5.5.7.2.6 Pressure-Activated Treatment

In some examples of the present technology, the stiffening process by which the second portions 4352 are stiffened comprises pressure-activated treatment. The second portions 4352 may be stiffened by the application of pressure to the stiffened portions.

In some forms the outer layer 4346 may comprise an activated material in the form of a pressure-activated material provided to the second portions 4352 and stiffening the second portions 4352 following application of pressure to the second portions 4352. The activated material may comprise an adhesive stiffening the second network of fibres following application of pressure to the second portion.

In some examples a second network of fibres forming a second portion 4352 may comprise one or more adhesive fibres. The adhesive fibres may be adhered to surrounding fibres by application of pressure to the second portion 4352.

In some examples the adhesive comprises microencapsulated adhesive. The microencapsulated adhesive may comprise small portions of adhesive encapsulated to prevent stiffening until sufficient pressure is applied to break the encapsulation and free the adhesive. The microencapsulated adhesive may be coated on the outer layer 4346 and may be provided only to the second portions 4352 to cause stiffening of the second portions. In other forms the second network of fibres forming each second portion 4352 may comprise fibres comprising microencapsulated adhesive, for example applied as a coating on the fibres.

In some forms, the outer layer 4346 may comprise a polyvinyl acetate or an ethylene vinyl acetate stiffening the second portions 4352 of the outer layer 4346 following application of pressure the second portions 4352.

5.5.7.2.7 Chemically-Activated Treatment

In some examples of the present technology, the stiffening process comprises chemically-activated treatment to stiffen the second portions 4352 of the outer layer 4346 of the air delivery conduit 4300.

The outer layer 4346 may comprise an activated material provided to the second portions 4352 to stiffen the second portions 4352. The activated material may comprise one or more materials chemically reacted to stiffen the second portion 4352 following application to the second portion 4352. The materials may not have chemically reacted until after application to the second portion 4352. In some examples the activated material may comprise a cross-linking agent.

In some forms, the second portions 4352 may comprise networks of fibres having fibres formed from a material which chemically reacts to stiffen the second portions 4352. In some forms, the stiffening process may comprise applying a material to the second portions 4352, such as a coating, which chemically reacts with fibres of the networks of fibres forming the second portions 4352 (e.g. by causing them to crosslink, cure or otherwise stiffen). In some forms, a chemically-activating coating may be applied to the second portions 4352, after which it may chemically activate to stiffen the second portions (e.g. by crosslinking or curing). The activated material may comprise a two-part mixture which has reacted with itself. Alternatively, The activated material may be one part of a two-part mixture that stiffens during a chemical reaction, the other part being fibres of the textile of the outer layer 4346.

In some examples, the outer layer 4346 may comprise a thermoplastic polyurethane polymer as a cross-linking agent.

5.5.7.3 Sealing Layer

The sealing layer 4341 of the air delivery conduits 4300 of FIGS. 61-65 may comprise features, properties and/or materials as described in relation to the sealing layers 4341 of the air delivery conduits 4300 described with reference to FIGS. 7-60. For example the sealing layer 4341 may comprise a thermoplastic material, such as thermoplastic polyurethane. It may be heat-bonded or adhered to the outer layer 4346. The sealing layer 4341 may comprise a thickness of less than 0.5 mm and in some examples may comprise a thickness of less than 0.2 mm or less than 0.15 mm.

In some examples, the sealing layer 4341 comprises a single layer, for example a single film layer. In some examples the sealing layer 4341 comprises an inner film layer and an outer film layer. The inner film layer may be formed from a material that resists hydrolysis and/or is antimicrobial. In some examples, the inner film layer comprises an Ether-type thermoplastic polyurethane. In some examples the outer film layer comprises a lower softening temperature than the inner film layer.

In some examples the sealing layer 4342 may comprise multiple layers such that the sealing layer 4342 is itself in the form of a laminate. In some examples an additional, or alternative sealing layer 4341 may be provided to the exterior of the outer layer 4346.

5.5.7.4 Method of Manufacturing an Air Delivery Conduit

With reference to FIGS. 62-64, one aspect of the present technology comprises a method of manufacturing an air delivery conduit 4300, such as the air delivery conduits 4300 shown in FIGS. 61 and 65.

A first step of the method comprises forming an outer layer 4346 for the air delivery conduit 4300. The outer layer 4346 comprises a textile in certain forms of the present technology. The outer layer 4346 may comprise one or more first portions 4351 and one or more second portions 4352. The outer layer 4346 therefore comprises at least one first portion 4351 and at least one second portion 4352. FIG. 61 shows an air delivery conduit comprising a plurality of first portions 4351 and second portions 4352 in an outer layer 4346, manufactured using a method according to one example of the present technology. FIG. 65 shows an air delivery conduit 4300 comprising a single first portion 4351 and a single second portion 4352 in an outer layer 4346.

In some examples, the method comprises forming a plurality of first portions 4351 and a plurality of second portions 4352 when forming the outer layer 4346 of the air delivery conduit 4300. The method may comprise forming the plurality of first portions 4351 and the plurality of second portions 4352 in an alternating manner along the outer layer 4346 or a portion thereof. The method may also comprise forming the plurality of second portions 4352 in the form of ring portions spaced apart along the outer layer 4346. FIG. 61 shows an example of an air delivery conduit 4300 produced by such a method.

In other examples, the method comprises forming a single second portion 4352. The second portion 4352 may be in the form of a helical portion extending helically along the air delivery conduit 4300. The method may also comprise forming only a single first portion 4351, which may also extend helically along the air delivery conduit 4300. FIG. 65 shows an example of an air delivery conduit 4300 produced by such a method.

The method may comprise forming the second portions 4352 such that they have the same size and/or spacing as the ring members 4310 of air delivery conduits 4300 described with respect to FIGS. 7-60. As will be described, in some examples of the present technology, the second portions 4352 are rigidised. In such examples, the second portions 4352 are stiffer to support the shape of the air delivery conduit 4300 and prevent occlusion thereof while more flexible first portions 4351 allow a sufficient amount of bending and/or stretching of the tube, enabling the air delivery conduit 4300 to function as a force decoupling component and/or be a comfortable component for a patient to sleep with.

In some examples of the present technology, the method comprises knitting the textile that forms the outer layer 4346. The method may comprise circular knitting the textile or flat knitting the textile, in examples. The method may comprise weaving the textile or forming the textile using any other suitable textile production process. The textile may be elongate and substantially cylindrical when forming the outer layer 4346, although before other steps of the method are performed it may not support itself in a cylindrical shape. In some forms of the present technology, the method comprises knitting the textile in an elongate cylindrical shape. In other forms, the method comprises forming the textile as an elongate strip and then joining edges of the textile to form an elongate cylindrical shape. For example, opposing long edges of a flat textile strip may be joined together, such as by stitching, gluing or otherwise securing or bonding, to form a closed circular cross-section. Any suitable method of forming the outer layer 4346 is contemplated. In examples, the outer layer 4346 may be woven, non-woven, braided or otherwise formed to have the features described herein.

In some examples of the present technology, the method comprises forming the first portions 4351 from a first material and forming the second portions 4352 from a second material. In some examples, the second method may be an activating material. The activating material may be configured to activate, resulting in a change in one or more properties of the activating material, after which it may be a considered an activated material. In some examples, the method comprises forming the second portions 4352 from both the first material and the activating material. For example, a first material may be used to form the textile along an entire length of the outer layer 4346 and an activating material may be used in addition to the first material to form the textile at the second portions 4352. The activating material may comprise one or more different properties to the first material. A third material, or further materials, may be used to form the first portions 4351 and/or the second portions 4352, in some examples, in addition to the first material and activating materials.

In some examples, the method comprises forming the first portions 4351 of the outer layer 4346 with fibres formed from a first material and forming the second portion 4352 of the outer layer 4346 with fibres formed from an activating material. In some forms the method comprises forming the outer layer 4346 and subsequently providing the activating material to the second portions 4352 of the outer layer 4346. The method in some examples may comprise providing more than one activating material to the second portions 4352.

In some examples the method comprises forming an outer layer 4346 having second portions 4352 comprising any one or more of a heat treatable material, photo-activated material, pressure-activated material and chemically-activated material. The second portions 4352 may have a single activated material which is activated in any one or more of these ways or may have multiple activated materials, each activated in a different way. The activated material(s) may be provided to the outer layer 4346 either during formation of the textile material with fibres formed from the activated material or after formation of the textile material by coating, impregnation or another post-processing step.

As also described previously with reference to FIGS. 61 and 65, either or both of the first material and the activating material may be able to be melted. Either or both may be thermoplastic materials. In some examples of the present technology, the activating material comprises a lower melting point than the first material. The activating material may alternatively, or additionally, comprise a lower softening point than the first material. The activating material may begin to soften, or reach a particular level of softness, at a lower temperature than the first material. This may enable the outer layer 4346 to be heated, during a method according to an example of the present technology, to a certain temperature at which the activating material has softened and/or melted while the first material remains in solid form or has not softened to the point that it begins to fuse with itself or adjacent material. Accordingly, in some examples of the present technology, the method comprises forming the second portion 4352 from a thermoplastic material.

Also as described previously with reference to FIGS. 61 and 65, either or both of the first material and the activating material may be able to be cured. The first material and/or the activating material may be thermosetting material. In some examples of the present technology, the activating material is more readily curable than the first material. For example, the activating material may cure at a lower temperature than the first material, may cure within a shorter time period than the first material, may cure at a higher rate than the first material and/or may cure to a greater extent within a certain time in comparison to the first material. Accordingly, in some examples of the present technology, the method comprises forming the second portion 4352 from a thermosetting material.

In some examples of the present technology, the method comprises forming the second portion(s) using both a thermosetting material and a thermoplastic material.

Where the method comprises knitting a textile to form the outer layer 4346 of the air delivery conduit 4300, the step of forming the outer layer 4346 may comprise knitting the first portions 4351 using fibres formed from a first material and knitting the second portions 4352 using fibres formed from an activating material, the activating material having a lower melting point and/or being more readily curable than the first material. The method may comprise knitting the second portions 4352 using one or more heat-treatable fibres. Fibres used for knitting may be in a suitable form such as thread, yarn and the like. A heat treatable fibre may be a fibre having a property which enables it to be heat treated, such as a low melting point (in the case of a thermoplastic material) or the ability to be cured. The method may comprise knitting the first portions 4351 using one or more non-heat treatable fibres. A non-heat treatable fibre may be a fibre which does not melt at a low temperature or which does not readily cure. The method may comprise knitting the first portions 4351 and the second portions 4352 using fibres for the second portions 4352 which are more heat-treatable than fibres used for the first portions 4351. The heat treatable fibres in the second portions 4352 may comprise thermally activated fibres, such as a thermally activated yarn.

In some examples of the present technology, the method comprises performing a stiffening process on the at least one second portion 4352 of the outer layer 4346 to cause the second portion 4352 to have a greater stiffness than the at least one first portion 4351 of the outer layer 4346. As described above, the method may comprise provide providing an activating material to the second portion(s) 4352 of the outer layer 4346. The activating material may cause the second portion 4352 to be stiffened by a stiffening process.

In some forms of the present technology, the activating material comprises a heat-treatable material. For example, the activating material may comprise a lower melting point than the first material, allowing it to be softened and/or melted during heat treatment without the first material being melted. The activating material may be a thermoplastic material. In some forms, the activating material may be more readily curable than the first material. The activating material may be a thermosetting material.

In some forms the activating material may be a photo-activating material which stiffens the second portion 4352 of the outer layer 4346 upon application of visible or non-visible light to the second portion 4352. Alternatively or additionally the activating material may be a pressure-activating material which stiffens the second portion 4352 of the outer layer 4346 upon application of pressure to the second portion 4352. For example, the activating material may comprise microencapsulated adhesive. In further examples, the activating material may comprise one or more chemically-activating materials configured to chemically react to stiffen the second 4352 portion of the outer layer 4346. In some examples, the activating material comprises a cross-linking agent.

In some forms of the present technology, the method comprises heat treating the outer layer 4346. The step of performing the stiffening process may comprise heat treating the second portion(s) 4352 of the outer layer 4346. The heat treatment may stiffen the one or more second portions 4352 of the outer layer 4346. After such a treatment, the first portion 4351 may comprise a first stiffness and the second portion 4352 may comprise a second stiffness, the second stiffness being greater than the first stiffness. Accordingly, the method may comprise stiffening the second portions 4352. The method may comprise stiffening the second portions 4352 with respect to the first portions 4351. That is, in some examples the method may comprise stiffening both the first portions 4351 and the second portions 4352 but may comprise stiffening the second portions 4352 to a greater degree (e.g. to reach a greater stiffness) than the first portions 4351.

In some examples, the step of heat treating the outer layer 4346 comprises heating the second portion 4352 causing fibres of the textile in the second portion 4352 to stiffen. In certain examples, the step of heat treating the second portion 4352 comprises curing fibres of the textile and the second portion 4352. When the second portions 4352 of an outer layer 4346 comprise thermosetting material or other material that stiffens at an elevated temperature, heat can be applied to the second portions 4352 (or to the outer layer 4346 as a whole) to cure the thermosetting material and cause the textile to stiffen in the second portions 4352. The step of heat treating the second portion 4352 may comprise heating the outer layer 4346 or the second portions 4352 thereof to a sufficient temperature and for a sufficient duration that after heat treatment, the second portions 4352 have cured or otherwise stiffened such that a predetermined stiffness of the textile and the second portions 4352 has been attained. The particular temperature and/or duration of heating will depend on the particular thermosetting material used in the second portions 4352. The method may comprise heat treating a second network of fibres forming each second portion 4352 to produce a heat-treated network of fibres in each second portion 4352. The first network of fibres forming each first portion 4351 may be unaffected by the heat-treatment. Alternatively, the first networks of fibres may be affected, but less so than the second networks of fibres.

In some examples, the step of heat treating the second portion 4352 comprises fusing fibres of the textile in the second portion(s) 4352. A heat treatment step of a method according to examples of the present technology may comprise both heating and cooling. If the textile comprises thermoplastic material in the second portions 4352 or another material that melts or softens at an elevated temperature, then during a heat treatment that the thermoplastic material can be melted and re-solidified. For example, the method may comprise heat treating the second portion 4352 by heating the outer layer 4346 causing fibres of the textile in the second portions 4352 to soften. The method may also comprise allowing the softened fibres of the textile in the second portion 4352 to cool and fuse to surrounding fibres. In some examples, the step of heat treating the second portion 4352 comprises melting fibres of the textile in the second portion 4352 and allowing said fibres to cool and fuse to surrounding fibres. The step of heat treating the second portion 4352 may comprise heating the outer layer 4346 to a sufficient temperature to melt or at least soften the fibres of the textile in the second portions 4352 and then either cooling outer layer 4346 or allowing it to cool. During cooling the fibres of the textile in the second portions 4352 may at least partially fuse to each other and/or to surrounding fibres, resulting in a stiffer network of fibres in the second portions 4352 than prior to the heat treatment process. After this step, the second network of fibres forming each second portion 4352 may comprise a heat-treated network of fibres.

As noted elsewhere in the present disclosure, the material used to form the first portions 4351 of the textile may be selected such that it remains stable at the temperatures required during the heat treatment step. This way, the entire outer layer 4346 of the air delivery conduit 4300 can be heated to temperatures necessary to cause changes in stiffness of the second portions 4352, without unintended changes also occurring in the first portions 4351.

In other examples of the present technology, the entire outer layer 4346 is not heated, or is not heated uniformly. Instead, heat may be focused on the second portions 4352 in order to minimise effects on the first portions 4351. Heat may be focused on the second portions 4352 by using specifically designed heating elements, using focused light from heat lamps, using lasers or by another suitable method. Accordingly, the method may comprise heating the second portions 4352 to a higher temperature than the first portions 4351.

In some examples of the present technology, the method comprises sealing the outer layer 4346 to create a sealed air path through which a flow of air is able to be conveyed during use of the air delivery conduit 4300. The method may comprise sealing the outer layer 4346 with a sealing layer 4341. The method may comprise bonding the sealing layer 4341 to the outer layer 4346. The method may comprise heat-bonding the sealing layer 4341 to the outer layer 4346. In other examples, the method comprises adhering the sealing layer 4341 to the outer layer 4346, for example with glue or by providing at least one of the sealing layer 4341 and the outer layer 4346 with an adhesive layer.

The heat treatment step may be performed before, during or after the step of sealing the outer layer 4346. In some examples, the heat treatment step is performed during the bonding step. Heat applied to bond the sealing layer 4341 to the outer layer 4346 may also heat-treat the outer layer 4346. The method may comprise heating the sealing layer 4341 and outer layer 4346 to both bond the sealing layer 4341 to the outer layer 4346 and to heat-treat the outer layer 4346 to stiffen the second portions 4352 of the outer layer 4346.

In some examples of the present technology, the step of sealing the outer layer 4346 comprises inserting the sealing layer 4341 into an interior of the outer layer 4346 and bonding the sealing layer 4341 to the outer layer 4346. The step of inserting the sealing layer 4341 into the outer layer 4346 as shown in FIG. 62. The sealing layer 4341 may comprise a substantially cylindrical elongate shape and may comprise an external diameter lesser than the internal diameter of the outer layer 4346 prior to and during insertion into the interior of the outer layer 4346. A sealing layer 4341 may be inserted into the interior of an outer layer 4346 in a similar way as the sealing layer 4341 inserted into the interior of the reinforcing structure 4305 described with reference to FIGS. 33-39.

During or after the step of inserting the sealing layer 4341 into the outer layer 4346, the method may comprise supporting the outer layer 4346 in a mould 7200. FIG. 63 shows the outer layer 4346 supported in a mould 7200 with the sealing layer 4341 inside of the outer layer 4346. FIG. 63 also shows the sealing layer 4341 and outer layer 4346 during bonding of the sealing layer 4341 to the outer layer 4346, which in this example is performed during heat treatment of the outer layer 4346.

In some examples, the method may comprise supporting the sealing layer 4341 on a mandrel 7000 and inserting the mandrel 7000 and sealing layer 4341 into the interior of the outer layer 4346. The outer layer 4346 may be supported in a mould 7200 during insertion of the mandrel 7000 and the sealing layer 4341. In some examples, the mandrel 7000 may blow hot air radially outward to heat and expand the sealing layer 4341 such that it fits to the interior of the outer layer 4346. The heating of the sealing layer 4341 may also bond it to the outer layer 4346. The method may comprise heating, expanding and bonding the sealing layer 4341 to the outer layer 4346 at the same time as heat treating the outer layer 4346 to stiffen the second portions 4352. The method may comprise heating, with the mandrel 7000, both the sealing layer 4341 and the outer layer 4346.

In some examples, the sealing layer 4341 may be supported on a balloon 7005 on a mandrel 7000 during insertion into the outer layer 4346, in a similar way as shown in FIGS. 37 and 38 during which a sealing layer 4341 is supported on a balloon 7005 during insertion into an interior of a reinforcing structure 4305. The outer layer 4346 may be supported within a mould 7200. Once the sealing layer 4341 is within the outer layer 4346, the balloon 7005 may be expanded to bring the sealing layer 4341 into contact with the interior surface of the outer layer 4346. The balloon 7005 may be heated to soften the sealing layer 4341 and bond it to the outer layer 4346. Alternatively, another source of heat, such as hot air provided from outside of the mould 7200 to the interior of the mould 7200, may be used to soften the sealing layer 4341 during expansion and/or bonding to the outer layer 4346. In some examples, the mould 7200 itself is heated. In this variation of the method, the step of heat treating the outer layer 4346 to stiffen the second portions 4352 may be performed when the sealing layer 4341 is bonded to the outer layer 4346. In some examples, the mould 7200 is heated during the process of bonding the sealing layer 4341 to the outer layer 4346, to heat treat the outer layer 4346. In some examples, hot air is blown into the interior of the mould 7200 and outer layer 4346 to raise the temperature of the outer layer 4346 (which may also assist in bonding the sealing layer 4341 to the outer layer 4346). In some examples, heat from heating the balloon 7005 both bonds the sealing layer 4341 to the outer layer 4346 and heat-treats the outer layer 4346 to stiffen the second portions 4352.

In some examples of the present technology, the method comprises heat treating the outer layer 4346 prior to sealing the outer layer 4346. That is, the method may comprise forming the outer layer 4346, supporting the outer layer 4346 (for example in an elongate cylindrical shape) and heat treating the outer layer 4346, prior to sealing of the outer layer 4346. The method may comprise supporting the outer layer 4346 in a mould 7200 and heating the mould 7200 to heat treat the outer layer 4346. Alternatively, or additionally, the method may comprise supporting the outer layer 4346 in a mould 7200 and supplying hot air to the interior of the outer layer 4346. In either example, sealing of the outer layer 4346 may be performed as a subsequent step in the same mould 7200. In other examples, the outer layer 4346 may be supported on a mandrel and heated. The mandrel may comprise means to heat the outer layer 4346, for example heating elements or ports from which hot air can be blown. Alternatively, hot air may be provided to the surroundings of the outer layer 4346 while supported on a mandrel to raise the temperature of the outer layer 4346, or the outer layer 4346 may be heated by a radiant source of heating, such as heat lamps.

In some examples of the present technology, the method comprises heat treating the outer layer 4346 after sealing the outer layer 4346. The method may comprise sealing the outer layer 4346 in a mould 7200 and then heating the mould 7200 (or keeping it heated) during a subsequent heat treatment step of the method. In some examples, the same means to heat the sealing layer 4341 to bond it to the outer layer 4346 may continue applying heat, after providing the heat necessary for sealing, in order to heat treat the outer layer 4346.

In some examples, it is a combination of heat applied to the outer layer 4346 during both a step of sealing the outer layer 4346 and a step of heat treating the outer layer 4346. For example, when the second portions 4352 of the outer layer 4346 comprise a thermosetting material, heat from the sealing step may partially cure the thermosetting material in the second portions 4352, and heat from a subsequent heat treatment step may fully cure the thermosetting material in the second portions 4352 to achieve the desired stiffness in the second portions 4352. In other examples, a heat treating step may be performed initially, during which thermosetting material in the second portions 4352 almost fully cures, and further heat from a subsequent sealing step in which the outer layer 4346 is sealed may complete the curing process to achieve the desired stiffness and the second portions 4352.

In some examples, the method comprises preheating the outer layer 4346 prior to sealing the outer layer 4346. The method may comprise blowing hot air to pre-heat the outer layer 4346 prior to inserting the sealing layer 4341. Alternatively, or additionally the method may comprise blowing hot air from a mandrel inserted within the outer layer 4346.

FIG. 64 shows an air delivery conduit 4300 in a mould 7200 following sealing and stiffening steps. The sealed outer layer 4346 comprises a plurality of first portions 4351 and a plurality of second portions 4352. The second portions 4352 are stiffer than the first portions 4351 due to stiffening of activated material provided to the second portions 4352.

In other examples, an alternative stiffening process may be utilised.

In some examples, performing the stiffening process comprises performing a photo-activation process to stiffen the second portion 4352 of the outer layer 4346. The method may comprise applying visible or non-visible light to the second portion 4352 of the outer layer to activate a photo-activating material provided to the second portion 4352 to cause the photo-activating material to stiffen the second portion 4352.

In some forms, the method may comprises curing the second portion of the outer layer using visible or non-visible light. The activating material may therefore be a photo-activating material. The activating material may be a material which stiffens during or after application of light (e.g. a particular type of light such as visible light or UV light).

The method may comprise forming the second portion 4352 from one or more fibres formed from the photo-activating material. The method may comprise weaving or otherwise networking fibres formed from the photo-activating material, possibly with other fibres, to form the textile from which the outer layer 4346 is formed. In other forms the method comprises providing the photo-activating material to the outer layer 4346 after formation of the textile, for example by applying photo-activating material to the second portions 4352 of the outer layer 4346, such as by coating, after the outer layer 4346 is formed.

In some forms, the outer layer 4346 comprises an aliphatic urethane acrylate stiffening the second portions 4352. In another example the outer layer 4346 comprises an epoxy acrylate stiffening the second portions 4352.

In other examples, the step of performing the stiffening process comprises curing an activating material by electron beam (EB) curing. The method may comprise providing the outer layer 4346 with an activating material, being a material that stiffens by curing during application of an electron beam.

In some examples of the present technology, the method step of performing the stiffening process comprises applying pressure to the second portion 4352 of the outer layer 4346 to stiffen the second portion 4352. In some examples the method comprises applying pressure to the second portion 4352 causing an adhesive to stiffen the second portion 4352 The method may comprise applying pressure to the second portion 4352 to activate microencapsulated adhesive. In other examples, the method may comprise forming the second portions 4352 with one or more adhesive fibres. The method may comprise adhering fibres of the textile to surrounding fibres by application of pressure to the second portion 4352. In some forms, the method may comprise providing the outer layer 4346 with a polyvinyl acetate or an ethylene vinyl acetate to stiffening the second portions 4352 of the outer layer 4346 following application of pressure the second portions 4352.

In some examples of the present technology, the step of performing the stiffening process comprises creating a chemical reaction to stiffen the second portion 4352 of the outer layer 4346. The method may comprises providing one or more materials to the second portion 4352 of the outer layer 4346 to cause a chemical reaction to stiffen the second portion, such as one or more activating materials. In some examples, the method comprises providing a cross-linking agent to the second portion 4352 of the outer layer 4346.

In some examples, the method may comprise forming the second portions 4352 from networks of fibres having fibres formed from a material which chemically reacts to stiffen the second portions 4352. In some forms, the method may comprise applying a material to the second portions 4352, such as a coating, which chemically reacts with fibres of forming the second portions 4352 (e.g. by causing them to crosslink, cure or otherwise stiffen). The method may comprise providing a thermoplastic polyurethane polymer to the outer layer 4346.

Subsequent steps may be performed to finish the air delivery conduit 4300. For example, connectors may be provided to the ends of the air delivery conduit 4300. The method may comprise providing end connectors 4362 to the air delivery conduit 4300 such that the air delivery conduit 4300 comprises a first end configured to connect to tubing connected to an outlet of a respiratory pressure therapy device 4000, and a second end configured to connect to a patient interface 3000. Alternatively, the method may comprise providing connectors to the air delivery conduit 4300 such that the air delivery conduit 4300 comprises a first end configured to connect to an outlet of the respiratory pressure therapy device 4000, and a second end configured to connect to a patient interface 3000. That is, the air delivery conduit 4300 may take the form of either a short tube configured to connect between a patient interface 3000 and a conventional long tube or may take the form of a long tube itself.

5.5.8 Air Delivery Conduit with Resilient Support Elements

The air delivery conduit 4300 forming part of an air circuit 4170 is configured to connect a patient interface 3000 to a supply of pressurised breathable gas. For instance, the air delivery conduit 4300 may be provided as a relatively short tube attached to the patient interface. In this embodiment, the air delivery conduit 4300 has a connector e.g. an end connector 4362 as described above, at one end to connect to another conduit (not illustrated in the Figures). The other end of the air delivery conduit 4300 is permanently connected to a patient interface e.g. to a decoupling structure (not illustrated in the Figures)

Alternatively, the air delivery conduit 4300 may be a relatively long component, provided with an end connector 4362 at one end which in use connects to a supply of pressurised breathable gas e.g. an RPT device 4000. Another connector 4362 (not illustrated in FIG. 7A is connected to another end of the air delivery conduit 4300 and in use connects to a patient interface 3000.

The air delivery conduit 4300 includes at least one resilient support element 3506 manufactured according to a method described herein. For instance, the air delivery conduit 4300 may include a single ridge of resilient material, or a plurality of discrete ridges of resilient material, provided on a layer of the air delivery conduit 4300. Further aspects of the air delivery conduit 4300 having resilient support elements should become clearer from their methods of manufacture described herein.

5.5.9 Oxygen Delivery

In one form of the present technology, supplemental oxygen 4180 is delivered to one or more points in the pneumatic path, such as upstream of the pneumatic block 4020, to the air circuit 4170 and/or to the patient interface 3000.

5.6 Methods of Manufacture

Embodiments of the present technology relate to methods to form devices, and components therefor, used in the screening, diagnosis, monitoring, amelioration, treatment or prevention of a respiratory disorder.

5.6.1 Knitting and Application

Referring to FIG. 68, which is a schematic of a system 6000 configured for use in a method of manufacturing a knitted structure using a knitting technique. The system 6000 generally comprises a knitting module 6002 and a dispensing module 6004.

The knitted structures formed by the system 6000 may be at least a portion of a device, or component therefor, for use in treating or prevention of a respiratory disorder e.g. a component of a respiratory therapy system. In some embodiments, the device, or component therefor, is a tubular structure e.g. a conduit as described herein. In alternative embodiments, the device or component therefor is a patient interface, seal structure for a patient interface or a positioning and stabilising structure as described herein.

The knitting module 6002 comprises a drive mechanism 6006, at least one spool 6008 of thread 6010, and at least one knitting element 6012. The drive mechanism 6006 is configured to in use move the thread relative to the knitting element 6010 to thereby at least partially form a knitted structured.

The knitting module 6002 may also comprise a second spool 6014 of thread 6016 The thread 6016 may be the same as or different to, the thread 6010. This may facilitate manufacturing of a knitted structure having required properties e.g. one of the threads may provide the waft and the other thread may provide the weft of the device/component, and the threads may be selected to provide desired properties such as extensibility or torsional resistance for the knitted structure.

The dispensing module 6004 comprises a reservoir 6016, an applicator 6018, and a curing tool 6020. The reservoir 6016 is configured to hold a supply of a resilient material e.g. an elastic material such silicone. The reservoir 6016 is connected to the applicator 6018 such that in use, the applicator 6018 receives material from the reservoir 6016 and can apply it to a knitted structure manufactured by the knitting module 6002.

The curing tool 6020 is configured to promote or otherwise assist in curing of the resilient material once that has been applied to a knitted structure. The curing tool 6020 may comprise a heat source configured to provide heat to the resilient material once applied to the knitted structure e.g. a UV light source, radiative heater, hot air source such as a gun etc.

The dispensing module 6004 may be movably or immovably mounted with respect to the knitting module 6002. For instance, in one embodiment, the dispensing module 6004 may be stationary relative to the knitting module 6002 or a knitted structure produced by the knitting module 6002. In this embodiment, the knitted structure is moved relative to the dispensing module 6004 to facilitate the dispensing module 6004 applying the resilient material to the knitted structure.

In alternative embodiments, the dispensing module 6004 may be movably mounted with respect to the knitting module 6002. In this embodiment, the dispensing module 6004 can be moved to apply the resilient material to the knitted structure.

Referring now to FIG. 70 which shows representative steps in a method 6001 of creating resilient support members on a textile material using the system 6000 of FIG. 68.

At step 6100, the knitting module 6002 is engaged and forms at least a part of a knitted structure.

At step 6102, the dispensing module 6004 is engaged and applies the resilient material to a portion of the knitted structure formed in step 6002. The curing tool 6022 subsequently cures the resilient material.

At step 6106, the knitting module 6002 continues to form at least a further portion of the knitted structure. The dispensing module 6004 continues to apply the resilient material to the knitted structure after that has been formed, and the curing tool 6022 subsequently cures the applied resilient material.

After the curing tool 6022 has cured the resilient material, the knitting module 6002 uses the second spool 6014 to knit a covering layer. This is indicated at step 6108. It should be appreciated that step 6108 may occur after the knitting module 6002 has produced substantially all of the knitted structure. Alternatively, step 6108 may continue concurrently with one or more of steps 6102, 6104 or 6106.

The above described process may be repeated to substantially or completely form a component of a respiratory therapy system as described herein. For instance, the method 6001 may produce a substantially tubular structure e.g. an air delivery conduit 4300 as described herein. In embodiments, other components e.g. an end connector 4362 may be attached to one or more ends of the tubular structure to thereby form the air delivery conduit 4300.

Alternatively, the method 6001 may form a sheet-like structure which can be used in a subsequent manufacturing step to form another component e.g. a headgear tube, in which case one or more of steps 6308, 8320, 6330 and 6334 discussed below with respect to FIG. 71-1 may be completed.

5.6.2 Resilient Support Elements Applied to Preformed Sheets of Material

Referring now to FIG. 70 which shows representative steps in a method 6201 according to an aspect of the present technology, and a representative component for a respiratory device manufactured according to the method. In general, the method 6201 includes the following steps, and the component according to the method includes:

1. Step 6200 which involves selecting, forming of manufacturing a sheet of material 6200A e.g. a sheet of textile material;
2. Step 6202 which involves applying a resilient material to form at least one resilient support element to create a base sheet 6202A; and
3. Step 6204 which involves forming the base sheet 6202A into a desired shape or structure e.g. a conduit 6204A as shown in FIG. 70.

In addition, the method 6201 may optionally include one or more of the following steps in any order:

1. Preparing the sheet of material 6200A e.g. by cutting to a desired shape or dimensions;
2. Curing the resilient material once applied to the sheet of material 6200A;
3. Applying at least one additional layer of material to the sheet of material 6200A or base sheet 6202A e.g. an air impermeable, light weight material
4. Providing connectors to the component 6204A e.g. end connectors 4362, to facilitate attaching the component 6204A to another component in use. For example, connectors such as end connectors may be formed to, or formed separately and subsequently attached to, one or more ends of the component 6204A.

Further aspects of the method 6201 and the structure and configuration of the component 6204A should become clearer from the following description of preferred embodiments.

5.6.2.1 First Preferred Embodiment

Referring now to FIG. 71-1 which shows steps of a method 6300 exemplifying further aspects of the method 6201 of FIG. 70 and components manufactured according to the method.

At step 6302 a sheet of material 6302A is provided. For instance, the sheet 6302A may be provided in the form of a roll 6302B as illustrated. Alternatively, the sheet 6302A may be manufactured using techniques as known to one skilled in the art, or formed as a coated textile sheet as described herein.

The sheet of material has at least one property which makes it suitable for use in treating a respiratory disorder. For instance, the sheet of material 6302A may be a textile material which is at least one of impermeable to gas, soft, and flexible. In the embodiments in which the sheet of material 6302A is impermeable to gas, the textile material may comprise a layer of a material which is impermeable to gas, has been injected with a material which is impermeable to gas, or is gas impermeable due to features of its construction e.g. the fibres from which the textile is constructed.

At step 6304 a resilient material is applied to the sheet of material 6302A to form a base sheet 6304A. For instance, an applicator (not illustrated in FIG. 71-1) may be used to apply at least one ridge 6304B of resilient material to the sheet 6302A. The at least one ridge may be applied as a plurality of discrete ridges which are spaced apart from each other on the sheet 6302B. Alternatively, or in addition, the resilient material may be applied as a ridge having a helix or spiral shape.

Applying the resilient material to the sheet 6302A as at least one ridge forms one or more resilient support elements. In use, the resilient support elements may be able to deform to improve patient comfort but can return towards a preferred shape to prevent occlusion of a conduit.

At step 6306 the resilient material is cured after it has been applied to the sheet 6302A. Curing of the resilient material may be achieved by any means known to one skilled in the art e.g. using a UV light source, radiative heater or hot air source.

The method 6300 may also optionally include a cutting step. The cutting step may occur before or after application of the resilient material to the sheet 6302A. In the illustrated embodiment, the cutting step occurs after application of the resilient material. This may be beneficial as it allows continuous application of the resilient material as the sheet is unrolled from the roll 3202B.

It is also envisaged that the sheet 6302A may be cut before step 6304 or 6306.

Curing of the resilient material forms a base sheet indicated as 6306A in FIG. 71-1.

The method includes a shaping step in which the base sheet 6306A is manipulated to create a predetermined structure.

In one form, a shaping step 6320 involves rolling the base sheet 6306A to form a cylindrical structure 6322 as is shown in FIG. 71-1. For instance, the base sheet 6306A may be positioned adjacent to, and wrapped around, a mandrel (not shown in FIG. 71-1). This brings the lateral edges 6306B and 6306C into contact with each other.

The lateral edges 6306B and 6306C are subsequently joined together to form a join 6324 along axis 6326 which extends along the length of the cylindrical structure 6322.

This may involve adhesive, RF welding or other technique known to one skilled in the art. In addition, additional or unrequired material is cut off to create a smooth and low-profile join 6324.

Preferably, forming the join 6324 may create a gas tight seal that prevents gas leak from the cylindrical structure 6322 in use.

In another form, an alternate shaping step 6330 is used to form a predetermined structure which involves attaching the base sheet 6306A to a second portion 6332. For instance, the separate portion 6332 may comprise at least one layer of material e.g. textile and one or more layers of foam.

Step 6330 may be particularly beneficial for use in manufacturing a component which has two portions having different shapes, structures and/or other properties. For instance, the component can find application as a headgear tube 3340 for a positioning and stabilising structure 3000 as is described herein with reference to FIGS. 66-1 to 66-1. In these embodiments, the separate portion 6332 may provide a patient contacting portion 3502 and the base sheet 6306A may provide a non-contacting portion 3505.

As shown in FIG. 72-3, at step 6330 the base sheet 6306A is positioned relative the second portion 6332. The base sheet 6306A may optionally be formed into a curved shape e.g. using a mandrel or a jig (neither shown in FIG. 71-1 or 71-3).

At step 6334 the base sheet 6306A and the second portion 6332 are attached together to form at least one join e.g. a first join 6336 which extends along axis 6338 and a second join 6340 which extends along axis 6342.

Forming the joins 6336, 6340 may involve adhesive, RF welding or other technique known to one skilled in the art. In addition, additional or unrequired material is cut off to create smooth and low-profile join 6336, 6340.

Preferably, forming the joins 6336, 6340 may create a gas tight seal that prevents gas leak from the structure in use.

5.6.2.2 Second Preferred Embodiment

Referring now to FIG. 72 which shows steps of a method 6400 exemplifying further aspects of the method of FIG. 71-1 to 71-3 and components manufactured according to the method.

The method 6400 is substantially similar to method 6300 and therefore like references refer to like steps or components. However, method 6400 includes the additional step 6402 of applying at least one additional layer of material 6402A to the base sheet 6306A to form a multi-layer structure 6404. The structure of the multi-layer sheet 6404 is perhaps better shown in FIG. 73.

The additional layer of material 6402A may be a textile material, a plastic material or other suitable material. For instance, the additional sheet of material 6402A may be at least one of soft, flexible and gas impermeable.

After completing step 6402, the method 6400 continues as discussed above with respect to FIGS. 71-1 to 71-3.

5.6.2.3 Third Preferred Embodiment

Referring now to FIG. 74 which shows steps of a method 6500 exemplifying further aspects of the method of FIG. 71-1 to 71-3 and components manufactured according to the method. The method of FIG. 74 has similarities to the method 6300 and therefore like references refer to like steps and components.

A step 6502, the sheet 6302A is positioned in a mould or jig (6502A). A retention force is applied to hold the sheet 6302A substantially immovably relative to the mould or jig. For instance, the retention force may be a vacuum, clips or other means as should be known to one skilled in the art.

At step 6504 a resilient material 6504 is moulded onto the sheet 6302A using techniques as should be known to one skilled in the art. Step 6504 creates at least one discrete ridge of resilient material.

In addition, step 6504 may mould a relatively thin layer of the resilient material across a substantial portion of the sheet 6302A. In this embodiment, the relatively thin layer of material provides a barrier layer to make the sheet of material substantially gas impermeable.

At step 6506, the resilient material is cured to form a base sheet 6508.

Curing of the resilient material may be achieved by any means known to one skilled in the art e.g. using a UV light source or radiative heater.

The base sheet 6508 can subsequently be used to create a predetermined structure as discussed above with reference to FIG. 71-1 to 71-3.

5.6.2.4 Fourth Preferred Embodiment

Referring now to FIG. 77 which shows steps in a method 6600 exemplifying further aspects of the present technology.

At step 6602, a sheet of material, e.g. a textile is provided in a roll 6602A.

The textile may be soft and compliant, and have properties which make it suitable to come into contact with a patient's skin in use.

At step 6604 The sheet of material is unwound from the roll 6602A and feed into a coating machine (not shown). The coating machine (not shown) may apply a material to the sheet of material e.g. a plurality of discrete "dots" or drops of a material may be applied and subsequently spread over the sheet to form a substantially continuous layer of the material. This may be performed, for example, using a knife-type applicator as known to one skilled in the art. Alternatively, a substantially continuous layer of the material may be applied to the sheet, for example using a drum-type applicator.

The coating material may be an adhesive e.g. a polyurethane (PU) glue.

In some embodiments, a liner material (not shown in the Figures) may be positioned relative to the adhesive material e.g. on a distal side to the sheet of material. The liner can allow the adhesive material to be spread. In embodiments, the liner may bond to the adhesive, and therefore be retained in a component of a respiratory therapy system manufactured according to the technology.

Alternatively, the liner may not bond to the adhesive, and therefore can be removed at a later step. In these embodiments, the liner material facilitates the adhesive being spread across the sheet of material 6602A to form a coated textile sheet 6604B.

The coated textile sheet 6604B manufactured according to method 6600 may be subsequently used to manufacture a component of a respiratory therapy treatment system e.g. steps 6308, 6330, or 6334 discussed herein with respect to FIGS. 71-1 to 71-3 may be performed on the sheet produced according to 6300.

In addition or alternatively, the coated textile sheet 6603B may be used in a lamination method where at least one other layer of material is attached to the coated textile sheet 6604B. In these embodiments, the at least one layer and the coated textile material form a composite layer material, where the coating material e.g. PU glue adheres the at least one other layer of material to the textile material.

5.6.3 Resilient Material and Resilient Support Elements Structures

The properties of resilient material applied to the sheet 6302A may be chosen to provide desired functional properties for a component manufactured according to the technology. For instance, at least one of the size, shape, spacing between ridges of resilient material, and orientation of ridges may be selected to achieve the desired functional property or combination of properties. In an embodiment in which a single, continuous ridge is provided, the pitch may be selected to provide desired functional properties for the component.

Alternatively, or in addition, the properties of the material from which the ridges are formed may be chosen to provide a desired functional property for the component. For instance, the hardness and elasticity of the resilient material may be varied.

In embodiments, a component manufactured according to the present technology may have different profiles in different sections to provide them with different functional properties. For instance, FIG. 70 shows a cross sectional view of a conduit 6700 according to an embodiment of the technology.

The conduit 6700 has a first section 6702 located towards a first end 6704 of the conduit 6700 and a second section 6706 located towards a second end 6708 of the conduit 6700. The first section 6702 and the second section 6706 each have a plurality of resilient support elements (unnumbered in FIG. 71) in the form of ridges of a resilient material.

In the first section 6702 the resilient support elements have a width indicated by dimension W in FIG. 71 and a height indicated by dimension H in FIG. 71.

The spacing between adjacent resilient support elements in the first section 6702 is different to the spacing of the resilient support elements in the second section 6706.

In addition, it is also envisaged that the beads in the first and second section 6702, 6706 may differ to each other in at least one respect e.g. have one or more of a different height, a different width, different hardness or modulus of elasticity.

Having a component e.g. conduit 6700 with different bead profiles in different sections may be useful to provide a conduit 6700 which is better suited to certain applications. For instance, one section of the conduit may have a bead profile which ensures that it is relatively stiffer or less extensible, and therefore is better adapted for use in a component which may be more likely crushed in use. Alternatively, another section of the conduit may have a bead profile which ensure that it is relatively less stiff and more flexible, and therefore is better adapted for use in a RPT system e.g. it can assist in decoupling tube drag forces.

Yet a further advantage of having different bead profiles in different sections of a conduit is that it can reduce overall weight of the conduit e.g. by reducing material, while also achieving desired stiffness in the conduit.

5.6.4 Knitting with Coated Yarn

Referring now to FIG. 77 which shows representative steps in a method 6700 according to an aspect of the present technology. The method uses a forming module e.g. a knitting module or a weaving module (not shown in the Figures) to form a structure e.g. a sheet of textile material or a tube (conduit).

At step 6702 a length of yarn (not illustrated) is provided which is coated or impregnated with a coating material. For instance, a spool of the yarn may be provided and ready to use in forming the structure.

Alternatively, a spool of uncoated yarn may be provided, to which the coating material is applied prior to the yarn being used in the forming module e.g. the yarn is coated and used in forming the structure in a substantially continuous process.

Step 6704 forms a plurality of threads using the yarn(s). It should be understood that the method of FIG. 89 may use multiple yarns which are different in at least one property e.g. their elasticity, colour, softness. Therefore, step 6702 may also involve providing a second yarn and/or a third yarn etc. The second yarn and/or the third yard may be identical or different to the first yarn.

The coating material may be any material which has a lower melting point than the yarn. For instance, the coating material may be an adhesive e.g. a polyurethane (PU) glue or TPU.

The yarn may be any material suitable for forming a textile sheet material e.g. a wool, cotton, polymeric e.g. nylon, or blend. In addition, the yarn has a melting point that is higher than the melting point of the coating material.

Step 6704 involves forming at least a portion of the structure using the yarn(s). The forming module is engaged and caused to create a formed portion (not illustrated. This may involve knitting, weaving or other techniques as known to one skilled in the art.

Step 6706 involves heating the formed portion using a heating source (not illustrated). The heating source may be a hot air gun, UV light source, radiant bar heater or other source as should be known to one skilled in the art.

The formed portion is heated to a temperature to at least partially melt the coating material which forms a heated portion. This allows the coating material on adjacent threads, or portions of yarn, to adhere to each other. In this way, it is possible to achieve a substantially, or completely, impermeable covering for the textile material and there by the formed portion.

In addition, the parameters of step 6706 are selected according to the properties of the coating material and desired properties of the structure being manufactured using the method 6700. For instance, the temperature to which the structure is heated, the residence time at the temperature, humidity and pressure can all be adjusted to provide the structure with a desired property.

At step 6708 the heated portion may be used to form a portion of a component for treatment of a respiratory component. For instance, steps 6320, 6330, and 6334 discussed herein in respect of FIGS. 71-1 to 71-3 may be used. Alternatively, other steps may be used.

It is also envisaged that steps may be used to apply resilient support elements onto the heated portion.

5.7 Humidifier

5.7.1 Humidifier Overview

In one form of the present technology there is provided a humidifier 5000 (e.g. as shown in FIG. 5A) to change the absolute humidity of air or gas for delivery to a patient relative to ambient air. Typically, the humidifier 5000 is used to increase the absolute humidity and increase the temperature of the flow of air (relative to ambient air) before delivery to the patient's airways.

The humidifier 5000 may comprise a humidifier reservoir 5110, a humidifier inlet 5002 to receive a flow of air, and a humidifier outlet 5004 to deliver a humidified flow of air. In some forms, as shown in FIG. 5A and FIG. 5B, an inlet and an outlet of the humidifier reservoir 5110 may be the humidifier inlet 5002 and the humidifier outlet 5004 respectively. The humidifier 5000 may further comprise a humidifier base 5006, which may be adapted to receive the humidifier reservoir 5110 and comprise a heating element 5240. As illustrated, the humidifier 5000 may also comprise a conductive portion 5120, humidifier reservoir dock 5130, locking lever 5135 and water level indicator 5150.

5.8 Breathing Waveforms

FIG. 6 shows a model typical breath waveform of a person while sleeping. The horizontal axis is time, and the vertical axis is respiratory flow rate. While the parameter values may vary, a typical breath may have the following approximate values: tidal volume Vt 0.5 L, inhalation time Ti 1.6 s, peak inspiratory flow rate Qpeak 0.4 L/s, exhalation time Te 2.4 s, peak expiratory flow rate Qpeak −0.5 L/s. The total duration of the breath, Ttot, is about 4 s. The person typically breathes at a rate of about 15 breaths per minute (BPM), with Ventilation Vent about 7.5 L/min. A typical duty cycle, the ratio of Ti to Ttot, is about 40%.

5.9 Glossary

For the purposes of the present technology disclosure, in certain forms of the present technology, one or more of the following definitions may apply. In other forms of the present technology, alternative definitions may apply.

5.9.1 General

Air: In certain forms of the present technology, air may be taken to mean atmospheric air, and in other forms of the present technology air may be taken to mean some other combination of breathable gases, e.g. atmospheric air enriched with oxygen.

Ambient: In certain forms of the present technology, the term ambient will be taken to mean (i) external of the treatment system or patient, and (ii) immediately surrounding the treatment system or patient.

For example, ambient humidity with respect to a humidifier may be the humidity of air immediately surrounding the humidifier, e.g. the humidity in the room where a patient is sleeping. Such ambient humidity may be different to the humidity outside the room where a patient is sleeping.

In another example, ambient pressure may be the pressure immediately surrounding or external to the body.

In certain forms, ambient (e.g., acoustic) noise may be considered to be the background noise level in the room where a patient is located, other than for example, noise generated by an RPT device or emanating from a mask or patient interface. Ambient noise may be generated by sources outside the room.

Automatic Positive Airway Pressure (APAP) therapy: CPAP therapy in which the treatment pressure is automatically adjustable, e.g. from breath to breath, between minimum and maximum limits, depending on the presence or absence of indications of SDB events.

Continuous Positive Airway Pressure (CPAP) therapy: Respiratory pressure therapy in which the treatment pressure is approximately constant through a respiratory cycle of a patient. In some forms, the pressure at the entrance to the airways will be slightly higher during exhalation, and slightly lower during inhalation. In some forms, the pressure will vary between different respiratory cycles of the patient, for example, being increased in response to detection of indications of partial upper airway obstruction, and decreased in the absence of indications of partial upper airway obstruction.

Flow rate: The volume (or mass) of air delivered per unit time. Flow rate may refer to an instantaneous quantity. In some cases, a reference to flow rate will be a reference to a scalar quantity, namely a quantity having magnitude only. In other cases, a reference to flow rate will be a reference to a vector quantity, namely a quantity having both magnitude and direction. Flow rate may be given the symbol Q. 'Flow rate' is sometimes shortened to simply 'flow' or 'airflow'.

Humidifier: The word humidifier will be taken to mean a humidifying apparatus constructed and arranged, or configured with a physical structure to be capable of providing a therapeutically beneficial amount of water ($H_2O$) vapour to a flow of air to ameliorate a medical respiratory condition of a patient.

Leak: The word leak will be taken to be an unintended flow of air. In one example, leak may occur as the result of an incomplete seal between a mask and a patient's face. In another example leak may occur in a swivel elbow to the ambient.

Noise, conducted (acoustic): Conducted noise in the present document refers to noise which is carried to the patient by the pneumatic path, such as the air circuit and the patient interface as well as the air therein. In one form, conducted noise may be quantified by measuring sound pressure levels at the end of an air circuit.

Noise, radiated (acoustic): Radiated noise in the present document refers to noise which is carried to the patient by the ambient air. In one form, radiated noise may be quantified by measuring sound power/pressure levels of the object in question according to ISO 3744.

Noise, vent (acoustic): Vent noise in the present document refers to noise which is generated by the flow of air through any vents such as vent holes of the patient interface.

Patient: A person, whether or not they are suffering from a respiratory condition.

Pressure: Force per unit area. Pressure may be expressed in a range of units, including $cmH_2O$, $g-f/cm^2$ and hectopascal. 1 $cmH_2O$ is equal to 1 $g-f/cm^2$ and is approximately 0.98 hectopascal. In this specification, unless otherwise stated, pressure is given in units of $cmH_2O$.

The pressure in the patient interface is given the symbol Pm, while the treatment pressure, which represents a target value to be achieved by the mask pressure Pm at the current instant of time, is given the symbol Pt.

Respiratory Pressure Therapy (RPT): The application of a supply of air to an entrance to the airways at a treatment pressure that is typically positive with respect to atmosphere.

Ventilator: A mechanical device that provides pressure support to a patient to perform some or all of the work of breathing.

5.9.1.1 Materials

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240.

Polycarbonate: a thermoplastic polymer of Bisphenol-A Carbonate.

5.9.1.2 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

'Soft' materials may include silicone or thermo-plastic elastomer (TPE), and may, e.g. readily deform under finger pressure.

'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use. An example of such a use may be setting up and maintaining a patient interface in sealing relationship with an entrance to a patient's airways, e.g. at a load of approximately 20 to 30 cmH$_2$O pressure.

As an example, an I-beam may comprise a different bending stiffness (resistance to a bending load) in a first direction in comparison to a second, orthogonal direction. In another example, a structure or component may be floppy in a first direction and rigid in a second direction.

5.9.2 Respiratory Cycle

Apnea: According to some definitions, an apnea is said to have occurred when flow falls below a predetermined threshold for a duration, e.g. 10 seconds. An obstructive apnea will be said to have occurred when, despite patient effort, some obstruction of the airway does not allow air to flow. A central apnea will be said to have occurred when an apnea is detected that is due to a reduction in breathing effort, or the absence of breathing effort, despite the airway being patent. A mixed apnea occurs when a reduction or absence of breathing effort coincides with an obstructed airway.

Flow limitation: Flow limitation will be taken to be the state of affairs in a patient's respiration where an increase in effort by the patient does not give rise to a corresponding increase in flow. Where flow limitation occurs during an inspiratory portion of the breathing cycle it may be described as inspiratory flow limitation. Where flow limitation occurs during an expiratory portion of the breathing cycle it may be described as expiratory flow limitation.

5.9.3 Patient Interface

Anti-asphyxia valve (AAV): The component or sub-assembly of a mask system that, by opening to atmosphere in a failsafe manner, reduces the risk of excessive CO$_2$ rebreathing by a patient.

Elbow: An elbow is an example of a structure that directs an axis of flow of air travelling therethrough to change direction through an angle. In one form, the angle may be approximately 90 degrees. In another form, the angle may be more, or less than 90 degrees. The elbow may have an approximately circular cross-section. In another form the elbow may have an oval or a rectangular cross-section. In certain forms an elbow may be rotatable with respect to a mating component, e.g. about 360 degrees. In certain forms an elbow may be removable from a mating component, e.g. via a snap connection. In certain forms, an elbow may be assembled to a mating component via a one-time snap during manufacture, but not removable by a patient.

Frame: Frame will be taken to mean a mask structure that bears the load of tension between two or more points of connection with a headgear. A mask frame may be a non-airtight load bearing structure in the mask. However, some forms of mask frame may also be air-tight.

Headgear: Headgear will be taken to mean a form of positioning and stabilizing structure designed for use on a head. For example the headgear may comprise a collection of one or more struts, ties and stiffeners configured to locate and retain a patient interface in position on a patient's face for delivery of respiratory therapy. Some ties are formed of a soft, flexible, elastic material such as a laminated composite of foam and fabric.

Membrane: Membrane will be taken to mean a typically thin element that has, preferably, substantially no resistance to bending, but has resistance to being stretched.

Plenum chamber: a mask plenum chamber will be taken to mean a portion of a patient interface having walls at least partially enclosing a volume of space, the volume having air therein pressurised above atmospheric pressure in use. A shell may form part of the walls of a mask plenum chamber.

Seal: May be a noun form ("a seal") which refers to a structure, or a verb form ("to seal") which refers to the effect. Two elements may be constructed and/or arranged to 'seal' or to effect 'sealing' therebetween without requiring a separate 'seal' element per se.

Shell: A shell will be taken to mean a curved, relatively thin structure having bending, tensile and compressive stiffness. For example, a curved structural wall of a mask may be a shell. In some forms, a shell may be faceted. In some forms a shell may be airtight. In some forms a shell may not be airtight.

Stiffener: A stiffener will be taken to mean a structural component designed to increase the bending resistance of another component in at least one direction.

Strut: A strut will be taken to be a structural component designed to increase the compression resistance of another component in at least one direction.

Swivel (noun): A subassembly of components configured to rotate about a common axis, preferably independently, preferably under low torque. In one form, the swivel may be constructed to rotate through an angle of at least 360 degrees. In another form, the swivel may be constructed to rotate through an angle less than 360 degrees. When used in the context of an air delivery conduit, the sub-assembly of components preferably comprises a matched pair of cylindrical conduits. There may be little or no leak flow of air from the swivel in use.

Tie (noun): A structure designed to resist tension.

Vent: (noun): A structure that allows a flow of air from an interior of the mask, or conduit, to ambient air for clinically effective washout of exhaled gases. For example, a clinically effective washout may involve a flow rate of about 10 litres per minute to about 100 litres per minute, depending on the mask design and treatment pressure.

5.9.4 Shape of Structures

Products in accordance with the present technology may comprise one or more three-dimensional mechanical structures, for example a mask cushion or an impeller. The three-dimensional structures may be bounded by two-dimensional surfaces. These surfaces may be distinguished using a label to describe an associated surface orientation, location, function, or some other characteristic. For example a structure may comprise one or more of an anterior surface, a posterior surface, an interior surface and an exterior surface. In another example, a seal-forming structure may comprise a face-contacting (e.g. outer) surface, and a separate non-face-contacting (e.g. underside or inner) surface. In another example, a structure may comprise a first surface and a second surface.

To facilitate describing the shape of the three-dimensional structures and the surfaces, we first consider a cross-section through a surface of the structure at a point, p. See FIG. 3B to FIG. 3F, which illustrate examples of cross-sections at point p on a surface, and the resulting plane curves. FIGS. 3B to 3F also illustrate an outward normal vector at p. The outward normal vector at p points away from the surface. In some examples we describe the surface from the point of view of an imaginary small person standing upright on the surface.

5.9.4.1 Curvature in One Dimension

The curvature of a plane curve at p may be described as having a sign (e.g. positive, negative) and a magnitude (e.g. 1/radius of a circle that just touches the curve at p).

Positive curvature: If the curve at p turns towards the outward normal, the curvature at that point will be taken to be positive (if the imaginary small person leaves the point p they must walk uphill). See FIG. 3B (relatively large positive curvature compared to FIG. 3C) and FIG. 3C (relatively small positive curvature compared to FIG. 3B). Such curves are often referred to as concave.

Zero curvature: If the curve at p is a straight line, the curvature will be taken to be zero (if the imaginary small person leaves the point p, they can walk on a level, neither up nor down). See FIG. 3D.

Negative curvature: If the curve at p turns away from the outward normal, the curvature in that direction at that point will be taken to be negative (if the imaginary small person leaves the point p they must walk downhill). See FIG. 3E (relatively small negative curvature compared to FIG. 3F) and FIG. 3F (relatively large negative curvature compared to FIG. 3E). Such curves are often referred to as convex.

5.9.4.2 Curvature of Two Dimensional Surfaces

A description of the shape at a given point on a two-dimensional surface in accordance with the present technology may include multiple normal cross-sections. The multiple cross-sections may cut the surface in a plane that includes the outward normal (a "normal plane"), and each cross-section may be taken in a different direction. Each cross-section results in a plane curve with a corresponding curvature. The different curvatures at that point may have the same sign, or a different sign. Each of the curvatures at that point has a magnitude, e.g. relatively small. The plane curves in FIGS. 3B to 3F could be examples of such multiple cross-sections at a particular point.

Principal curvatures and directions: The directions of the normal planes where the curvature of the curve takes its maximum and minimum values are called the principal directions. In the examples of FIG. 3B to FIG. 3F, the maximum curvature occurs in FIG. 3B, and the minimum occurs in FIG. 3F, hence FIG. 3B and FIG. 3F are cross sections in the principal directions. The principal curvatures at p are the curvatures in the principal directions.

Region of a surface: A connected set of points on a surface. The set of points in a region may have similar characteristics, e.g. curvatures or signs.

Saddle region: A region where at each point, the principal curvatures have opposite signs, that is, one is positive, and the other is negative (depending on the direction to which the imaginary person turns, they may walk uphill or downhill).

Dome region: A region where at each point the principal curvatures have the same sign, e.g. both positive (a "concave dome") or both negative (a "convex dome").

Cylindrical region: A region where one principal curvature is zero (or, for example, zero within manufacturing tolerances) and the other principal curvature is non-zero.

Planar region: A region of a surface where both of the principal curvatures are zero (or, for example, zero within manufacturing tolerances).

Edge of a surface: A boundary or limit of a surface or region.

Path: In certain forms of the present technology, 'path' will be taken to mean a path in the mathematical—topological sense, e.g. a continuous space curve from f(0) to f(1) on a surface. In certain forms of the present technology, a 'path' may be described as a route or course, including e.g. a set of points on a surface. (The path for the imaginary person is where they walk on the surface, and is analogous to a garden path).

Path length: In certain forms of the present technology, 'path length' will be taken to mean the distance along the surface from f(0) to f(1), that is, the distance along the path on the surface. There may be more than one path between two points on a surface and such paths may have different path lengths. (The path length for the imaginary person would be the distance they have to walk on the surface along the path).

Straight-line distance: The straight-line distance is the distance between two points on a surface, but without regard to the surface. On planar regions, there would be a path on the surface having the same path length as the straight-line distance between two points on the surface. On non-planar surfaces, there may be no paths having the same path length as the straight-line distance between two points. (For the imaginary person, the straight-line distance would correspond to the distance 'as the crow flies'.)

5.9.4.3 Space Curves

Space curves: Unlike a plane curve, a space curve does not necessarily lie in any particular plane. A space curve may be closed, that is, having no endpoints. A space curve may be considered to be a one-dimensional piece of three-dimensional space. An imaginary person walking on a strand of the DNA helix walks along a space curve. A typical human left ear comprises a helix, which is a left-hand helix, see FIG. 3Q. A typical human right ear comprises a helix, which is a right-hand helix, see FIG. 3R. FIG. 3S shows a right-hand helix. The edge of a structure, e.g. the edge of a membrane or impeller, may follow a space curve. In general, a space curve may be described by a curvature and a torsion at each point on the space curve. Torsion is a measure of how the curve turns out of a plane. Torsion has a sign and a magnitude. The torsion at a point on a space curve may be characterised with reference to the tangent, normal and binormal vectors at that point.

Tangent unit vector (or unit tangent vector): For each point on a curve, a vector at the point specifies a direction from that point, as well as a magnitude. A tangent unit vector is a unit vector pointing in the same direction as the curve at that point. If an imaginary person were flying along the curve and fell off her vehicle at a particular point, the direction of the tangent vector is the direction she would be travelling.

Unit normal vector: As the imaginary person moves along the curve, this tangent vector itself changes. The unit vector pointing in the same direction that the tangent vector is changing is called the unit principal normal vector. It is perpendicular to the tangent vector.

Binormal unit vector: The binormal unit vector is perpendicular to both the tangent vector and the principal normal vector. Its direction may be determined by a right-hand rule (see e.g. FIG. 3P), or alternatively by a left-hand rule (FIG. 3O).

Osculating plane: The plane containing the unit tangent vector and the unit principal normal vector. See FIGS. 3O and 3P.

Torsion of a space curve: The torsion at a point of a space curve is the magnitude of the rate of change of the binormal unit vector at that point. It measures how much the curve deviates from the osculating plane. A space curve which lies in a plane has zero torsion. A space curve which deviates a relatively small amount from the osculating plane will have a relatively small magnitude of torsion (e.g. a gently sloping helical path). A space curve which deviates a relatively large amount from the osculating plane will have a relatively large magnitude of torsion (e.g. a steeply sloping helical path). With reference to FIG. 3S, since T2>T1, the magnitude of the torsion near the top coils of the helix of FIG. 3S is greater than the magnitude of the torsion of the bottom coils of the helix of FIG. 3S With reference to the right-hand rule of FIG. 3P, a space curve turning towards the direction of the right-hand binormal may be considered as having a right-hand positive torsion (e.g. a right-hand helix as shown in FIG. 3S). A space curve turning away from the direction of the right-hand binormal may be considered as having a right-hand negative torsion (e.g. a left-hand helix).

Equivalently, and with reference to a left-hand rule (see FIG. 3O), a space curve turning towards the direction of the left-hand binormal may be considered as having a left-hand positive torsion (e.g. a left-hand helix). Hence left-hand positive is equivalent to right-hand negative. See FIG. 3T.

5.9.4.4 Holes

A surface may have a one-dimensional hole, e.g. a hole bounded by a plane curve or by a space curve. Thin structures (e.g. a membrane) with a hole, may be described as having a one-dimensional hole. See for example the one dimensional hole in the surface of structure shown in FIG. 3I, bounded by a plane curve.

A structure may have a two-dimensional hole, e.g. a hole bounded by a surface. For example, an inflatable tyre has a two dimensional hole bounded by the interior surface of the tyre. In another example, a bladder with a cavity for air or gel could have a two-dimensional hole. See for example the cushion of FIG. 3L and the example cross-sections therethrough in FIG. 3M and FIG. 3N, with the interior surface bounding a two dimensional hole indicated. In a yet another example, a conduit may comprise a one-dimension hole (e.g. at its entrance or at its exit), and a two-dimension hole bounded by the inside surface of the conduit. See also the two dimensional hole through the structure shown in FIG. 3K, bounded by a surface as shown.

5.10 Other Remarks

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

5.11 Reference Signs List

| | |
|---|---|
| Patient | 1000 |
| Bed partner | 1100 |
| Patient interface | 3000 |
| Seal-forming structure | 3100 |
| Chord | 3210 |
| Superior point | 3220 |
| Inferior point | 3230 |
| Plenum chamber | 3200 |
| Positioning and stabilising structure | 3300 |
| Vent structure | 3400 |
| Connection port | 3600 |
| Forehead support | 3700 |
| RPT device | 4000 |
| External housing | 4010 |
| Upper portion | 4012 |
| Lower portion | 4014 |
| Panel | 4015 |
| Chassis | 4016 |
| Handle | 4018 |
| Pneumatic block | 4020 |
| Air filter | 4110 |
| Inlet air filter | 4112 |
| Outlet air filter | 4114 |
| Muffler | 4120 |
| Inlet muffler | 4122 |
| Outlet muffler | 4124 |
| Pressure generator | 4140 |
| Blower | 4142 |
| Motor | 4144 |
| Anti - spill back valve | 4160 |
| Air circuit | 4170 |
| Supplemental oxygen | 4180 |
| Electrical components | 4200 |
| Printed circuit board assembly (PCBA) | 4202 |
| Electrical power supply | 4210 |
| Input devices | 4220 |
| Transducers | 4270 |
| Air delivery conduit | 4300 |
| Reinforcing structure | 4305 |
| Ring member | 4310 |
| Outer profile | 4312 |
| Outer surface | 4312a |
| Inner profile | 4313 |
| Inner surface | 4313a |
| Face | 4314 |
| Thickened portions | 4315 |
| Gate location | 4316 |
| Overflow location | 4317 |
| Outer Corner | 4318 |
| Inner corner | 4319 |
| Covering | 4340 |
| Sealing layer | 4341 |
| Outer sheet | 4342 |
| First edge of outer sheet | 4342a |
| Second edge of outer sheet | 4342b |
| First portion of interior surface | 4343 |
| Second portion of interior surface | 4344 |
| Sealing flap | 4345 |
| Outer layer | 4346 |
| Fabric layer | 4347 |
| Air impermeable inner layer | 4348 |
| First portion of the outer layer | 4351 |
| Second portion of the outer layer | 4352 |
| Outer strip | 4354 |
| End connector | 4362 |
| Humidifier | 5000 |
| Humidifier inlet | 5002 |
| Humidifier outlet | 5004 |

-continued

| | |
|---|---|
| Humidifier base | 5006 |
| Reservoir | 5110 |
| Conductive portion | 5120 |
| Humidifier reservoir dock | 5130 |
| Locking lever | 5135 |
| Water level indicator | 5150 |
| Heating element | 5240 |
| Mandrel | 7000 |
| Actuator | 7001 |
| Expanding support | 7002 |
| Balloon | 7005 |
| Vacuum jig | 7100 |
| First direction | 7121 |
| Second direction | 7122 |
| Tooth | 7125 |
| First wall | 7126 |
| Second wall | 7127 |
| Mould | 7200 |

The invention claimed is:

1. An air delivery conduit configured to convey a flow of air under pressure from a respiratory pressure therapy device to a patient interface for providing respiratory pressure therapy to a patient, the air delivery conduit comprising:
 a flexible reinforcing structure provided along a length of the air delivery conduit; and
 an air impermeable covering provided to the flexible reinforcing structure along the length of the air delivery conduit, the air impermeable covering forming a sealed air path through which the flow of air is able to be conveyed in use, the air impermeable covering comprising:
 a sealing layer provided to the flexible reinforcing structure; and
 a sheet wrapped around the flexible reinforcing structure, the sheet comprising a first edge and a second edge each extending along the air delivery conduit and meeting or overlapping to form a seam, an outer side, and an inner side, the inner side of the sheet comprising:
 a first portion on a first side proximate the first edge; and
 a second portion proximate the first edge, on a second side opposite the first side
 wherein the sealing layer extends across an inner side of the seam to seal between the first portion of the inner side of the sheet and the second portion of the inner side of the sheet.

2. The air delivery conduit of claim 1, wherein the inner side of the sheet proximate the second edge is bonded to the sealing layer.

3. The air delivery conduit of claim 1, wherein the inner side of the sheet proximate the second edge is bonded to the outer side of the sheet proximate the first edge.

4. The air delivery conduit of claim 1, wherein the sealing layer is bonded to the flexible reinforcing structure.

5. The air delivery conduit of claim 1, wherein the sheet is bonded to the sealing layer.

6. The air delivery conduit of claim 1, wherein the sealing layer is heat-bonded to the flexible reinforcing structure and/or the sheet.

7. The air delivery conduit of claim 1, wherein the air delivery conduit comprises an outer strip bonded to the outer side of the sheet over and along the second edge of the sheet.

8. The air delivery conduit of claim 1, wherein the sheet comprises a laminate.

9. The air delivery conduit of claim 8, wherein the sheet comprises an outer layer comprising a textile material.

10. The air delivery conduit of claim 1, wherein the sealing layer comprises a sealing strip extending along the length of the air delivery conduit.

11. The air delivery conduit of claim 10, wherein the sheet is bonded to the sealing strip, the first edge of the outer side of the sheet lying along the sealing strip proximate a centre line along the sealing strip.

12. The air delivery conduit of claim 1, wherein the inner side of the sheet proximate the second edge is bonded to the outer side of the sheet proximate the first edge with the second edge spaced from the first edge such that the sheet overlaps with itself.

13. The air delivery conduit of claim 1, wherein the second edge of the sheet comprises a serrated profile configured to resist peeling of the second edge of the sheet away from the outer side of the sheet.

14. The air delivery conduit of claim 1, wherein the flexible reinforcing structure comprises a plurality of support structures spaced apart along the length of the air delivery conduit.

15. A patient interface assembly comprising:
   a patient interface configured to sealingly engage a patient's face, in use; and
   the air delivery conduit of claim 1,
   wherein the air delivery conduit is connected to, or connectable to, the patient interface to deliver pressurized respiratory gas to the patient interface.

16. A respiratory therapy system configured to deliver pressurized respiratory gas to a patient's airways, the system comprising:
   a respiratory therapy device configured to pressurize a flow of respiratory gas; and the air delivery conduit of claim 1,
   wherein the air delivery conduit is connected to, or connectable to, the respiratory therapy device to receive the pressurized flow of respiratory gas from the respiratory therapy device.

17. An air delivery conduit configured to convey a flow of air under pressure from a respiratory pressure therapy device to a patient interface for providing respiratory pressure therapy to a patient, the air delivery conduit comprising:
   a flexible reinforcing structure provided along a length of the air delivery conduit;
   a sealing strip applied to the flexible reinforcing structure; and
   an air impermeable covering wrapped around the flexible reinforcing structure and the sealing strip, the air impermeable covering forming a sealed air path through which the flow of air is able to be conveyed in use, the air impermeable covering having a first edge and a second edge each extending along the air delivery conduit, the first edge and the second edge meeting or overlapping to form a seam,
   wherein the sealing strip extends across an inner portion of the seam to prevent air leaking through the seam, the sealing strip being in contact with an inner side of the air impermeable covering on both sides of the seam.

18. An air delivery conduit configured to convey a flow of air under pressure from a respiratory pressure therapy device to a patient interface for providing respiratory pressure therapy to a patient, the air delivery conduit comprising:
   a flexible reinforcing structure provided along a length of the air delivery conduit; and
   an air impermeable covering provided to the flexible reinforcing structure along the length of the air delivery conduit, the air impermeable covering forming a sealed air path through which the flow of air is able to be conveyed in use, the air impermeable covering comprising a textile layer and a sealing layer laminated to the textile layer, the air impermeable covering being wrapped around the flexible reinforcing structure and comprising a first edge and a second edge each extending along the air delivery conduit and meeting or overlapping to form a seam, an outer side, and an inner side, the inner side of the air impermeable covering comprising:
      a first portion on a first side of the seam proximate the first edge; and
      a second portion proximate the first edge, on a second side of the seam opposite the first side,
   wherein a portion of the sealing layer extends beyond an edge of the textile layer at the first edge of the air impermeable covering to form a sealing flap, the sealing flap being sealed to another portion of an inner side of the sealing layer to extend across an inner side of the seam to seal between the first portion of the inner side of the air impermeable covering and the second portion of the inner side of the air impermeable covering.

19. The air delivery conduit of claim 18, wherein the sealing flap is sealed to both an outer side of the textile layer proximate the first edge of the air impermeable covering, and the inner side of the sealing layer.

20. The air delivery conduit of claim 19, wherein the sealing flap is sealed to the inner side of the sealing layer on the second side of the air impermeable covering.

21. The air delivery conduit of claim 18, wherein the sealing layer is bonded to the flexible reinforcing structure.

22. The air delivery conduit of claim 18, wherein the air delivery conduit comprises an outer strip bonded to an outer side of the air impermeable covering over and along the second edge of the air impermeable covering.

* * * * *

UNITED STATES PATENT AND TRADEMARK OFFICE
CERTIFICATE OF CORRECTION

PATENT NO. : 12,496,422 B2  
APPLICATION NO. : 17/612657  
DATED : December 16, 2025  
INVENTOR(S) : Angelene Marie Ozolins Page 1 of 1

It is certified that error appears in the above-identified patent and that said Letters Patent is hereby corrected as shown below:

In the Claims

In Claim 1, Column 128, Line 44, "…wherein the scaling layer extends across an inner side of…" should read "…wherein the sealing layer extends across an inner side of…"

In Claim 17, Column 129, Line 44, "…a scaling strip applied to a flexible reinforcing structure…" should read "…a sealing strip applied to a flexible reinforcing structure…"

Signed and Sealed this  
Thirteenth Day of January, 2026

John A. Squires  
*Director of the United States Patent and Trademark Office*